United States Patent
Gordon et al.

(10) Patent No.: US 11,637,915 B1
(45) Date of Patent: *Apr. 25, 2023

(54) SYSTEM, METHOD, AND COMPUTER PROGRAM PRODUCT FOR COORDINATION AMONG MULTIPLE DEVICES

(71) Applicant: W74 Technology, LLC, Plano, TX (US)

(72) Inventors: George Andrew Gordon, Fisco, TX (US); Joseph A Cerrato, Longview, TX (US); Ronald A Johnston, Longview, TX (US); Kevin J Zilka, Los Gatos, CA (US)

(73) Assignee: W74 Technology, LLC, Longview, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/371,039

(22) Filed: Jul. 8, 2021

Related U.S. Application Data

(63) Continuation of application No. 16/989,865, filed on Aug. 10, 2020, now Pat. No. 11,089,134, which is a
(Continued)

(51) Int. Cl.
*G06F 3/04817* (2022.01)
*G06F 3/14* (2006.01)
(Continued)

(52) U.S. Cl.
CPC .......... *H04L 67/75* (2022.05); *G06F 3/04817* (2013.01); *G06F 3/1454* (2013.01);
(Continued)

(58) Field of Classification Search
CPC ..... H04L 67/75; H04L 69/18; G06F 3/04817; G06F 3/1454; H04M 1/72436; H04W 4/023
See application file for complete search history.

(56) References Cited

U.S. PATENT DOCUMENTS 7,254,786 B2   8/2007   Henriquez
8,291,349 B1   10/2012  Park et al.
(Continued)

FOREIGN PATENT DOCUMENTS

AU   2014278594 A1   12/2015
CN   102687485 B     12/2015
(Continued)

OTHER PUBLICATIONS

Decision to Grant, dated Jul. 29, 2015. received in Dutch Patent Application No. 2012928 (5898NL01), which corresponds with U.S. Appl. No. 14/290,973, 4 pages.
(Continued)

*Primary Examiner* — Daxin Wu
(74) *Attorney, Agent, or Firm* — Patrick E. Caldwell, Esq.; The Caldwell Firm, LLC

(57) ABSTRACT

In various embodiments, a method, apparatus, and computer program product are provided involving, at a first device: opening the application on the first device, performing an action utilizing an application, updating a state of the application, for being communicated with the second device; and, at a second device: utilizing the updated state of the application received from the first device, displaying an interface including: a button for opening the application utilizing the second device, and indicia that indicates that the first device has updated at least one aspect of the application, and in response to a detection of the selection of the button, accessing the application utilizing the second device such that the application is accessed so as to reflect the updated state of the application.

20 Claims, 43 Drawing Sheets

Related U.S. Application Data continuation-in-part of application No. 16/537,488, filed on Aug. 9, 2019, now Pat. No. 10,776,103, which is a continuation-in-part of application No. 15/925,737, filed on Mar. 19, 2018, which is a continuation-in-part of application No. 14/050,332, filed on Oct. 9, 2013, now abandoned, and a continuation-in-part of application No. 13/652,458, filed on Oct. 15, 2012, now abandoned.

(60) Provisional application No. 61/748,371, filed on Jan. 2, 2013, provisional application No. 61/577,657, filed on Dec. 19, 2011.

(51) Int. Cl.
  *H04L 67/75* (2022.01)
  *H04L 69/18* (2022.01)
  *H04W 4/02* (2018.01)
  *H04M 1/72436* (2021.01)

(52) U.S. Cl.
  CPC ........ *H04L 69/18* (2013.01); *H04M 1/72436* (2021.01); *H04W 4/023* (2013.01)

(56) References Cited

U.S. PATENT DOCUMENTS

| | | | |
|---|---|---|---|
| 8,417,225 | B2 | 4/2013 | Mock et al. |
| 8,577,803 | B2 | 11/2013 | Chatterjee et al. |
| 8,799,977 | B1* | 8/2014 | Kapner, III ...... H04N 21/23113 709/212 |
| 9,413,761 | B2* | 8/2016 | Herberger ............. H04L 63/10 |
| 9,483,758 | B2 | 11/2016 | Rhee et al. |
| 9,519,901 | B1 | 12/2016 | Dorogusker |
| 9,830,589 | B2 | 11/2017 | Xing |
| 10,120,541 | B2 | 11/2018 | Shaw et al. |
| 10,311,503 | B2 | 6/2019 | Lim et al. |
| 10,379,830 | B2 | 8/2019 | Prasad et al. |
| 10,551,876 | B2 | 2/2020 | Sepulveda et al. |
| 10,635,134 | B2 | 4/2020 | Sepulveda et al. |
| 10,642,416 | B2 | 5/2020 | Sepulveda et al. |
| 10,754,603 | B2 | 8/2020 | Bernstein et al. |
| 11,017,458 | B2 | 5/2021 | Lim et al. |
| 11,089,134 | B1* | 8/2021 | Gordon ................. G06F 3/0481 |
| 2002/0015042 | A1* | 2/2002 | Robotham ............ G06F 3/1454 345/581 |
| 2002/0169673 | A1 | 11/2002 | Prorock et al. |
| 2003/0169290 | A1* | 9/2003 | Nishiyama ............ H04L 67/535 715/738 |
| 2006/0135142 | A1 | 6/2006 | Repka |
| 2006/0224989 | A1 | 10/2006 | Pettiross et al. |
| 2007/0035513 | A1 | 2/2007 | Sherrard et al. |
| 2007/0157094 | A1 | 7/2007 | Lemay et al. |
| 2008/0165210 | A1 | 7/2008 | Platzer et al. |
| 2008/0274752 | A1* | 11/2008 | Houri .................... H04W 4/021 455/456.1 |
| 2009/0007014 | A1 | 1/2009 | Coomer et al. |
| 2009/0182630 | A1 | 7/2009 | Otto et al. |
| 2009/0300649 | A1 | 12/2009 | Gopal et al. |
| 2010/0179991 | A1* | 7/2010 | Lorch .................... H04L 51/10 715/810 |
| 2011/0117898 | A1 | 5/2011 | Pereira et al. |
| 2011/0163969 | A1 | 7/2011 | Anzures et al. |
| 2011/0202834 | A1 | 8/2011 | Mandryk et al. |
| 2011/0264586 | A1 | 10/2011 | Boone et al. |
| 2012/0030566 | A1 | 2/2012 | Victor |
| 2012/0192239 | A1* | 7/2012 | Harwell ............. H04N 21/2343 725/109 |
| 2012/0240041 | A1 | 9/2012 | Lim et al. |
| 2012/0291020 | A1* | 11/2012 | Scharer III, III ...... H04N 5/272 717/172 |
| 2012/0310743 | A1 | 12/2012 | Johri |
| 2013/0036382 | A1 | 2/2013 | Yuan et al. |
| 2013/0047123 | A1 | 2/2013 | May et al. |
| 2013/0054826 | A1 | 2/2013 | Hong et al. |
| 2013/0117365 | A1* | 5/2013 | Padmanabhan ......... H04L 67/10 709/204 |
| 2013/0125020 | A1 | 5/2013 | Lee et al. |
| 2013/0189953 | A1 | 7/2013 | Mathews |
| 2013/0212470 | A1 | 8/2013 | Karunamuni et al. |
| 2013/0219342 | A1 | 8/2013 | Nosou et al. |
| 2013/0268331 | A1 | 10/2013 | Bitz et al. |
| 2013/0275883 | A1 | 10/2013 | Bharshankar et al. |
| 2013/0332297 | A1 | 12/2013 | Forutanpour et al. |
| 2014/0030980 | A1 | 1/2014 | D'Ambrosio |
| 2014/0162598 | A1 | 6/2014 | Villa-Real |
| 2014/0362056 | A1 | 12/2014 | Zambetti et al. |
| 2014/0365882 | A1 | 12/2014 | Lemay |
| 2014/0365912 | A1 | 12/2014 | Shaw et al. |
| 2014/0365919 | A1 | 12/2014 | Shaw et al. |
| 2014/0365953 | A1 | 12/2014 | Zambetti et al. |
| 2017/0010771 | A1 | 1/2017 | Bernstein et al. |
| 2017/0010846 | A1 | 1/2017 | Bernstein et al. |
| 2017/0010847 | A1 | 1/2017 | Bernstein et al. |
| 2019/0073102 | A1 | 3/2019 | Shaw et al. |
| 2019/0220134 | A1 | 7/2019 | Sepulveda et al. |
| 2020/0249720 | A1 | 8/2020 | Sepulveda et al. |

FOREIGN PATENT DOCUMENTS

| | | |
|---|---|---|
| DK | 201770561 A1 | 2/2018 |
| DK | 201670555 B | 10/2018 |
| EP | 3130999 A1 | 1/2019 |
| EP | 3699746 A1 | 8/2020 |
| NL | 2012929 A | 12/2014 |
| WO | 2011100623 A3 | 11/2011 |
| WO | 2013039528 A1 | 3/2013 |
| WO | 2014200730 A1 | 12/2014 |
| WO | 2014200676 A3 | 4/2015 |
| WO | 2018022313 A1 | 2/2018 |

OTHER PUBLICATIONS

Dutch Search Report, dated May 12, 2015, received in Dutch Patent Application No. 2012928, which corresponds with U.S. Appl. No. 14/290,973, 4 pages.

Dutch Search Report, dated May 12, 2015, received in Dutch Patent Application No. 2012928, which corresponds with U.S. Appl. No. 14/290,973, 11 pages.

Dutch Search Report, dated May 12, 2015, received in Dutch Patent Application No. 2012929, which corresponds with U.S. Appl. No. 14/290,973, 6 pages.

Dutch Search Report, dated May 12, 2015, received in Dutch Patent Application No. 2012929, which corresponds with U.S. Appl. No. 14/290,973, 13 pages.

Final Office Action, dated Jan. 27, 2017, received in U.S. Appl. No. 14/290,973 (5898), 17 pages.

Final Rejection, dated Sep. 1, 2021 for U.S. Appl. No. 17/180,662.

International Preliminary Report of Patentability, dated Dec. 15, 2015, received in International Patent Application No. PCT/US2014/040398, which corresponds with U.S. Appl. No. 14/290,973, 11 pages.

Non-Final Rejection, dated Aug. 9, 2021 for U.S. Appl. No. 16/990,990.

Non-Final Rejection, dated Aug. 18, 2021 for U.S. Appl. No. 16/041,614.

Notice of Allowance dated Apr. 13, 2022 for U.S. Appl. No. 16/357,161.

Notice of Allowance, dated Jan. 17, 2020, received in Japanese Patent Application No. 2018-212428 (7584JP), which corresponds with U.S. Appl. No. 16/181,939, 5 pages.

Notice of Allowance, dated Jun. 25, 2018, received in U.S. Appl. No. 14/290,973 (5898), 14 pages.

Notice of Allowance, dated Mar. 10, 2017, received in U.S. Appl. No. 14/290.960 (5979), 8 pages.

Notice of Allowance, dated May 14, 2019, received in Chinese Patent Application No. 201480032760.9 (5898CN), which corresponds with U.S. Appl. No. 15/290,973, 3 pages.

(56) References Cited

OTHER PUBLICATIONS

Notice of Allowance, dated Nov. 13, 2017, received in Korean Patent Application No. 2015-7036974 (5898KR), which corresponds with U.S. Appl. No. 14/290,973, 4 pages.
Notice of Allowance, dated Nov. 30, 2017, received in Korean Patent Application No. 2015-7036974 (5898KR), which corresponds with U.S. Appl. No. 14/290,973, 4 pages.
Notice of Allowance, dated Oct. 12, 2018, received in Japanese Patent Ap plication No. 2017-076173 (5898JP01), which correspond s with U.S. Appl. No. 14/290,973, 5 pages.
Office Action dated Mar. 31, 2021 for U.S. Appl. No. 16/041,614.
Office Action dated May 4, 2021 for U.S. Appl. No. 17/180,662.
Office Action dated May 12, 2021 for U.S. Appl. No. 16/041,611.
Office Action dated Jun. 1, 2021 for U.S. Appl. No. 16/041,614.
Office Action dated Jun. 10, 2020 for U.S. Appl. No. 16/041,611.
Office Action dated Jun. 10, 2020 for U.S. Appl. No. 16/041,614.
Office Action dated Oct. 3, 2019 for U.S. Appl. No. 16/041,611.
Office Action dated Oct. 3, 2019 for U.S. Appl. No. 16/041,614.
Office Action dated Nov. 19, 2021 for U.S. Appl. No. 17/180,662.
Office Action dated Dec. 8, 2021 for U.S. Appl. No. 16/041,611.
Office Action dated Jan. 3, 2020 for U.S. Appl. No. 16/357,161.
Office Action, dated Aug. 3, 2021 for U.S. Appl. No. 16/357,161.
Office Action, dated Dec. 14, 2018, received in European Patent Application No. 1473575.1 (5898EP), which corresponds with U.S. Appl. No. 14/290,973, 5 pages.
Office Action, dated Feb. 20, 2018, received in Japanese Patent Application No. 2017-076173 (5898JP01), which corresponds with U.S. Appl. No. 14/290,973, 8 pages.
Office Action, dated Jan. 28, 2019, received in Chinese Patent Application No. 201480032760.9 (5898CN), which corresponds with U.S. Appl. No. 14/290,973, 4 pages.
Office Action, dated Jun. 12, 2018, received in Chinese Patent Application No. 201480032760.9 (5898CN), which corresponds with U.S. Appl. No. 14/290,973, 5 pages.
Office Action, dated Jun. 30, 2017, received in U.S. Appl. No. 14/290,973 (5898), 25 pages.
Office Action, dated Mar. 10, 2016, received in U.S. Appl. No. 14/290,960, 10 pages.
Office Action, dated May 19, 2017, received in Korean Patent Application No. 2015-7036974 (5859KR), which corresponds with U.S. Appl. No. 14/290,973, 4 pages.
Office Action, dated May 24, 2016, received in U.S. Appl. No. 14/290,973, 18 pages.
Office Action, dated Sep. 2, 2016, received in Australian Patent Application No. 2014278594, which corresponds with U.S. Appl. No. 14/290,973, 2 pages.
Oral Summons, dated Jan. 16, 2020, received in European Patent Application No. 14735751.1 (5898EP), which corresponds with U.S. Appl. No. 14/ 290,973, 9 pages.
Patent, dated Feb. 19, 2018, received in Korean Patent Application No. 2015-7036974 (5898KR), which corresponds with U.S. Appl. No. 16/181,939, 4 pages.
U.S. Appl. No. 16/041,614 Office Action Communication dated Jan. 14, 2022.
U.S. Appl. No. 16/041,614 Office Communication dated Jul. 15, 2022.
U.S. Appl. No. 16/041,614 Response filed Apr. 14, 2022.
U.S. Appl. No. 16/357,161 Office Communication dated Apr. 13, 2022.
U.S. Appl. No. 16/357,161 Office Communication dated May 5, 2022.
U.S. Appl. No. 16/357,161 Response filed Mar. 30, 2022.
U.S. Appl. No. 16/990,990 Office Action Communication dated Jan. 24, 2022.
U.S. Appl. No. 16/990,990 Office Communication dated Jul. 19, 2022.
U.S. Appl. No. 16/990,990 Response filed Jan. 10, 2022.
U.S. Appl. No. 16/990,990 Response filed Jun. 23, 2022.
U.S. Appl. No. 17/180,662 Office Communication dated Apr. 28, 2022.
U.S. Appl. No. 17/180,662 Petition filed May 10, 2022.
U.S. Appl. No. 61/832,939.
Wallen, "Five Useful Tips for Your Samsung Galaxy S III," TechRepublic, http:www.techrepublic.com/blog.smartphones/five-useful-tips-for-your-Samsung-Galaxy-S-III, Nov. 1, 2012, 12 pages.
Wikipedia, "iOS 5," https://en.wikipedia.org/wiki/IOS_5#:~:text=iOS%205%20is%20the%20fifth,6%20on%20September%2019%2C%202012.
WO 2014/200730 Spec.

\* cited by examiner

SYSTEM, METHOD, AND COMPUTER PROGRAM PRODUCT FOR COORDINATION AMONG MULTIPLE DEVICES

RELATED APPLICATION(S)

The present application is a continuation of and claims priority to U.S. application Ser. No. 16/989,865 filed Aug. 10, 2020, which in turn, is a continuation-in-part of and claims priority to U.S. application Ser. No. 16/537,488, filed Aug. 9, 2019, which, in turn, is a continuation-in-part of and claims priority to U.S. application Ser. No. 15/925,737, filed Mar. 19, 2018, which, in turn, is a continuation-in-part of and claims priority to U.S. application Ser. No. 13/652,458, filed Oct. 15, 2012, which in turn claim priority to U.S. Provisional Application No. 61/577,657, filed Dec. 19, 2011.

U.S. application Ser. No. 15/925,737, filed Mar. 19, 2018 (published as U.S. Patent Publication No. 2018-0211282), is a continuation-in-part of and claims priority to U.S. application Ser. No. 14/050,332, filed Oct. 9, 2013 (published as U.S. Patent Publication No. 2018-0032997), which, in turn, claims priority to U.S. Provisional Application No. 61/48, 371 filed Jan. 2, 2013. U.S. Provisional Application No. 61/48,371 filed Jan. 2, 2013: U.S. Patent Publication No. 2018-0211282; and U.S. Patent Publication No. 2018-0032997 are incorporated herein by reference for all purposes.

FIELD OF THE INVENTION AND BACKGROUND

The present invention relates to mobile devices, and more particularly to device coordination.

SUMMARY

In some embodiments, a non-transitory computer readable storage medium, method, and device are provided to while displaying a first application on the display, detect a first input that corresponds to a request to share first content from the first application; in response to detecting the first input, display a sharing interface that includes a plurality of options for sharing the first content, wherein the sharing interface includes: a first predefined region for displaying one or more user-first sharing options for sharing content directly with other users; and a second predefined region separate from the first predefined region for displaying protocol-first sharing options for sharing content using a user-selected protocol of a plurality of protocols; and while displaying the sharing interface, detect selection of an affordance in the sharing interface; in accordance with a determination that the affordance is a respective user-first sharing option for a respective user, initiate a process for sharing the first content with the respective user; and in accordance with a determination that the affordance is a protocol-first sharing option for a respective protocol, initiate a process for sharing the first content using the respective protocol.

In some embodiments, a non-transitory computer readable storage medium, method, and device are provided for while displaying a first user interface of a first application on the display, detecting a first input that corresponds to a request to share first content from the first application; in response to detecting the first input, while continuing to display at least a portion of the first user interface of the first application, displaying a sharing interface that includes a plurality of concurrently displayed, user-selectable options for sharing the first content, wherein the sharing interface includes: a first predefined region for displaying one or more user-first sharing options for sharing content directly with other users; and a second predefined region, separate from and concurrently displayed with the first predefined region, the second predefined region for displaying protocol-first sharing options for sharing content using a user-selected protocol of a plurality of protocols; and while displaying the sharing interface, detecting user selection of an affordance in the sharing interface; and in response to detecting user selection of the affordance in the sharing interface: in accordance with a determination that detecting user selection of the affordance in the sharing interface includes detecting selection of a respective user-first sharing option for a respective user without detecting selection of any of the protocol-first sharing options in addition to selection of the respective user-first sharing option for the respective user, initiating a process for sharing the first content with the respective user, including replacing display of at least a portion of the sharing interface with a first user interface element corresponding to the user-first sharing option; and in accordance with a determination that detecting user selection of the affordance in the sharing interface includes detecting selection of a respective protocol-first sharing option for a respective protocol without detecting selection of any of the user-first sharing options in addition to selection of the respective protocol-first sharing option for the respective protocol, initiating a process for sharing the first content using the respective protocol, including replacing display of at least a portion of the sharing interface with a second user interface element corresponding to the respective protocol, wherein the second user interface element is different from the first user interface element.

DETAILED DESCRIPTION

The present application incorporates by reference all of the following: U.S. Non-Provisional application Ser. No. 13/652,458, filed Oct. 15, 2012, which claims priority from U.S. Provisional Application No. 61/547,638, filed Oct. 14, 2011. U.S. Provisional Application No. 61/567,118 dated Dec. 5, 2011. U.S. Provisional Application No. 61/577,657 dated Dec. 19, 2011. U.S. Provisional Application No. 61/599,920 dated Feb. 16, 2012, and U.S. Provisional Application No. 61/612,960 dated Mar. 19, 2012, all of which are incorporated herein by reference in their entirety for all purposes. As an option, any one or more of the following embodiments (and/or any one or more features thereof) described in connection with any one or more of the subsequent Figure(s) may or may not be implemented in the context of any one or more of the embodiments (and/or any one or more features thereof) described in connection with any one or more Figure(s) of the above incorporated applications. Of course, however, any one or more of the following embodiments (and/or any one or more features thereof) may be implemented in any desired environment.

Figures 1, 90:
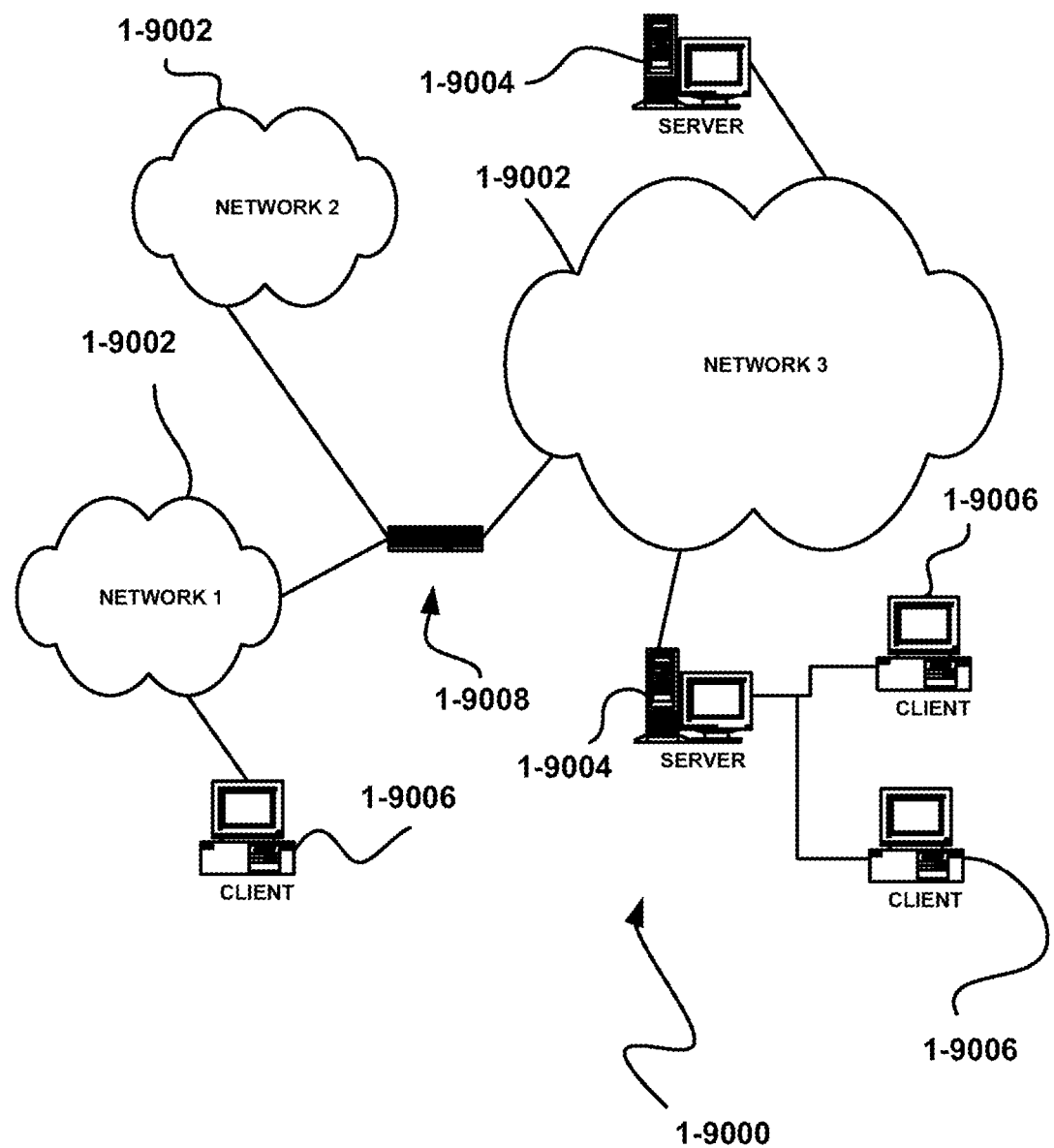
FIG. 1-90 illustrates a network architecture, in accordance with one embodiment.

FIG. 1-90 illustrates a network architecture 1-9000, in accordance with one embodiment. As shown, a plurality of networks 1-9002 is provided. In the context of the present network architecture 1-9000, the networks 1-9002 may each take any form including, but not limited to a local area network (LAN), a wireless network, a wide area network (WAN) such as the Internet, peer-to-peer network, etc.

Coupled to the networks 1-9002 are servers 1-9004 which are capable of communicating over the networks 1-9002. Also coupled to the networks 1-9002 and the servers 1-9004 is a plurality of clients 1-9006. Such servers 1-9004 and/or clients 1-9006 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 1-9002, at least one gateway 1-9008 is optionally coupled therebetween.

Figures 2, 91:
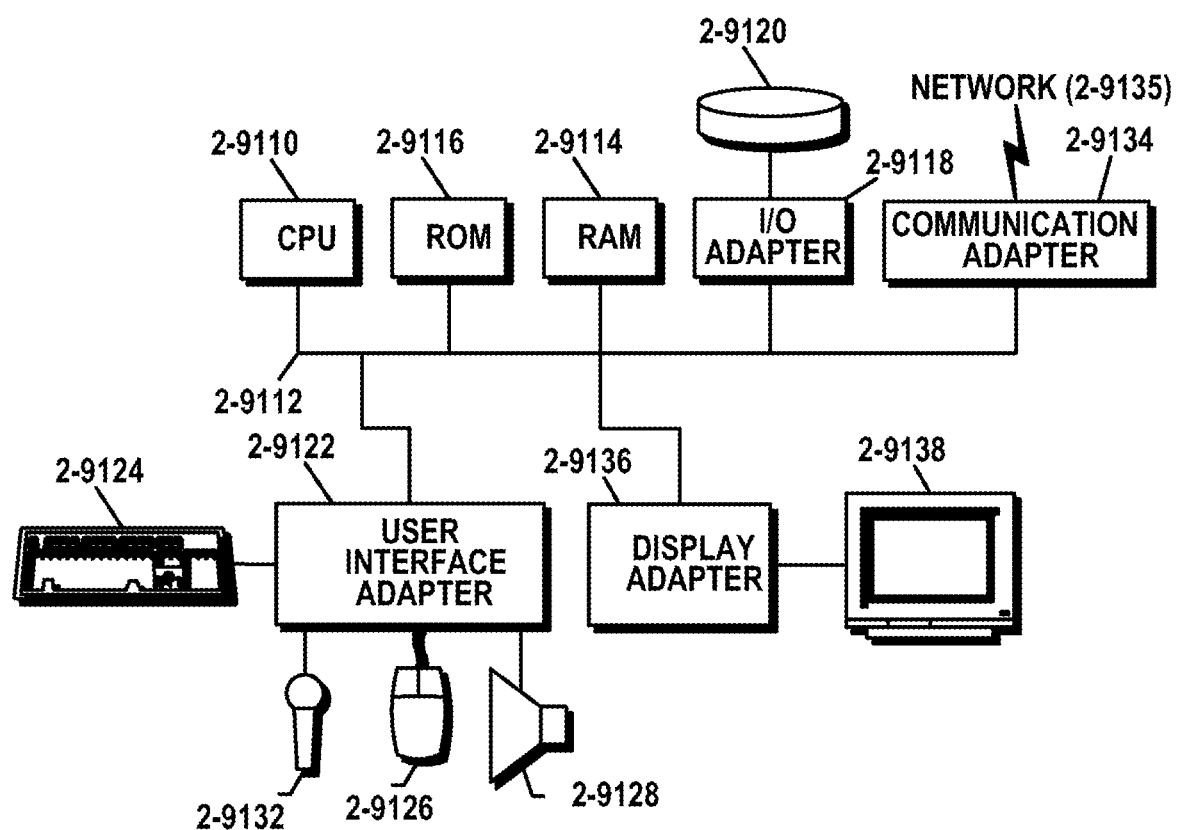
FIG. 2-91 shows a representative hardware environment that may be associated with the servers and/or clients of FIG. 1-90, in accordance with one embodiment.

FIG. 2 shows a representative hardware environment that may be associated with the servers 1-9004 and/or clients 1-9006 of FIG. 1-90, in accordance with one embodiment. Such figure illustrates a typical hardware configuration of a workstation in accordance with one embodiment having a central processing unit 2-9110, such as a microprocessor, and a number of other units interconnected via a system bus 2-9112.

The workstation shown in FIG. 2-91 includes a Random Access Memory (RAM) 2-9114, Read Only Memory (ROM) 2-9116, an I/O adapter 2-9118 for connecting peripheral devices such as disk storage units 2-9120 to the bus 2-9112, a user interface adapter 2-9122 for connecting a keyboard 2-9124, a mouse 2-9126, a speaker 2-9128, a microphone 2-9132, and/or other user interface devices such as a touch screen (not shown) to the bus 2-9112, communication adapter 2-9134 for connecting the workstation to a communication network 2-9135 (e.g., a data processing network) and a display adapter 2-9136 for connecting the bus 2-9112 to a display device 2-9138.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figures 3, 92:
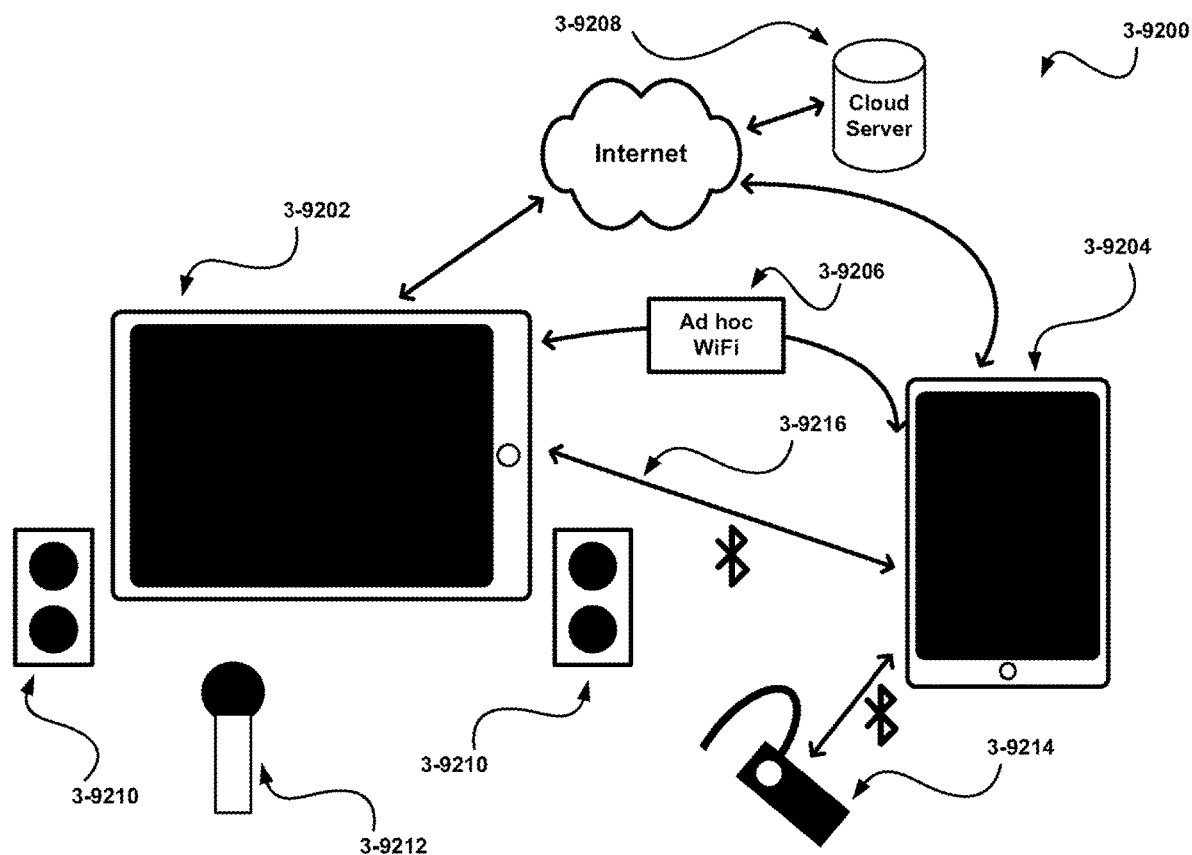
FIG. 3-92 shows a system for sending a control message to a mobile phone utilizing a tablet, in accordance with another embodiment.

FIG. 3-92 shows a system 3-9200 for sending a control message to a mobile phone utilizing a tablet, in accordance with one embodiment. As an option, the system 3-9200 may be implemented in the context of the architecture and environment of the previous Figures or any subsequent Figure(s). Of course, however, the system 3-9200 may be implemented in any desired environment. It should also be noted that the aforementioned definitions may apply during the present description.

As shown, a tablet computer 3-9202 may be included. Additionally, a phone device 3-9204 may be included.

In various embodiments, the tablet and the phone may be integrated together, allowing the user to utilize the resources of both devices through a unified interface. For example, in one embodiment, the user may operate the phone by causing the tablet to send a control message to the phone. In the context of the present description, a control message refers to a signal sent to a device to serve as a substitute for direct user input. Thus, integration requires some form of communication to occur between the tablet and the phone.

In one embodiment, the tablet and the phone may communicate by various techniques. For example, in one embodiment, the phone and the tablet may communicate wirelessly through an ad-hoc, or peer-to-peer, Wi-Fi network 3-9206, a Bluetooth channel 3-9216, or any other wireless protocol, such as Wireless USB or near-field. Additionally, in one embodiment, the tablet and phone may communicate through a network, such as a local area network or wireless local area network. Furthermore, in one embodiment, the tablet and phone may communicate via an external network, such as the internet, or through an external server, such as a cloud server 3-9208.

Integration facilitates the synergistic use of both devices to perform a variety of tasks. For example, in one embodiment, a process running on the phone may make use of speakers 3-9210 and/or microphone 3-9212 coupled to the tablet. Furthermore, in one embodiment, the phone may utilize a Bluetooth headset 3-9214 as an audio input/output device. In another embodiment, the phone may utilize the tablet as a Bluetooth audio input/output device, via Bluetooth connection 3-9216.

Figures 4, 93:
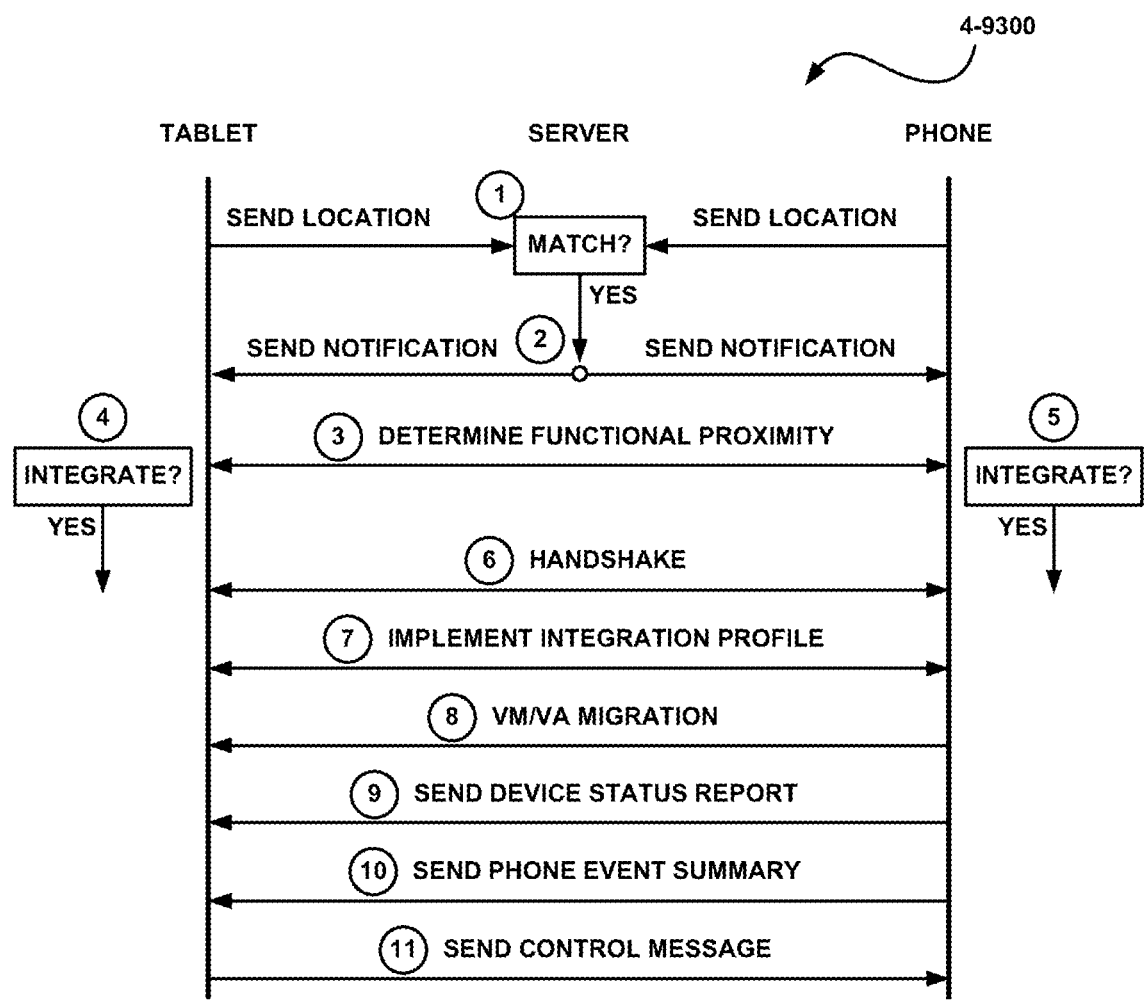
FIG. 4-93 shows an exemplary system flow for sending a control message to a mobile phone utilizing a tablet, in accordance with one embodiment.

FIG. 4-93 shows an exemplary system flow 4-9300 for sending a control message to a mobile phone utilizing a tablet, in accordance with one embodiment. As an option, the exemplary system flow 4-9300 may be implemented in the context of the architecture and environment of the previous Figures or any subsequent Figure(s). Of course, however, the exemplary system flow 4-9300 may be implemented in any desired environment. It should also be noted that the aforementioned definitions may apply during the present description.

As shown, a phone and a tablet may send location data to a server (e.g. see Step 1). In the context of the present description, location data may include, but is not limited to, GPS coordinates, names and signal strength of detectable Wi-Fi networks, assigned IP address, and/or any other data which may be used to determine the location of the device.

In various embodiments, the location data is used to facilitate a user in utilizing the phone and the tablet together. In some embodiments, the phone and the tablet may be associated with the same user. In one embodiment, the phone and the tablet are associated with a single user. In another embodiment, one or both devices may be associated with a plurality of users. In still another embodiment, one of the devices may be a public device, able to be temporarily associated with any user. As an option, a user may be required to provide authentication before being able to utilize a public device.

In one embodiment, location data may be sent to the server at regular intervals. In another embodiment, location data may be sent to the server only when device movement has been detected. For example, transmission of location data may be triggered by device accelerometer data. In yet another embodiment, location data may be sent to the server only after the device has been in motion for a predefined amount of time. In this way, location data may be kept up to date while reducing the amount of power expended determining and transmitting the data.

In various embodiments, the location data of the phone and tablet are compared by the server. If it is determined that the phone and tablet are within some threshold distance from each other, a notification is sent to the tablet and the phone indicating an integration may be possible (e.g. see Step 2). In one embodiment, the threshold distance may be based on the average distance between two devices being used by the same person. In another embodiment, the threshold distance may be governed by the device with the least accurate method for determining its location. For example, if the method used to locate the tablet is only accurate to within 20 feet, while the method to locate the phone is accurate to within 2 feet, the threshold distance may be set to 20 feet. In still another embodiment, the threshold distance may be set by a user. For example, in one embodiment, the threshold distance may be set by the user using a user interface similar to FIG. 30 of the previous application.

In some situations, the location data sent to the server may not be accurate enough to consistently distinguish between instances where a user may wish to integrate the two devices from instances where the two devices are close, but functionally separate. For example, the phone and tablet may be near each other, but separated by a wall. In various embodiments, upon receipt of a notification from the server indicating that the phone and tablet are within a threshold distance from each other, the devices may further determine their functional proximity to each other (e.g. see Step 3). In the context of the present description, functional proximity (or functional distance) refers to the separation between the two devices weighted by their ability to be used simultaneously by the same user. In the previous example, the two devices separated by a wall, while physically close, would be functionally distant.

In one embodiment, functional proximity may be determined using RFID tags embedded within the devices. In another embodiment, functional proximity may be determined using an NFC signal. In still another embodiment, functional proximity may be determined by bumping the two devices together and comparing the accelerometer data at a server.

In other embodiments, the functional proximity may be determined using sound. For example, in one embodiment, the ambient noise heard by each device may be transmitted to the server, and compared. In another embodiment, functional proximity may be determined by one device emitting a series of tones in a pattern specified by a server, and the other device comparing the tones heard with a verification code received from the server. As an option, the tones may be ultrasonic.

In various embodiments, upon determining that the phone and tablet are within a threshold functional proximity to each other, each device must determine whether to proceed with an integration (e.g. see Steps 4 and 5). In some embodiments, a user may be notified of a potential integration with a nearby device, and prompted whether to proceed. For example, in one embodiment, a user may be notified of a potential integration through one or more device outputs, including but not limited to, sound, vibration, a LED light, a GUI notification on a device screen, and/or any other device output. In another embodiment, a user may authorize or refuse the potential integration using one or more methods of device input, including but not limited to, a GUI interaction, triggering an accelerometer (e.g. tapping a pattern), pressing a hardware button, a voice command, and/or any other form of user input. As a specific example, in one embodiment, a user may be able to be notified of a potential integration and accept said integration without having to look at the screen of a device. As an option, in one embodiment, this "no look" authorization of an integration may be limited to devices preselected by the user.

In various embodiments, one or both of the devices may proceed with an integration without requiring user input. For example, in one embodiment, one or both devices may notify the user of a potential integration, and proceed with the integration unless the user intervenes within a certain period of time. In another embodiment, a device may proceed with the integration if one or more conditions are satisfied. These conditions may include, but are not limited to, device location, the amount of time elapsed since an accelerometer registered device movement, device identity, time of day, day of the week, and/or any other condition.

Furthermore, a device may automatically refuse an integration if one or more conditions are satisfied, in various embodiments. These conditions may include, but are not limited to, whether the device is being used by a different user, whether the devices is being powered by a battery, and/or any other condition.

In other embodiments, the determination whether or not to automatically proceed with an integration may be based upon a predefined computer mode, such as the desktop computer and tablet modes discussed in the previous application. For example, in one embodiment, whether or not an integration is automatically performed may be defined in a user interface similar to that shown in FIG. 34 of the previous application.

A successful integration requires both devices to proceed. If either device refuses the integration, the process is halted.

As a specific example, if a tablet charging on a desk and a phone in a user's hand are both notified that they could potentially integrate, the tablet may automatically proceed with the integration based upon its motionless state and the identity of the phone. However, if the user presses a 'decline' button on the phone, the process is cancelled. In various embodiments, one or more conditions may have to be satisfied before another integration may be attempted, once an integration has been refused. These conditions may include, but are not limited to, whether a preset time period has elapsed, whether the user has manually requested an integration at one or both devices, whether the devices have been separated by a preset distance since the refusal, and/or any other condition.

As shown, if both devices determine that the integration should be allowed, the devices engage in a handshaking process (e.g. see Step 6). In the context of the present description, a handshake process refers to any process used to establish at least one communication channel between the two devices. In various embodiments, a communication channel between the two devices may utilize any of a number of protocols and technologies, including but not limited to, Wi-Fi or other wireless LAN methods, wired LAN or any wired communication protocol, Bluetooth, ad hoc Wi-Fi or other forms of peer-to-peer communication, and/or any other form of inter-device communication. As an option, the communication channel used for the integration may be turned on at the start of the handshaking process. In this way, the channel is only active when needed, preserving battery power and providing additional security.

In various embodiments, the handshaking process may also include a form of authentication. For example, in one embodiment, a user may be prompted to enter a passcode or PIN in one or both devices, to further verify user intention to integrate. In another embodiment, authentication may only be required the first time two devices are being integrated. As a specific example, the previously unknown tablet may display a passcode for the user to enter into their phone, to verify that this tablet should be trusted in the future.

Optionally, authentication may be required only in particular circumstances. For example, in one embodiment, authentication may only be required when integrating with previously unknown devices. In another embodiment, authentication may be required only when the integration is being performed away from one or more predefined locations, such as home and work. In still another embodiment, authentication may be required when using particular protocols, such as Bluetooth. Additionally, handshaking without authentication may be allowed in other circumstances. In one embodiment, authentication may not be required if both devices are on a wireless network previously designated as 'trusted'. In another embodiment, authentication may not be needed if the integration prompt was manually selected by the user on both devices. As an option, a user may define the circumstances in which authentication may or may not be required.

As shown, once the devices are able to communicate, an integration profile is implemented (e.g. see Step 7). In the context of the present description, an integration profile refers to a predefined set of parameters for the integration being formed. For example, in one embodiment, an integration profile may include a collection of contextual triggers associated with one or more use scenarios for the tablet/mobile phone integration. These triggers may include, but are not limited to, location, the identities of the devices, time of day, day of the week, detectable wireless networks, the presence of one or more peripheral devices, accelerometer data, computer mode of one or both devices, and/or any other information which may be used to describe a use context for a tablet/mobile phone integration. In another embodiment, an integration profile may serve as a default profile with no contextual triggers specified.

In some embodiments, an integration profile may include preferences regarding the conditions under which an integration may be performed without user input. For example, in one embodiment, each device may refer to one or more integration profiles to determine whether to proceed with an integration without user input, or whether user input is needed (e.g. see Steps 4 and 5).

In a further embodiment, an integration profile may include one or more parameters describing the integration. For example, in one embodiment, an integration profile may specify what role the mobile phone will play in the integration. In various embodiments, the role of an integrated mobile phone may include, but is not limited to, a mouse, a trackpad, a camera, a keyboard, a customized input device, a display, a speaker, a microphone, and/or any other device role. In another embodiment, an integration profile may specify the role of the integrated tablet.

In yet another embodiment, an integration profile may specify what devices will be used for the various input and output functions of the integration. For example, in one embodiment, an integration profile may specify the method of various outputs and inputs, including, but not limited to, audio, display, and camera. In another embodiment, an integration profile may specify an ordered list of preferred input and output options. In some embodiments, input and output options may be specified globally. In other embodiments, an integration profile may specify particular input and output parameters for particular activities, such as phone calls and video conferences. As an option, other parameters associated with phone calls and video conferences may also be specified in the integration profile, as will be discussed later. In still another embodiment, an integration profile may specify policy regarding the offloading of a virtual machine or virtual applications from the phone to the tablet.

In various embodiments, multiple integration profiles may be associated with a device. In one embodiment, the process of selecting an appropriate integration profile to implement includes checking for conflicting profiles. In the context of the present description, conflicting profiles refers to two or more profiles whose contextual triggers are identical. In some embodiments, profiles whose triggers are a more specific subset of another profile's triggers may be allowed.

In some embodiments, integration profiles may be predefined by a user. The integration profiles themselves may come from different sources. In one embodiment, each device may store one or more integration profiles. The process of integration may include combining both sets of profiles, resolving any conflicts, and providing both devices with an updated set of profiles. As an option, a device may have different sets of integration profiles associated with different users. In another embodiment, the integration profiles may be stored on an external server, such as a cloud server. The maintenance of a single set of profiles prevents conflicts which could potentially slow down the integration process. Additionally, a user may be able to create or modify an integration profile using a web interface and/or a local application.

In one embodiment, the implementation of an integration profile may include storing one or more settings associated with one or both devices in their pre-integrated state. For example, in one embodiment, the devices may store the audio volume setting for both devices before implementing an integration profile which specifies a new volume. Upon disintegration, the devices may be restored to their individual former volumes. Other settings which may be stored may include, but are not limited to, volume, display brightness, security settings (e.g. time before autolock, passcode requirement, etc.), active application, network settings, display orientation lock, and/or any other setting, property, or parameter associated with the devices.

In various embodiments, after the devices are able to communicate and an integration profile has been implemented, one device may transfer one or more active processes to the other device. In one embodiment, this transfer may be performed via the live migration of a virtual machine or virtual application (e.g. see Step 8). This would allow a user to take advantage of resources which were unavailable before the integration without interrupting tasks. These resources may include a larger screen, greater processing power, enhanced I/O capabilities, or even better battery life.

In one embodiment, the live migration of a virtual machine or application may be performed by transferring the virtual machine or application over a communication channel established by the handshake. In another embodiment, the live migration may take place via a server, such as a cloud server. As an option, network connections from both devices may be routed through the cloud server, such that they may retain their distinct network addresses while preventing any disruption of an ongoing host-client or peer-to-peer session after the migration.

In some embodiments, a user may be prompted whether they wish to migrate one or more active processes to the other integrated device. In one embodiment, the prompt may appear on the device where the process is running, informing the user of expanded resources available on the other device. In another embodiment, the prompt may appear on the device with the larger display. In still another embodiment, the transfer may be automatic after the handshaking is completed. In yet another embodiment, the user may predefine specific applications, application types (e.g. games, video conferencing, etc.), or functionality to be automatically migrated after handshaking, without further user input. Of course, in one embodiment, these preferences may be specified in the definition of a computer mode, as discussed in the previous application, or in the integration profile implemented in Step 7.

While operating as part of a tablet/mobile phone integration, the mobile phone will periodically send a device status report to the tablet (e.g. see Step 9), in accordance with one embodiment. In the context of the present description, a device status report refers to information regarding the present capabilities of a device. These capabilities may include, but are not limited to, battery charge, cellular signal strength, communication capacity (e.g. ability to place and receive phone calls, SMS messages, etc.), peripheral devices such as a Bluetooth earpiece, and/or any other device capability. In some embodiments, the device status may be updated periodically. In other embodiments, at least a portion of the device status of the phone may be displayed in a user interface on the tablet.

Once a tablet and phone are integrated, they may serve roles distinct from those served when operated while apart. For example, in one embodiment, the tablet may serve as a display, while the phone may serve as a mouse, as depicted in FIG. 36c of the previous application. However, there may also be some roles which do not change. For example, in another embodiment, while the phone is being used as a mouse, it may also continue to run an application, or receive phone calls or SMS messages. In various embodiments, the tablet may be utilized to interact with the phone, without disrupting the way the phone is utilized in the integration.

As shown, a phone event summary is sent from the phone to the tablet (e.g. see Step 10), in accordance with one embodiment. In the context of the present description, a phone event refers to any event local to the integrated phone. Examples may include, but are not limited to, incoming phone calls, incoming SMS messages, system notifications, application notifications, dialog boxes and other user prompts spawned by processes running on the phone, and/or any other type of event or prompt associated with the phone.

Furthermore, in the context of the present description, a phone event summary refers to the data used to communicate the phone event to the user and elicit a response, if necessary. For example, in one embodiment, a phone event summary for an incoming phone call may include, but is not limited to, the phone number, caller ID information, and contact info (e.g. name, photograph, etc.) associated with the incoming call.

In another embodiment, a phone event summary for a SMS message may include, but is not limited to, the text of the message, the sender's identification (e.g. name, phone number, photograph, etc.). In yet another embodiment, a phone event summary for a system or application notification may include the text of the notification, and an icon representing the source of the notification. In still another embodiment, a phone event summary for a dialog box or other user prompt may include, but is not limited to, the text of the prompt, the user's options, and an icon representing the source of the prompt.

In other embodiments, a phone event summary may be a link which may be used to initiate real-time sharing of the phone display with the tablet. In one embodiment, the transmission of this link may be triggered by the occurrence of an event local to the integrated phone. In another embodiment, this link may be sent once the integration is complete.

Once the phone event summary is received by the tablet, the user will be prompted for input, if necessary, and a control message will be sent to the integrated phone (e.g. see Step 11), in accordance with one embodiment. In the context of the present description, a control message refers to a signal sent to a device to serve as a substitute for direct user input. One or more control messages may be sent in response to the receipt of a phone event summary. Additionally, one or more control messages may be sent without requiring the receipt of a phone event summary. In some embodiments, the type of control message sent to the mobile phone may vary depending upon the nature of the phone event summary and the form of user input requested.

In one embodiment, a control message may consist of an acknowledgement. For example, in one embodiment, where the phone event summary describes a notification generated by the mobile phone operating system or an application running on the mobile phone, the control message sent in response may comprise an acknowledgement that the user had been notified. In one embodiment, this reply may be sent automatically. In another embodiment, this reply may be sent only after the user has dismissed the notification. In this way, the mobile phone may remove the notification from a notification history local to the phone, having been assured that the user was notified and the notification dismissed. In some embodiments, the phone event summary may be presented to the user in the same manner as notifications local to the tablet. In other embodiments, the phone event summary may be presented to the user in a manner which indicates that the notification is local to the mobile phone. Of course, phone event summaries may be presented to the user in other forms, according to various embodiments.

In another embodiment, a control message may consist of one or more commands to be executed on the phone. For example, in one embodiment, where the phone event summary describes a dialog box generated on the mobile phone, the control message sent in response may include an indication of the button selected. As another example, where the phone event summary describes an incoming phone call, the control message sent in response may comprise a command to send the call to voice mail. In some embodiments, the phone event summary may be presented to the user by recreating the same event interface as would be seen on the phone. In other embodiments, the phone event summary may be presented to the user using an interface unique to the tablet, or the tablet/phone integration.

In yet another embodiment, a control message may consist of data describing a user's physical interaction with the tablet device. For example, in one embodiment, where the phone event summary includes a link used to initiate display sharing with the phone, the control message sent in response may include data generated by the user interacting with the tablet's touch screen. In this way, a user is not limited to interacting with phone applications designed to receive remote commands or notifications, but rather can operate the phone through the tablet as though using the phone itself. In some embodiments, the user may interact with the shared phone display in the same manner as they would interact with the actual phone. In other embodiments, the user may interact with the shared display using an input device not normally used with a phone, such as a mouse. As an option, the tablet may present the user with ways to execute multitouch gestures using a mouse cursor combined with some other form of input.

Figures 5, 94:
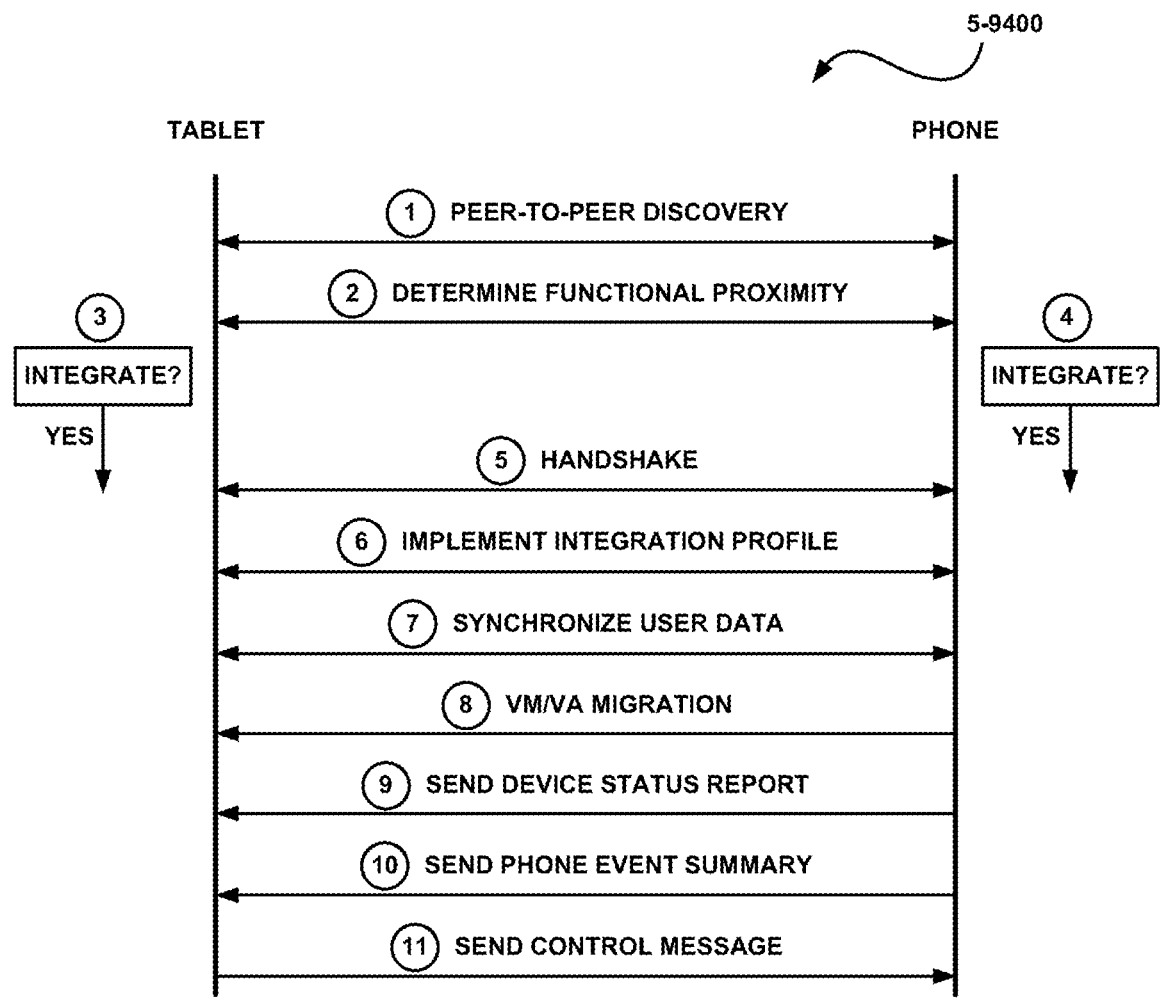
FIG. 5-94 shows an exemplary system flow for sending a control message to a mobile phone utilizing a tablet, in accordance with another embodiment.

FIG. 5-94 shows an exemplary system flow 5-9400 for sending a control message to a mobile phone utilizing a tablet, in accordance with another embodiment. As an option, the exemplary system flow 5-9400 may be implemented in the context of the architecture and environment of the previous Figures or any subsequent Figure(s). Of course, however, the exemplary system flow 5-9400 may be implemented in any desired environment. It should also be noted that the aforementioned definitions may apply during the present description.

In the context of the present description, an ad hoc integration between two devices refers to an integration initiated without an external server or preexisting network infrastructure. These external resources may be later utilized, but they are not required. In one embodiment, the ad hoc integration between a tablet and a phone may be completed without the need for any other device or infrastructure.

The ad hoc integration is initiated by some form of peer-to-peer discovery (e.g. see Step 1). For example, in one embodiment, a tablet may send a broadcast signal message using an ad hoc or peer-to-peer Wi-Fi protocol, which is received and acknowledged by the phone. In another embodiment, the peer-to-peer discovery may be as simple as physically connecting the two devices.

In various embodiments, the peer-to-peer discovery may include the transmission of a broadcast message, containing a device identifier. In some embodiments, this transmission may occur at a regular interval. In other embodiments, this transmission may be triggered by an event. Possible triggering events may include, but are not limited to, an increase in ambient light (e.g. a room light is turned on), an increase in ambient sound, being removed from a case, and/or any other event. In another embodiment, the triggering event and/or time interval may vary according to a predefined context, such as time of day, day of the week, location, whether the device is powered, and/or any other context.

Once the tablet and phone are aware of each other, the functional proximity may be determined (e.g. see Step 2). In addition to the methods for determining functional proximity previously discussed, ad hoc integration may also utilize the methods used to obtain location data (e.g. Step 1 of FIG. 4-93), except the data is sent directly to the other device, and not a central server. Of course, a server may also be utilized, in accordance with another embodiment.

In some embodiments, the determination of functional proximity may be conditionally performed, depending on whether the devices had previously been integrated. In one embodiment, a user may be prompted for permission to share location data with an unknown device to determine the potential for an integration. In another embodiment, functional proximity may be determined only for known devices, or if the user has requested the integration. In still another embodiment, the determination of the functional proximity may be performed solely on the user's known device: upon determining the devices are functionally proximate, the user's device may send an acknowledgement to the unknown device.

In other embodiments, the use of GPS data may be reserved for security purposes during the determination of functional proximity. A third party may attempt to gain access to a user's device by posing as a known device, which may be permitted to automatically integrate without user input. In one embodiment, the determination of functional proximity further entails the transmission of location data of a user's device, as well as the claimed identity of the other device, to a trusted external server. Upon receipt, the external server transmits a request to the other device, which responds with encrypted location data. The server may compare the two, and determine if the two devices are indeed at the same location. If they are not, the integration process is terminated. As an option, the user may be informed of the attempted integration.

As shown, once it is determined that the phone and tablet are functionally proximate to each other, each device must determine whether to proceed with an integration (e.g. see Steps 3 and 4). In one embodiment, the user's device may proceed with the integration without further confirmation, if the user has already provided input, such as granting permission to share location data or explicitly requesting an integration. In other embodiments, the determination may be made using the previously discussed methods.

If both devices determine that the integration should be allowed, the devices engage in a handshaking process (e.g. see Step 5) and implement an integration profile (e.g. see Step 6), as previously discussed.

In one embodiment, once the handshaking process is successfully completed, the two devices synchronize user data (e.g. see Step 7). In various embodiments, the user data which is synchronized may include, but is not limited to, contacts, calendars, tasks, notes, user preferences, bookmarks, stored passwords, and/or any other form of user data.

In various embodiments, after handshaking is done and the devices are able to communicate, one device may transfer one or more active processes to the other device. In one embodiment, this transfer may be performed via the live migration of a virtual machine or virtual application (e.g. see Step 8), as previously discussed.

The final step of the ad hoc integration of the two devices may include the periodic transmission of a device status from one device to another (e.g. see Step 9). Once the tablet and phone have been integrated, the phone may transmit phone event summaries to the tablet (e.g. see Step 10), which may respond with one or more control messages (e.g. see Step 11), in accordance with one embodiment.

Figures 6, 95:
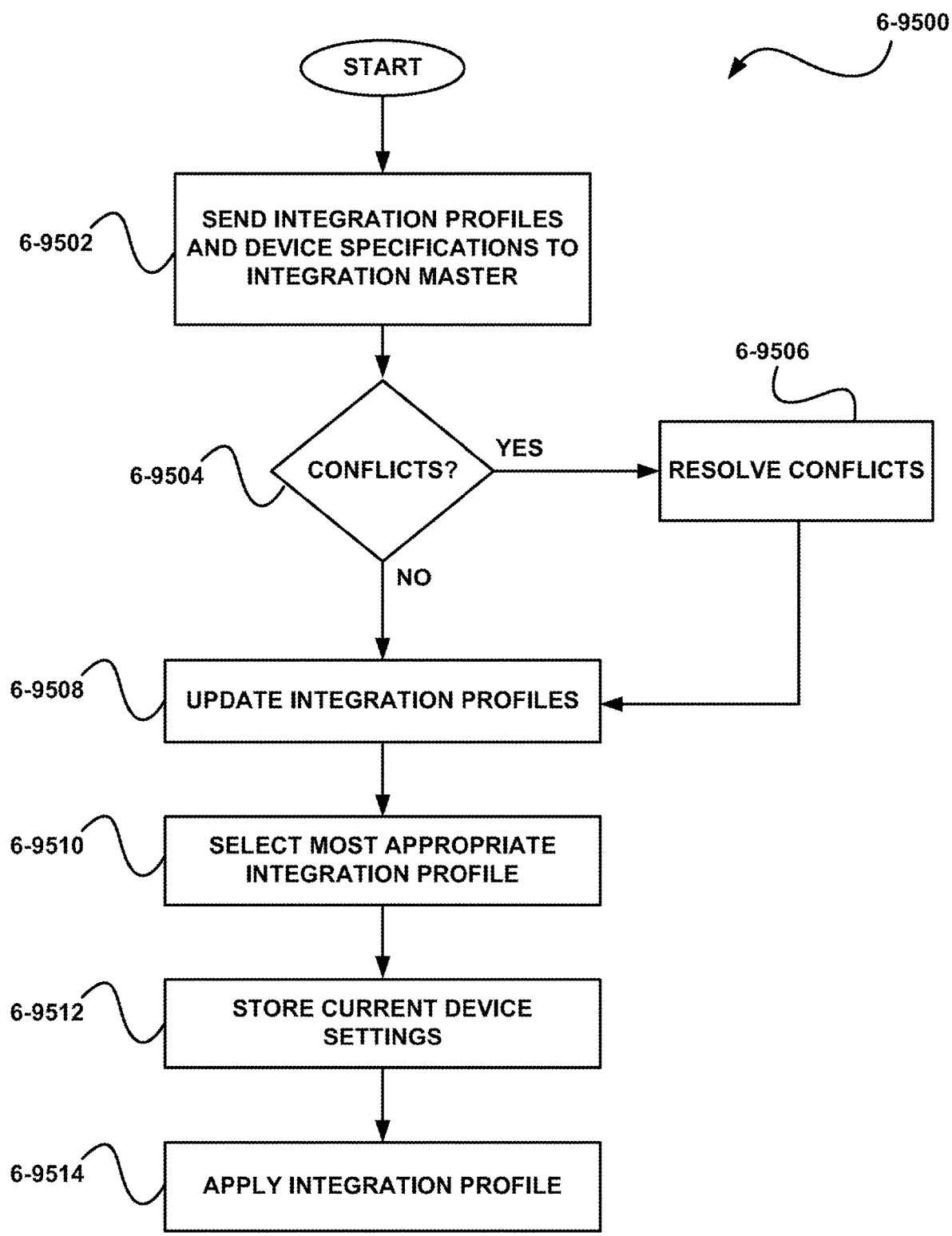
FIG. 6-95 shows a method for implementing an integration profile, in accordance with one embodiment.

FIG. 6-95 shows a method 6-9500 for implementing an integration profile, in accordance with one embodiment. As an option, the method 6-9500 may be implemented in the context of the architecture and environment of the previous Figures or any subsequent Figure(s). Of course, however, the method 6-9500 may be implemented in any desired environment. It should also be noted that the aforementioned definitions may apply during the present description.

In various embodiments, the integration of a tablet and mobile phone proceeds according to an integration profile. In some embodiments, there may exist an external server, such as a cloud server, which possesses one or more integration profiles for the one or more devices associated with a user. As an option, this may be the server to which location data is reported in Step 1 of FIG. 4-93. In one embodiment, the selection of an integration profile to use in a particular situation may be made by an external server.

Alternatively, in another embodiment, the selection of an integration profile may be made by one of the devices being integrated. In one embodiment, the selection may be made after a communication channel has been established between the two devices. In the context of the present description, the device which makes this determination is referred to as the integration master, while the other device is referred to as the integration slave. In one embodiment, the device with the largest display (i.e. the tablet) may be used as the integration master, to facilitate user input. In another embodiment, the device most likely to be under the user's immediate control may be used as the integration master. As a specific example, if accelerometer data indicates that the mobile phone is being held by the user, while the tablet is stationary, the phone may be used as the integration master. In yet another embodiment, a user may specify which device to use as the integration master.

As shown, integration profiles and device specifications are sent from the integration slave to the integration master. See operation 6-9502. In the context of the present description, device specifications refer to a description of the hardware and software capabilities of a device. In various embodiments, hardware capabilities may include, but are not limited to, display size, display resolution, power source (e.g. battery, power supply, etc.), battery charge, attached (i.e. wired) peripherals, paired (i.e. wireless) peripherals, audio output power and quality (e.g. frequency response, etc.), audio input sensitivity and quality (e.g. noise cancelation, etc.), camera resolution, cellular modem, and/or any other physical component associated with a device. Peripherals may include, but are not limited to, keyboards, mice, trackballs, trackpads, speakers, microphones, cameras, video cameras, and/or any other device which may be used in conjunction with a phone or tablet. In the context of the present description, software capabilities may include, but are not limited to, applications or programs capable of enabling video conferencing, VOIP communications, speech recognition, and/or any other software process, in accordance with one embodiment.

Once the integration profiles and device specifications have been received at the integration master, it is determined whether there are any conflicting integration profiles. See determination 6-9504. In one embodiment, two integration profiles may be deemed conflicting if they require the same set of contextual triggers.

As shown, if it is determined that there are conflicting integration profiles, the conflicts are resolved. See operation 6-9506. In one embodiment, a conflict between two integration profiles may be resolved by giving preference to the profile most recently defined or modified. In another embodiment, the user may be prompted to choose between two conflicting integration profiles. As an option, the user may be notified which profile is the most recent. In some embodiments, the resolution of a conflict results in the deletion of one of the integration profiles. In other embodiments, the resolution of a conflict does not alter the integration profiles, requiring a resolution be made every time the conflict arises. As an option, in one embodiment, only conflicts arising from the contextual triggers and device specifications at hand may be resolved, while the rest are ignored.

Once all conflicts have been resolved or ignored, the collection of integration profiles for both devices is updated. See operation 6-9508. In one embodiment, the user may be prompted whether they wish to add new integration profiles to a device.

As shown, the integration master selects the most appropriate integration profile, based upon contextual triggers and device specifications. See operation 6-9510. In the context of the present description, the most appropriate integration profile refers to the profile whose contextual triggers are most narrowly defined (and completely satisfied). In this way, general profiles may be defined for common situations, and be overridden in specific subsets of that situation.

Once an integration profile has been selected, the tablet and mobile phone store their current device settings. See operation 6-9512. These settings may be restored to the devices once the integration has ended. The settings may include, but are not limited to, default audio input and output sources, volume, display orientation lock, display brightness, security settings (e.g. time before autolock, passcode requirement, etc.), active applications, network settings, and/or any other setting, property, or parameter associated with the devices. In another embodiment, the settings may include the active device computer mode, such as those disclosed in the previous application.

In one embodiment, all device settings may be stored. In another embodiment, only settings which will be changed by the implementation of the integration profile may be stored. In still another embodiment, settings which are stored, and then manually adjusted by the user while using the tablet/phone integration, may be deleted, allowing the user to adjust settings before disintegration. In yet another embodiment, a user may be prompted to indicate which settings to store for eventual restoration.

As shown, the selected integration profile is applied to the phone and tablet devices. See operation 6-9514. In various embodiments, the application of an integration profile may include, but is not limited to, modifying audio inputs and/or outputs, modifying settings or preferences for specific applications (e.g. phone application, video conference application, etc.), adjusting volume, adjusting display brightness, and/or any other modification which may be specified in an integration profile.

Figures 7, 96:
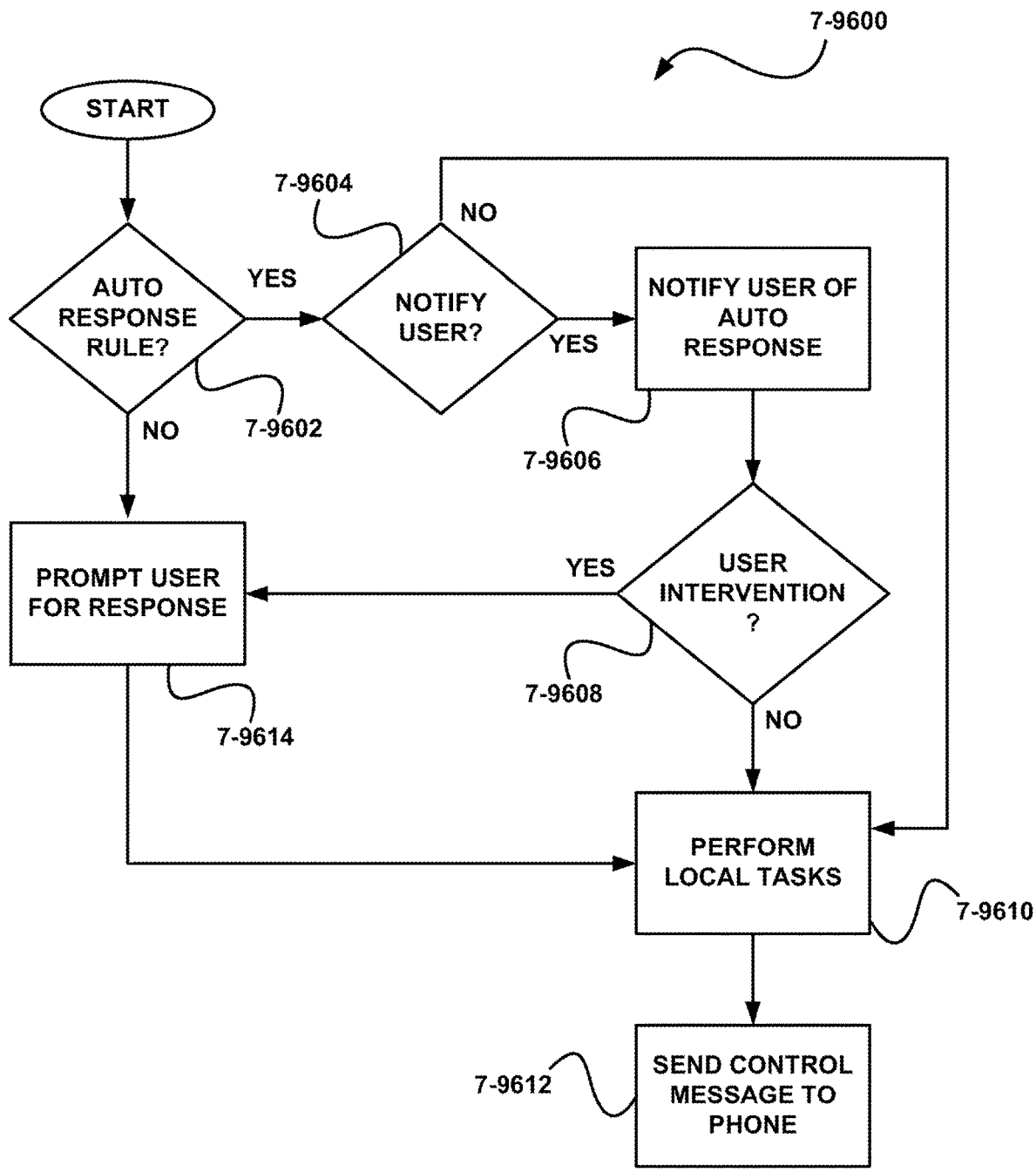
FIG. 7-96 shows a method for handling an incoming call utilizing a tablet/mobile phone integration, in accordance with one embodiment.

FIG. 7-96 shows a method 7-9600 for handling an incoming call utilizing a tablet/mobile phone integration, in accordance with one embodiment. As an option, the method 7-9600 may be implemented in the context of the architecture and environment of the previous Figures or any subsequent Figure(s). Of course, however, the method 7-9600 may be implemented in any desired environment. It should also be noted that the aforementioned definitions may apply during the present description.

In various embodiments, method 7-9600 may be utilized for handling an incoming call. In one embodiment, the incoming call may be a voice call. In another embodiment, the incoming call may be an invitation to join a video conference. In still another embodiment, the incoming call may be an SMS message. FIG. 7-96 shows a method for handling an incoming call which is hosted on an integrated phone device (e.g. a call made using a cellular voice network, etc.). In some embodiments, a similar method may be utilized for handling an incoming call that is hosted on the integrated tablet device (e.g. a video conference, a VOIP-based call, etc.).

As shown, it is determined if there is an auto response rule which may be applied. See determination 7-9602. In the context of the present description, an auto response rule refers to one or more predefined actions, whose automatic performance in response to an event is triggered by the satisfaction of a set of one or more contextual conditions or triggers. In one embodiment, one or more auto response rules may be defined for incoming calls.

In various embodiments, an auto response rule may be triggered based on the identity of the caller. For example, in one embodiment, an auto response rule may be defined such that it is used when a call is received from a particular entity, or one of a plurality of entities. In another embodiment, an auto response rule may be triggered when a call does not originate from a particular entity, or one of a plurality of entities. As a specific example, an auto response rule may be defined such that a call from someone not in the users list of contacts is silently sent to voice mail without requiring user input. Of course, in other embodiments, an auto response rule may require the existence of more than one contextual trigger.

In various embodiments, an auto response rule may be triggered based on the user's calendar. For example, in one embodiment, an auto response rule may be defined such that it is only used if the user's calendar indicates that a particular event is currently occurring. As a specific example, an auto response rule may be defined such that if the user's calendar indicates that a meeting is in progress, an automatic response may be made for all incoming calls.

In one embodiment, an auto response rule may be defined such that it is triggered during any event whose calendar data contains an event name, event location, or note containing one or more specific text strings (e.g. "meeting", "mtg", etc.). In another embodiment, the contextual trigger for an auto response rule may be based on the known participants of a calendar event. For example, an auto response rule may be defined such that all incoming calls will receive an automatic response during a scheduled meeting, unless the call is from someone who was supposed to be in the meeting. In yet another embodiment, an auto response rule may be triggered by the occurrence of a particular class of event, where the event class may be defined when the event is created in the calendar.

In another embodiment, an auto response rule may be defined such that it is triggered based on event data obtained from a source other than the user's calendar. For example, in one embodiment, data obtained from an electronic transaction made by the user (e.g. purchasing movie or event tickets, making restaurant reservations, etc.) may be used to schedule the use of a particular auto response rule. Said data may originate from the user's device, from an external server, or any other source.

In various embodiments, an auto response rule may be triggered by the location of the user's device. For example, in one embodiment, an auto response rule may be defined such that it is triggered when the user is at a user-defined location (e.g. home, office, church, etc.). In another embodiment, an auto response rule may be defined such that it is triggered when the user is at a particular type of location, where the type of the device's present location does not have to be specified by the user. As a specific example, an auto response rule may be defined such that it is utilized whenever it is determined that the user is inside a movie theater.

In some embodiments, an auto response rule may be triggered by the actual location of the device, as determined using GPS or other methods. In other embodiments, a rule may be triggered by the relative location of the device, as determined by the presence of identifying signals (e.g. RFID, NFC, etc.). As a specific example, a rule may be defined such that it is utilized whenever the device detects the presence of an RFID tag associated with the user's car.

In various embodiments, an auto response rule may be triggered by device motion. For example, in one embodiment, an auto response rule may be defined such that it is used whenever the user device is moving faster than a person can walk (i.e. the user is in a moving vehicle). In another embodiment, an auto response rule may be defined such that it is used whenever the device accelerometer data indicates the user is jogging or running. Device motion may be determined using location data such as GPS coordinates, accelerometer data, and/or any other method for determining motion or velocity.

In various embodiments, an auto response rule may be triggered based upon what applications are running on the users device. For example, in one embodiment, an auto response rule may be defined such that it is used whenever the user watching a streaming movie. Other example applications may include, but are not limited to, video conferencing applications, fitness applications, video and/or audio recording, and/or any other application.

In various embodiments, an auto response rule may be triggered based upon the time of day. For example, in one embodiment, an auto response rule may be defined such that it is only applied between the hours of 9 pm and 7 am. In another embodiment, an auto response rule may be defined such that it is only applied on weekends.

In various embodiments, an auto response rule may be triggered based upon the computer mode of one of the integrated devices, as described in the previous application. For example, in one embodiment, an auto response rule may be defined such that it is only applied when the integrated tablet is being used in a desktop computer mode.

In various embodiments, the use of an auto response rule may be conditioned upon user input. For example, in one embodiment, an auto response rule may be defined such that it may only be applied when the user has switched the phone to a "silent" mode (e.g. turned the ringer off, etc.).

Auto response rules may be associated with one or more responses. Responses may include, but are not limited to, sending a call to voice mail, responding to a call with an SMS message, responding with an email message, causing a ringer to go silent, and/or any other manner in which a user might respond to an incoming call.

Not only may the auto response rules be implemented depending upon the existence of predefined contextual triggers, but the content or nature of the response itself may vary depending upon context. In various embodiments, a response may vary depending upon the identity of the caller. For example, in one embodiment, response content may be personalized using the caller's name or predefined nickname. In another embodiment, the type and amount of information conveyed in a response may depend upon the caller's identity. As a specific example, an auto response rule may be defined such that all calls received during a scheduled meeting receive an automatic response via SMS, where all callers are informed that the user is unavailable, except for the user's spouse, who is informed that the user is in a meeting until 3 pm.

In various embodiments, a response may vary depending upon the user's schedule. For example, in one embodiment, a response may include what the user is presently doing. In another embodiment, a response may indicate when the user will be available (e.g. the next opening in the user's schedule, a scheduled time to return calls, etc.). In yet another embodiment, a response may vary depending upon the identities of scheduled event participants and the identity of the caller. As a specific example, an auto response rule may be defined such that all calls received during a scheduled event receive an automatic response via SMS, where all callers are informed that the user is unavailable, except for scheduled event participants, who are given an update as to the location of the event.

In various embodiments, a response may vary depending upon the user's location. For example, in one embodiment, a response may include the user's current location. In other embodiments, a response may vary depending upon the motion of the user's device. For example, in one embodiment, a response may indicate that the user is currently driving. As a specific example, an auto response rule may be defined such that a call from a predefined group of users will receive an automatic response that indicates that the user is driving, and reports their estimated arrival time to a predefined location or scheduled event location (e.g. "I'm driving, and am 12 minutes from home", etc.).

In various embodiments, a response may vary depending upon the currently running application, or data obtained from a running application. For example, in one embodiment, a response which indicates a user's estimated time of arrival may also indicate whether the user is stuck in traffic, as determined by a navigation application. In another embodiment, a response may indicate the user's current activity (e.g. "I'm watching a movie, I'm jogging, etc.). Of course, the sharing of this information may be limited to a predefined list of callers.

In some embodiments, the responses attached to an auto response rule may be text-based messages (e.g. SMS, email, etc.). In other embodiments, the attached responses may be audio (e.g. prerecorded messages, messages generated using text-to-speech, etc.) or video (e.g. prerecorded video messages, computer generated video messages, etc.). In one embodiment, the format of the response may be determined by the format of the incoming call (e.g. a voice call responded to with a voice message, a video call responded to with a video, etc.).

In various embodiments, a response may include the use of a service allowing the caller to leave a message (e.g. voice mail, video messaging, etc.). For example, in one embodiment, a response may include an outgoing message whose content is specified by the auto response rule, coupled with a prompt for the caller to leave their own message. In some embodiments, the message recording service may be hosted on the user's device (e.g. simulating an actual call, but recording the callers message for later playback). In other embodiments, the message recording service may be hosted externally, including on an external server, through a third party service provider, the user's cellular network provider, and/or any other entity.

In some embodiments, a response may be predefined by the user. In other embodiments, a response may be predefined by a third party. In still other embodiments, a response may be defined by software, based upon observed user behavior. For example, in one embodiment, a record may be kept of all user interactions with their devices. These records may be used to find repeated behaviors, and examine the context associated with the behaviors. In one embodiment, when a correlation can be made between a context and a behavior, an auto response rule may be generated by the device.

In one embodiment, device generated auto response rules may reproduce user behavior patterns so far as they are predictable. As a specific example, a device may observe that the user never answers incoming calls during a scheduled meeting, but rather usually replies with a SMS message if the caller was in the user's contacts, and always replies with a SMS message indicating they are in a meeting and when they will be done if the caller was a family member. Upon observing this behavior repeated a predefined number of times, the device may generate two auto response rules for incoming calls received during a scheduled meeting, where caller identity is one of the triggers. Calls coming from a contact may result in the user being presented with an interface allowing an immediate response via SMS, while calls coming from family members may result in the same interface being presented to the user, but prefilled with a message indicating the meeting and when the user is free.

In some embodiments, the auto response rules may be defined and stored on the mobile phone and/or the tablet. In one embodiment, auto response rules may be defined, modified, and applied on devices even when they are not integrated. In another embodiment, auto response rules stored on each device are synchronized as part of integration. As an option, conflicting rules may be dealt with using the methods previously described for handling conflicting integration profiles. In other embodiments, auto response rules may be stored on a cloud server, which is accessed by each of the user's devices for an up-to-date set of rules. In one embodiment, these auto response rules may be defined and modified through the cloud server using a web interface.

In some embodiments, the determination 7-9602 as to whether an auto response rule should be applied may be based entirely upon the context surrounding the incoming call. In other embodiments, the determination may also be based, in part, upon user input. For example, in one embodiment, a user may disable one or more auto response rules, or one or more predefined groups of rules. As a specific example, a user may specify a group of auto response rules which are only to be available for application when the user has toggled a "silent" switch on one or both devices. In one embodiment, it may be possible for a user to enable or disable the entire auto response system with one or more user interactions.

If it is determined in 7-9602 that an applicable auto response rule exists, it is then determined if the user should be notified. See determination 7-9604. In one embodiment, a user may always be notified when an auto response rule is being applied. In another embodiment, the user may never be notified when an auto response rule is being applied.

In various other embodiments, a user may specify whether or not they are notified when an auto response rule is being applied. For example, in one embodiment, the auto response rule itself may contain instructions regarding whether to notify the user or not. As a specific example, a user may wish to be notified when their device automatically sends a message to a friends who called, but not be notified when sending a call from an unknown or blocked number directly to a special voice mail box. In another embodiment, a user may specify that they are always notified when a device generated auto response rule is being applied. In still another embodiment, a user may specify particular contexts (e.g. locations, times, days, computer modes, etc.) in which they are to be notified that an auto response rule is being applied, and contexts in which to never be notified (e.g. late at night, in movie theaters, etc.).

If it is determined in 7-9604 that the user should be notified, the user is then notified that an auto response rule is being applied. See operation 7-9606. In various embodiments, this notification may be made using a sound, vibration, flashing light, a device display, and/or any other method of alerting a user. In one embodiment, the notification is subtle, as to not overly disrupt the user experience with the device. As an option, the user may be told which auto response rule is being applied. In another embodiment, the manner of notification may depend upon the context. For example, the notification may be silent in a meeting, a vibration in a movie theater, and a sound while traveling. As an option, these contexts may be specified by the user.

As shown, once the user has been notified that an auto response rule is being applied, it is determined whether the user wishes to intervene. See determination 7-9608. In various embodiments, the notification regarding the application of an auto response rule may be accompanied by an opportunity for the user to intervene before the response is made. For example, in one embodiment, the user may be given a particular amount of time to indicate they wish the event be handled differently. As an option, there may be a visual countdown provided. In another embodiment, the user may predefine the amount of time given to intervene. In still another embodiment, the user may be able to dismiss the countdown, and apply the auto response rule immediately.

If the user does not intervene, or if it is determined in 7-9604 that the user need not be notified, local tasks associated with the response are performed. See operation 7-9610. In the context of the present description, local tasks refer to tasks which may be performed on the integrated tablet. In various embodiments, local tasks which may be associated with an auto response rule include, but are not limited to, sending an email or other message not explicitly requiring a cellular network, creating a reminder, and/or any other task which does not require sending a control message to a phone. Of course, in embodiments where the auto response rules are being utilized outside of an integrated environment, such as on a non-integrated phone, all tasks would be considered local.

As shown, a control message is sent to the phone. See operation 7-9612. In various embodiments, an integrated tablet may send control messages to the integrated phone to perform tasks requiring hardware unique to the phone, such as sending a voice message to a caller, or an SMS message. In other embodiments, the integrated tablet may send a control message to the phone instructing it to perform a task which could have been performed by the tablet. The control message may take the forms previously discussed, or any other form of signal which may be used to control an aspect of the phone.

If it is determined in 7-9602 that an auto response rule will not be applied, the user is prompted for a response to the incoming call. See operation 7-9614. In one embodiment, the user may prompted using the phone display. In other embodiments, the user may be prompted using the tablet display. For example, in one embodiment, the user may be presented with a recreation of the phone user interface on the tablet display. In another embodiment, the user may be presented with a live transmission of the phone user interface on the tablet display. In still another embodiment, the user may be presented with a user interface, unique to the tablet, which displays all of the response options available to the user.

In various embodiments, the user may be presented with one or more response options as a result of an incoming call. Possible response options include, but are not limited to, answer the call, cause the incoming call notification (e.g. ringtone, vibration, etc.) to cease, refuse the call without sending to voice mail, send the caller directly to voice mail (or video mail, in the case of an incoming video conference call), create a reminder to contact the caller later, respond via SMS, respond via email, and/or any other possible response.

In various embodiments, the user may be presented with one or more predefined responses. For example, in one embodiment, the user may be presented with commonly used responses, such as "I'm on my way" or "I will call you later". In another embodiment, the user may be presented with responses previously defined by the user. In still another embodiment, the user may be presented with the option to choose from recently sent responses. As an option. the choices may be limited to responses sent to that particular caller. In yet another embodiment, the user may be presented with one or more responses they have historically used most often for a particular caller, or in a particular context associated with the incoming call.

In one embodiment, the user may be presented with one or more responses or partial responses which are software generated, based on observed user behavior, similar to the device generated auto response rules previously discussed. In another embodiment, the user interface used to prompt the user for a response to the incoming call may be modified based upon observed user behavior. For example, in one embodiment, often chosen responses may have larger user interface elements than other responses. In another embodiment, the response options may be ordered and/or arranged on the user interface such that the most often used responses are easiest for the user to access.

In some embodiments, available responses may have a single, predefined form (e.g. text, voice, video, etc.). In other embodiments, a given response may be sent to the caller in a user selected form, whether as a prerecorded, device generated, or externally generated voice or video, or as some form of text-based message, or any other form a message may take.

In some embodiments, the user may be presented with response options based upon predefined auto response rules. For example, in one embodiment, the user may be presented with response options based upon an auto response rule whose contextual triggers are a partial match to the context surrounding the incoming call. As an option, a user may be able to specify how close a match the triggers must be before an auto response rule is presented as an option. In another embodiment, the user may be presented with responses generated by auto response rules which would have been applied, had the user enabled them.

In various embodiments, the user may be presented with context-sensitive response options. For example, in one embodiment, the content of the prepared responses available to the user may vary depending upon context, similar to responses generated by auto response rules, discussed earlier. In another embodiment, the user may be presented with multiple versions of the same response, varying by the amount of information conveyed. In this way, a user may easily choose between informing the caller they are busy, and informing the caller they are in a meeting which ends in an hour.

After the user has chosen a response, local tasks associated with the response are performed. See operation 7-9610. In various embodiments, local tasks which may be associated with a user-selected response include, but are not limited to, answering a video conference call, activating a camera, turning on a light, pausing music or a video, activating Bluetooth devices or other peripherals, adjusting sound volume to a level appropriate for the selected response, sampling background noise in preparation for performing noise cancelation, and/or any other task. In other embodiments, local tasks associated with a user selected response may also include those associated with an auto response rule, as previously discussed. In yet another embodiment, the local tasks may include presenting to the user a user interface associated with actions available during a call.

As shown, a control message is sent to the phone as previously discussed. See operation 7-9612.

Figures 8, 97:
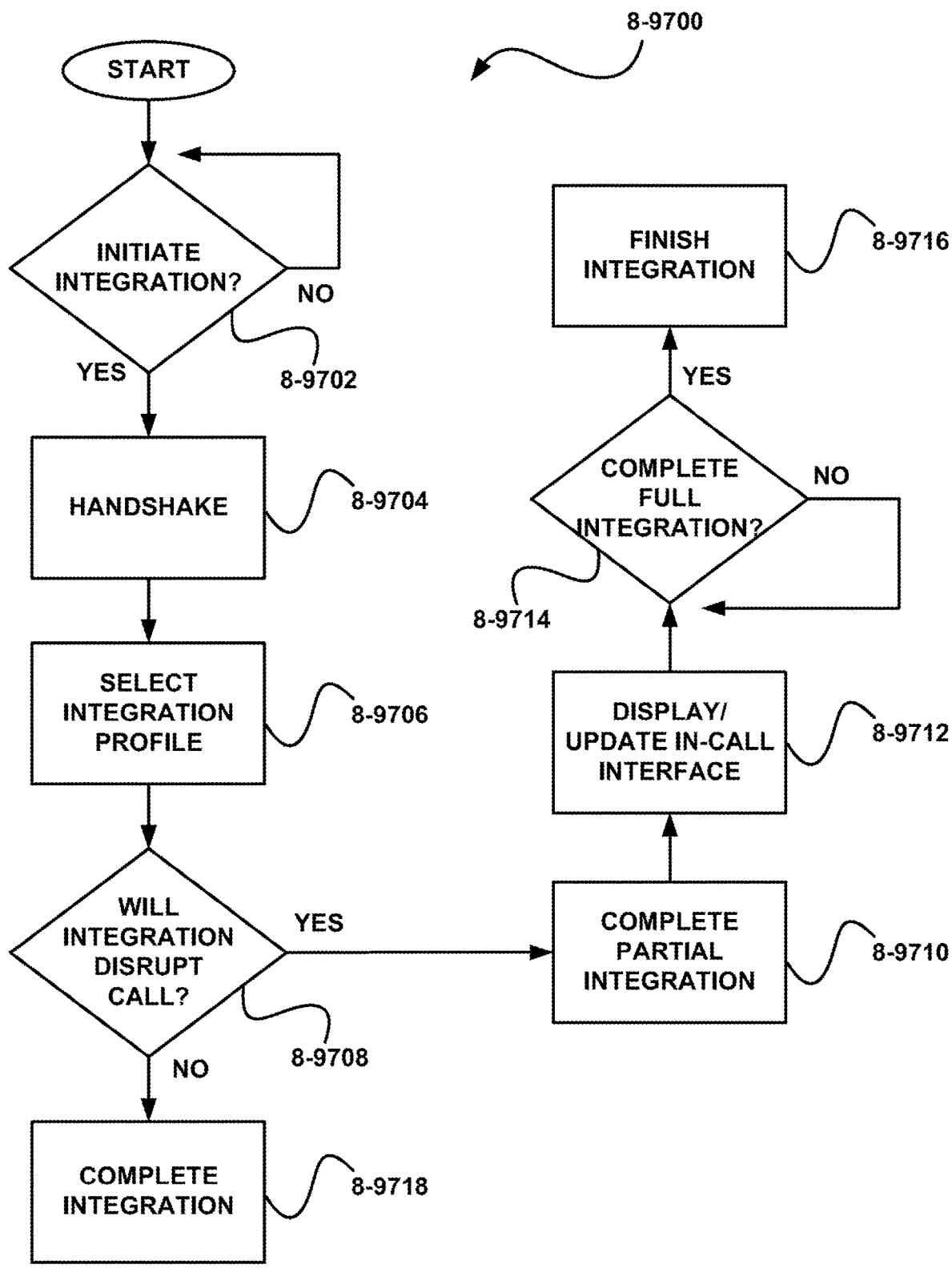
FIG. 8-97 shows a method for integrating a tablet and a mobile phone while a call is in progress, in accordance with one embodiment.

FIG. 8-97 shows a method 8-9700 for integrating a tablet with a mobile phone while a call is in progress, in accordance with one embodiment. As an option, the method 8-9700 may be implemented in the context of the architecture and environment of the previous Figures or any subsequent Figure(s). Of course, however, the method 8-9700 may be implemented in any desired environment. It should also be noted that the aforementioned definitions may apply during the present description.

On occasion, a user may have a call in progress on one device when they come close enough to another device for a potential integration. For example, a user may be speaking on their mobile phone when they sit down at a desk where their tablet is located.

In some embodiments, a device may refuse all integration attempts made during a call (e.g. integration does not proceed past Step 5 of FIG. 4-93, etc.). In other embodiments, method 8-9700 may be utilized to integrate the two devices without disrupting the call. Of course, in still other embodiments, this method may be used to integrate the devices without interrupting user activities other than an in-progress call, such as recording a video or viewing a movie.

As shown, it is determined whether to initiate integration. See determination 8-9702. In some embodiments, this determination is similar to that made in steps 4 or 5 of FIG. 4-93 or steps 3 or 4 of FIG. 5-94, except it may be modified to avoid disrupting the user's call. For example, in one embodiment, if a user would normally have to interact with the phone to permit an integration, that permission may be sought through the tablet display instead, if the phone is being used for a call. In another embodiment, this may be accomplished by passing a message to the tablet through an external server, such as the server which receives location data. As an option, the user may be prompted to enter a password. In this way, accidental or malicious integrations may be prevented.

In another embodiments, all integration prompts that would have been presented to the user via the phone may be routed through a non-integrated tablet if the phone is being used for a call. This may be accomplished using a peer-to-peer connection between the two devices. In one embodiment, this connection may be limited in functionality, such that only a text prompt and a response may be transmitted.

In one embodiment, parameters related to integration may be adjusted when a device is being used for a call. For example, in one embodiment, the threshold functional proximity may be adjusted to take into account how the devices are being used. As a specific example, when a user is sitting at a desk with a phone and a tablet, the threshold functional proximity may be a few inches. However, if that user was talking on the phone as they sat down at the desk, it is unlikely the phone and tablet will be that close, so the threshold functional proximity may be expanded to permit integration at a greater distance.

If it is determined that integration should be initiated, the devices will proceed to handshake. See operation 8-9704. In some embodiments, this handshaking may be identical to that performed in step 6 of FIG. 4-93 or step 5 of FIG. 5-94. In other embodiments, the procedure may be modified to avoid disrupting the user's call. For example, in one embodiment, any authentication which is performed as part of the handshaking process may utilize the device which is not being used for a call to obtain user input.

As shown, an appropriate integration profile is selected. See operation 8-9706. In many embodiments, the selection of an appropriate integration profile is performed in a manner similar to step 7 of FIG. 4-93 or step 6 of FIG. 5-94. In some embodiments, efforts may be made to prevent interrupting the user's ongoing call. For example, in one embodiment, any integration profile conflicts which require user input to resolve may utilize the display of the device which is not being used for a call. In another embodiment, the device not being used for a call may automatically serve as the integration master.

In various embodiments, the user may have the option of making temporary adjustments to the integration profile, to prevent disruption of the ongoing call. For example, in one embodiment, the user may be prompted whether they wish to proceed with the application of potentially disruptive elements of the selected integration profile. These elements may include, but are not limited to, switching the call to a speakerphone, changing the camera and/or display being used for a video conference, switching to or from a Bluetooth device for call audio, switching to new channels/sources for audio input and output, and/or any other potentially disruptive activity which may be specified in an integration profile. In other embodiments, the integration profile may be modified without requiring user input. In one embodiment, the modifications to the profile may be temporary, such that once the call is over, the modifications are reversed and the integration profile is applied as originally defined. In another embodiment, the modifications may persist after the call has ended.

After an integration profile has been selected, it is determined whether the application of said profile will disrupt the ongoing call. See determination 8-9708. In various embodiments, this determination may be made using, at least in part, an estimation of potential disruption. This estimation may be based upon a number of factors, including, but not limited to, the selected integration profile, network bandwidth, connection quality, signal strength, the load on an external server necessary for integration, and/or any other factor which may cause a disruption of the ongoing call.

As a specific example, in the case where the user using the phone for a video conference, and is integrating with a tablet using an integration profile which specifies that the tablet is to be used for video conferencing, and that all applications running on the phone should be transferred to the tablet through the live migration of a virtual machine. It may be determined that, due to a slow network, transferring the video conference to the tablet using the live migration will result in a disruption of the call.

In some embodiments, some degree of disruption may be allowed. For example, in one embodiment, an allowable disruption period may be defined. If the overall foreseeable disruption of the call is expected to be shorter than the allowable disruption period, it will be ignored.

If it is determined that integration will disrupt the ongoing call, a partial integration is completed. See operation 8-9710. In the context of the present description, a partial integration refers to an integration which follows the selected integration profile as closely as possible, preserving functionality while not disrupting the ongoing call. As a specific example, if migrating a virtual machine from the phone to the tablet would disrupt the call, the migration may be cancelled. In another example, if the integration profile calls for the phone to serve as a mouse, but doing so would disrupt the call, that input functionality may be provided through the tablet display, even if the integration profile specifies otherwise.

Once the partial integration has been completed, an in-call user interface is displayed or updated. See operation 8-9712. In some embodiments, the in-call user interface may be presented to the user on the device with the largest display. In this way, the user may have a visual indication of the success of the partial integration, and take advantage of newly integrated resources. In other embodiments, the in-call user interface may continue to be displayed on the device being used for the call, to provide a consistent user experience. As an option, there may be a visual indication that the partial integration has been completed.

In some embodiments, the in-call user interface may be updated after the partition integration to reflect functionality made available by the additional device. For example, in one embodiment, the user may be given new input/output options for audio and/or video. In another embodiment, the in-call user interface may be updated to reflect the availability of data or applications located on the additional device.

As shown, it is determined whether to complete the full integration. See determination 8-9714. If it is determined that the integration should be completed, the full integration is performed. See operation 8-9716. In some embodiments, the partial integration will not proceed to a full integration until it is determined that the call in progress will not be disrupted. For example, in one embodiment, this may mean that the remaining integration steps are delayed until the call has ended. In another embodiment, the remaining integration steps may be performed if the user takes an action which would diminish the effect of a disruption. As a specific example, if the user had previously indicated that they did not wish to switch to the microphone and speakers associated with a tablet for their ongoing phone call, and the integration profile specifies that all audio be routed through the tablet audio system, the integration may be completed before the call has ended if the user manually selects the tablet audio channels through the in-call user interface.

In another embodiment, the partial integration may not proceed to completion until the user has indicated they are ready for an associated transition. For example, if the complete integration will result in the call audio or video switch from one device to another, the system may wait for the user to indicate that they are ready for the change. In one embodiment, the user may cause the integration to proceed to completion through the in-call user interface, or some other user interface. In another embodiment, the user may provide this input through a method other than a device display, such as the accelerometer. As a specific example, the user may indicate their wish to complete the transition from speaking into a phone to speaking through a tablet by setting down the phone. As an option, the in-call user interface may indicate to the user that they system is ready to complete the integration, and may instruct the user how to trigger the remaining steps.

In some embodiments, the user may be informed of all the changes which have occurred due to the completion of the integration. In one embodiment, these changes may be reported using the in-call user interface. In another embodiment, a different user interface may be used to display the changes associated with the integration.

If it is determined in determination 8-9708 that integration will not disrupt the call, a complete integration may be performed. See operation 8-9718. In one embodiment, the user may be informed of all the changes which have taken place due to the integration. As an option, this information may be displayed in an interface which will not disrupt the ongoing call.

Figures 9, 98:
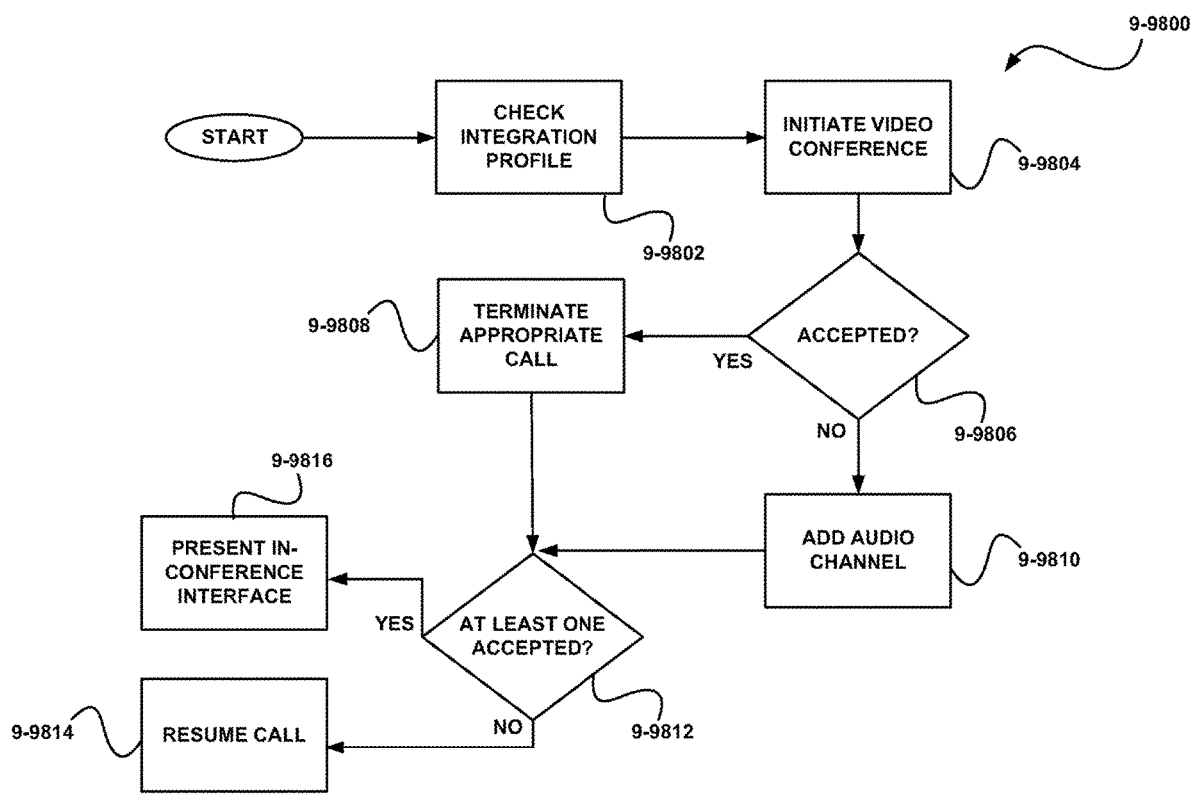
FIG. 9-98 shows a method for escalating a voice call to a video conference utilizing a tablet/mobile phone integration, in accordance with one embodiment.

FIG. 9-98 shows a method 9-9800 for escalating a voice call to a video conference utilizing a tablet/mobile phone integration, in accordance with one embodiment. As an option, the method 9-9800 may be implemented in the context of the architecture and environment of the previous Figures or any subsequent Figure(s). Of course, however, the method 9-9800 may be implemented in any desired environment. It should also be noted that the aforementioned definitions may apply during the present description.

While engaged in a voice call using an integrated phone/tablet system, a user may wish to escalate to a video conference. As shown, the integration profile is checked. See operation 9-9802. In various embodiments, an integration profile may specify the display, camera, microphone, and/or speaker to utilize when making a video conference. For example, the integration profile may specify that the tablet display is to be utilized in conjunction with a camera located on the phone.

The video conference is initiated from the appropriate integrated device. See operation 9-9804. In one embodiment, the video conference may be initiated from the device on which the voice call is being made. In another embodiment, the video conference may be initiated from the device on which it will ultimately be displayed.

In various embodiments, the initiation of a video conference may result in all other call participants receiving a request to join the video conference. In one embodiment, the request may be sent to the other users using contact information available to the user who initiated the escalation, such as an address book. As an option, if no direct video conferencing contact information is available, instructions may be sent to those users using other communication channels, such as SMS or email, indicating how to join the conference. In another embodiment, the request may be sent to the other users using the communications channel being used for the ongoing voice call.

In some embodiments, a user may specify a preference for, or manually initiate, multichannel video conferencing. In the context of the present description, multichannel video conferencing refers to a conference between multiple users which involves more than one communications channel. For example, in one embodiment, a multichannel video conference may include screen sharing. In the context of the present description, screen sharing refers to transmitting a live view of at least a part of one user's workspace. This allows one user to demonstrate something on their device as though all participants were physically present.

In another embodiment, a multichannel video conference may include a shared workspace. In the context of the present description, a shared workspace refers to a virtual workspace with which one or more conference participants may interact. In one embodiment, conference participants may each contribute documents to this shared workspace, which may be viewed or modified by other participants. In another embodiment, a shared workspace may allow conference participants to simultaneously modify the same document. As an option, each user may have a unique cursor to indicate where they are working. In some embodiments, the shared workspace may be hosted by and managed using an external server, such as a cloud server. In other embodiments, the shared workspace may be hosted on the device of one of the conference participants, with document sharing and document changes being shared directly between conference participants. As an option, a shared workspace may also include cloud storage which is accessible by some or all participants. In some embodiments, a shared workspace may be used outside of the context of a multichannel video conference (e.g. in conjunction with a voice call, etc.).

In yet another embodiment, a multichannel video conference may include a virtual projector. In the context of the present description, a virtual projector refers to video feed which is transmitted to other conference participants, which is generated using a simulated hardware connection. From the point of view of the originating device, a projector or external display has been connected to the integrated system, except instead of projecting the video on a screen, it is transmitted to the other conference participants. In this way, a user may give a virtual presentation using the same software and methods they would use had all participants been in the same room. This would allow the presenter to use notes, timers, teleprompters, and/or other features which are available when using a projector or external display.

In still another embodiment, a multichannel video conference may include a live video feed. For example, in one embodiment, a multichannel video conference may include a live feed from another participant's camera. In another embodiment, a multichannel video conference may include a combination of the live video camera feeds coming from each participant.

Once the video conference has been initiated, it is determined whether the other participants have accepted the escalation request. See determination 9-9806. If a participant accepts the video conference request, their call may be terminated. See operation 9-9808. In some embodiments, the escalating user's participation in the voice call may not be terminated until all participants have accepted or refused the video conference.

If a call participant refuses the video conference request, they may be added to the video conference as an audio channel. See operation 9-9810. In some embodiments, a participant may only be added to the video conference as an audio-only channel if they refuse the video conference request. In other embodiments, a participant may be added to the video conference as an audio-only channel if they do not accept the video conference request within a certain amount of time. In still other embodiments, a participant may be automatically added as an audio-only channel if the escalating user does not have direct video conference contact information for that participant. For example, the participant may be calling from a blocked number, or a number which is not associated with video conferencing functionality, and no other contact information is known.

In some embodiments, a call participant may be added to the video conference as an audio-only channel by routing the call through the escalating user. For example, in one embodiment, a participant on a cellular-based phone call may be added to the video conference as an audio-only channel by keeping the call active, and using the escalating user's integrated devices as a bridge between the cellular phone call and the video conference. In other embodiments, a call participant may be added to the video conference as an audio-only channel using an external server. For example, in one embodiment, a participant on a VOIP-based phone call may be added to the video conference as an audio-only channel by bridging the VOIP call and the video conference using a server. The server may be a VOIP server, a video conference server, or any other external server. Of course, in other embodiments, a VOIP call may also be routed through the escalating user's integrated device.

After all of the call participants have responded to the request to join a video conference, or after a certain amount of time has elapsed, it is determined whether at least one participant has accepted the request. See determination 9-9812. If nobody accepted the request to join the video conference, the video conference is terminated and the voice call is continued as before. See operation 9-9814.

If it is determined that at least one call participant has accepted the request to join a video conference, an in-conference user interface is presented to the user. See operation 9-9816. In some embodiments, the in-conference user interface may utilize the displays of both integrated devices. In other embodiments, the in-conference user interface may utilize only one display. For example, in one embodiment, the video conference may utilize the tablet display, and the in-conference user interface may be presented on the phone display.

The in-conference user interface may display the various options available to the user during the video conference. These options may include, but are not limited to, available audio channels (e.g. Bluetooth, built-in audio for phone and tablet, etc.), available video sources, multichannel video conference options, and/or any other options or functionality which may be associated with a video conference.

In some embodiments, the video conference may include multiple participants. Each participant may be represented in the in-conference user interface as an icon, or as a live video feed. In one embodiment, the user may have the option to mute one or more participants, or to cut them off from the user's video feed(s). In another embodiment, the user may have the option to re-invite participants to the video conference who are currently participating as audio-only channels.

In various embodiments, a multichannel video conference may utilize the tablet display for a shared screen, a shared workspace, or a virtual projector, and the phone display for the in-conference user interface. In some embodiments, the user may have the option to interact with the shared workspace, shared screen, or virtual projector in a way that indicates a screen location to the other participants, but does not interact with any screen elements, similar to how a laser pointer would be used in a physical presentation.

In other embodiments, a user may be able to cycle through various channels of a multichannel video conference on the display of a single device. As an option, the user may be able to change the video channel through a gesture performed on a touch-sensitive display, such as a swiping motion.

Figures 10, 99:
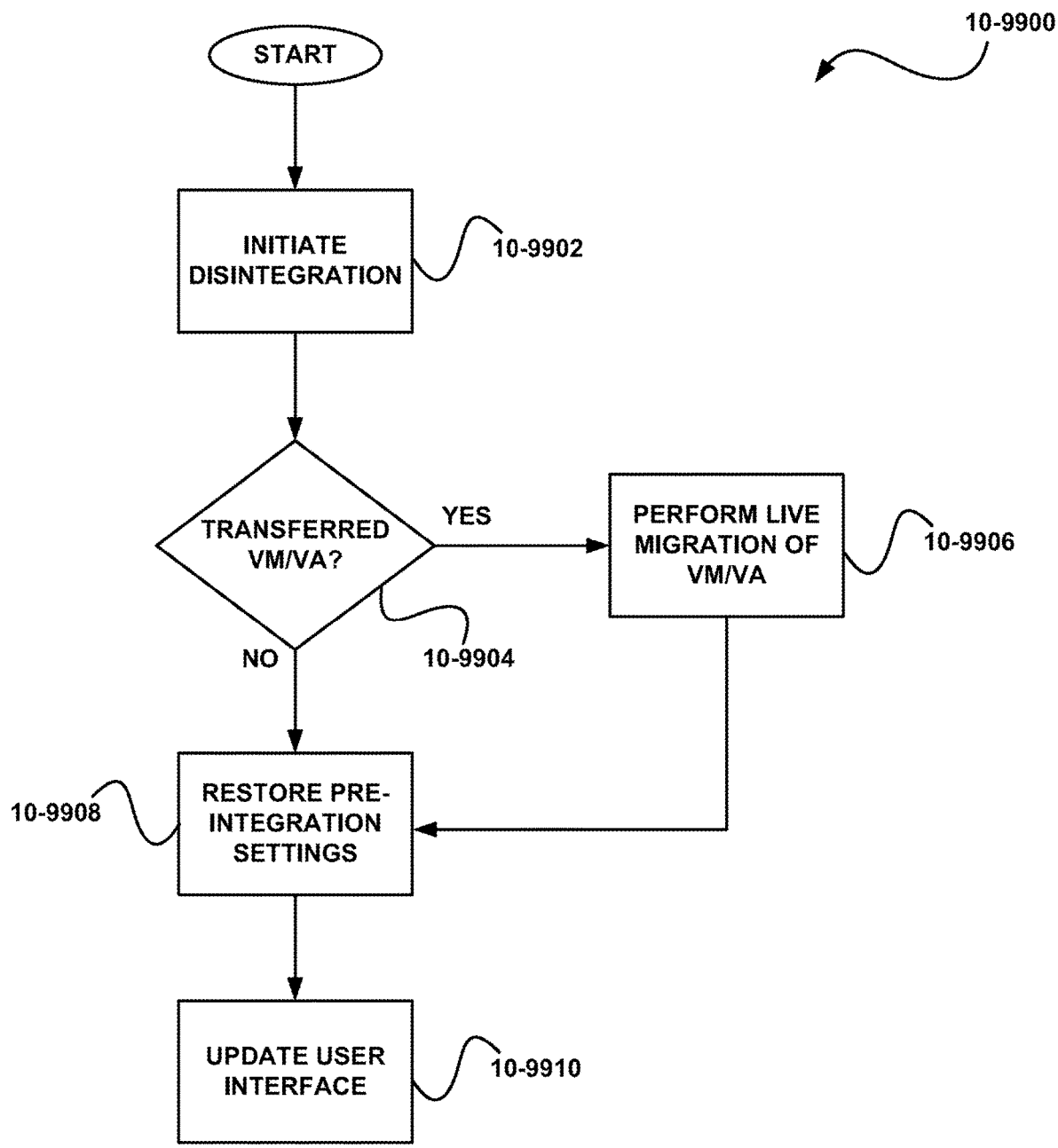
FIG. 10-99 shows a method for disintegrating a tablet/mobile phone integration, in accordance with one embodiment.

FIG. 10-99 shows a method 10-9900 for disintegrating a tablet/mobile phone integration, in accordance with one embodiment. As an option, the method 10-9900 may be implemented in the context of the architecture and environment of the previous Figures or any subsequent Figure(s). Of course, however, the method 10-9900 may be implemented in any desired environment. It should also be noted that the aforementioned definitions may apply during the present description.

As shown, the disintegration is initiated. See operation 10-9902. In some embodiments, the disintegration of two integrated devices may be initiated manually by the user. For example, in one embodiment, the user may initiate disintegration by turning off one of the devices. In another embodiment, the disintegration may be initiated by the user manually putting a device to sleep.

In some embodiments, disintegration may be initiated automatically. For example, in one embodiment, disintegration may be initiated when the two devices have been separated. The disintegration may be initiated if the separation exceeds a predefined distance, or if the devices have been separated by more than another predefined distance for more than a predefined period of time. In another embodiment, disintegration may be initiated automatically if one or more aspects of the integrated system change. For example, disintegration may be initiated if one or both devices switch from being powered by an external source to running off of battery power. In various embodiments, when a disintegration has been automatically initiated, the user may be notified on one or both devices. This notification may be visual, auditory, tactile (e.g. a vibration, etc.), and/or any combination of notification forms.

In some embodiments, if there is a call, such as a voice call or video conference, in progress when the disintegration is initiated, steps may be taken to prevent the call from being disrupted. For example, in one embodiment, if the nature of the call is such that it may be transferred without disruption through the live migration of a virtual machine or application, said migration may be performed automatically in later steps. In another embodiment, if it is determined that there is no way to disintegrate the two devices without disrupting the call, the user may be notified, and presented with options. These options may include, but are not limited to, cancelling the disintegration or opening a new line of communication which will not be disrupted. In one embodiment, if the user does not take steps to preserve the call, and the call is disrupted by a disintegration, a message may be sent automatically to the other participant or participants of the disrupted call, informing them of the problem.

Once a disintegration has been initiated, it is determined if a virtual machine or virtual application needs to be transferred. See determination 10-9904. In some embodiments, if a virtual machine or application was transferred when the devices were integrated, that same virtual machine or application (if still running) may be automatically migrated back to it's original device. In other embodiments, the user may be prompted to select which, if any, virtual machines and/or virtual applications should be transferred as part of the disintegration. In still other embodiments, the integration profile may specify what is to be done with running processes and applications in the case of a disintegration.

If it is determined that a transfer is needed, a live migration of the virtual machine or virtual application is performed. See operation 10-9906. In some embodiments, this operation may simply be to conclude an anticipatory migration. In the context of the present description, an anticipatory migration refers to the migration of a virtual machine or application which is initiated (but not completed) in anticipation of a disintegration. When a disintegration has officially been initiated, the bulk of the migration will already have been completed. In this way, the system will be more responsive to automatic disintegration, and the amount of time the system spends in a transitory state (the state between integration and disintegration) will be reduced.

In various embodiments, anticipatory migration may be triggered by user behavior. For example, in one embodiment, if device accelerometers have determined that the device has been picked up, placed in a pocket or case, or moving, an anticipatory migration may be initiated. In other embodiments, anticipatory migration may be triggered by historical use observations. For example, in one embodiment, if it has been observed that the user triggers a disintegration every day at a certain time, an anticipatory migration may be triggered before that time, in preparation.

In some embodiments, when the migration of a virtual machine or application has been initiated automatically, the user may be warned to prevent a disruption of communications before the migration is complete. For example, in one embodiment, a user may be warned of a potential disruption if it is determined that the distance is increasing between two devices connected with an ad-hoc network. In another embodiment, the user may be warned if a decrease in signal strength is detected which may disrupt the migration. As an option, in these embodiments, the notification may override the user's instructions (e.g. making a sound even when the user has silenced a device, etc.).

After the migration of the virtual machine or application has been completed, or if such a migration is not required, the pre-integration settings for both devices are restored. See operation 10-9908. In various embodiments, one or both devices may be restored to the state they were in before they were integrated. This may include, but is not limited to, device volume, peripheral connections (e.g. Bluetooth, etc.), display brightness, and/or any other aspect associated with the device.

As shown, the user interface is updated to reflect the disintegration. See operation 10-9910. In various embodiments, this update may include, but is not limited to, removal of integrated device status notifications (e.g. signal strength, etc.), and the removal of one or more options in the in-call user interface for voice calls or video conferences.

Figures 11, 100:
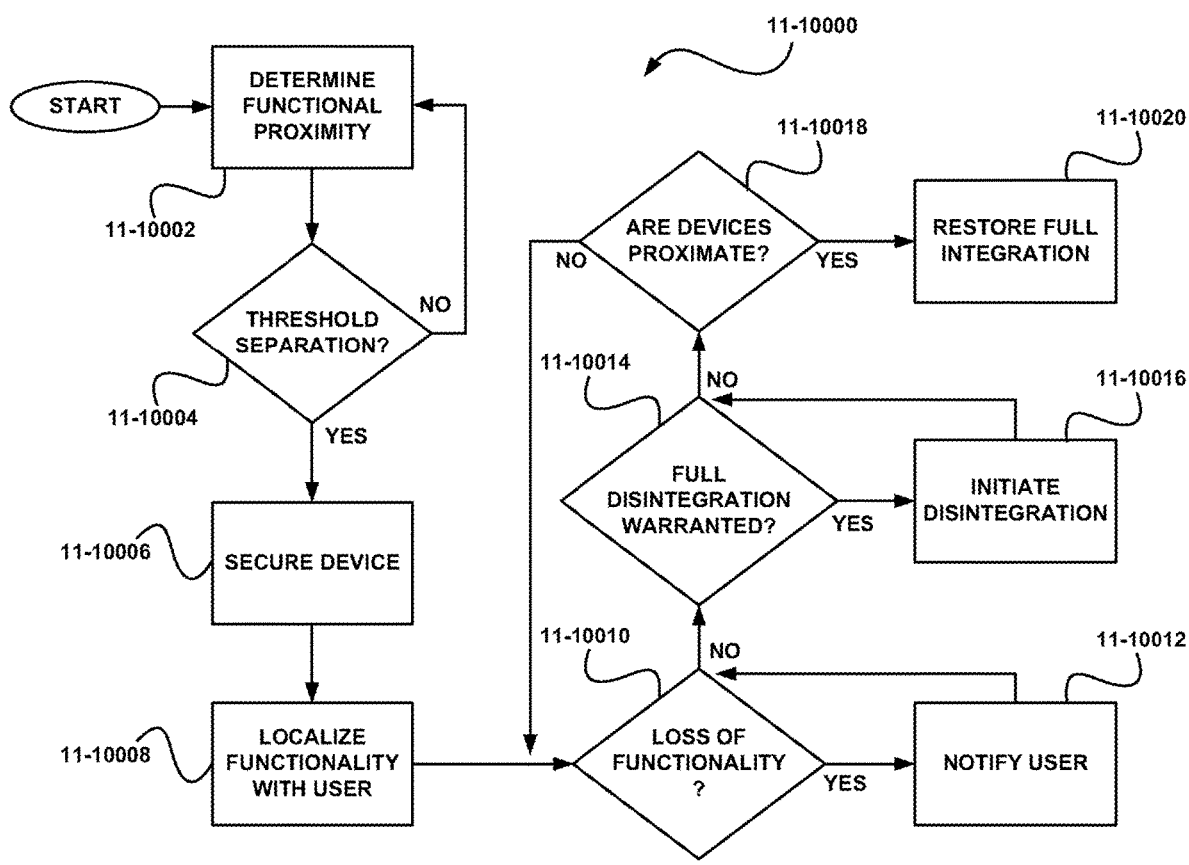
FIG. 11-100 shows a method for performing a partial disintegration of a tablet/mobile phone integration, in accordance with one embodiment.

FIG. 11-100 shows a method 11-10000 of performing a partial disintegration of a tablet/mobile phone integration, in accordance with one embodiment. As an option, the method 11-10000 may be implemented in the context of the architecture and environment of the previous Figures or any subsequent Figure(s). Of course, however, the method 11-10000 may be implemented in any desired environment. It should also be noted that the aforementioned definitions may apply during the present description.

During the course of normal use, a user of an integrated system may cause the devices to temporarily separate. For example, a user may take their tablet to a different room to share something with another person, leaving their phone behind. During the temporary separation, the integrated devices may be partially disintegrated, in an effort to provide security and preserve functionality.

As shown, the functional proximity is determined. See operation 11-10002. In various embodiments, the functional proximity may be determined using any of the previously discussed methods. In one embodiment, the determination of functional proximity may be triggered by movement detected by device accelerometers. In another embodiment, the determination may be performed periodically.

In one embodiment, each device may be responsible for determining its own functional proximity to the other device. In another embodiment, once the functional proximity is determined, it may be shared between the devices through a communication channel established by the integration. In still another embodiment, the functional proximity may be reported to an external server by one device, and retrieved by the other device.

Using the functional proximity, it is determined whether the devices have reached a threshold functional separation. See determination 11-10004. In the context of the present description, threshold functional separation refers to a predefined functional proximity beyond which partial disintegration may be required. In some embodiments, the threshold functional separation may be larger than the threshold functional proximity, to allow a user the freedom to reposition their integrated devices without the risk of unintentional partial disintegration.

In various embodiments, the threshold functional separation may be predefined by the user. In one embodiment, the threshold functional separation may be defined as part of an integration profile. In another embodiment, the threshold functional separation may be defined independent of the integration profile. In yet another embodiment, the threshold functional separation may be defined such that it depends upon one or more matters of context, including, but not limited to, location, time of day, day of the week, and/or any other contextual information.

In some embodiments, the threshold functional separations that have been defined may be synchronized between the devices during integration. In other embodiments, the devices may have different threshold functional separations. In these embodiments, where each device has its own definition of the threshold functional separation, each device may be responsible for determining when that threshold functional separation has been exceeded.

In still other embodiments, the threshold functional separation may be stored on an external server. For example, in one embodiment, an external server may store the threshold functional separation, and also determine whether the threshold functional separation has been exceeded by the two devices.

If it is determined that a device has exceeded a predefined threshold functional separation, the device is secured. See operation 11-10006. In various embodiments, a device may be secured by implementing a device security profile. In the context of the present description, a device security profile refers to a predefined set of security measures, such as locking down a device using a password, as well as a predefined set of contexts in which those measures are to be applied. For example, in one embodiment, a device security profile may depend upon the location of devices. As a specific example, a set of device security profiles may be defined such that unlocking an integrated device while separated from its partner may require a four digit PIN at the office, a press of a button at home, and an alphanumeric password everywhere else. In other embodiments, the use of particular device security profiles may depend upon other factors, including, but not limited to, the time of day, the day of the week, the identity of the partner device, and/or any other contextual detail.

In various embodiments, the device security profile may depend upon whether a device is active or passive. In the context of the present description, an active device is one that is in the user's physical possession (e.g. in their hand, in a pocket or purse, in a case inside a backpack the user is wearing, etc.). This may be determined by detecting motion, using accelerometers, in accordance with one embodiment. Similarly, a passive device, in this context, is a device which is not in the user's physical possession. In other words, if the user has left the vicinity of one device, taking the other device with them, the device that went with the user is an active device, and the device left behind is a passive device. As a specific example, in one embodiment, a set of device security profiles may be defined such that if a device is passive, it may be locked with a password, while if the device is active, it may use whatever screen lock settings are used when the device is not integrated, such as a PIN unlock, or a simple gesture.

In some embodiments, each device may have one or more device security profiles. In other embodiments, the collection of device security profiles may be synchronized during integration, similar to the synchronization of integration profiles. In still other embodiments, the device security profiles may be maintained on an external server, which may be used to update one or more of a users devices.

In various embodiments, device security profiles associated with separating integrated devices may also include actions associated with preparing for a possible disintegration. For example, in one embodiment, a device security profile may be defined to include triggering an anticipatory migration of virtual machines and/or applications, as previously discussed.

As shown, functionality is localized with the user. See operation 11-10008. While the integrated devices are separated, a partial disintegration may be performed to the extent necessary to allow as much functionality to remain with the user as possible, in accordance with various embodiments. In these embodiments, it may be assumed that an active device is a device which is still available to the user, and may serve as a target for localizing functionality. In one embodiment, the user may be prompted on both devices to indicate which device is still with them. A similar prompt may be used in the case where it is determined that both devices are moving, according to one embodiment. As an option, the devices may request a password or PIN.

For example, in one embodiment, if the integration profile specifies that all video conferencing is to utilize the camera and display of a tablet, and after the threshold functional separation is exceeded the phone is the only active device, incoming video conference requests may be routed to the phone automatically.

In another embodiment, the integration profile may specify that all voice calls utilize the speaker and microphone associated with a tablet. If, after sufficient separation, the tablet is the only active device, steps may be taken to ensure that telephone functionality remains available to the user. For example, in one embodiment, audio which may have previously been transmitted to the tablet via a Bluetooth connection may be sent to the now distant tablet via a communication channel which has greater range (e.g. local wireless network, peer-to-peer wireless network, etc.).

In various embodiments, a user may specify which functionality should or should not be preserved upon separation. For example, in one embodiment, a user may specify that certain functionality does not need to remain localized with the user if a particular device is the active device. As a specific example, a user may not wish to have a conversation via tablet speakers outside the confines of their office, so they may specify that voice call functionality does not need to be localized to the tablet when separated and active.

As shown, it is determined if any of the functionality associated with the integration has been lost due to the separation of the two devices. See determination 11-10010. Sometimes only a portion of the integrated functionality is preserved in operation 11-10008, or sometimes functionality is lost due to a degrading connection between the two device. If it is determined if a portion of the functionality associated with the integration has been lost, the user is notified. See operation 11-10012.

In various embodiments, the user may be notified when some aspect of integrated functionality has been lost. For example, in one embodiment, if the quality of the network connection linking an active tablet to a passive phone degrades to the point that audio cannot be clearly transmitted between the two, the user may be notified that phone functionality has been lost. In some embodiments, the user may be notified by the disappearance of a status icon, a sound or vibration, an on-screen notification, a combination of these, or any other form of user notification.

As shown, it is determined if the separation has reached the point that would warrant a full disintegration. See determination 11-10014. As previously discussed, in one embodiment, disintegration may be automatically initiated if the devices have been separated for more than a predefined amount of time. In another embodiment, disintegration may be automatically initiated if the devices become separated by more than a predefined distance. In some embodiments, these predefined times and distances may vary according one or more contexts, including location, time of day, day of the week, and/or any other context.

In one embodiment, disintegration may be automatically initiated if one or more functionalities is lost, or is about to be lost, due to the separation. For example, the user may specify that if a separation ever causes the ad hoc Wi-Fi connection between the devices to fail, disintegration may be automatically initiated. In another embodiment, the user may specify that if the signal strength of the ad hoc Wi-Fi drops below a certain level, disintegration may be initiated automatically.

If it is determined that disintegration is warranted, then disintegration is initiated. See operation 11-10016. Otherwise, it is determined whether the devices are once again functionally proximate. See determination 11-10018. Throughout the separation, the functional proximity may be repeatedly determined, either on a schedule, or in response to device movement, as previously described. As an option, the functional proximity may be determined more often than usual during a partial disintegration, to make the system more responsive to rapid changes in separation distance.

If it is determined that the devices have been brought within the threshold functional separation, the full integration is restored. See operation 11-10020. For example, in one embodiment, all of the settings originally specified in the integration profile may be reapplied to the devices once they are closer than the threshold functional separation.

In various embodiments, the restoration of the full integration may also include the reversal of device security profiles which had been applied. For example, in one embodiment, restoring the full integration may cause both device displays to unlock, without requiring a password. In another embodiment, the restoration may cause both displays to unlock if a password is entered on either of the devices. In some embodiments, the device security profiles may specify a particular behavior upon the restoration of a full integration.

Figures 12A, 101A:
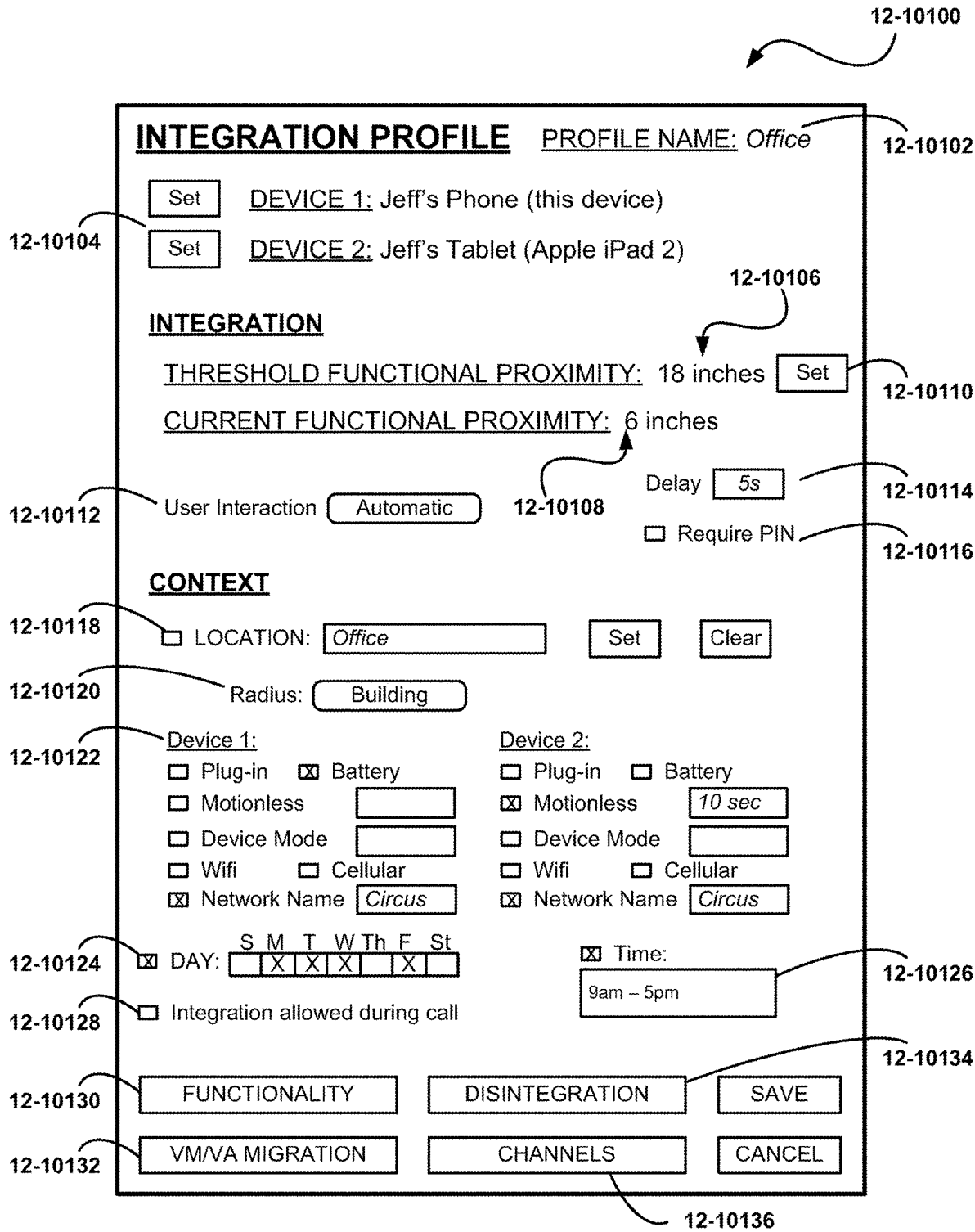
FIG. 12A-101A shows a user interface for defining an integration profile, in accordance with one embodiment.

FIG. 12A-101A shows a user interface 12-10100 for defining an integration profile, in accordance with one embodiment. As an option, user interface 12-10100 may be implemented in the context of the architecture and environment of the previous Figures or any subsequent Figure(s). Of course, however, user interface 12-10100 may be implemented in any desired environment. It should also be noted that the aforementioned definitions may apply during the present description.

In various embodiments, user interface 12-10100 may be used to define or modify an integration profile. In one embodiment, user interface 12-10100 may be used to define the context and nature of an integration. As shown, the user interface 12-10100 may include text fields 12-10102 and 12-10104 which identify the integration profile being defined, as well as the devices which may use the integration profile.

In various embodiments, the user may be able to specify one or both of the device identities. For example, in one embodiment, the user may be able to specify both devices. In another embodiment, a user may be limited to defining integration profiles which involve the device through which user interface 12-10100 is being presented.

In one embodiment, a user may specify specific devices to which the profile may be applied. In other embodiments, a user may specify a subset of devices which share a particular attribute. For example, in one embodiment, a user may specify that the integration profile may be applied to devices from a particular manufacturer (e.g. "Apple iPads", etc.). In another embodiment, a user may specify that the profile be applicable to device which have a particular physical attribute (e.g. "tablets with a 7+ inch screen", etc.). In still another embodiment, a user may specify that the profile be applicable to all devices which are owned by a particular user.

As shown, text fields 12-10104 may identify the devices which may use the integration profile by their user defined names (e.g. "Jeff's Tablet", etc.), in accordance with one embodiment. As an option, additional information may be provided, including, but not limited to, device make and model (e.g. "Apple iPad 2", etc.), an iconic depiction of the device, or other identifying information (e.g. "this device", etc.).

In some embodiments, the devices may be specified by the user using a drop down menu. In other embodiments, the user may specify specific devices, or a class of devices, through a different interface.

The user interface 12-10100 may include a text field 12-10106 displaying the threshold functional proximity, which defines how close the devices specified in text fields 12-10104 must be before that particular integration profile may be applied. Additionally, in one embodiment, the user interface may also include a text field 12-10108 displaying the current functional proximity between the two devices.

In one embodiment the functional proximities may be displayed with units of distance (e.g. feet, meters, etc.). In another embodiment, the functional proximities may be displayed as signal strengths. In still another embodiment, the current functional proximity displayed in 12-10108 may be reported as a percentage of the currently defined threshold functional proximity. In yet another embodiment, the proximities may be displayed using a unitless metric.

In various embodiments, the user interface may include a button 12-10110 to define the threshold functional proximity. In one embodiment, button 12-10110 may prompt the user to input a new value for the threshold functional proximity. In another embodiment, button 12-10110 may define the current functional proximity 12-10108 as the new threshold functional proximity. It should be noted that the term "button" may include/refer to any input mechanism (e.g. indicia for selection via a touchscreen, etc.).

As shown, in one embodiment, user interface 12-10100 may include a drop down menu 12-10112 which allows the user to specify the amount of user interaction needed to initiate an integration using that profile. In one embodiment, drop down menu 12-10112 may include an "automatic" option, which means that if all contextual requirements, including the functional proximity, are met, integration will begin automatically. In another embodiment, the drop down menu may include a "prompt user" option, which means that if all contextual requirements, including the functional proximity, are met, the user will be prompted whether they wish to integrate the two devices.

In still another embodiment, the drop down menu 12-10112 may include a "manual" option, which means that the profile will only be used if the user manually initiates an integration. In this way, a user may create an integration profile involving a device which is often in the proximity, but seldom integrated to (e.g. a device belonging to someone else, etc.). The user will not have their device use repeatedly interrupted with integration prompts, but still be able to easily integrate when so desired.

In one embodiment, user interface 12-10100 may include text field 12-10114 which allows the user to specify the timing related to the integration profile. As an option, the label associated with 12-10114 may change depending on what has been selected in drop down menu 12-10112. For example, if the user has specified that the profile be implemented automatically, text field 12-10114 may be used to specify a delay within which the user may cancel the automatic integration, and may be labeled as such (e.g. "delay", etc.). If the user has specified that the user be prompted concerning the potential application of the present integration profile, text field 12-10114 may be used to specify the window of time during which a user may initiate the integration, before the option disappears, and may be labeled as such (e.g. "auto dismiss", etc.).

In various embodiments, user interface 12-10100 may include a check box 12-10116 which allows the user to specify that a PIN or password is required before an integration is completed. In one embodiment, the user may specify a PIN or alphanumeric password associated with that particular integration profile. In another embodiment, selecting check box 12-10116 may condition integration on the input of a PIN or password which is associated with a particular device. In yet another embodiment, the PIN or password may be associated with the user, across multiple devices.

In various embodiments, an integration profile may be defined such that integration will only occur in certain contexts. The user interface 12-10100 may include one or more elements to allow the user to define the context in which that profile may be used.

In one embodiment, the user interface 12-10100 may include a check box 12-10118 which allows the user to specify that the integration profile only be used at a particular location. In various embodiments, the user may specify a particular location at which the integration profile may be used. In one embodiment, the user may enter a street address into a text field. In another embodiment, the user may select a business or person from their contacts. In still another embodiment, the user may be able to select from labeled locations (e.g. "home", "office", etc.). As an option, the user may be able to press a button which captures their present location and prompts them for a label. In yet another embodiment, the user may be able to indicate a location using a map.

In another embodiment, the user may be able to specify a location type in which the integration profile will be available. For example, the user may create a profile to be used in coffee shops. Whenever the location of the devices corresponds with the address of a known coffee shop, the profile will be available. Other location types may include airports, hotels, and/or any other type of location where an integration may be performed. In some embodiments, the determination of location type may be performed by both devices. In other embodiments, the determination may be made by just the integration master. In still other embodiments, the determination may be made on an external server which has access to the location data of both devices.

As shown, the user interface 12-10100 may include a drop down menu 12-10120, which allows the user to specify a radius around a location within which the integration profile will be available. A user may wish to define a profile that is only active within a certain room or building, such as in a work setting. A user may also wish to define a profile which is available over a larger area, such as a college campus, without having to create multiple profiles. As shown, in one embodiment, a user may be able to choose from a set of labeled radii (e.g. "room", "building", "1 block", "4 blocks", etc.). In another embodiment, a user may be able to chose a radius from a set of distances (e.g. 2 m, 10 m, 20 m, etc.). In still another embodiment, a user may be able to enter a specific distance to be used as a radius. In yet another embodiment, the user may be able to use a map (e.g. drawing on the map, etc.) to indicate the boundaries of an area within which the integration profile will be available.

In various embodiments, the user interface may include a plurality of check boxes 12-10122, which represent a plurality of contextual requirements related to the devices identified in text fields 12-10104. In one embodiment, the contextual requirements may include the power source of the devices, whether battery or non-battery. As an option, a minimum charge level may be specified.

In another embodiment, the contextual requirements represented by the plurality of check boxes may include whether or not one or both of the devices have been motionless. As an option, the user may specify for how long the device must have been motionless before the integration profile is available. In still another embodiment, the contextual requirements may include the device mode of one or both devices, the identity of the network to which one or both devices are connected, the type of network connection, and or any other device related information.

In one embodiment, user interface 12-10100 may include a plurality of check boxes 12-10124 which allows the user to specify which days of the week that integration profile will be available. For example, a user may create a profile for use on work days, and another profile for use on the weekend. The user interface may also include a text field 12-10126 which allows the user to specify the time of day during which the integration profile will be available. In another embodiment, the user may be able to specify different and/or multiple time periods for each day of the week.

In one embodiment, user interface 12-10100 may include a check box 12-10128 which allows the user to specify whether this integration profile should be available while one of the devices is being used for a voice call or video conference. In another embodiment, selecting this check box may allow the user to specify a different set of parameters to be used in that situation, such as an expanded threshold functional proximity, as previously discussed.

Figures 12B, 101B:
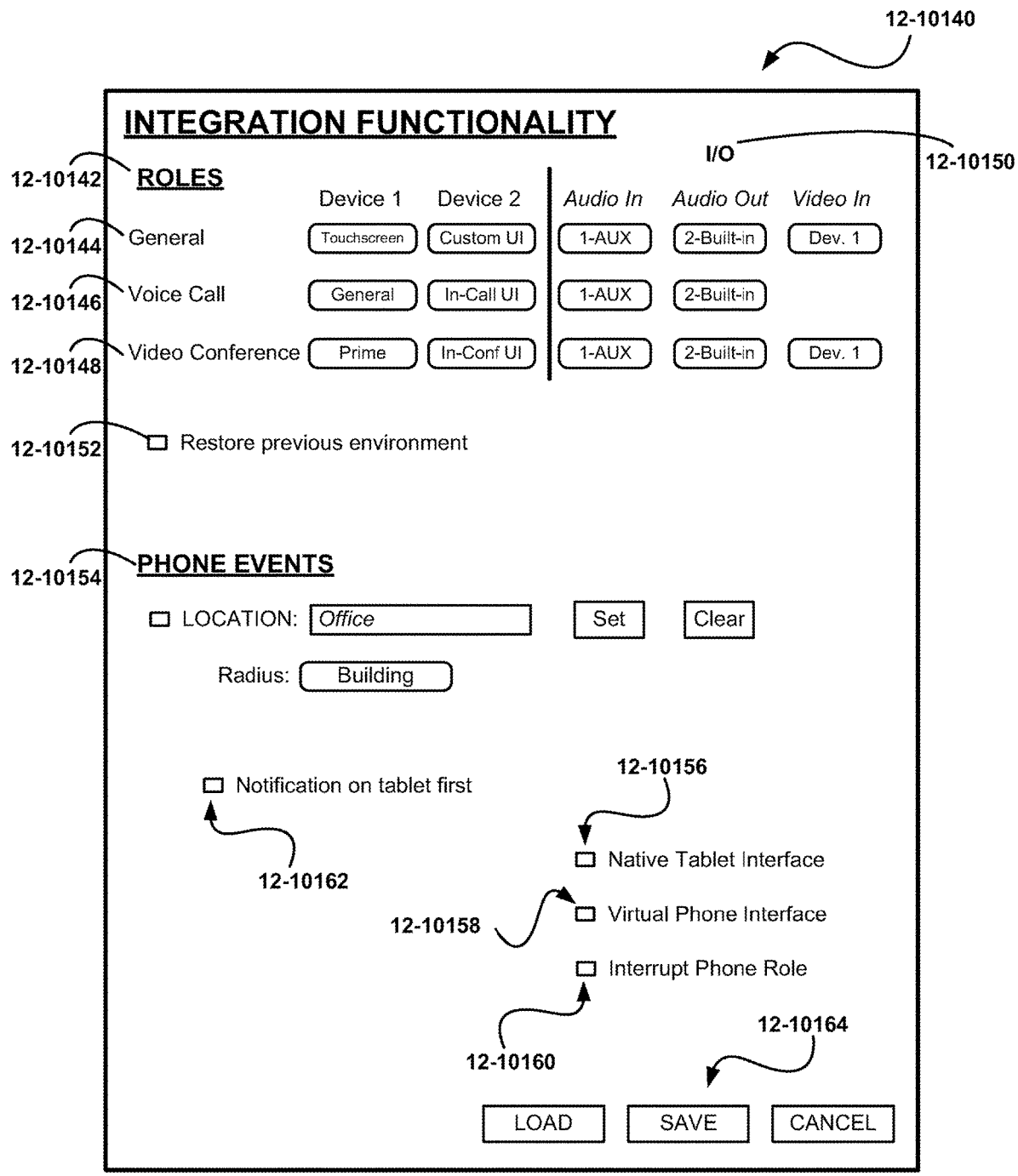
FIG. 12B-101B shows a user interface for defining integration functionality as part of an integration profile, in accordance with one embodiment.

FIG. 12B-101B shows a user interface 12-10140 for defining integration functionality as part of an integration profile, in accordance with one embodiment. As an option, user interface 12-10140 may be implemented in the context of the architecture and environment of the previous Figures or any subsequent Figure(s). Of course, however, user interface 12-10140 may be implemented in any desired environment. It should also be noted that the aforementioned definitions may apply during the present description.

In one embodiment, user interface 12-10100 of FIG. 12A-101A may include a button 12-10130 which allows the user to define or modify the various aspects of the functionality of the integration. In various embodiments, selecting button 12-10130 may present a different user interface. For example, in one embodiment, user interface 12-10140 may be used to define how the two devices will function while integrated.

Integration may allow some tasks which are normally confined to a single device to utilize the resources of two devices. When defining an integration profile, the role each device plays in carrying out said tasks may be defined. As shown, the user interface 12-10140 may be utilized to define how each device will function in one or more use scenarios. For example, in one embodiment, the user interface may include a collection of drop down menus 12-10142 associated with the roles each integrated device may fill in one or more use scenarios. Of course, in other embodiments, these roles may be associated with other types of user interface elements, such as a collection of check boxes or radio buttons.

As shown, the collection of integrated device roles 12-10142 may include a plurality of drop down menus 12-10144 to specify the general, or default, role each device will play while integrated. In one embodiment, a drop down menu representing the general roles for an integrated tablet may include one or more roles combining the functionality of a display with the functionality of an input device. For example, the general integrated tablet roles may include, but are not limited to, "display" (i.e. display only, no input) and/or "touchscreen" (i.e. display plus input). In another embodiment, general integrated tablet roles may include the roles which may be associated with a desktop computer mode, such as those shown in FIG. 34 of the previous application.

In various embodiments, the plurality of drop down menus 12-10144 may include a drop down menu representing the general roles available for an integrated phone. In one embodiment, these general roles may include those of a visual nature, such as "display" or "touchscreen". In another embodiment, the general roles for an integrated phone may include "widget", which would utilize the phone as a screen to persistently display information the user desires, such as a calendar, a clock, a photo, a weather report, an email unread message counter, and/or any other type of display. In still another embodiment, these general integrated phone roles may include those of an interactive nature, such as "track pad". "mouse". "keyboard", and/or any other input role which a phone could fill.

In some embodiments, the general integrated phone roles may also include "custom UI", in which the phone would serve as a configurable user interface, providing user interface elements for a plurality of tasks, actions, macros, scripts, apps, and/or any other function which may be performed by either integrated device. In one embodiment, this user interface may be entirely user defined. In another embodiment, all or a part of this custom UI may be configured automatically, based upon observed user behavior. In yet another embodiment, this custom UI may be context-sensitive.

In another embodiment, the general integrated phone roles may include "locked", where the phone display would remain off. This may be desirable in the case where the integrated phone does not have an external power source and battery life needs to be extended.

In various embodiments, the available general roles for the integrated tablet and integrated phone may be focused upon the advantages provided by each device. For example, the tablet roles may focus upon harnessing a superior display, while the phone roles may focus on ease with which a phone may be manipulated and repositioned. Of course, except in the case where a role relies upon a resource which is unique to only one of the devices, the tablet and phone roles may be interchangeable, in accordance with one embodiment.

In some embodiments, the user may be warned if they have chosen a pair of general integrated device roles which both lack input functionality (e.g. the tablet fills a "display" role, and the phone fills a "widget" role, etc.). In one embodiment, this warning may indicate to the user that one or more external input devices will be required. In another embodiment, the user may be prevented from choosing a pair of roles which preclude a form of input. In other embodiments, however, the user interface 12-10140 may include a list of potential input sources which the user may reorder according to their desired priority. For example, a user may order the list such that if an external mouse is detected, it will have priority and the tablet will not be touch sensitive. The user may also order the list such that they will be able to interact with the integration via mouse as well as a touchscreen.

Similarly, in other embodiments, the user interface 12-10140 may include a list of general integrated roles which the user may prioritize. As a specific example, the phone may fill the "custom UI" role until the need for a keyboard arises (i.e. an editable text field is selected, etc.), at which time it will become a keyboard.

In one embodiment, the user interface 12-10140 may also provide the user with the ability to designate a prime display. In the context of the present description, the prime display refers to the device display upon which the most important user interaction will take place (e.g. a menu bar, notifications, etc.).

As shown, the collection of integrated device roles 12-10142 may include a plurality of drop down menus 12-10146 to specify the role each integrated device will play during a voice call. In one embodiment, an "in-call UI" role may use an integrated device to display a plurality of actions which a user may take during a call (e.g. "mute", "speaker", "escalate to video conference", etc.). In another embodiment, a "caller info" role may use an integrated device to display information regarding the caller, which may include, but is not limited to, a photo, a call history, recent emails, and/or any other information related to the caller. In yet another embodiment, a "call transcript" role may use an integrated device to display a user interface containing a transcript of the call. As an option, the transcript may be generated automatically. In still another embodiment, a "prime display" role may use an integrated device as the prime display. For instance, a user may utilize the tablet as the prime display in general, but could have that display moved to the phone screen during a call, using the tablet to display caller information and related emails. Further more, in another embodiment, one or more of the general integration roles previously discussed may also be available during a voice call.

In one embodiment, both devices may be assigned roles from a single set of voice call device roles. As an option, the user may be prevented from selecting a conflicting set of roles, such as two identical roles. In another embodiment, the user may be able to choose from a set of roles for the integrated phone, and from a similar, yet enhanced, set of roles for the integrated tablet. These enhanced roles may take advantage of the additional resources of the tablet, such as a larger display. In some embodiments, user interface 12-10140 may allow the user to customize various aspects of the interfaces and roles associated with a voice call.

In one embodiment, the behavior associated with a role specified in user interface 12-10140 may be unchangeable during that use scenario (e.g. the in-call UI is displayed on the tablet until the call has ended, etc.). In another embodiment, the roles specified in this user interface may simply represent a default starting point; the user may be able to modify the functionality and/or role of one or both devices at any time, during any use scenario.

As shown, the collection of integrated device roles 12-10142 may include a plurality of drop down menus 12-10148 to specify the role each integrated device will play during a video conference. In one embodiment, an "in-conference UI" role may use an integrated device to display a plurality of actions which a user may take during a conference, similar to the "in-call UI" role for voice calls. Additionally, "caller info", "conference transcript", and "prime display" roles may exist, which are similar to roles discussed with respect to a voice call.

In various embodiments, the available device roles for a video conference may also include roles specific to the video streams being used. For example, in one embodiment, there may exist an "incoming video stream" role, which uses a device to display the one or more video streams coming from one or more other callers. In another embodiment, there may exist an "outgoing video stream" role, which displays the video stream the user is sending to other conference participants. As an option, if the user does not delegate the displaying of the outgoing video to a particular device, said video may be displayed in a reduced size within another user interface.

As with the device roles for voice calls, in one embodiment both devices may be assigned roles from a single set of video conference device roles. As an option, the user may be prevented from selecting a conflicting set of roles, such as two identical roles. The user may also be required to elect one of the devices to fill the "incoming video stream" role, in accordance with another embodiment.

In another embodiment, there may be one set of video conference device roles for the integrated phone, and a similar though enhanced set of roles for the integrated tablet, taking advantage of additional resources available on the tablet. In some embodiments, user interface 12-10140 may allow the user to customize various aspects of the interfaces and roles associated with a video conference.

In some embodiments, the plurality of drop down menus 12-10148 may include a drop down menu for selecting integrated device roles to be filled during a multichannel video conference (e.g. "shared workspace", etc.). In other embodiments, said roles may be incorporated into the set of video conference roles.

In various embodiments, the user interface 12-10140 may include a collection of drop down menus 12-10150 specifying various audio and video channels to be associated with one or more use scenarios. For example, as shown, in one embodiment a user may specify the audio and/or video inputs and outputs to be used in the general, voice call, and video conference use scenarios. Possible inputs and outputs may include, but are not limited to, built-in speakers and microphones, external speakers and microphones, Bluetooth and other wireless audio and video devices, built-in cameras, external cameras, and/or any other input or output hardware which may be associated with an integrated device. Each drop down menu may list all of the options (e.g. tablet microphone, phone microphone, external microphone, etc.) available for each channel.

In some embodiments, the user interface 12-10140 may include one or more lists of potential input and output sources which the user may reorder according to their desired priority. In one embodiment, there may be a list just for the general use scenario. For example, a user may order a list such that if an external speaker is connected to the tablet, it will have priority, otherwise the integration will prefer to use headphones connected to the phone. In another embodiment, there may be lists for each use scenario. For example, a user may specify that an external speaker be preferred over a Bluetooth headset in a general use scenario, but the Bluetooth headset have priority during a voice call. In still another embodiment, a user may specify a set of input and output priorities which are used in all use scenarios.

In some embodiments, the user may assign roles, inputs, and outputs for the general, voice call, and video conference use scenarios, as shown. In other embodiments, the user may specify roles, inputs, and/or outputs for other use scenarios. For example, in one embodiment, the user may make such specifications for the scenario where one of the integrated devices is being used to capture photos or video. As a specific example, a user may define roles for a photography use scenarios such that as the user takes photos with the phone, the captured images are immediately displayed on the tablet, where they may be tagged, retouched, or modified in some way.

In another embodiment, the user may use interface 12-10140 or a similar interface to define preferred roles, inputs and outputs for use scenarios specific to particular applications. For example, a user could specify that, independent of how the general use scenario is defined, when a word processing application is being used, the phone display is used for an application specific user interface. See, for example, FIG. 40 of the previous application. In still another embodiment, a user may be able to define preferred roles, inputs, and outputs for use scenarios associated with a particular class of applications. For example, a user may define a particular set of audio input and output preferences to be used when playing a game.

In one embodiment, the user interface 12-10140 may include a check box 12-10152 to cause a user environment to be associated with and restored upon application of that particular integration profile. In the context of the present description, a user environment refers to the set of running applications, open documents, and/or settings which are in use at a particular time. By selecting check box 12-10152, the environment that was in use the last time this particular integration profile was used will be restored as part of the next application.

In other words, if a user was running a particular application, viewing a particular document, and/or using a particular setting (e.g. sound volume, display brightness, etc.) the last time the integration association with this profile was disintegrated, that application/document will be restored the next time the profile is applied. This may be useful for integration profiles associated with a particular use context, such as being at work. As an option, in one embodiment, a user may be able to specify which aspects (e.g. applications, documents, settings, etc.) are preserved as part of a user environment.

In some embodiments, the application of an integration profile may cause the previous user environment to be restored. In other embodiments, the specifics of the user environment which is restored may be determined by previously observed user behavior. For example, if a user is observed running a particular application, using a particular system setting, or viewing a particular document (or website), at a particular time of day, that might be part of the user environment which is restored, depending on the time of day when the environment is restored.

As a specific example, a user may define an integration profile for use at their place of business, and specify that the user environment be restored. Historically, this user may spend the early morning sending and reading email, and then reviewing spreadsheets until lunchtime. Depending on the time of day when that user's "business integration" profile is applied, an email client may be opened showing unread email, or a spreadsheet application may be opened displaying the most recent document.

The user interface 12-10140 may be utilized to define how phone events are handled by the integration. In one embodiment, the user interface 12-10140 may include a collection of check boxes 12-10154 associated with different methods of handling phone events. In another embodiment, this user interface may also include a button to allow the user to configure the selected method.

In one embodiment, the collection of phone event handling methods 12-10154 may include a check box 12-10156 to specify that phone events be handled on the tablet, using a native interface (i.e. using user interface elements native to the tablet, as opposed to images of UI elements generated by the phone). In this way, the larger display of the tablet may be utilized, allowing the user to deal with phone events without overly disrupting their use of the tablet.

In various embodiments, handling phone events through a native tablet interface may be accomplished through the insertion of hooks. For example, in one embodiment, one or more hooks may be inserted at runtime on the phone which intercept API calls, system events, and/or any other signal or occurrence associated with a need for user intervention (e.g. a dialog box, a warning message, etc.) or attention (e.g. an alert sound, a screen flash, etc.), and pass on the relevant information to the integrated tablet in the form of a phone event summary.

In one embodiment, the collection of phone event handling methods 12-10154 may include a check box 12-10158 to specify that phone events be handled on the tablet, using a virtual phone interface. In the context of the present description, a virtual phone interface refers to displaying at least a portion of a user interface or graphic generated by the integrated phone on the tablet, where the user may interact with it. In this way, phone events may be handled on the tablet through a familiar, predictable user interface. In some embodiments, this may be done without requiring the use of hooks, or having to modify phone application code to handle use while integrated.

In some embodiments, a virtual phone interface may be displayed which shows the entire phone display on the tablet. For example, in one embodiment, the virtual phone interface may be presented to the user framed within a depiction of the integrated phone. It should be noted that the use of a virtual phone interface does not require the phone display to be used. For example, the phone display may be turned off to preserve battery power, while the data In other embodiments, only new or modified portions of the phone display may be shown in the virtual phone interface. For example, if the phone event involves the display of a dialog box, or updating an application icon with a badge or label, only that altered or new element may be shown on the tablet. In this way, phone applications do not have to include special code for integration, and the amount of graphical data sent to the tablet is reduced. In one embodiment, this virtual phone interface may be created by comparing the intended phone display with a display predating the phone event.

In one embodiment, the collection of phone event handling methods 12-10154 may include a check box 12-10160 to specify that phone events be handled on the phone, interrupting whatever role the phone may be filling at the time. This method makes the user experience more predictable and intuitive, with processes running on the phone being dealt with on the phone, and processes running on the tablet being dealt with on the tablet.

In one embodiment, user interface 12-10140 may include a check box 12-10162 which allows the user to specify that they be notified on the tablet before an interface for handling a phone event is presented. This would prevent a phone event from overly disrupting activity on the tablet, for instance, by obscuring a portion of the display. In various embodiments, these phone event notifications may be presented in a manner whose purpose is to avoid disturbing the user. For example, in one embodiment, phone event notifications may be incorporated into whatever system the tablet uses for notifications local to the tablet. In another embodiment, phone event notifications may be displayed using status icons located along the border of the tablet display. In yet another embodiment, phone event notifications may be made by momentarily displaying a representative icon on the tablet display. In still another embodiment, phone event notifications may be communicated to the user using a tone, or other sound.

In some embodiments, the user may interact with these phone event notifications to activate the phone event handling method selected in user interface 12-10140. In other embodiments, interacting with the phone event notifications may provide the user with one or more choices, which may include, but are not limited to, activating a phone event handling method, or dismissing the phone event.

As shown, user interface 12-10140 may include buttons 12-10164 which allow the user to save the defined integration functionality settings, load an already defined set of integration functionality settings, or to revert to the previous settings and return to the previous user interface, in accordance with one embodiment. In some embodiments, the user may be given the option to give a name to the defined set of integration functionalities. In other embodiments, the loading and/or saving of settings may be done using the name given to the associated integration profile.

Figures 12C, 101C:
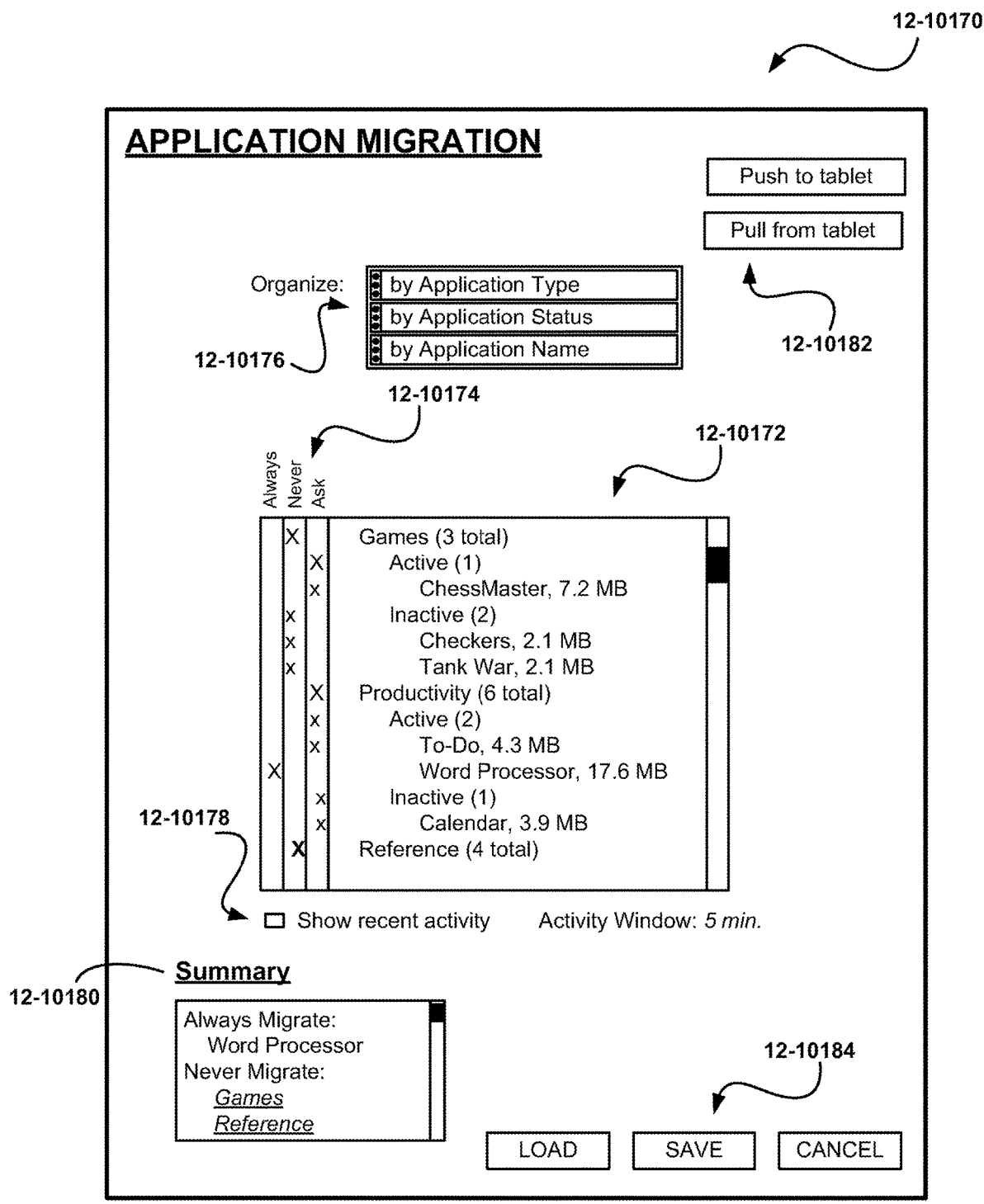
FIG. 12C-101C shows a user interface for defining application migration settings as part of an integration profile, in accordance with one embodiment.

FIG. 12C-101C shows a user interface 12-10170 for defining application migration settings as part of an integration profile, in accordance with one embodiment. As an option, user interface 12-10170 may be implemented in the context of the architecture and environment of the previous Figures or any subsequent Figure(s). Of course, however, user interface 12-10170 may be implemented in any desired environment. It should also be noted that the aforementioned definitions may apply during the present description.

In one embodiment, user interface 12-10100 of FIG. 12A-101A may include a button 12-10132 which allows the user to define or modify how the integration will handle the use of virtual machines and/or virtual applications. In various embodiments, selecting button 12-10132 may present a different user interface. For example, in one embodiment, user interface 12-10170 may be used to define how virtual machines and/or virtual applications will be utilized by integration.

As shown, user interface 12-10170 may include a list 12-10172 which allows the user to define which items will be migrated as part of the integration. In various embodiments, migration preferences may be specified with varying degrees of granularity. For example, in one embodiment, migration preferences may be defined for specific applications, all applications of a specific type (e.g. entertainment, communication, productivity, etc.), or all applications of a specific status (e.g. actively running, inactive, recently active, etc.). In other embodiments, preferences may be defined for other groupings of applications, including type of software license, application executable size (to ensure a rapid migration, etc.), and/or any other grouping.

In various embodiments, each row in list 12-10172 may include text (e.g. "Productivity", "Active", "Calendar", etc.), and one or more buttons to indicate a migration preference. For example, as shown, each row of the list includes text as well as a set of radio buttons 12-10174 used to indicate migration settings, in accordance with one embodiment.

In some embodiments, there may be token items in list 12-10172, which represent a dynamic group of applications whose members are determined at the time of integration. Such token items may include, but are not limited to, running applications and/or recently used applications.

In one embodiment, the set of migration options 12-10174 may include a radio button indicating that an application or set of applications should always be automatically migrated as virtual applications or as part of a virtual machine when the integration profile is applied. In another embodiment, a user may further specify that if a particular application or set of applications are not running at the time of integration, they should be executed on the phone, then transferred as a virtual applications or as part of a virtual machine. This may be useful in cases where a user may not be certain that a crucial application will be available on an integrated tablet which is not exclusively under the user's control (e.g. a shared or borrowed tablet, etc.).

In one embodiment, the set of migration options 12-10174 may include a radio button indicating that an application or set of applications should never be automatically migrated as virtual applications or as part of a virtual machine when the integration profile is applied. This may be useful for applications which the user may be confident will be installed on the integrated tablet, and which do not need local data, or which store their data on an external server, such as a cloud server. Designating such applications as off limits to automatic migration reduces the number of decisions the user may have to make at the time of integration.

In one embodiment, the set of migration options 12-10174 may include a radio button indicating that a user should be prompted whether or not an application should be transferred as a virtual application or as part of a virtual machine via a live migration. In some cases, the user may which to limit such a prompt to the applications which are running at the time the integration profile is applied. However, a user may wish to be prompted regarding recently run applications, or applications which are often run, and not present on the tablet.

In some embodiments, the radio buttons which make up the set of migration options 12-10174 may vary in appearance, depending upon how the button was selected. For example, in one embodiment, if a particular application is designated to always migrate because it is part of a group, the toggled radio button for that item may be a different color than buttons where were explicitly selected by the user. In this way, the user may be aware of what selections are due to a group, and which are explicit. This also makes it easier for a user to see where exceptions made for entire groups need to be made.

In some embodiments, items in list 12-10172 may contain text describing a group (e.g. "Games", "Active", etc.) of applications or the name of a single application. In other embodiments, this text may convey additional information. For example, in one embodiment, list items which represent groups of applications may indicate the number of applications within the group. In another embodiment, the style of the text (e.g. plain, italic, bold, etc.) may indicate whether or not the application is known to be installed on the tablet associated with that particular integration profile. In this way, a user may make a more informed decision whether or not an application should be forced to migrate as part of the integration process.

As shown, interface 12-10170 may include a collection of drop down menus 12-10176 which allow the user to organize items of list 12-10172 by one or more criteria, in accordance with various embodiments. For example, in one embodiment, a user may specify a first, second, and third type of ordering for the list. Types of ordering may include, but are not limited to, by application name, by application status (e.g. running, recently run, inactive, etc.), by application type (e.g. games, productivity, etc.), by size (e.g. under 100 k, 100 k to 1 MB, etc.), and/or any other basis for grouping applications. In this way, a user may more easily specify migration preferences for groups of applications. As a specific example, a user may order the list by application type, and specify that all applications of the type "games" are to never be transferred during integration, through selecting a single button. Subsequently, a user may reorder the list, and specify that if a game is active, and under 500 k, it should always be migrated as part of integration.

In various embodiments, user interface 12-10170 may include a button 12-10178 which allows the user to specify that recently run applications should be indicated in list 12-10172. For example, in one embodiment, recently run applications may be indicated by stylizing the item text in the list. In another embodiment. "recently run" may be one of the application status groups. As an option, the user may be able to specify how recent an application needs to have been run to qualify for this designation.

In one embodiment, user interface 12-10170 may include a text field 12-10180 which provides the user with a summary of all the migration settings which have been defined. In another embodiment, the partitioning of the summary may be identical to the set of migration options 12-10174 (e.g. "always", "never", "ask", etc.). As an option, the same stylization used in list 12-10172 may also be used in text field 12-10180, to convey the same information.

In some embodiments, user interface 12-10170 may be used to specify application migration settings for virtual applications and/or virtual machines being migrated from the phone to the tablet as part of an integration. In other embodiments, user interface 12-10170 may include buttons 12-10182 which allow the user to parameterize a migration from phone to tablet, as well as a migration from tablet to phone. As an option, user interface 12-10170 may be tabbed, with one tab for phone-to-tablet migration, and another tab for tablet-to-phone migration.

As shown, user interface 12-10170 may include buttons 12-10184 which allow the user to save the defined application migration settings, load an already defined set of application migration settings, or to revert to the previous settings and return to the previous user interface, in accordance with one embodiment. In some embodiments, the user may be given the option to give a name to the defined set of application migration settings. In other embodiments, the loading and/or saving of settings may be done using the name given to the associated integration profile.

Figures 12D, 101D:
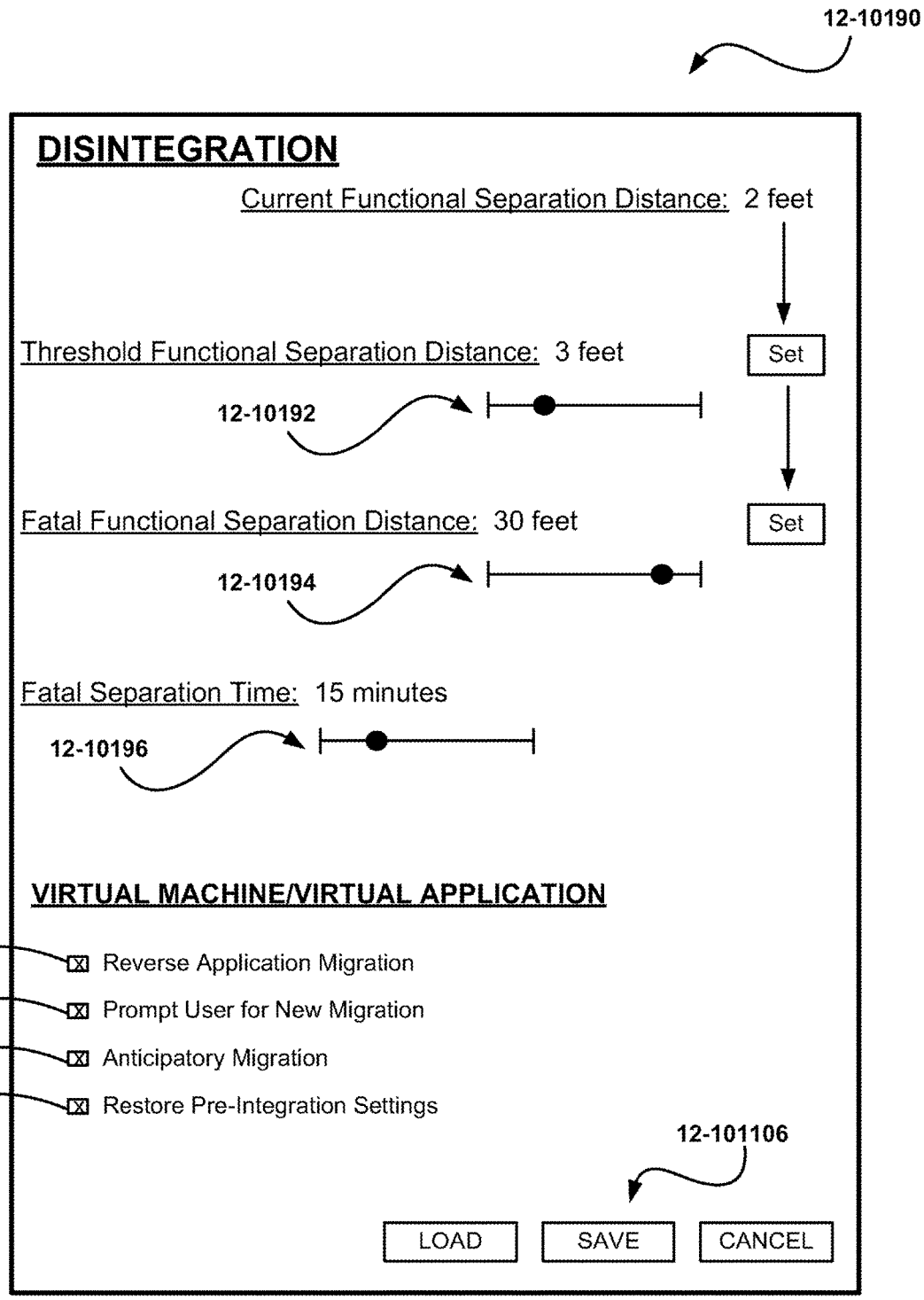
FIG. 12D-101D shows a user interface for defining disintegration parameters as part of an integration profile, in accordance with one embodiment.

FIG. 12D-101D shows a user interface 12-10190 for defining disintegration parameters as part of an integration profile, in accordance with one embodiment. As an option, user interface 12-10190 may be implemented in the context of the architecture and environment of the previous Figures or any subsequent Figure(s). Of course, however, user interface 12-10190 may be implemented in any desired environment. It should also be noted that the aforementioned definitions may apply during the present description.

In one embodiment, user interface 12-10100 of FIG. 12A-101A may include a button 12-10134 which allows the user to define how and when the integration will end. In various embodiments, selecting button 12-10134 may present a different user interface. For example, in one embodiment, user interface 12-10190 may be used to define or modify the details and triggers for disintegration.

For example, in one embodiment, user interface 12-10190 may include a slider 12-10192 which allows the user to specify a threshold functional separation distance, or the functional distance at which a partial disintegration is initiated. As previously discussed, a functional distance may be represented as a unitless value, using units of distance, or using some other unit (e.g. signal strength, unique unit, etc.).

As shown, in one embodiment, user interface 12-10190 may include a slider 12-10194 which allows the user to specify a fatal functional separation distance. In the context of the present description, a fatal functional separation distance refers to the functional distance at which a full disintegration is triggered. In another embodiment, slider 12-10194 may be used to specify an offset from an observed and/or calculated physical limit of the integration.

As a specific example, when first defining an integration profile to be associated with a particular location, the user may be prompted to leave one device at the most likely place of use (e.g. user's office, user's desk, etc.), and wander around with the other device, testing the limits of the integration. After determining the physical limitations, the user may utilize slider 12-10194 to specify how close to this limit a full disintegration should be triggered.

In some embodiments, the range of sliders 12-10192 and 12-10194 may be static. In other embodiments, the range of one or both of these sliders may be dynamic. For example, in one embodiment, the upper limit of the threshold functional separation distance slider may be based upon (e.g. equal to, offset from, etc.) the currently defined fatal functional separation distance. In another embodiment, the upper limit of the fatal functional separation distance may be based upon the observed and/or calculated physical limits of the integration. For example, if it had been previously observed that the integration failed at a functional distance less than that chosen by the user, the user may be notified and the fatal functional separation distance may be modified.

In various embodiments, user interface 12-10190 may include a text field displaying the current functional proximity between the two devices, if they are presently integrated and the integration profile is being defined using one of the devices. In one embodiment, the user interface may also include a button for each definable distance (e.g. threshold functional separation, fatal separation distance, etc.) which captures the value of the current functional proximity. This allows the user to simply arrange the devices in their desired positions and press a button, rather than guessing at a distance, or measuring. Additionally, this method takes into account the "functional" aspect of these distances (i.e. obstruction between the devices will increase the functional proximity, even if the spatial relationship remained unchanged).

In one embodiment, user interface 12-10190 may include a slider 12-10196 which allows the user to specify a fatal separation time. In the context of the present description, a fatal separation time refers to the maximum amount of time an integration may remain partially disintegrated (i.e. separated beyond the threshold functional separation distance) before a full disintegration is initiated. As an option, a user may disable this time limit, allowing the pair of devices to remain partially disintegrated indefinitely, so long as their separation remains between the threshold and fatal functional separation distances.

In one embodiment, user interface 12-10190 may include a button 12-10198 which allows the user to specify that any virtual applications and/or virtual machines which were migrated as part of the integration be migrated back to the originating device as part of the disintegration process. In another embodiment, this is may be specified on a per-application or per-group basis in a different user interface, such as 12-10170.

Reversing the migrations performed at integration may increase the amount of time needed to disintegrate the devices. In one embodiment, specifying that the migrations should be reversed by selecting button 12-10198 may inform the user the predicted amount of time and/or data transfer that such a reversal would take, based upon the currently defined application migration settings.

In another embodiment, specifying that the migrations should be reversed as part of disintegration may automatically modify the fatal functional separation distance, to ensure that the migration can reliably be completed before the integration fails due to physical limitations. As an option, this modification may be based upon previously observed user behavior, including, but not limited to, average walking speed, the average rate that communication channel signal strength degrades while partially disintegrated (as a function of time of day), and/or any other observable information which could be used to predict how quickly a partial disintegration may proceed to integration failure.

In one embodiment, user interface 12-10190 may include a button 12-101100 which allows the user to specify that the user should be prompted before disintegration, having the option to migrate one or more currently active applications, independent of whether they were migrated at the time of integration. The timing of such a prompt may be based upon a number of factors. For example, in one embodiment, the prompt may be displayed at a time such that, should the user elect to migrate all active applications, the migration would be complete before integration failure. In another embodiment, the prompt may be displayed at a time such that, based upon observed user behavior, the migration of the set of applications most likely to be migrated will be complete before integration failure.

In one embodiment, user interface 12-10190 may include a button 12-101102 which allows the user to specify that an anticipatory migration be initiated while the devices are partially disintegrated. Similar to the migration prompt previously discussed, the timing for the anticipatory migration may be based upon a number of factors. For example, in one embodiment, the start of the anticipatory migration may be triggered such that the bulk of the migration will be complete before the device separation is likely to have increased to the fatal functional separation distance. In another embodiment, the amount of resources (e.g. bandwidth, processor load, etc.) devoted to the anticipatory migration may depend upon how close the partially integrated devices are to reaching the fatal functional separation distance.

In one embodiment, user interface 12-10190 may include a button 12-101104 which allows the user to specify that, upon disintegration, the devices will be restored to their pre-integration state. As a specific example, the devices may be restored to their previous sound volume, display brightness, active applications, and/or open documents. In another embodiment, the user may be able to specify what aspects will be restored upon disintegration. For example, a user may wish to restore their previous sound volume, but not return to a previous application, since they have since began working on something new.

As shown, user interface 12-10190 may include buttons 12-101106 which allow the user to save the defined disintegration settings, load an already defined set of disintegration settings, or to revert to the previous settings and return to the previous user interface. In some embodiments, the user may be given the option to give a name to the defined set of disintegration settings. In other embodiments, the loading and/or saving of settings may be done using the name given to the associated integration profile.

Figures 12E, 101E:
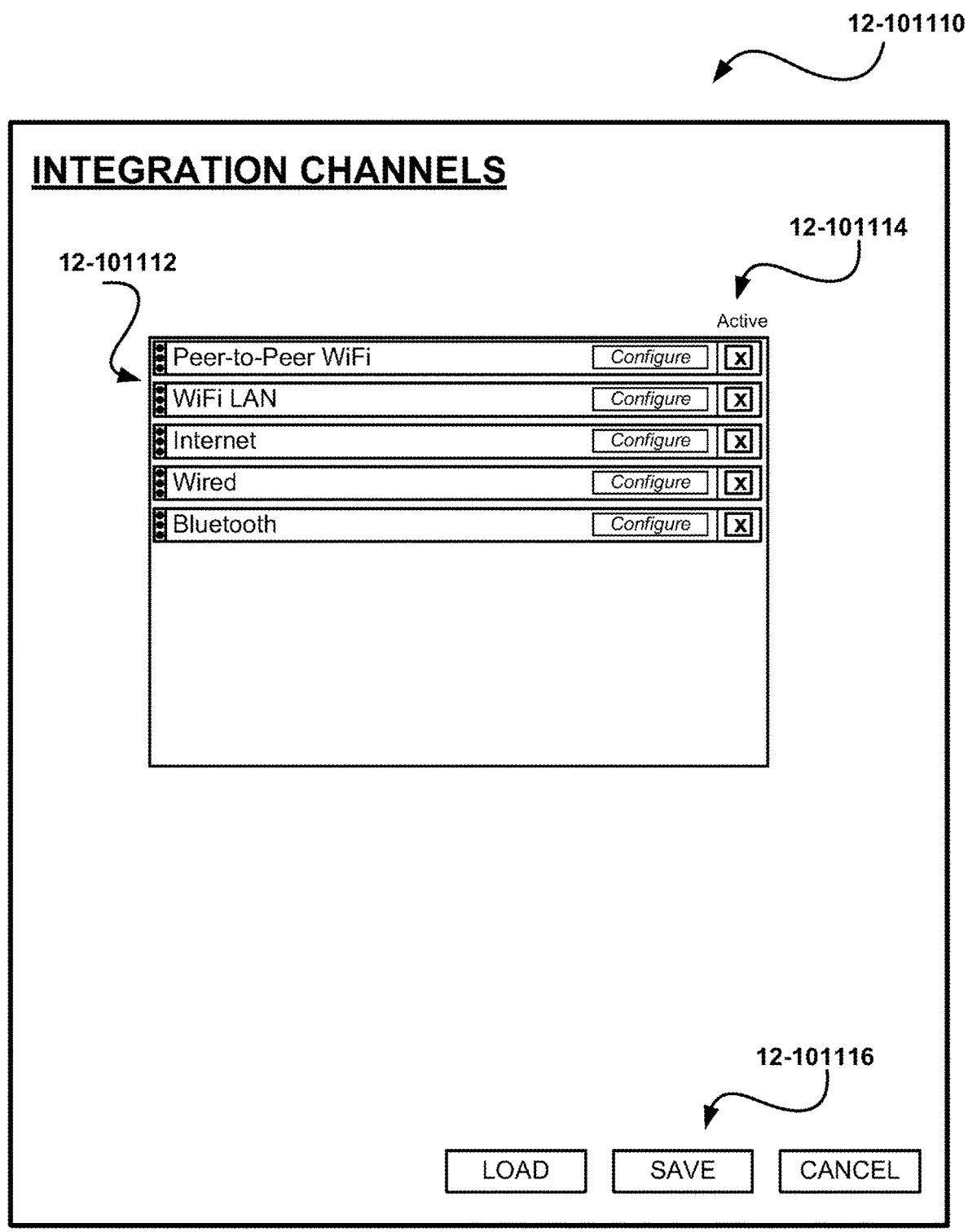
FIG. 12E-101E shows a user interface for defining integration channels as part of an integration profile, in accordance with one embodiment.

FIG. 12E-101E shows a user interface 12-101110 for defining integration channels as part of an integration profile, in accordance with one embodiment. As an option, user interface 12-101110 may be implemented in the context of the architecture and environment of the previous Figures or any subsequent Figure(s). Of course, however, user interface 12-101110 may be implemented in any desired environment. It should also be noted that the aforementioned definitions may apply during the present description.

In one embodiment, user interface 12-10100 of FIG. 12A-101A may include a button 12-10136 which allows the user to specify which communications channels are to be used in the integration. In various embodiments, selecting button 12-10136 may present a different user interface. For example, in one embodiment, user interface 12-101110 may be used to specify the settings and priority for the one or more communication channels available in integration.

In various embodiments, user interface 12-101110 may include a list 12-101112 of one or more potential communications channels to be used in an integration. In some embodiments, the user may use list 12-101112 to indicate a preferred order of importance for the various types of communications channels. Specifically, the first item on the list will be tried first; it an integration cannot be formed using that channel, the next channel will be attempted. In one embodiment, the user may drag items in the list to rearrange them. Furthermore, in one embodiment, each item in list 12-101112 may have a checkbox 12-101114 to indicate whether a channel may be used or not, as shown.

As shown, user interface 12-101110 may include buttons 12-101116 which allow the user to save the defined integration channel settings, load an already defined set of integration channel settings, or to revert to the previous settings and return to the previous user interface. In some embodiments, the user may be given the option to give a name to the defined set of integration channel settings. In other embodiments, the loading and/or saving of settings may be done using the name given to the associated integration profile.

Figures 13, 102:
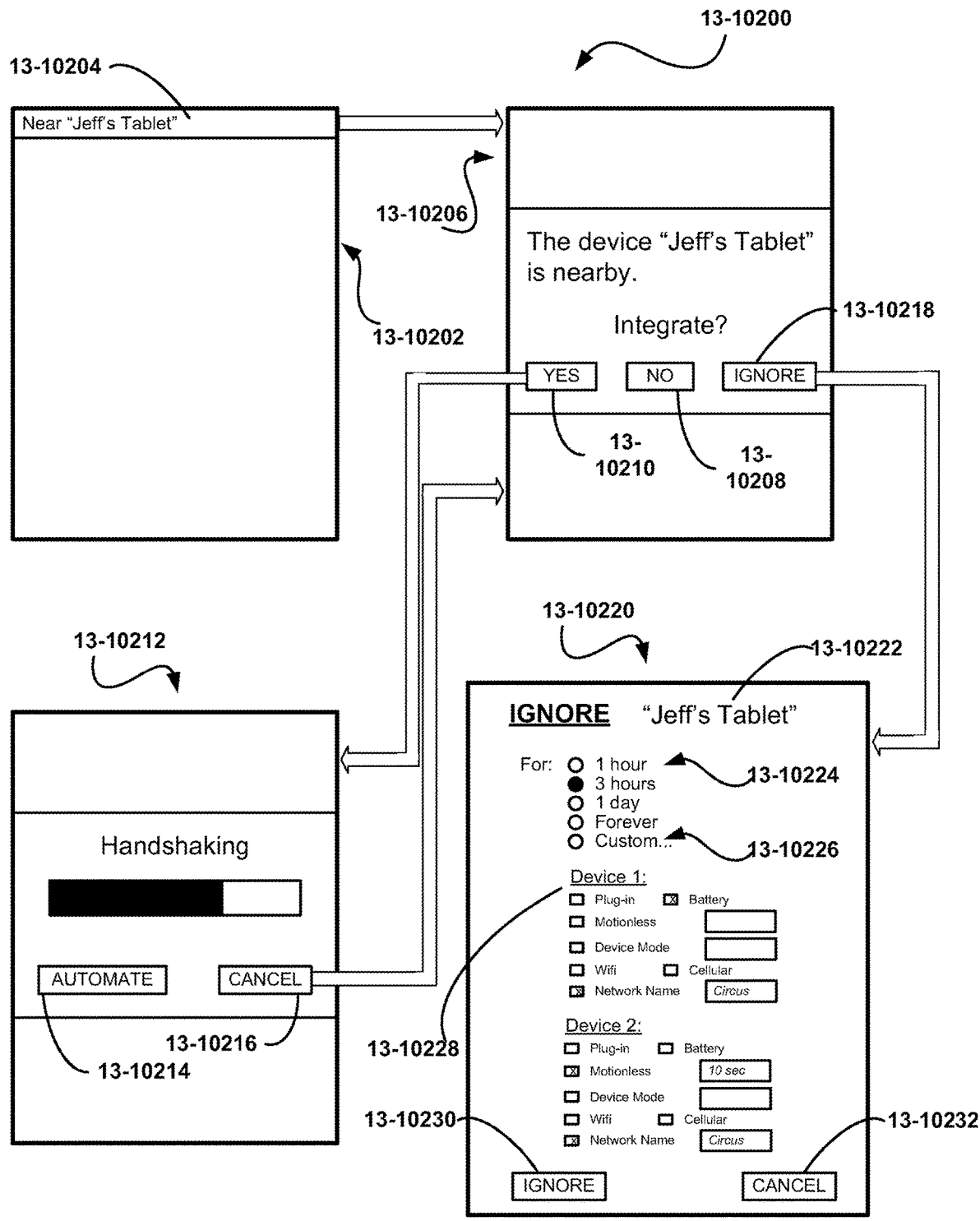
FIG. 13-102 shows a plurality of user interfaces for prompting a user to initiate an integration, in accordance with one embodiment.

FIG. 13-102 shows a plurality of user interfaces 13-10200 for prompting a user to initiate an integration, in accordance with one embodiment. As an option, the plurality of user interfaces 13-10200 may be implemented in the context of the architecture and environment of the previous Figures or any subsequent Figure(s). Of course, however, the plurality of user interfaces 13-10200 may be implemented in any desired environment. It should also be noted that the aforementioned definitions may apply during the present description.

In various embodiments, the plurality of user interfaces 13-10200 may be used to prompt a user regarding a potential integration. In one embodiment, plurality 13-10200 may include user interface 13-10202, which may be used to notify the user of a potential integration. As shown, the user interface 13-10202 may include text field 13-10204 which informs the user of a potential integration in a unobtrusive way, in accordance with one embodiment. In another embodiment, text field 13-10204 may identify the detected device in one or more ways, including, but not limited to, a device name, a device make and model, a device owner, and/or any other identifying information. As an option, text field 13-10204 may also indicate the last time an integration was performed with that device.

A user may be notified of a potential integration in other ways. In one embodiment, an icon may flash in a menu or status bar at the edge of a display, indicating that an integration may be possible. Interacting with the icon (e.g. touching it, clicking on it, etc.) may cause additional information to be displayed. In another embodiment, the potential integration may be indicated using sound and/or vibration. In still another embodiment, the user may be notified of a potential integration utilizing whatever method is used to display system events on the device.

In various embodiments, if the user takes no action, the notification presented in user interface 13-10202 may disappear after a predetermined amount of time. If the user interacts with the notification (e.g. touch, clicking, etc.), the user may be presented with user interface 13-10206. In one embodiment, user interface 13-10206 may be used to prompt the user whether they want to proceed with an integration, or whether they wish to ignore the device in question. In another embodiment, the options and information provided by user interface 13-10206 may be given through a popup menu, activated by interacting with the notification.

In one embodiment, user interface 13-10206 may include button 13-10208, which may be used to indicate that the user does not wish to perform an integration. Interacting with the button will dismiss the dialog box, and the user may resume normal operation of their device.

In one embodiment, user interface 13-10206 may include button 13-10210, which may be used to indicate that the user wishes to proceed with the integration. In various embodiments, if the user indicates that they wish to proceed with the integration, they may be presented with a dialog box similar to that shown in user interface 13-10212.

In one embodiment, the plurality of user interfaces 13-10200 may include user interface 13-10212, which may be used to indicate the progress of the integration. As shown, user interface 13-10212 may include a progress bar indicating how the integration is advancing, in accordance with one embodiment. As an option, the phase of integration (e.g. "handshaking", "synchronizing integration profiles", etc.) may also be indicated.

In various embodiments, user interface 13-10212 may include button 13-10214, which may be used to indicate that the user wishes to automate the integration process, to streamline the process in the future. In one embodiment, selecting button 13-10214 may result in displaying an interface for defining an integration profile, such as the user interface depicted in FIG. 12A-101A. As an option, the integration profile may be prepopulated with settings related to the context during which button 13-10214 was activated. Specifically, the profile may be populated with contextual information such as the present location, whether or not one or both devices is running on battery power, the type of network being used, the time of day, and/or any other contextual information.

In various embodiments, user interface 13-10212 may include button 13-10216, which may be used to cancel the integration. In one embodiment, button 13-10216 may cancel the integration and allow the user to return to their previous activity. In another embodiment, button 13-10216 may cancel the integration and return the user to user interface 13-10206.

In one embodiment, user interface 13-10206 may include button 13-10218, which may be used to indicate that the user does not wish to perform an integration, and furthermore wishes to ignore the device which triggered the prompt. In another embodiment, button 13-10218 may present user interface 13-10220 to the user. In the context of the present description, ignoring a device refers to suppressing any notifications which may be presented to a user regarding integrating with that device, and deactivating any integration profiles for that device which are triggered within the context of the ignore request. This allows a user to operate a device within the proximity of a potential integration without the repeated interruption of integration prompts.

In one embodiment, the plurality of user interfaces 13-10200 may include user interface 13-10220, which may be used to indicate how long, and in what context, a device should be ignored. As shown, user interface 13-10220 may include a text field 13-10222, which describes the device which will be ignored. In one embodiment, this description may be limited to the device's given name. In another embodiment, the description may include additional identifying information, such as make, model, owner, and/or any other identifying information. In still another embodiment, the description may be accompanied by an iconic representation of the device.

In various embodiments, user interface 13-10220 may include a plurality of radio buttons 13-10224 to indicate how long the device should be ignored. For example, in one embodiment, this collection of radio buttons may include one or more finite durations (e.g. 1 hour, 12 hours, 1 day, 1 week, etc.). In another embodiment, there may be a radio button associated with a text field, where the user may enter any duration they choose. In still another embodiment, the user may elect to ignore the device indefinitely.

In other embodiments, radio buttons 13-10224 may include context based durations. For example, in one embodiment, a user may elect to ignore a device until they leave their present location. In other words, after they leave the present location, they will again be prompted concerning integration the next time they are in proximity to the device. As an option, the user may have to leave the location for a predefined amount of time.

As shown, the collection of radio buttons 13-10224 may include a radio button 13-10226 which provides an option for a customized "ignore" policy, in accordance with one embodiment. For example, in one embodiment, selecting this radio button may cause a collection of check boxes 13-10228 representing contextual requirements to become available. In one embodiment, these contextual requirements are similar to those represented by the plurality of check boxes 12-10122 depicted in FIG. 12A-101A. This allows the user to ignore a device, but only in a particular set of circumstances. In some embodiments, the user may receive a warning if they have selected a set of contextual requirements that would conflict with a previously defined integration profile.

In one embodiment, user interface 13-10220 may include button 13-10230, which causes the ignore policy to be implemented. Furthermore, in one embodiment, user interface 13-10220 may include button 13-10232, which may be used to cancel the ignore policy and return to user interface 13-10206.

Figures 14, 103:
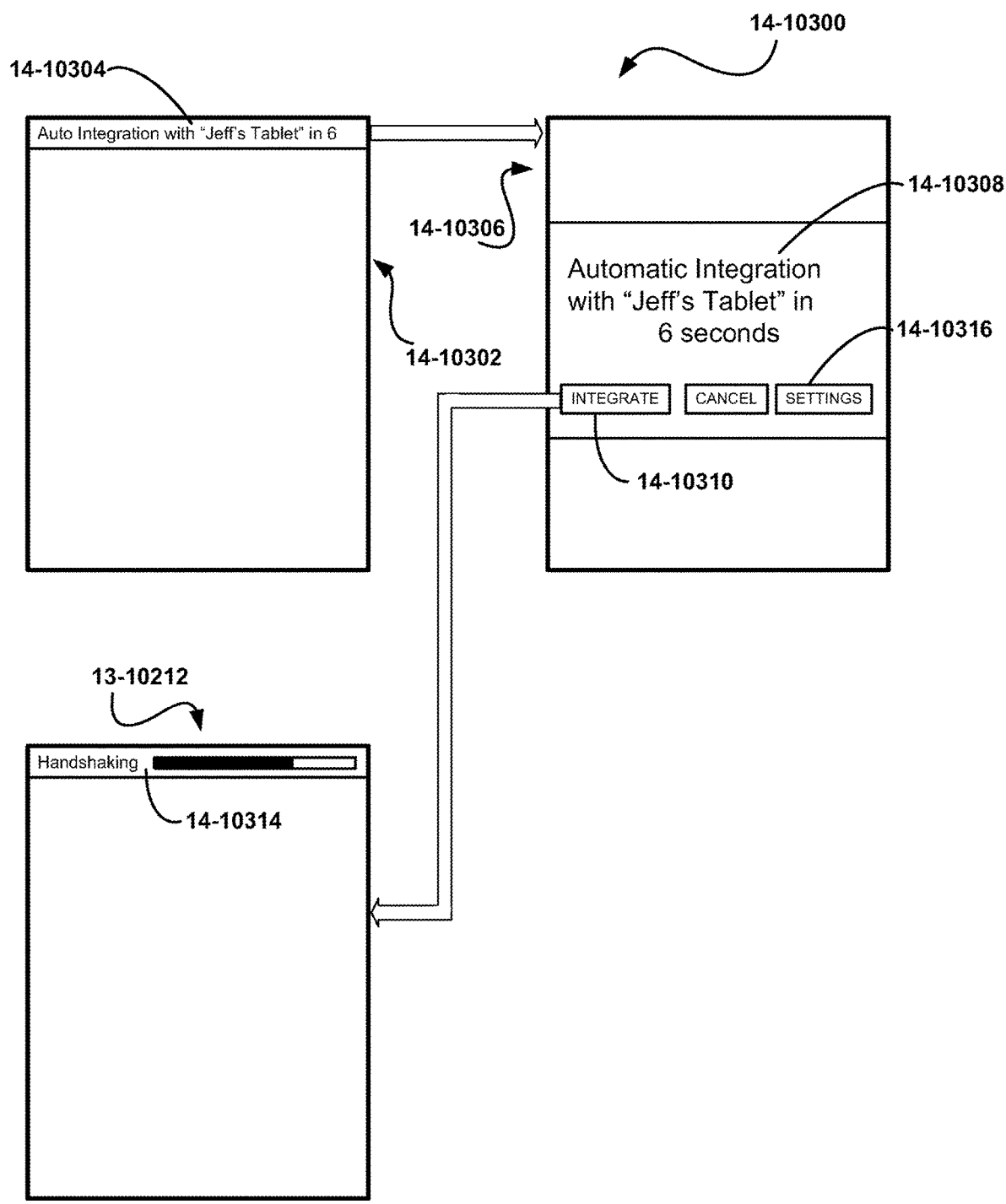
FIG. 14-103 shows a plurality of user interfaces for prompting a user regarding an automatic integration, in accordance with one embodiment.

FIG. 14-103 shows a plurality of user interfaces 14-10300 for prompting a user regarding an automatic integration, in accordance with one embodiment. As an option, the plurality of user interfaces 14-10300 may be implemented in the context of the architecture and environment of the previous Figures or any subsequent Figure(s). Of course, however, the plurality of user interfaces 14-10300 may be implemented in any desired environment. It should also be noted that the aforementioned definitions may apply during the present description.

In various embodiments, the plurality of user interfaces 14-10300 may be used to prompt a user regarding an automatic integration. In one embodiment, the plurality of user interfaces 14-10300 may include user interface 14-10302, which may be used to notify the user that an automatic integration is about to begin. As shown, the user interface 14-10302 may include text field 14-10304 which informs the user of the impending start of an automatic integration in an unobtrusive way, in accordance with one embodiment. In other embodiments, the user may be notified of the automatic integration in other ways, including, but not limited to, those methods previously discussed for notifying the user that a potential integration exists.

In various embodiments, a user may have a certain amount of time to intervene before an automatic integration is initiated. In one embodiment, this countdown may be indicated in the text field 14-10304. In another embodiment, the passage of time may be indicated with a sound. For example, a device may make a sound when there are only 5 seconds remaining before the integration is automatically initiated.

In various embodiments, if the user takes no action, the integration will proceed automatically. In one embodiment, the text field 14-10304 may be replaced with a progress bar, similar to that shown in user interface 14-10312, depicting the advancement of the integration process. If the user does interact with the notification (e.g. touch, clicking, etc.), the user may be presented with user interface 14-10306. In one embodiment, user interface 14-10306 may be used to prompt the user whether they want to intervene in the automatic integration. In another embodiment, the options and information provided by user interface 14-10306 may be given through a popup menu, activated by interacting with the notification.

In one embodiment, user interface 14-10306 may include a text field 14-10308, which identifies the other device involved in the automatic integration. In another embodiment, text field 14-10308 may also show the time remaining before the integration proceeds. In some embodiments, the time given to the user to intervene in the automatic integration starts over once user interface 14-10306 is displayed. In other embodiments, the time limit does not start over.

In one embodiment, user interface 14-10306 may include a button 14-10310, which causes the automatic integration to proceed immediately. As shown, selecting button 14-10310 may cause user interface 14-10312 to appear, in accordance to one embodiment. In a variety of embodiments, the plurality of user interfaces 14-10300 may include user interface 14-10312, which provides the user with an unobtrusive status bar 14-10314, providing updates as to the progress of the integration without overly disrupting the use of the device. In other embodiments, the progress of the integration may be conveyed using another visual indicator, such as an animated status icon, or any other method of indicating progress.

In one embodiment, user interface 14-10306 may include a button 14-10316, which allows the user to modify the parameters of the automatic integration. For example, in one embodiment, selecting button 14-10316 may present to the user the integration profile responsible for triggering the automatic integration, using a user interface such as the one depicted in FIG. 12A-101A. In some cases, there may exist multiple integration profiles for the two devices in question. In one embodiment, the user may be informed of the existence of other profiles when presented with the profile actually responsible for the automatic integration.

Figures 15, 104:
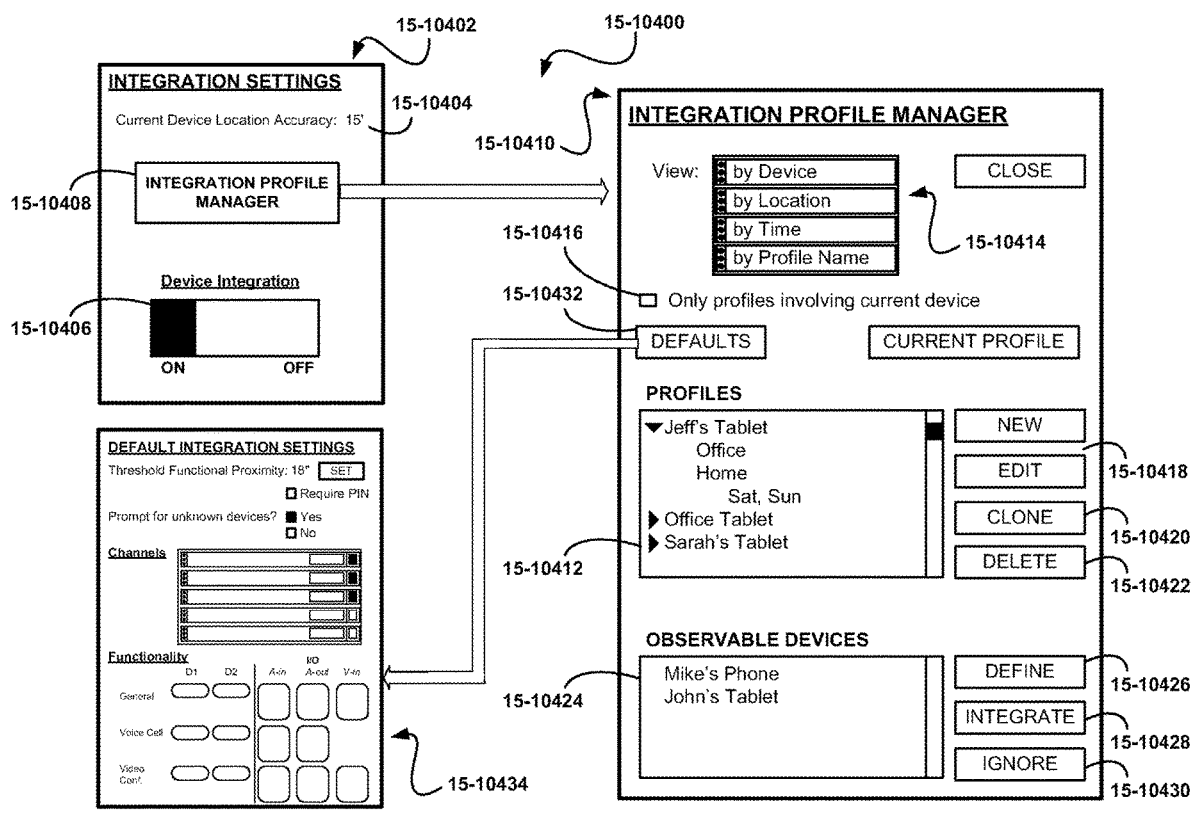
FIG. 15-104 shows a plurality of user interfaces for managing integration settings, in accordance with one embodiment.

FIG. 15-104 shows a plurality of user interfaces 15-10400 for managing integration settings, in accordance with one embodiment. As an option, the plurality of user interfaces 15-10400 may be implemented in the context of the architecture and environment of the previous Figures or any subsequent Figure(s). Of course, however, the plurality of user interfaces 15-10400 may be implemented in any desired environment. It should also be noted that the aforementioned definitions may apply during the present description.

In various embodiments, the plurality of user interfaces 15-10400 may be used to manage integration settings. In one embodiment, plurality 15-10400 may include user interface 15-10402, which may be used to activate or deactivate the ability of a device to integrate. As shown, the user interface 15-10402 may include a text field 15-10404 displaying the current device location accuracy limit. In the context of the present description, a location accuracy limit refers to the smallest discernable threshold distance. In various embodiments, the device location accuracy limit may be affected by GPS signal strength and the number of visible satellites, the number and identity of wireless networks detectable, and/or any other factor related to location determination. Reporting the accuracy limit to the user may help them best utilize the integration functionality. For example, they may be able to discern why an automatic integration is not triggering. In one embodiment, text field 15-10404 may also display what the limiting factor is regarding the location accuracy, whether it is limited GPS signal, or the lack of a secondary location system, or some other factor.

In one embodiment, user interface 15-10402 may include a switch 15-10406, which may be used to enable or disable the integration functionality of the device. In another embodiment, this user interface may also be used to specify whether or not integration requests from other devices may be acknowledged. Furthermore, in one embodiment, user interface 15-10402 may also include a button to display the integration profile for the current integration, if one exists.

In one embodiment, user interface 15-10402 may include a button 15-10408, which may be used to activate an integration profile manager. In various embodiments, selecting button 15-10408 may result in displaying user interface 15-10410, which may be used to manage one or more integration profiles. In some embodiments, integration profiles may be given user defined names. In other embodiments, the integration profiles may be identified by one or more of the key components of the profile, such as the identity of the devices, a location name, a time span, and/or any other part of the profile. In still other embodiments, integration profiles may be identified by both a given name, as well as items specific to the profile.

In various embodiments, user interface 15-10410 may include a list 15-10412 of integration profiles. As shown, in some embodiments, items in this list may be organized in a hierarchical fashion. In one embodiment, user interface 15-10410 may include a collection of drop down menus 15-10414, which allow the user to organize items of list 15-10412 by one or more criteria. For example, in one embodiment, a user may specify a first, second, and third type of ordering for the list. Types of ordering may include, but are not limited to, by device identity, by location, by time, by profile name, and/or any other basis for grouping profiles. In some embodiments, if one or more of these criteria are not used, that information may be included for each item on the list.

As shown, in one embodiment, user interface 15-10410 may include a check box 15-10416 which allows the user to limit the items of list 15-10412 to just the profiles which involve the device on which the interface is presently displayed. In some embodiments, a user's device may have access to integration profiles associated with that user which do not involve the present device. For example, in one embodiment, the profiles may be accessible from an external server. In another embodiment, the user's collection of profiles may be synchronized among devices every time an integration is performed.

In one embodiment, user interface 15-10410 may include buttons 15-10418, which may be used to create a new integration profile, or edit a profile which has been selected from list 15-10412. Upon selecting one of these buttons, the user may be presented with an interface for defining or modifying an integration profile, such as those depicted in FIG. 12-101, in accordance with one embodiment.

In one embodiment, user interface 15-10410 may include button 15-10420, which may be used to clone an integration profile selected from list 15-10412. Furthermore, in one embodiment, user interface 15-10410 may include button 15-10422, which may be used to delete a selected integration profile.

In one embodiment, user interface 15-10410 may include a list 15-10424 of observable devices. In some embodiments, the list of observable devices may include only devices with which integration is possible. In other embodiments, this list may include all detectible devices, independent of whether they are available for integration.

In various embodiments, the items in the list of observable devices 15-10424 may be stylized to convey additional information. For example, in one embodiment, the text style (e.g. bold, etc.) of a list item may indicate whether or not an integration profile already exists for that device. As an option, the number of known integration profiles for that device may be indicated in the text description. In another embodiment, the text style (e.g. underlined, etc.) of a list item may indicate whether or not an integration has ever been formed between the observable device and the current device. In still another embodiment, the text style (e.g. italic, etc.) of a list item may indicate whether or not an observable device is available for integration.

In one embodiment, user interface 15-10410 may include a button 15-10426 to allow the user to define an integration profile for an observable device selected in list 15-10424. As an option, if one or more integration profiles already exist for the selected device, the user may be presented with an interface listing the pre-existing integration profiles, and allowing the user to use one of these profiles as the basis for a new profile.

In one embodiment, user interface 15-10410 may include a button 15-10428 to allow the user to initiate an integration with a device selected from the list of observable devices. If an applicable integration profile already exists, it will be used, otherwise the default integration profile will be used. In some embodiments, if the selected device is not available for integration, button 15-10428 may be disabled.

In one embodiment, user interface 15-10410 may include a button 15-10430 to allow the user to create or modify an ignore policy for a device selected from the list of observable devices. If selected, the user may be presented with user interface 13-10220, as depicted in FIG. 13-102.

In one embodiment, user interface 15-10410 may include a button 15-10432 to allow the user to define or modify a default integration profile. If selected, the user may be presented with user interface 15-10434, which may be used to define a default integration profile. As shown, user interface 15-10434 possesses a number of features found within the user interfaces of FIG. 12-101, in accordance with one embodiment. Being a default profile, none of the contextual settings found in other integration profiles are needed. The remaining settings, such as communication channels, functionality, migration settings, and disintegration settings, may be defined in terms of priorities. For example, in one embodiment, the user may be given a list of potential values for each setting, which they may arrange according to their preferences. When the default profile is applied, each ordered group of settings is traversed in order of priority until an integration is successfully created.

Figures 16, 105:
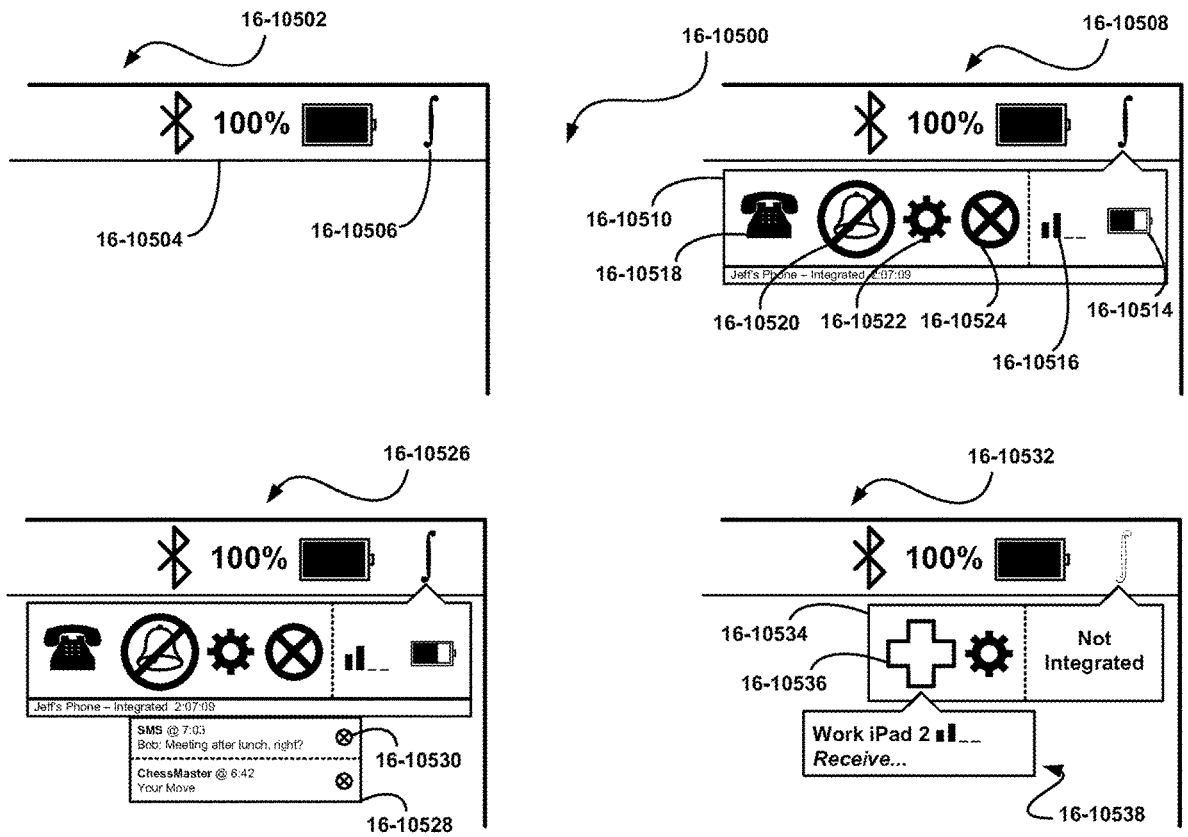
FIG. 16-105 shows a plurality of user interfaces for managing an integrated device, in accordance with one embodiment.

FIG. 16-105 shows a plurality of user interfaces 16-10500 for managing an integrated device, in accordance with one embodiment. As an option, the plurality of user interfaces 16-10500 may be implemented in the context of the architecture and environment of the previous Figures or any subsequent Figure(s). Of course, however, the plurality of user interfaces 16-10500 may be implemented in any desired environment. It should also be noted that the aforementioned definitions may apply during the present description.

In various embodiments, the plurality of user interfaces 16-10500 may be used to manage, utilize, and monitor an ongoing integration from the display of one of the integrated devices. In one embodiment, plurality 16-10500 may include user interface 16-10502, which may be used to report the health of an integration at a glance. As shown, the user interface 16-10502 includes status bar 16-10504, which may be used to report the status of various aspects of the device (e.g. power, wireless signal, time, GPS status, etc.), and which remains visible in many use scenarios.

In various embodiments, status bar 16-10504 may contain an icon 16-10506 which is representative of the device's integration functionality. The appearance of the integration status icon may communication a variety of information. For example, in one embodiment, the appearance of the integration status icon may indicate whether or not there is an active integration. As a specific example, in one embodiment, if the integration status icon is only an outline, then there is no active integration. However, if the icon is solid, then there is an integration currently active.

In various embodiments, the color of the integration status icon 16-10506 may represent the health of the presently active integration. In the context of the present description, the health of a integration refers to ease with which data may be sent between the two integrated devices. A determination of the health of a integration may be based upon wireless signal strength, bandwidth, network latency, and/or any other factor which may affect interdevice communications.

In some embodiments, this health may be reflected in the color of the integration status icon. For example, in one embodiment, a green integration status icon may indicate that the communication channel being used for the integration is operating in an ideal manner, while the color yellow may indicate that conditions are not ideal, but the integration is still stable. The color red may indicate that the health of the integration has degraded to the point that the user experience may be disrupted. Of course, in other embodiments, these colors may represent different levels of integration health, and different colors may be used.

In various embodiments, the integration status icon 16-10506 may be used to indicate that the integration is disintegrating. For example, in one embodiment, a partial disintegration may be indicated by muting (i.e. reducing the saturation, etc.) the coloring of the status icon. In some embodiments, the details of a partial disintegration may be conveyed to the user through the integration status icon. For example, in one embodiment, the countdown to the fatal separation time may be indicated next to the integration status icon. In another embodiment, the interior, colored shading of the integration status icon may drain/fill up depending upon the current functional separation distance. In other words, if the icon is completely filled, the devices are about to reintegrate, and if the icon is completely empty, the fatal functional separation distance has been reached, and a full disintegration is about to begin.

In some embodiments, the integration status icon 16-10506 may remain visible within status bar 16-10504 at all times. In other embodiments, the integration status icon may periodically change into a different icon, to communicate various details regarding the integration to the user. For example, in one embodiment, if the signal strength of a communication channel unique to the other integrated device (e.g. cellular signal strength of an integrated phone, etc.) should fall below a certain level, the integration status icon may alternate between the usual symbol, and a symbol representing low signal strength. A similar method may be used to indicate that the other integrated device has low battery power.

In various embodiments, interacting with the integration status icon 16-10506 may result in another interface being presented to the user. For example, in one embodiment, interaction with the integration status icon while there is an active integration may result in the display of user interface 16-10508, which contains an integration status panel 16-10510. As an option, this panel may appear to slide down from behind the status bar 16-10504.

In various embodiments, an integration status panel may be used for controlling, modifying, initiating, and/or ending an integration. The contents of the panel may change, depending upon whether there is an active integration, and the nature of the other integrated device. For example, in one embodiment, integration status panel 16-10510 may be used for controlling, modifying, and/or ending an ongoing integration.

As shown, integration status panel 16-10510 may contain a text field 16-10512, which provides information about the ongoing integration, in accordance with one embodiment. The information provided may include, but is not limited to, the identity of the other integrated device (e.g. given device name, device manufacturer and/or model, etc.), the name of the integration profile which was applied, the amount of time since the integration was created, and/or any other information regarding the integration.

In various embodiments, an integration status panel may provide information regarding the status of the other integrated device. For example, as shown, integration status panel 16-10510 may indicate the other device's remaining battery charge (or whether it is connected to an external power source) through power status icon 16-10514. As an option, the time remaining until the battery is fully charged may also be indicated. Furthermore, in some embodiments, integration status panel 16-10510 may indicate the status of various other aspects of the other integrated device. For example, in one embodiment, the signal strength and network type of the other integrated device's cellular modem may be indicated using a cellular status icon 16-10516. In another embodiment, the integration status panel 16-10510 may indicate the amount of storage space that is available on the other integrated device.

In various embodiments, an integration status panel may allow the user to utilize functionality that is provided by the integration. For example, in one embodiment, integration status panel 16-10510 may contain a phone icon 16-10518, which may be used to open an interface for placing a phone call using an integrated phone. Examples of other functionality provided by or enhanced through integration which might be accessible through the integration status panel include, but are not limited to, video conferencing, video recording, enhanced input devices (e.g. using a phone as a custom input device, etc.), and/or any other functionality.

In various embodiments, an integration status panel may allow the user to perform functions otherwise delegated to a hardware interface on the other integrated device. For example, as shown, integration status panel 16-10510 may contain an icon 16-10520 which allows the user to "silence" incoming calls, similar to operating a physical "silence" switch on the integrated phone. As an option, the user may specify what this silent mode entails, whether all audible phone alerts are silenced, or whether all phone events are indicated through the integration status icon 16-10506, without immediately employing one of the previously described phone event handling methods. In other embodiments, integration status panel 16-10510 may contain similar iconic representations of other hardware functions of the other integrated device, such as putting the device into a sleep mode, activating a voice recognition mode, and/or any other functionality which may be accessed though a physical interaction with the other integrated device.

As shown, in one embodiment, integration status panel 16-10510 may include a button 16-10522 to give the user access to integration settings. For example, in one embodiment, interacting with button 16-10522 may result in presenting the user with user interface 15-10402 of FIG. 15-104.

As shown, in one embodiment, integration status panel 16-10510 may include a button 16-10524 to allow the user to manually initiate a full disintegration. In some embodiments, the user may be prompted for confirmation before the disintegration begins, to prevent an accidental termination of the integration.

In various embodiments, the integration status icon 16-10506 may be used to indicate the occurrence of a phone event. As previously discussed, in one embodiment, the user may have the option to be notified of a phone event before a phone event handling method is implemented. For example, in one embodiment, the occurrence of a phone event may cause the integration status icon to briefly change colors, pulse (i.e. change brightness in a cyclical manner, etc.), or any other kind of iconic animation. As an option, this indication may continue until the user manually dismisses the event or initiates a phone event handling method, as previously discussed. Of course, in the case where the phone is the prime display, similar interfaces and methods may be used to handle tablet events.

In various embodiments, interaction with the integration status icon in response to a phone event may result in the display of user interface 16-10526, which contains a phone event notification panel 16-10528. As an option, the phone event notification panel may appear to slide down from behind the integration status panel.

In some embodiments, a user may be notified of phone events through the same system used to notify regarding events which are local to the device serving as the prime display. In other embodiments, a user may be notified of phone events through a separate interface, such as the phone event notification panel 16-10528. In some embodiments, the phone event notification panel may be displayed momentarily to the user, without requiring user input, in response to receiving a phone event summary from the integrated phone. In other embodiments, the phone event notification panel may only be shown in response to a user interaction, such as with the integration status icon 16-10506.

In various embodiments, a phone event notification panel may be used to communicate the details regarding one or more phone events. The details which are reported for each phone event may include, but are not limited to, an event type (e.g. "SMS Message", "Missed Call", etc.), the name of the event-generating application (e.g. "ChessMaster", etc.), the time and/or date of the event, amount of time elapsed since the event, an event summary (e.g. the first dozen words of a text message, an application status message, etc.), an icon representation of the event source (e.g. application icon, contact photo, etc.), a color indication of urgency, and/or any other information which could be conveyed as part of a phone event summary. In some embodiments, interacting with (e.g. touching, clicking on, etc.) a notification in the phone event notification panel may result in the initiation of an appropriate phone event handling method, as previously discussed.

In some embodiments, once a phone event notification panel has been displayed, it may be assumed that the user has been notified, and the notifications are removed automatically. In other embodiments, the notifications remain in the phone event notification panel until the user takes some action, whether it be initiating a phone event handling method, or dismissing the notification. In some embodiments, each notification may have a button 16-10530 to clear the notification from the panel.

In various embodiments, interaction with the integration status icon while there is no active integration may result in the display of user interface 16-10532, which contains an integration status panel 16-10534. As an option, this panel may appear to slide down from behind the status bar 16-10506.

An integration status panel will provide different options to the user, depending upon whether or not an integration is currently active. For example, in various embodiments, if there is no active integration, integration status panel 16-10534 may contain a button 16-10536 for manually initiating an integration. In some embodiments, interacting with button 16-10536 may present the user with an observable device panel 16-10538, which lists all devices which are detectable, and which are available for integration. This list may be formatted in a manner similar to observable device list 15-10424 in FIG. 15-104. Furthermore, in one embodiment, observable device list 16-10538 may contain an item labeled "Receive . . . ", which may place the user's device in a state where it is receptive to integration attempts from other devices. This may make it easier for a user to integrate two devices for the first time.

Figures 17A, 106A:
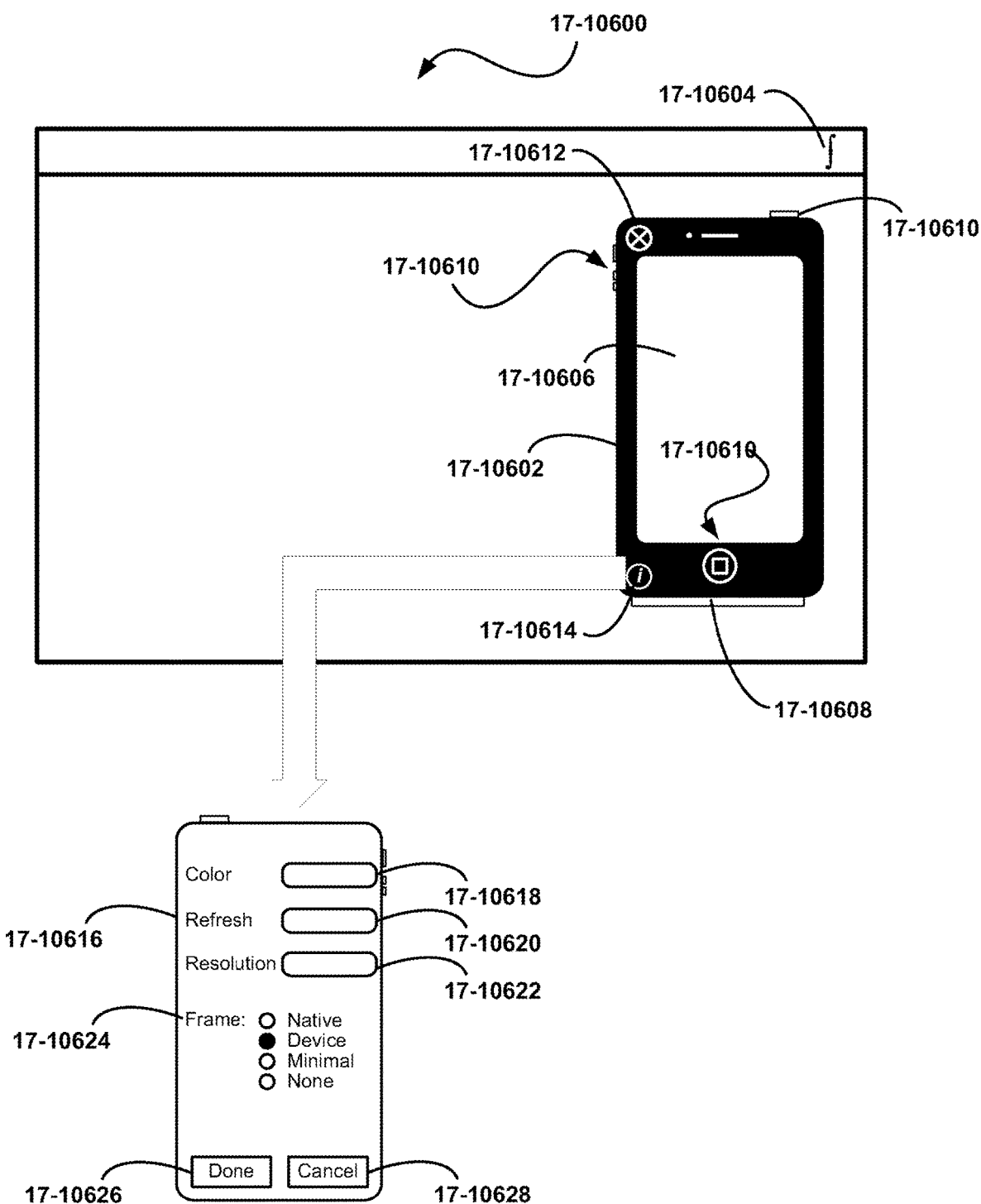
FIG. 17A-106A shows a plurality of user interfaces for implementing a virtual phone interface, in accordance with one embodiment.

FIG. 17A-106A shows a plurality of user interfaces 17-10600 for implementing a virtual phone interface, in accordance with one embodiment. As an option, the plurality of user interfaces 17-10600 may be implemented in the context of the architecture and environment of the previous Figures or any subsequent Figure(s). Of course, however, the plurality of user interfaces 17-10600 may be implemented in any desired environment. It should also be noted that the aforementioned definitions may apply during the present description.

In various embodiments, integration functionality may be utilized, and phone events may be handled, using a virtual phone interface, such as those depicted within the plurality of user interfaces 17-10600. Utilizing the resources of one device through the interface of another may be a confusing concept for some users, and steps may be taken to make the operation of integrated devices more intuitive. For example, in one embodiment, virtual phone interface 17-10602 may have the physical appearance of the integrated device it is being used to control.

A virtual phone interface may be displayed to a user under a number of circumstances. For example, in one embodiment, the user may specify that such an interface be displayed immediately in response to the receipt of a phone event summary. A user could define such a preference through user interface 12-10140 of FIG. 12B-101B. In another embodiment, the user could request that they be notified of a phone event before being presented with a virtual phone interface. In some embodiments, a user may be notified concerning a phone event through a change in the appearance of the integration status icon 17-10604, and receive further information through a phone event notification panel, such as the one depicted in FIG. 16-105. In one embodiment, virtual phone interface 17-10602 may be displayed in response to the user interacting with an element within a phone event notification panel.

A phone event is not required to display a virtual phone interface. The user may wish to utilize functionality unique to the integrated device, using interface 17-10602. In various embodiments, the user may cause a virtual phone interface to appear through an interaction with the integration status icon 17-10604. For example, in one embodiment, the virtual phone interface may be activated by touching/clicking on the integration status icon, and holding down for a predetermined amount of time. In another embodiment, the virtual phone interface maybe activated by double tapping/clicking on the integration status icon. In still other embodiments, the virtual phone interface may be activated through a predefined touch gesture, or a predefined cursor gesture. As an option, the virtual phone interface 17-10602 may appear to slide out of the side of the prime display. Furthermore, in another embodiment, the user may be able to specify which side of the screen the virtual phone interface is located on.

In various embodiments, the rest of the prime display may be obscured to some degree. This may be done to further convey to the user that they are controlling a different device through this new interface. For example, in one embodiment, the presence of user interface 17-10602 may cause the remainder of the prime display to become slightly blurred. Other methods of obscuring the rest of the prime display may include, but are not limited to, desaturation of colors, a slight fading of brightness, a combination of these, and/or any other visual method of obscuring an image. As an option, a universal status bar (where the integration status icon 17-10604 is located) may remain unchanged.

As shown, in one embodiment, virtual phone interface 17-10602 may include a virtual phone display 17-10606, which displays a video signal being created by the integrated phone. As previously mentioned, the display of the phone itself may be inactive, or filling a different role: the virtual phone display serves as a virtual display device, showing the user what they would see were they operating the phone in a disintegrated state.

In one embodiment, virtual phone display 17-10606 may have a one-to-one pixel ratio with the actual display of the integrated phone. In another embodiment, there may be some form of scaling performed on the image displayed on the virtual phone display. In some embodiments, this scaling is performed on the phone, before transmission to the prime display. This could be useful in a situation where the integration is being maintained using a communication channel with limited bandwidth. In other embodiments, the scaling may be performed on the tablet, after transmission but before being displayed, taking advantage of potentially greater processing power possessed by the tablet.

Typically, phone applications are designed to be operated using a touchscreen interface. In some embodiments, assuming the prime display is touch sensitive, a user may interact with a virtual phone interface using touch, just as they would had they been using the phone directly. In one embodiment, the ability to interact with the virtual phone interface using touch may override a setting which renders the prime display unresponsive to touch input in other circumstances. As an option, only the virtual phone interface itself may become touch sensitive in such a situation.

In other embodiments, a user may interact with a virtual phone interface using a method other than touch. Input methods may include, but are not limited to, mouse, keyboard, trackball, trackpad, any combination of these, and/or any other input method. In one embodiment, a click with a cursor may be interpreted as a tap, and a click and drag with a cursor may be interpreted as a drag with a single finger. In another embodiment, there may be a set of predefined key combinations which may be used, in conjunction with a cursor, to perform common multitouch gestures. In this way, a user may interact with functionality localized on the integrated phone using a virtual phone interface without having to alter their method of input.

As shown, in one embodiment, virtual phone interface 17-10602 may include a text field 17-10608 identifying the integrated phone device. In another embodiment, text field 17-10608 may be used to identify the integration profile being used. As an option, the age of the integration may be displayed.

As shown, in one embodiment, virtual phone interface 17-10602 may include a plurality of buttons 17-10610 which represent hardware buttons, switches, and other interfaces found on the actual integrated phone. Buttons 17-10602 may be used to perform the same functions that their physical counterparts would perform on the integrated device. Such functions may include, but are not limited to, returning to a home screen, changing the system and/or ringtone volume on the phone, putting the phone into a sleep mode, and/or any other function which may be triggered by a hardware interface located on the integrated phone. In this way, a more intuitive user experience may be provided. Of course, in some embodiments, all of this functionality may be provided elsewhere, such as in the form of icons in an integration status panel, as previously discussed.

In one embodiment, virtual phone interface 17-10602 may include a button 17-10612 for closing the virtual phone interface. In some embodiments, activating button 17-10612 may cause the transmission of a video signal from the phone to cease immediately. In other embodiments, activating button 07512 may cause the virtual phone interface to disappear, while the video signal continues to be transmitted from the integrated phone for a predetermined amount of time. In this way, a user may close the interface, and immediately open it back up without having to wait for the virtual phone display to connect to a new video signal from the phone. In one embodiment, the virtual phone interface may also be closed by double tapping/clicking outside of the interface.

The performance of the virtual phone display may be improved by reducing the amount of information being transmitted from the phone. In some embodiments, various aspects of the video signal sent by the integrated phone may be altered automatically to provide the best possible user experience (e.g. virtual display more responsive to input, less lag in displaying rapidly changing screen elements, etc.) In other embodiments, the user may be able to modify various aspects of the video signal being sent by the integrated phone. For example, in one embodiment, virtual phone interface 17-10602 may include a button 17-10614, which causes user interface 17-10616 to be displayed. As an option, user interface 17-10616 may be presented by causing the virtual phone interface 17-10602 appear to flip over, exposing the back side of the virtual phone.

As shown, user interface 17-10616 may be used to modify various aspects of the virtual phone interface, in accordance with one embodiment. For example, in one embodiment, user interface 17-10616 may include a drop down menu 17-10618 which allows the user to specify the color quality of the video signal. By reducing the number of colors used, less bandwidth may be used in transmitting the signal, potentially making the virtual phone display more responsive to rapidly changing screen elements. In one embodiment, the user may select from a variety of color bit-depths (e.g. 24-bit, 16-bit, etc.). In another embodiment, the user may be presented with a simplified set of color spaces (e.g. "best color", "reduced color", "greyscale", etc.).

In one embodiment, user interface 17-10616 may include a drop down menu 17-10620 which allows the user to modify the refresh rate, or the frequency with which the virtual phone display is updated. Depending upon the nature of the user's activity within the virtual phone interface, the combination of a modified color quality with a modified refresh rate may provide an improved user experience. For example, in a situation where the user is working with an application whose interface does not change very often, or very rapidly, high color quality combined with a low refresh rate may provide a superior image with little noticeable lag. On the other hand, in a case where the interface is rapidly changing, a low color quality combined with a high refresh rate may provide superior responsiveness with a slight degradation in image quality. In one embodiment, the user may simply be given the choice between a high or low refresh rate. In another embodiment, drop down menu 17-10620 may provide explicit refresh rates for the user to choose from. In some embodiments, the settings in drop down menus 17-10618 and 17-10620 may be linked, such that selecting a low color quality increases the refresh rate, and so forth. In other embodiments, these settings may remain independent.

In one embodiment, user interface 17-10616 may include a drop down menu 17-10622 which allows the user to modify the resolution of the video feed being transmitted by the integrated phone. A reduced resolution may provide a more responsive user experience. Additionally, if there are many other processes running on the integrated phone, such as applications which were not migrated during integration, transmitting a lower resolution video feed may free up needed processor resources. In some embodiments, the user may be given the choice of multiple resolutions. In other embodiments, the user's choices may be limited to a native resolution (e.g. full resolution of the phone, etc.), or a reduced resolution whose scaling is less processor intensive than others (e.g. both dimensions halved, etc.).

In one embodiment, user interface 17-10616 may include a drop down menu 17-10624 which allows the user to select a frame for the virtual phone interface. For example, in one embodiment, the user may select a "device" frame, such as the frame shown on virtual phone interface 17-10602. Other possible frames include, but are not limited to, "native" (e.g. a frame which blends in with the rest of the tablet's native UI, etc.), "minimal" (e.g. a simple border, etc.), "none" (e.g. no visual barrier between the virtual phone display and the rest of the tablet interface, etc.), and/or any other type of frame which may be put around a virtual phone display.

In one embodiment, user interface 17-10616 may include a button 17-10626 which allows the user to save the modified settings and return to the virtual phone interface. Furthermore, in one embodiment, user interface 17-10616 may include a button 17-10628 which allows the user to return to the virtual phone interface without modifying the settings.

Figures 17B, 106B:
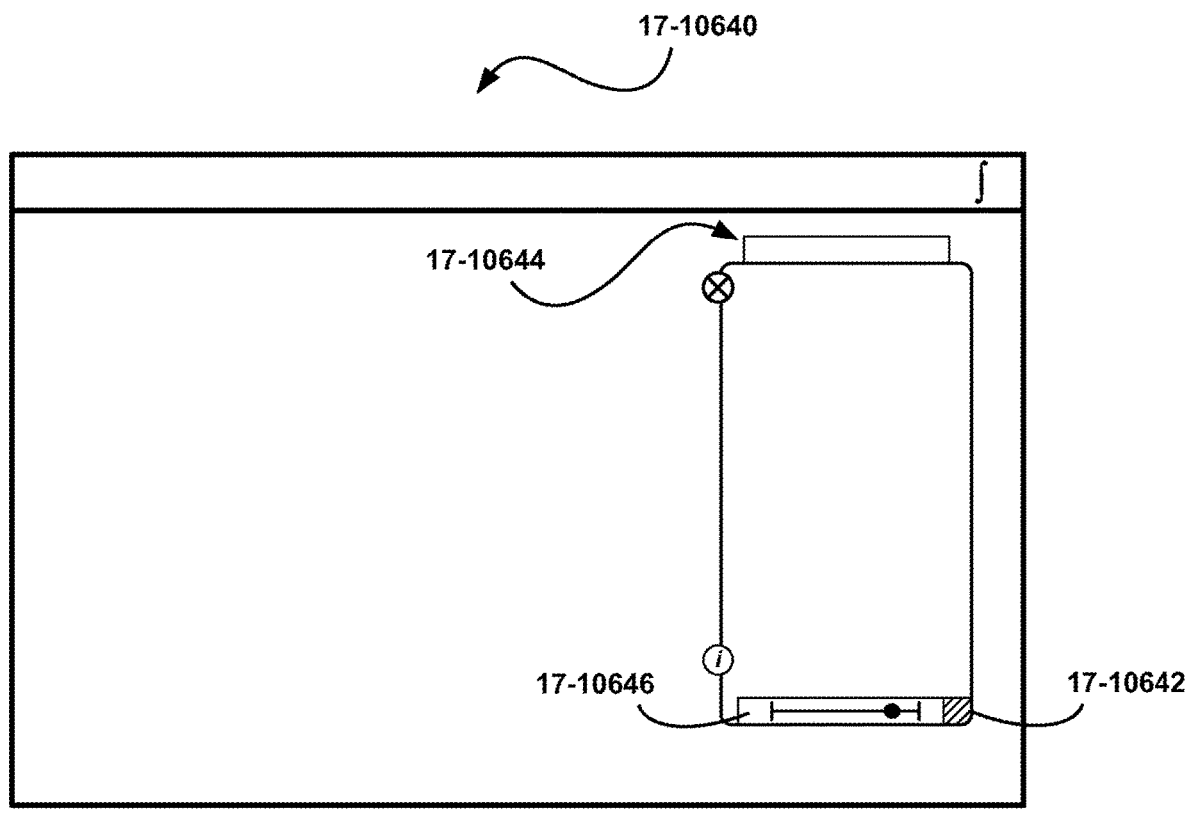
FIG. 17B-106B shows a user interface for implementing a virtual phone interface, in accordance with another embodiment.

FIG. 17B-106B shows a user interface 17-10640 for implementing a virtual phone interface, in accordance with another embodiment. As an option, user interface 17-10640 may be implemented in the context of the architecture and environment of the previous Figures or any subsequent Figure(s). Of course, however, user interface 17-10640 may be implemented in any desired environment. It should also be noted that the aforementioned definitions may apply during the present description.

In some embodiments, the virtual phone interface may be pinned to one of the sides of the display. Additionally, the virtual phone interface may be at a fixed resolution. These constraints may interfere with the operation of the tablet while the virtual phone interface is active. However, in some embodiments, the user may have the ability to move and/or resize a virtual phone interface, such as virtual phone interface 17-10640.

In one embodiment, virtual phone interface 17-10640 may include a dynamic resizing element 17-10642. In the context of the present description, a dynamic resizing element is a user interface element which allows a user to resize a window or panel. In one embodiment, this resizing may be performed by dragging the dynamic resizing element until the virtual phone interface is the desired size. As an option, the virtual phone interface may maintain the aspect ratio of the virtual phone display.

In one embodiment, virtual phone interface 17-10640 may include a movable integration description 17-10644, which allows a user to drag the virtual phone interface to a desired location within the prime display. Furthermore, in one embodiment, virtual phone interface 17-10640 may include a transparency slider 17-10646, which allows the user to modify the transparency of the virtual phone interface. In this way, the user may modify the virtual phone interface so that it interferes less with the operation of the integrated tablet. As an option, the transparency slider 17-10646 may be hidden until the user hovers a cursor, or presses and holds a finger, over the area of the slider. Additionally, the other user interface elements of the virtual phone interface (e.g. close button, settings button, etc.) may fade out unless there is some sort of interaction nearby.

Figures 17C, 106C:
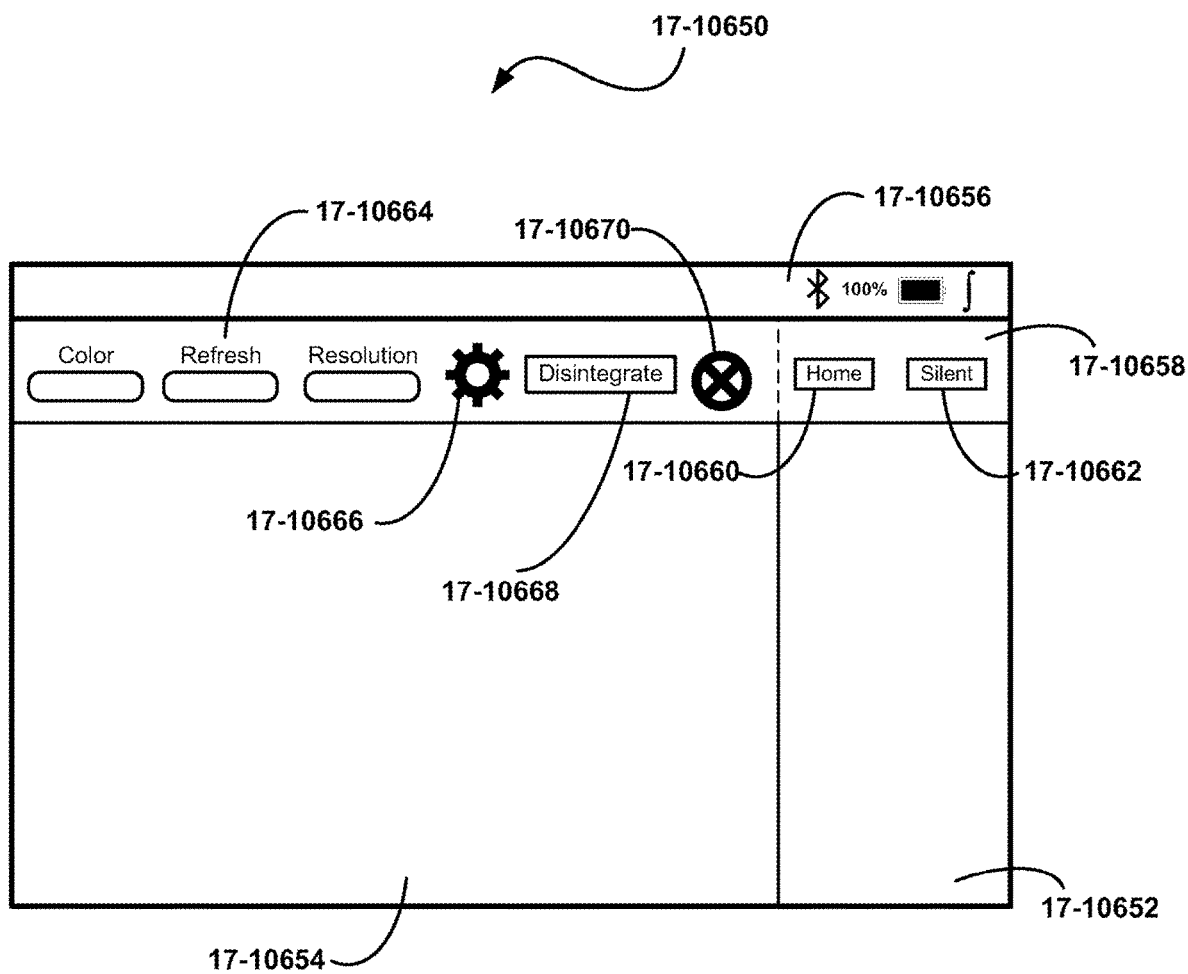
FIG. 17C-106C shows a user interface for implementing a virtual phone interface, in accordance with another embodiment.

FIG. 17C-106C shows a user interface 17-10650 for implementing a virtual phone interface, in accordance with another embodiment. As an option, user interface 17-10650 may be implemented in the context of the architecture and environment of the previous Figures or any subsequent Figure(s). Of course, however, user interface 17-10650 may be implemented in any desired environment. It should also be noted that the aforementioned definitions may apply during the present description.

As shown, user interface 17-10650 may include a virtual phone interface 17-10652 as well as a scaled-down tablet interface 17-10654, in accordance with one embodiment. In some embodiments, the dimensions of the virtual phone interface and tablet interface may be modified to reduce visual artifacts introduced by scaling. In some embodiments, one or both interfaces may be scaled down using pixel based methods. In other embodiments, the tablet interface 17-10654 and/or the virtual phone interface 17-10652 may utilize resolution independent methods of rendering text and other UI elements, to maintain usability even when scaled down.

Unlike other embodiments, user interface 17-10650 does not overlap the virtual phone interface and the tablet interface, but rather presents them both in their entirety, albeit one or both interfaces are scaled down. In this way, the user may utilize the functionality unique to the phone through the virtual phone interface without interrupting their activities on the tablet.

In one embodiment, user interface 17-10650 may include a status bar 17-10656, which may include the usual status icons. Further more, in one embodiment, user interface 17-10650 may include a virtual phone interface toolbar 17-10658, which may be used to modify the virtual phone interface, as well as the integration itself.

In various embodiments, the virtual phone interface toolbar 17-10658 may allow the user to utilize various aspects of the integrated phone. For example, in one embodiment, virtual phone interface toolbar 17-10658 may include a button 17-10660, which represents the hardware "home" button on the integrated phone, as well as a button 17-10662, which represents the "silent" switch on the integrated phone. In other embodiments, other hardware buttons found on the integrated phone may be represented in the toolbar in iconic form. In still other embodiments, additional functionality unique to the phone (e.g. cellular phone interface, etc.) may also be represented on the toolbar in iconic form.

In various embodiments, the virtual phone interface toolbar 17-10658 may allow the user to modify one or more parameters associated with the virtual phone interface. For example, in one embodiment, toolbar 17-10658 may include a collection of drop down menus 17-10664 which may allow the user to modify the color quality, refresh rate, and/or resolution of the video feed being sent from the phone to the virtual phone interface, as previously discussed in FIG. 17A-106A.

In various embodiments, the virtual phone interface toolbar 17-10658 may allow the user to modify one or more aspects of the ongoing integration. For example, in one embodiment, toolbar 17-10658 may include a button 17-10666 which may allow the user to modify the integration profile currently in use. In another embodiment, toolbar 17-10658 may include a button 17-10668 which may initiate a manual disintegration.

Finally, as shown, in one embodiment, the user interface 17-10650 may include a button 17-10670, which allows the user to dismiss the virtual phone interface. In some embodiments, the dismissal of the virtual phone interface may cause the tablet interface 17-10654 to expand, pushing the toolbar 17-10658 and virtual phone interface 17-10652 off of the display.

Figures 18, 107:
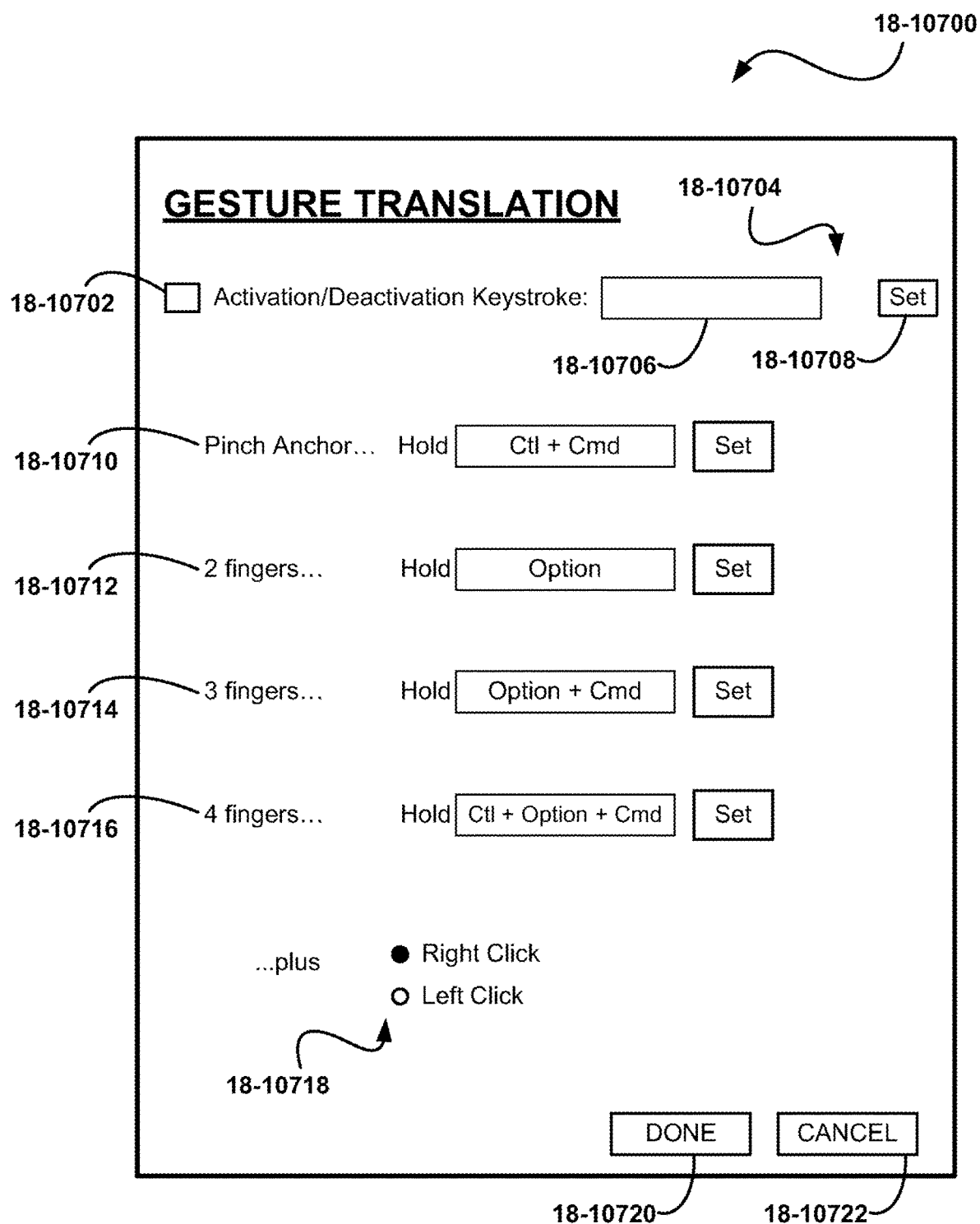
FIG. 18-107 shows a user interface for facilitating the operation of touch-sensitive applications without the use of a touchscreen, in accordance with one embodiment.

FIG. 18-107 shows a user interface 18-10700 for facilitating the operation of touch sensitive applications without the use of touchscreen, in accordance with one embodiment. As an option, user interface 18-10700 may be implemented in the context of the architecture and environment of the previous Figures or any subsequent Figure(s). Of course, however, user interface 18-10700 may be implemented in any desired environment. It should also be noted that the aforementioned definitions may apply during the present description.

In various embodiments, a user may desire to utilize a form of input that is not based upon touch when operating a pair of integrated devices. If both displays are being used, it is likely that neither device is being held by the user, but rather both are resting on a mount or some other stable surface. In such a case, the user may wish to use a keyboard and some sort of cursor based device (e.g. mouse, trackball, trackpad, etc.).

In many embodiments, basic touch interactions may be performed with a cursor-based form of input without difficulty. For example, a finger tap may be performed with the click of a mouse button; dragging actions are similarly equivalent. However, since software designed to be used with a touchscreen may sometimes employ touch gestures, or multitouch gestures, representative actions which use a keyboard and/or a cursor based device may be needed.

In various embodiments, user interface 18-10700 may be used to facilitate the operation of touch sensitive applications using a keyboard and a cursor-based form of input. Further discussion will be done with respect to a mouse, but the same or similar methods and interfaces may be employed when working with other cursor-based inputs, such as a trackball.

In various embodiments, multitouch gestures may be simulated using mouse-based gestures combined with keyboard shortcuts. In some embodiments, these keyboard shortcuts may always be available for use. In this way, the barrier to the performance of these gesture replacements is reduced.

In other embodiments, user interface 18-10700 may include check box 18-10702, which allows a user to indicate that they wish to condition the availability of the gesture replacements upon the performance of an activation/deactivation keyboard shortcut. For example, in one embodiment, if the user has selected check box 18-10702, a shortcut capture element 18-10704 may become available.

In the context of the present description, a shortcut capture element refers to a user interface element which allows a user to define a keyboard shortcut associated with a command or function. In various embodiments, this element may include a text field which describes the one or more keys which must be pressed to employ the shortcut, and a button to allow the user to specify the keys. For example, as shown, activation shortcut element 18-10706 may include a text field 18-10704 and a button 18-10708. As an option, when the user activates the button in a shortcut capture element, they may be prompted to perform the desired key press or key combination. The text field is then updated with the user's input. In some embodiments, shortcuts may be required to involve one or more modifier keys (e.g. shift, control, option, alt, command, etc.). In other embodiments, the user may define a shortcut using any key or combination of keys. As an option, a user may be warned if they have defined a shortcut that conflicts with a known system shortcut.

In some embodiments, activating the gesture replacement shortcuts using the activation shortcut may result in their being available for a limited amount of time. As an option, a status icon representing the gesture replacements may appear in a status bar while the gesture replacement shortcuts are available. In other embodiments, the gesture replacement shortcuts may remain available for use until the activation shortcut is performed again. As an option, a status icon representing the gesture replacements may appear in a status bar while the gesture replacement shortcuts are available.

As shown, user interface 18-10700 may include a shortcut capture element 18-10710, which allows the user to define a shortcut to assist in the performance of a two-finger pinch or two-finger spread gesture, in accordance with one embodiment. The shortcut is used to set an anchor point, or in other words, to define where the first of the two fingers would be. As a specific example, the user may hold the shortcut keys (e.g. control+command, etc.) down, move the cursor to where the second finger would be, then click and drag in a direction, replicating a pinch or spread motion with respect to the two points.

As shown, user interface 18-10700 may include a shortcut capture element 18-10712, which allows the user to define a shortcut to assist in the performance of a two-finger tap or swipe, in accordance with one embodiment. The shortcut is used to represent the presence of a second finger (the cursor representing the first). As a specific example, the user may hold the shortcut key (e.g. option, etc.) down, and perform the desired gesture with the cursor. In other words, a two-finger tap may be performed by holding down option and clicking the mouse, while a two-finger swipe may be performed by holding down option, then clicking and dragging in the desired direction.

As shown, user interface 18-10700 may include shortcut capture elements 18-10714 and 18-10716, which allow the user to define shortcuts to assist in the performance of three- and four-finger tabs and swipes, in accordance with one embodiment. Similar to the two-finger shortcut, these shortcuts are used to represent the presence of additional fingers. In many embodiments, the gesture replacements for three- and four-finger taps and swipes are identical to those representing two-finger taps and swipes, apart from the different shortcuts.

As shown, user interface 18-10700 may include a collection of radio buttons 18-10718, which allow the user to specify which mouse button must be pressed to perform the gesture replacements, in accordance with one embodiment. For example, in one embodiment, collection 18-10718 may include buttons for the right mouse button and left mouse button. In some embodiments, other options may be available, such as a third mouse button and/or scroll wheel. In other embodiment, the options presented to the user in collection 18-10718 may be dynamic, changing depending upon the input devices detected and/or required by an active integration profile.

In some embodiments, additional gesture replacements may be available, depending upon the nature of the cursor-based input device. For example, in one embodiment, the use of a mouse with a scroll wheel may result in user interface 18-10700 including shortcut capture elements for multi-finger rotation and/or flicking.

In one embodiment, user interface 18-10700 may include a button 18-10720 which allows the user to save the modified settings and dismiss the interface. Furthermore, in one embodiment, user interface 18-10700 may include a button 18-10722 which allows the user to dismiss the user interface without modifying the settings.

Figures 19, 108:
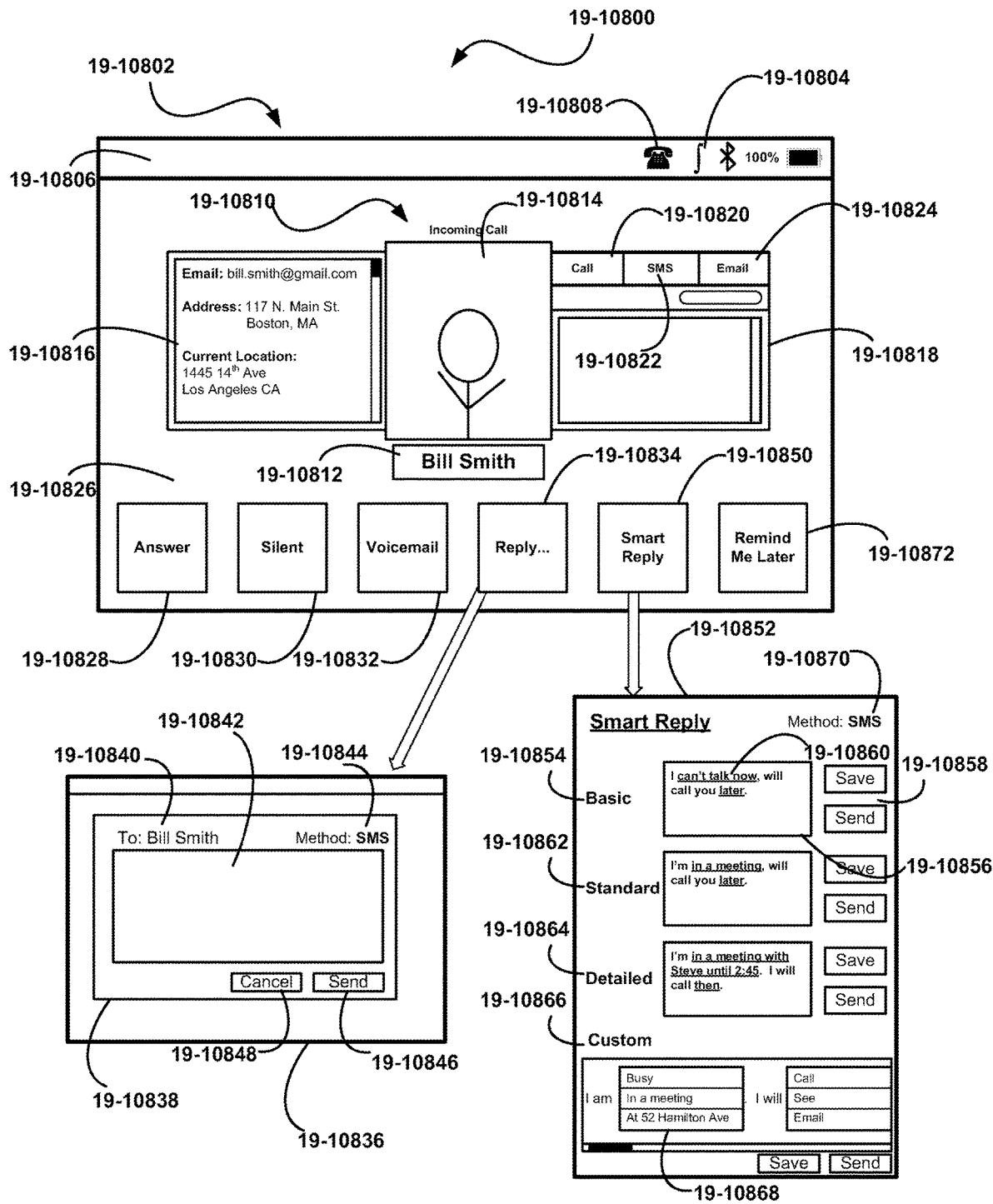
FIG. 19-108 shows a plurality of user interfaces for receiving and responding to a voice call, in accordance with one embodiment.

FIG. 19-108 shows a plurality of user interfaces 19-10800 for receiving and responding to a voice call, in accordance with one embodiment. As an option, the plurality of user interfaces 19-10800 may be implemented in the context of the architecture and environment of the previous Figures or any subsequent Figure(s). Of course, however, the plurality of user interfaces 19-10800 may be implemented in any desired environment. It should also be noted that the aforementioned definitions may apply during the present description.

In various embodiments, integration functionality may be utilized, and phone events may be handled, using a native tablet interface, such as those depicted within the plurality of user interfaces 19-10800. The use of native tablet interfaces to perform integrated functions, or to take advantage of integrated hardware, provides a superior user experience, blurring the line between the devices to the point that all functionality appears to be provided by a single device.

In many embodiments, the user interface 19-10802 may resemble what a user would see when receiving a voice call while using a pair of integrated devices. Before the incoming call, the only indication the user may have that they are using an integrated system may be the presence of an integration status icon 19-10804 within a status bar 19-10806, in accordance with one embodiment. In some embodiments, the availability of voice call functionality (e.g. the ability to place a call on a cellular voice network, VOIP network, etc.) may be indicated by the presence of an integrated phone status icon 19-10808 within the status bar.

In some embodiments, an incoming voice call may cause an integrated system to display a native tablet pre-call interface 19-10810, providing the user with a plurality of actions which may be taken in response to the call, as well as information about the caller. In other embodiments, user action may be required before interface 19-10810 may be displayed. For example, in one embodiment, if the user has placed the integrated system into "silent" mode (e.g. using button 16-10520 of FIG. 16-105, etc.), an incoming voice call may be indicated visually using integrated phone status icon 19-10808 (e.g. pulsing, flashing, color change, etc.). As an option, minimal information regarding the identity of the caller may also be displayed near the status icon 19-10808 (e.g. a miniature contact photo, an abbreviated name, etc.). If the user interacts with (e.g. taps, clicks on, etc.) the integrated phone status icon 19-10808 in response to an incoming call notification, native tablet pre-call interface 19-10810 may be displayed, in accordance with one embodiment.

A pre-call interface may display the usual identifying information. For example, as shown, native tablet pre-call interface 19-10810 may include a text field 19-10814 containing the identity of the caller (e.g. a name, Caller ID data, a phone number, etc.), in accordance with one embodiment.

In various embodiments, pre-call interface 19-10810 may include a text field 19-10812. In some embodiments, text field 19-10812 may display identifying information associated with a caller. Identifying information may include, but is not limited to, the caller's name, the caller's phone number, a caller ID message (e.g. "PRIVATE", "WITHHELD", etc.), a nickname or other data pulled from a user's contact record for the caller, and/or any other descriptive information.

In various embodiments, pre-call interface 19-10810 may include descriptive graphic element 19-10814. The contents of graphic element 19-10814 may vary, depending on the nature of the caller. For example, in one embodiment, if the caller exists within a collection of contacts stored on either integrated device, a contact photo may be displayed within graphic element 19-10814. In another embodiment, if the caller is not one of the user's contacts, graphic element 19-10814 may display the location associated with the caller (e.g. area code, phone number prefix, etc.). In still another embodiment, if the caller is not one of the user's contacts, graphic element 19-10814 may display an iconic representation of a person.

One of the advantages of an integrated system is that it may combine the voice call functionality of a phone with the larger display of a tablet, thus allowing for a greater amount of information related to a voice call to be displayed. In many embodiments, native tablet pre-call interface 19-10810 may include a caller information panel 19-10816, which may display a variety of information about the caller. As an option, caller information panel 19-10816 may appear to slide out from behind graphic element 19-10814. Furthermore, in some embodiments, the caller information panel may be resizable, allowing the user to make use of a large tablet display.

In one embodiment, caller information panel 19-10816 may display whatever information is available from the user contact data stored on either integrated device (e.g. address, company, email, notes, etc.). In another embodiment, caller information panel 19-10816 may include related information from calendar data stored on either integrated device (e.g. upcoming calendar events associated with the caller or the caller's organization, etc.).

In yet another embodiment, caller information panel 19-10816 may display location data for the caller, such as data obtained from a social geolocation sharing service. Specifically, if the caller has previously granted the user permission to receive their location data, caller information panel 19-10816 may display that data. In one embodiment, this location data may be displayed in the form of a street address. In another embodiment, this location data may be displayed in the form of a map, which may or may not also display the street address. In some embodiments, if the caller has not granted the user permission to know their location, caller information panel 19-10816 may include a button in place of the location data, which would send a request to the caller, asking for permission to see their location. As an option, the user may specify whether the request is for permanent permission, or for a limited amount of time (e.g. 24 hours, etc.).

In still another embodiment, caller information panel 19-10816 may display location data derived from the caller's phone number (e.g. area code, phone number prefix, etc.). As an option, in the case where the caller's identity is unknown, caller information panel 19-10816 may display upcoming calendar events which are occurring near the geographic area associated with the caller's phone number, if that location is distinctly different from the user's current position. As a specific example, if the user had recorded a calendar event for next week, taking place in a distance city, and then receives a phone call from a hotel in that city, the user may be reminded of the upcoming event within the caller information panel.

In another embodiment, caller information panel 19-10816 may display information regarding the caller obtained from a third party. Possible information sources may include, but are not limited to, reverse phone number lookup service, telemarketing reporting services, weather services, news services, and/or any other service which may provide information based upon a phone number or location.

In various embodiments, the information displayed within native tablet pre-call interface 19-10810, or any other interface, may be automatically linked to appropriate data handlers using data detection methods. For example, if caller information panel 19-10816 provides a street address for a caller, interacting with that address (e.g. tapping, clicking, etc.) may activate a mapping application displaying the location of the address, and providing directions for how to travel there. Other data which may be automatically linked to appropriate applications may include, but is not limited to, phone numbers, email addresses, street addresses, dates, and web URLs.

In many embodiments, native tablet pre-call interface 19-10810 may include a communication history panel 19-10818, which may display previous communications with the caller. As an option, communication history panel 19-10818 may appear to slide out from behind graphic element 19-10814. Furthermore, in some embodiments, the communication history panel may be resizable, allowing the user to take advantage of a large tablet display.

In various embodiments, communication history panel 19-10818 may be organized as a series of tabs, each tab representing a form of communication which has previously been made with the caller. For example, in one embodiment, communication history panel 19-10818 may include call history tab 19-10820, to allow the user to view previous voice calls with the caller. In one embodiment, the user may be able to specify whether call history tab 19-10820 displays missed calls, completed calls, or both. In another embodiment, call history tab 19-10820 may also indicate the date the call was made, whether it was incoming or outgoing, and/or how long the call lasted. In some embodiments, call history tab 19-10820 may also include data concerning previous video conferences. In other embodiments, video conference history may be provided in a separate tab. As an option, a video conference history tab may also identify all participants in a video conference. Other possible tabs include, but are not limited to, social network messages, instant messages, and/or any other form of communication.

In one embodiment, communication history panel 19-10818 may include SMS history tab 19-10822, to allow the user to view previous SMS messages sent to and received from the caller. In one embodiment, the user may be able to specify whether SMS history tab 19-10822 is organized by discrete conversations, or whether all previous SMS messages involving the caller are presented as one collection. As an option. SMS history tab 19-10822 may combine the SMS historical data stored on both integrated devices, creating a single history.

In one embodiment, communication history panel 19-10818 may include email history tab 19-10824, to allow the user to view previous emails sent to and received from the caller. In one embodiment, the user may be able to specify whether email history tab 19-10824 is organized as hierarchical threads, or as a flat collection of messages. In another embodiment, the user may be able to specify whether email history tab 19-10824 displays received emails, sent emails, or both.

In one embodiment, the user may only the data from one tab at a time within communication history panel 19-10818. In another embodiment, the user may select more than one tab, causing communication history panel 19-10818 to present the combined historical communication data as a single set. As an option, the data may be ordered chronologically.

In still another embodiment, the user may be presented with a timeline indicating all communication events when more than one tab has been selected within the communication history panel 19-10818. In yet another embodiment, the user may be able to specify the type of data displayed, and in what form, for each tab, through an interaction (e.g. touch and hold, right click, etc.) with the tab title, which may display a drop down menu with various options.

In one embodiment, the user may be able to use communication history panel 19-10818 to search through past communications involving the caller. As an option, the user may be able to constrain the search to a certain period of time. In another embodiment, the user may be able to search specific portions of the communications (e.g. other recipients, senders, subject, content, contains image, etc.).

In various embodiments, the native tablet pre-call interface 19-10810 may include a collection of buttons 19-10826 which provide a plurality of response options to the user. For example, in one embodiment, collection 19-10826 may include button 19-10828, which may be used to answer the incoming call. In some embodiments, upon answering a call, the user may be presented with a native tablet in-call interface, such as the one shown in user interface 19-10860.

In some embodiments, an integrated system may utilize the display of only one device. In other embodiments, an integrated system may make use of the displays of both devices, a prime display and a secondary display. In some cases, elements of a user interface may be spread across both screens. For example, in one embodiment, the collection of buttons 19-10826 may be displayed on a secondary display.

In one embodiment, collection 19-10826 may include button 19-10830, which may be used to silence the incoming call. In various embodiments, button 19-10830 may provide different functionality, depending upon how the user interacts with it. For example, in one embodiment, if the user taps or clicks on button 19-10830, the incoming call may be silenced. In another embodiment, if the user has an extended interaction with button 19-10830 (e.g. touch and hold, click and hold, right click, etc.), the user may be presented with the option of creating a policy to always silence calls coming from this particular caller. In one embodiment, such policies may be managed through a different user interface.

In some embodiments, the silence button 19-10830 may only silence the ringtone. In other embodiments, button 19-10830 may also dismiss the native tablet pre-call interface 19-10810. In one embodiment, silencing an incoming call means that the call is ignored, and bypasses voicemail. In another embodiment, the silenced call may still go to voicemail.

In one embodiment, collection 19-10826 may include button 19-10832, which may be used to send the incoming call to a voicemail system. In various embodiments, button 19-10832 may provide different functionality, depending upon how the user interacts with it. For example, in one embodiment, if the user taps or clicks on button 19-10832, the incoming call may be sent to a voicemail. In another embodiment, if the user has an extended interaction with button 19-10832 (e.g. touch and hold, click and hold, right click, etc.), the user may be able to choose from a plurality of prerecorded messages to play for the caller before sending them to a voicemail system.

In some embodiments, if the user taps or clicks on button 19-10832, the integrated system may utilize the most appropriate prerecorded message in conjunction with a voicemail system. The most appropriate prerecorded message may be determined based upon one or more criteria, including, but not limited to, previous user behavior (e.g. what messages have been used for this caller in the past, etc.), the identity of the caller (e.g. is the caller one of the user's contacts, an unknown individual, etc.), and/or contextual information (e.g. time of day, day of the week, location of the user, the user's velocity, active integration profile, etc.). In one embodiment, the prerecorded message may also include a device generated audio message.

As a specific example, in one embodiment, if a user's calendar indicates that the user is traveling, the prerecorded message presented to a caller found within the user's contact data may indicate that the user is out of town. In one embodiment, context-based audio messages may be managed through a user interface.

In one embodiment, collection 19-10826 may include button 19-10834, which may be used to send a reply message to the caller via some method other than a voice call. These methods may include, but are not limited to, email, SMS message, social network messaging, instant messaging, and/or any other form of messaging. In various embodiments, button 19-10834 may provide different functionality, depending upon how the user interacts with it. For example, in one embodiment, if the user taps or clicks on button 19-10834, the user may be presented with an interface where they may input a reply message to be sent using a predefined default method. In another embodiment, if the user has an extended interaction with button 19-10834 (e.g. touch and hold, click and hold, right click, etc.), the user may be able to choose from a plurality of methods with which to send a message to the caller in response to their voice call.

In some embodiments, if the user taps or clicks on button 19-10834, the integrated system may utilize the most appropriate form of communication to reply to the caller. The most appropriate form of communication may be determined based upon one or more criteria, including, but not limited to, observed user behavior (e.g. what has the user done in this situation in the past, etc.), observed caller preferences (e.g. does the caller favor one form of communication over another, does the caller respond more readily to one form of communication than another, etc.), and/or any other criteria. In another embodiment, the integrated system may also select the most appropriate message origination source (e.g. what account to send the message from), based upon similar criteria.

In one embodiment, interacting with button 19-10834 may present the user with user interface 19-10836, which includes a dialog box 19-10838 allowing the user to input a reply message to be sent to the caller. As shown, dialog box 19-10838 includes a text field 19-10840 which identifies the caller, in accordance with one embodiment. Furthermore, in one embodiment, dialog box 19-10838 may include a text field 19-10842 where the user may input a response message.

In one embodiment, dialog box 19-10838 may include text field 19-10844, which identifies the communication method with which the message will be sent. In some embodiments, a user may interact (e.g. tap, click, etc.) with text field 19-10844 to cycle through the various methods available. In other embodiments, an extended user interaction (e.g. touch and hold, click and hold, right click, etc.) with text field 19-10844 may allow the user to select from one or more different message origination points (e.g. email accounts, instant message accounts, social network accounts, etc.).

In one embodiment, dialog box 19-10838 may include a button 19-10846 to send the composed message. Furthermore, dialog box 19-10838 may include a button 19-10848 to return the user to the native tablet pre-call interface 19-10810 without sending a reply message.

In one embodiment, collection 19-10826 may include button 19-10850, which may be used to send a smart reply to the caller. In the context of the present description, a smart reply refers to a message which is, at least in part, device-generated, the device-generated portion of the message being based upon contextual information. Contextual information may include, but is not limited to, calendar data, location data, user velocity, user contact data (e.g. user's relationship to the caller, etc.), and/or any other data related to the user or the integrated devices. An example of a smart reply would be some of the device generated responses used in conjunction with auto response rules, as previously discussed.

In various embodiments, button 19-10850 may provide different functionality, depending upon how the user interacts with it. For example, in one embodiment, if the user taps or clicks on button 19-10850, a default smart reply may be sent to the caller. In another embodiment, if the user has an extended interaction with button 19-10850 (e.g. touch and hold, click and hold, right click, etc.), the user may be presented with a plurality of smart replies to choose from, providing varying degrees of information. These replies may be labeled for ease of use. For example, a "basic" response may indicate that the user is unavailable, while a "personal" response may indicate that the user is at the dentist, and will be done within an hour. In yet another embodiment, the user may be provided with an option to customize the smart replies available through button 19-10850. In some embodiments, the user may be shown the response for each label. In other embodiments, only the label may be visible to the user while interacting with button 19-10850.

In some embodiments, if the user taps or clicks on button 19-10850, the integrated system may send the most appropriate smart response to the caller. The most appropriate smart response, or in other words, the response the user would most likely intend to send, may be determined based upon one or more criteria, including, but not limited to, observed user behavior (e.g. what has the user done in this situation in the past, etc.), observed caller responses (e.g. what additional information has the caller previously requested in response to various messages, etc.), and/or any other criteria. In another embodiment, the integrated system may also select the most appropriate message origination source (e.g. what account to send the message from) and message format (e.g. email, SMS message, etc.), based upon similar criteria.

In various embodiments, after an interaction with button 19-10850, the user may be presented with a plurality of smart replies, as well as the option to customize said replies. In one embodiment, selecting the option to customize the smart replies may take the user to user interface 19-10852, which may allow the user to define one or more labeled smart replies, as well as prepare a custom smart reply to send to the caller.

In one embodiment, user interface 19-10852 may include one or more smart response editor elements, such as 19-10854. In the context of the present description, a smart response editor element refers to the combination of text field containing a response, as well as a plurality of buttons which allow the user to save the current response and send the current response. For example, as shown, smart response editor element 19-10854 includes a response text field 19-10856, as well as a plurality of buttons 19-10858.

In various embodiments, the response text field of a smart response editor element may include dynamic text. In the context of the present description, dynamic text refers to a portion of text which changes value (i.e. says something different, etc.) in response to a user interaction. For example, in one embodiment, if a user touches or clicks on a piece of dynamic text, it may cycle through a plurality of possible values. In some embodiments, dynamic text may have a different appearance than static text (e.g. different font, different style, different size, different color, animated, etc.).

The dynamic text found within the response text field of a smart response editor element allows a user to easily modify a response by cycling through a plurality of context-based response elements. In some embodiments, the set of response elements associated with a piece of dynamic text in a smart response are thematically related. For example, one set of response elements may describe a user's current activity, and comprise the values of "busy", "in a meeting", and "in a meeting with Bill". The types of context-based response elements may include, but are not limited to, the user's current activity (e.g. in a meeting, etc.), the user's current location (e.g. away, on the road, at 117 N. Main Street, etc.), the user's schedule (e.g. later, after the meeting, at 3:45 pm, etc.), the user's intended future response activity (e.g. call, meet, email, conference, etc.), and/or any other context-based information. In one embodiment, the set of possible values for a piece of dynamic text may be thematically related, yet vary in degree of specificity. In another embodiment, the set of possible values may be thematically related, and of a similar level of specificity, yet vary in style, tone, and/or degree of formality (e.g. "I can't talk right now", "Busy.", "I am currently unavailable", etc.).

In various embodiments, each possible value within a set of values that a piece of dynamic text draws from may be assigned a numerical score representative of that set's degree of freedom. For example, if a set is made up of thematically related values of varying specificity, a very vague value may have a score of zero, while a very specific, detailed value may have a score of ten. The same may be done for varying degrees of tone and formality (i.e. extremely casual language may have a low score, while very formal language may have a high score). In this way, preferred levels of specificity and formality may be maintained for responses to a particular caller, even if the theme or context of the response changes, facilitating the selection of a most appropriate smart response. In some embodiments, the user may be made aware of these scores, whether in numerical form, or in the form of icons.

In one embodiment, dynamic text may cycle through a set of possible values in response to a touch or a click. In another embodiment, touching or clicking on a piece of dynamic text may display the entire set of possible values, which the user may choose from. As an option, in the case of large sets of values, a subset of values may be displayed, which the user may scroll through.

As shown, user interface 19-10852 may include a "basic" smart response editor element 19-10854, a "standard" smart response editor element 19-10862, and a "detailed" smart response editor element 19-10864, in accordance with one embodiment. In another embodiment, the dynamic text within each of these smart response editors may draw from sets of values which have roughly the same specificity (e.g. values for dynamic text within the "basic" smart response will all be vague, etc.). In yet another embodiment, the user may be able to modify the labels assigned to each smart response, as well as select which set each piece of dynamic text draws from.

As shown, user interface 19-10852 may include a custom smart response editor element 19-10866, which may provide the user with more freedom in designing a smart response. For example, in one embodiment, the pieces of dynamic text 19-10868 within a custom smart response editor element may be two dimensional in nature. In the context of the present description, a two dimensional piece of dynamic text is a dynamic text which draws from a two dimensional set of values, able to vary in both specificity as well as tone/formality. In various embodiments, different interactions may affect different dimensions of a two dimensional piece of dynamic text. For example, in one embodiment, variation in specificity may be associated with vertical motion (e.g. flicking up or down, click-dragging up or down, moving a scroll wheel, etc.), while variation in formality may be associated with horizontal motion (e.g. flicking left or right, click-dragging left or right, moving a scroll wheel while holding down a shift key, etc.). As an option, the interactions used for all dynamic text in user interface 19-10852 may be consistent (i.e. all specificity variations are vertical, all formality variations are horizontal, etc.).

In one embodiment, user interface 19-10852 may include a text field 19-10870 which indicates how the smart response will be transmitted (e.g. email, SMS, social network, etc.). In another embodiment, a user may interact with (e.g. touch, click on, etc.) this text field to change the method of transmission. In some embodiments, the user may send the smart response using text-to-speech technology. In other words, the system would answer the incoming call, and read the smart response to the caller. As an option, the caller may then be sent to a voicemail system. In other embodiments, this functionality may be available to the user through the voicemail button 19-10832.

In some embodiments, modifications made to the smart responses through user interface 19-10852 may persist from caller to caller. In other words, if a user makes the "standard" smart response very formal, it may remain formal for all future callers. In other embodiments, the modifications made to the smart responses are maintained for each caller. Thus, a user may specify that all responses to one individual be casual, while those sent to a different individual are all formal. As an option, a user may define levels of specificity and formality for smart responses sent to particular contacts by assigning the previously discussed scores to their contact data (e.g. contact data has fields for specificity and formality, etc.). Furthermore, in another embodiment, preferred scores may be assigned to groups of contacts. As a specific example, a user may specify that all contacts within the group "family" should receive informal, very specific smart responses.

In one embodiment, collection 19-10826 may include button 19-10872, which may be used create a reminder for the user to contact the caller at a later time or date. In various embodiments, button 19-10872 may provide different functionality, depending upon how the user interacts with it. For example, in one embodiment, if the user taps or clicks on button 19-10872, the user may be reminded to contact the caller after a default amount of time has elapsed. In another embodiment, if the user has an extended interaction with button 19-10872 (e.g. touch and hold, click and hold, right click, etc.), the user may be presented with a plurality of delays before such a reminder is displayed.

In another embodiment, interacting with button 19-10872 may cause the creation of a reminder which will be triggered at a time based upon contextual data. For example, if a user is in a scheduled meeting and activates 19-10872 in response to an incoming voice call, the reminder may be set to occur ten minutes after the scheduled end of the meeting. In yet another embodiment, the reminder created in response to activating 19-10872 may be timed based upon observed user behavior, combined with contextual data. As a specific example, a system may avoid scheduling a reminder to return a voice call during a time in which the user has been consistently observed to refuse incoming calls (e.g. lunch time, etc.), and instead schedule the reminder for a time when the user has been observed making a number of voice calls.

Figures 20, 109:
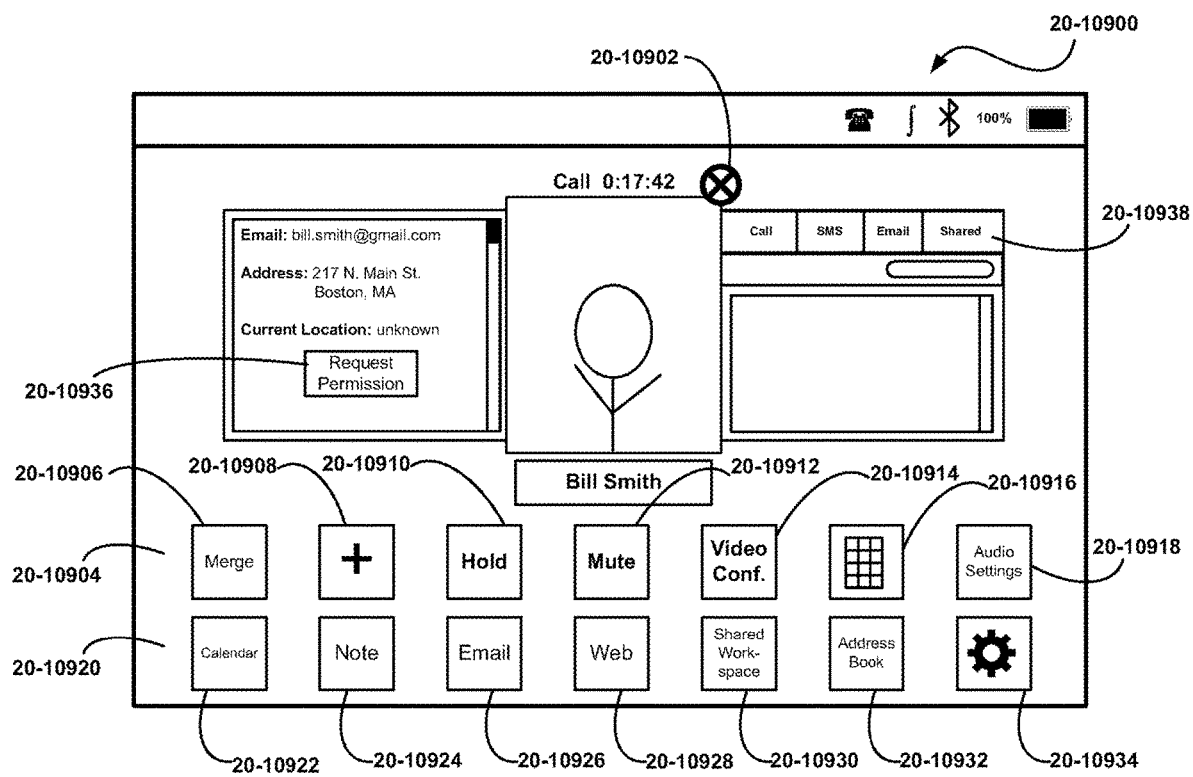
FIG. 20-109 shows a user interface for modifying an ongoing voice call, in accordance with one embodiment.

FIG. 20-109 shows a user interface 20-10900 for modifying an ongoing voice call, in accordance with one embodiment. As an option, user interface 20-10900 may be implemented in the context of the architecture and environment of the previous Figures or any subsequent Figure(s). Of course, however, user interface 20-10900 may be implemented in any desired environment. It should also be noted that the aforementioned definitions may apply during the present description.

As shown, user interface 20-10900 is a native tablet interface which may be used to modify an ongoing voice call, or enhance the ongoing communication with one or more parties participating in the voice call. In many embodiments, the native tablet in-call interface may appear similar to the native tablet pre-call interface 19-10800. For instance, in one embodiment, the native tablet in-call interface may have a caller information panel and/or a communication history panel, in addition to various information identifying the caller (e.g. contact photo, caller name, etc.).

In one embodiment, native tablet in-call interface 20-10900 may include a button 20-10902 for dismissing the in-call interface. In some embodiments, dismissing the in-call interface does not interrupt the voice call, but rather hides the interface, allowing the user to perform other functions. In one embodiment, the user may cause the in-call interface to reappear by interacting with the integrated phone status icon located in the status bar.

In various embodiments, in-call interface 20-10900 may include a collection of buttons 20-10904 which allow the user to perform various in-call operations. For example, in one embodiment, collection 20-10904 may include buttons to merge two calls into a single conference call (e.g. button 20-10906), add another person to an ongoing call (e.g. button 20-10908), place a call on hold (e.g. button 20-10910), and mute the ongoing voice call (e.g. button 20-10912).

In one embodiment, collection 20-10904 may include button 20-10914, which may be used to escalate the voice call to a video conference. In various embodiments, this escalation may be performed using the method depicted in FIG. 9-98. In some embodiments, if it is known that all other participants of a voice call are unable to support a video conference, button 20-10914 may be disabled, and made to appear different (e.g. faded, etc.).

In one embodiment, button collection 20-10904 may include button 20-10916, for displaying a phone keypad. This may be used to interact with a phone based system that uses voice prompts and phone-generated tones as input.

As shown, button collection 20-10904 may include button 20-10918 for allowing a user to modify the integration audio settings while a call is in progress, in accordance with one embodiment. In one embodiment, activating button 20-10918 may present the user with an interface where they may change the sources for audio input and output, volume, microphone sensitivity, and/or noise cancelation settings. In this way, a user may quickly and easily change the nature of the ongoing call (e.g. switch from speakerphone to a headset, etc.).

In various embodiments, in-call interface 20-10900 may include a collection of buttons 20-10920 which represent various applications. In some embodiments, activating an application via a button included in collection 20-10920 may cause the application to appear with a modified user interface designed to facilitate applying the functionality of the application towards the ongoing voice call. In other embodiments, activating an application via the in-call interface may simply dismiss the in-call interface and execute the selected application in an ordinary manner.

In various embodiments, the collection of application buttons 20-10920 may include a button 20-10922 for launching a calendar application. In one embodiment, button 20-10922 may launch a calendar application using a special user interface to facilitate operating the calendar application in conjunction with the ongoing voice call. The activities said interface may facilitate include, but are not limited to, creating a shared event, sending and receiving calendar events, and publishing a calendar, in accordance with one embodiment. See, for example, the plurality of user interfaces depicted in FIG. 22-111.

In various embodiments, the collection of application buttons 20-10920 may include a button 20-10924 for launching a note application. In one embodiment, button 20-10924 may launch a note application using a special user interface to facilitate operating the note application in conjunction with the ongoing voice call. The activities said interface may facilitate include, but are not limited to, sending text, receiving text, and generating a transcript of the voice call, in accordance with one embodiment. See, for example, the user interface depicted in FIG. 24-113.

In various embodiments, the collection of application buttons 20-10920 may include a button 20-10926 for launching an email application. In one embodiment, button 20-10926 may launch an email application using a special user interface to facilitate operating the email application in conjunction with the ongoing voice call. The activities said interface may facilitate include, but are not limited to, creating a new message addressed to one or more participants of the voice call, and show all previous communications with one or more participants of the voice call, in accordance with one embodiment. See, for example, the user interface depicted in FIG. 25-114.

In various embodiments, the collection of application buttons 20-10920 may include a button 20-10928 for launching a web browser application. In one embodiment, button 20-10928 may launch a web browser application using a special user interface to facilitate operating the web browser application in conjunction with the ongoing voice call. The activities said interface may facilitate include, but are not limited to, sending and receiving bookmarks, sending the URL of the current web page, and receiving a URL, in accordance with one embodiment. See, for example, the user interface depicted in FIG. 26-115.

In various embodiments, the collection of application buttons 20-10920 may include a button 20-10930 for launching a shared workspace. In one embodiment, button 20-10930 may launch a share workspace using a special user interface to facilitate operating the shared workspace in conjunction with the ongoing voice call. The activities said interface may facilitate include, but are not limited to, inviting one or more participants of the ongoing voice call to join a shared workspace, in accordance with one embodiment. See, for example, the user interface depicted in FIG. 27-116.

In various embodiments, the collection of application buttons 20-10920 may include a button 20-10932 for launching an address book application. In one embodiment, button 20-10932 may launch an address book application using a special user interface to facilitate operating the address book application in conjunction with the ongoing voice call. The activities said interface may facilitate include, but are not limited to, granting permission to access location data, requesting permission to access location data, sending personal contact information, sending a contact record, creating a new contact record, and displaying a contact record for the caller, in accordance with one embodiment. See, for example, the plurality of user interfaces depicted in FIG. 28-117.

In various embodiments, user interface 20-10900 may include a button 20-10934 for specifying preferences regarding the collection of application buttons 20-10920. In one embodiment, collection of application buttons 20-10920 may be predefined, and fixed. As an option, the collection may be populated with applications which are likely to be used during a voice call and/or possess a modified user interface for use during a voice call. In other embodiments, the collection of applications may be dynamic. For example, in one embodiment, a user may select the members of the collection of applications. In another embodiment, the collection of applications may be automatically populated based upon observed user behavior (e.g. applications which are most used, applications which have previously been used during a voice call, applications which have been previously used during voice call with one or more participants of the current call, etc.).

As previously discussed, the caller information panel may display location data for a caller, in accordance with one embodiment. In various embodiments, user interface 20-10900 may include a button 20-10936 for requesting location data from a call participant, if permission to access such data does not already exist. As an option, the participant may have the option to grant temporary (e.g. 24 hour, etc.) permission, or permanent permission, which can later be revoked.

In various embodiments, the communication history panel of user interface 20-10900 may include a shared content tab 20-10938, to all the user to see content which has been shared in conjunction with the ongoing voice call. In one embodiment, the user may be able to perform operations on the content listed in shared content tab 20-10938. Potential operations may include, but are not limited to, opening a piece of content with an appropriate application, resending previously sent content, deleting content, viewing metadata associated with a piece of content, and/or any other operation which may be performed in association with content.

Figures 21, 110:
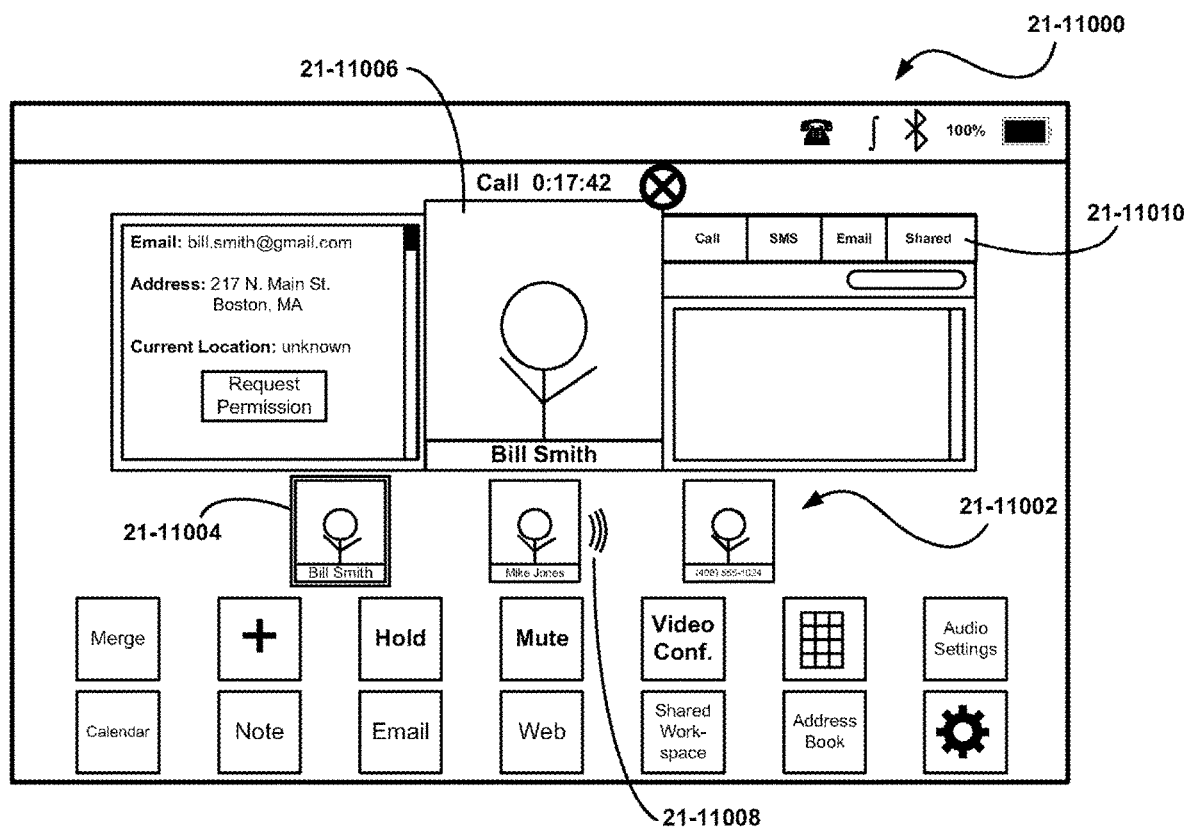
FIG. 21-110 shows a user interface for modifying an ongoing voice call with multiple participants, in accordance with another embodiment.

FIG. 21-110 shows a user interface 21-11000 for modifying an ongoing voice call with multiple participants, in accordance with another embodiment. As an option, user interface 21-11000 may be implemented in the context of the architecture and environment of the previous Figures or any subsequent Figure(s). Of course, however, user interface 21-11000 may be implemented in any desired environment. It should also be noted that the aforementioned definitions may apply during the present description.

As shown, user interface 21-11000 is a native tablet interface which may be used to modify an ongoing voice call, or enhance an ongoing communication with one or more parties participating in the voice call. In many embodiments, the native tablet in-call interface may appear similar to the native tablet pre-call interface 19-10800. For instance, in one embodiment, the native tablet in-call interface may have a caller information panel and/or a communication history panel.

In various embodiments, user interface 21-11000 may include a collection of buttons 21-11002 which represent the participants of the ongoing voice call. In some embodiments, these buttons bear the image of the associated call participant (e.g. contact photo, etc.), or an iconic representation of the caller. Examples of possible iconic representations of a call participant may include, but are not limited to, a symbol, a map of the geographic area associated with the participant's area code, and/or any other visual representation. Furthermore, the button may also bear a text description of the call participant (e.g. name, phone number, etc.).

In various embodiments, a user may select a button representing a call participant, wherein the selection causes information associated with the selected call participant to be displayed in the in-call descriptive elements 21-11006 (e.g. the caller information panel, the communication history panel, the descriptive graphic element, etc.). In some embodiments, the currently selected call participant button may be visually distinct from the rest of button collection 21-11002. For example, as shown, selected button 21-11004 is framed with a second border.

In some embodiments, the in-call descriptive elements 21-11006 may display information associated with a call participant explicitly selected by the user from buttons 21-11002. In other embodiments, these descriptive elements may display the information associated with the call participant who is currently speaking. As an option, a call participant may be required to speak for a predefined amount of time before their information replaces the information currently being displayed. In one embodiment, a user may specify how the subject of these descriptive elements is chosen (e.g. manually, automatically, etc.). Furthermore, in one embodiment, the user may override an automatically made choice by interacting with a button representing a participant. A second interaction may deselect said button, returning the system to automatically change the descriptive elements.

In various embodiments, user interface 21-11000 may include icon 21-11006, which indicates which call participant is currently speaking. In some embodiments, the user may be able to specify a threshold volume above which a participant may be considered to be speaking. In this way, different levels of background noise among call participants may be accounted for.

In various embodiments, user interface 21-11000 may include a shared content tab 21-11010. In some embodiments, the shared content tab may only list the content which has been sent to and/or received from the participant currently displayed in descriptive elements 21-11006, in conjunction with the ongoing communication. In other embodiments, the shared content tab may list the content which has been sent to and/or received from all communication participants, in conjunction with the ongoing communication.

Figures 22, 111:
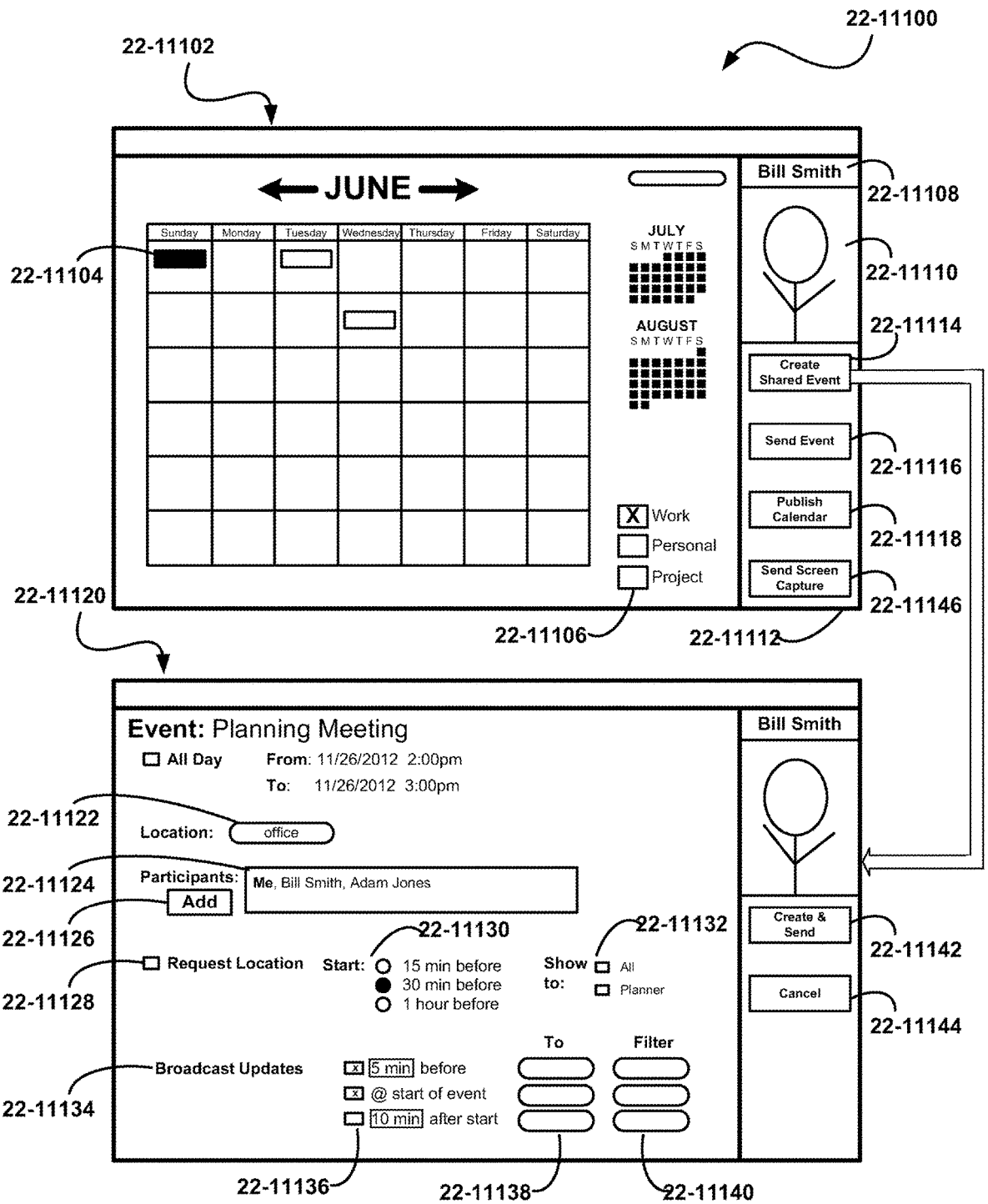
FIG. 22-111 shows a plurality of user interfaces for using a calendar application, in accordance with one embodiment.

FIG. 22-111 shows a plurality of user interfaces 22-11100 for using a calendar application, in accordance with one embodiment. As an option, the plurality of user interfaces 22-11100 may be implemented in the context of the architecture and environment of the previous Figures or any subsequent Figure(s). Of course, however, the plurality of user interfaces 22-11100 may be implemented in any desired environment. It should also be noted that the aforementioned definitions may apply during the present description.

In various embodiments, the plurality of user interfaces 22-11100 may be used to operate a calendar application in conjunction with an ongoing or recently terminated communication. Specifically, the plurality of user interface 22-11100 may be used in conjunction with a voice call or video conference which is in progress, or has recently ended. In some embodiments, user interfaces 22-11100 may be available for a limited amount of time after a voice call or video conference has ended. In other embodiments, these user interfaces may be accessible, and utilized with respect to the previous communication, when accessed through an interface directly related to said communication (e.g. phone interface, video conference interface, an integrated phone interface, etc.).

In one embodiment, plurality 22-11100 may include user interface 22-11102, which may be used to review and modify data within a calendar application. User interface 22-11102 may serve as a primary interface to a calendar application, in accordance with one embodiment. For example, as shown, user interface 22-11102 includes an expanded monthly calendar, which may be populated with events 22-11104, which may be organized into one or more calendar groups (e.g. work calendar, personal calendar, birthdays, etc.). In other embodiments, user interface 22-11102 may be used to access any of the functionality available through the calendar application when executed outside of the context of an ongoing or recently terminated communication.

In one embodiment, the calendar in user interface 22-11102 may be populated with events 22-11104, which may be associated with one or more individuals. In some embodiments, the user interface elements (e.g. text, graphics, etc.) within user interface 22-11102 which represent events which are associated with one or more participants of the ongoing or recently terminated communication may be visually distinguished from other events. For example, in one embodiment, these relevant events may be displayed with a pulsing animation. In another embodiment, the relevant events may be highlighted with a border.

In the case of a communication which involves more than one other participant, the relevant events may visually indicate which participants they are associated with, in accordance with one embodiment. In one embodiment, each participant in the communication may be associated with a distinct color, an association which may be indicated through the use of that color in user interface elements which identify the participants (e.g. contact photo, video feed, participant name, etc.) as well as calendar event elements which are associated with each participant. As a specific example, in the case of a multi-channel video conference, the video feed associated with each participant may have a uniquely colored border, the color corresponding with colored dots within relevant calendar event UI elements. In another embodiment, a user may be able to select a single communication participant, causing relevant events to become visually distinct.

In one embodiment, user interface 22-11102 may include a plurality of check boxes 22-11106 associated with calendar groups, which may be used to specify which calendar group events are visible within the user interface. In some embodiments, it may be possible for a user to publish a calendar group, allowing invited individuals to view calendar data associated with the published group. Similar to what was previously described with respect to calendar event elements, any of the calendar groups represented by plurality 22-11106 may be visually distinguished if they have been subscribed to by a communication participant. The methods previously discussed for visually distinguishing relevant calendar event elements may be applied to relevant calendar groups, in accordance with one embodiment.

In some embodiments, user interface 22-11102 may provide all of the functionality available when using the calendar application outside the context of an ongoing or recently terminated communication. In other embodiments, user interface 22-11102 may provide enhanced functionality. For example, in one embodiment, user interface 22-11102 may include an enhanced communication panel 22-11108, which may facilitate the operation of an application in conjunction with an ongoing or recently terminated communication.

In the context of the present description, an enhanced communication panel refers to a user interface panel which may be used to provide synergy between an ongoing or terminated communication and the operation of an application. In many embodiments, it may provide information (e.g. name, contact photo, video feed, etc.) concerning one or more communication participants. Furthermore, an enhance communication panel may include one or more buttons associated with operations which combine the functionality of an application with information related to one or more communication participants (e.g. name, email, phone number, etc.).

In some embodiments, an enhanced communication panel may be displayed on the prime display, along side an application. In other embodiments, the enhanced communication panel may be displayed on a secondary display (e.g. the phone display, etc.). In still other embodiments, elements of the enhanced communication panel may be split between prime and secondary displays.

In various embodiments, an enhanced communication panel may include a visual element which may be used to identify one or more communication participants. For example, as shown, enhanced communication panel 22-11108 includes a visual element 22-11110, in accordance with one embodiment.

In one embodiment, visual element 22-11110 may include a contact photo and name for a participant of a recently terminated voice call or video conference. In another embodiment, visual element 22-11110 may display a video stream being received as part of an ongoing video conference. In cases where there is more than one communication participant (in addition to the user), a user may interact with (e.g. swipe, click, scroll, etc.) visual element 22-11110 to cycle through various participants, in accordance with one embodiment. As an option, a reduced version of the visual data (e.g. contact photo, video feed, etc.) associated with the other participants may be displayed elsewhere (e.g. secondary display, along an edge of visual element 22-11110, etc.). In another embodiment, visual element 22-11110 may display the video stream/visual representation of all communication participants at the same time, in reduced size. In yet another embodiment, visual element 22-11110 may display the video stream/visual representation of the communication participant who is currently speaking. As an option, a participant may be required to speak for a certain amount of time before visual element 22-11110 changes, to avoid the distraction of a rapidly changing visual element.

In one embodiment, enhanced communication panel 22-11108 may include a collection of buttons 22-11112 which are associated with operations that combine the functionality of the calendar application with information related to one or more communication participants (e.g. name, email, phone number, etc.). In some embodiments, the operations made available by buttons 22-11112 may change depending upon a context, such as which application interface is presently active.

In one embodiment, enhanced communication panel 22-11108 may include a button 22-11114 which may be used to create a shared event. In the context of the present description, a shared event refers to a calendar event which is associated with the user as well as one or more other individuals. For example, in one embodiment, button 22-11114 may result in the creation of an event in which the user and all communication participants are listed as event participants. In another embodiment, the creation of a shared event may result in an event invitation being sent to all participants. As an option, the creation of a shared event may be performed using a user interface, such as user interface 22-11120.

In one embodiment, enhanced communication panel 22-11108 may include a button 22-11116 which may be used to send a calendar event to one or more communication participants. In some embodiments, a calendar event may be sent via email to one or more other parties in a commonly supported data format such as iCalendar. In one embodiment, a user interaction (e.g. tap, click, etc.) with button 22-11116 may result in the currently selected calendar event or events being sent to all communication participants. In another embodiment, an extended user interaction (e.g. touch and hold, click and hold, right click, etc.) with button 22-11116 may provide the user with the ability to choose which of the communication participants should receive the selected event or events.

In one embodiment, enhanced communication panel 22-11108 may include a button 22-11118 which may be used to publish a calendar group to one or more communication participants. In some embodiments, a user may be able to publish a calendar group, or a collection of calendar events, to an external server, where other individuals with sufficient permission may subscribe to the published calendar group and receive updates. In one embodiment, button 22-11118 may cause a selected calendar group to be published (if it is not already published), and issue an invitation to one or more communication participants granting them sufficient permission to subscribe to the published calendar group.

In one embodiment, a user interaction (e.g. tap, click, etc.) with button 22-11118 may result in the currently selected calendar group being published to all communication participants. In another embodiment, an extended user interaction (e.g. touch and hold, click and hold, right click, etc.) with button 22-11118 may provide the user with the ability to choose which of the communication participants should receive the invitation to subscribe to the published calendar group.

If a user activates button 22-11116 to create a shared event, they may be presented with user interface 22-11120. In various embodiments, user interface 22-11120 may be used to create and transmit a shared event. As shown, user interface 22-11120 resembles a standard event creation interface, where a user may define an event name, a start and end time and date, and other details.

In one embodiment, user interface 22-11120 may include text field 22-11122 for defining a location to be associated with the calendar event. In some embodiments, the contents of text field 22-11122 may be treated as additional information to pass to other participants in the form of a note, without any further action taken in the absence of user interaction. In other embodiments, text field 22-11122 may utilize one or more sources of data (e.g. the user's contact data stored on either integrated device, data from an external server, etc.) to automatically link the user's input with additional information. For example, in one embodiment, if the user were to enter "office" in the location text field, the system may correlate that input with the user's personal contact information, which includes the address for their place of employment. While the user may see the word "office" in text field 22-11122, recipients of the shared event will see additional data, such as the street address. As an option, text within text field 22-11122 which has been recognized and linked to additional data may be visually distinct from other text, letting the user know that the text has been linked to other data. As a further option, in some embodiments, the user may interact with (e.g. hover a cursor, touch and hold, etc.) a piece of recognized and correlated text to see the associated data.

In one embodiment, user interface 22-11120 may include text field 22-11124 for specifying who will be participating in the calendar event. In some embodiments, the contents of text field 22-11124 may be automatically linked to additional information, similar to what has been described with respect to locations.

In various embodiments, the participants text field 22-11124 may be automatically populated with the identities of all communication participants, when the shared event is being created in response to the activation of a button within an enhanced communication panel. As an option, the field may always list the user first, as the event creator. In some embodiments, names may be added directly to and deleted directly from text field 22-11124. In other embodiments, the user may utilize button 22-11126, which allows the user to select contacts from the address book data stored on both integrated devices.

In one embodiment, user interface 22-11120 may include check box 22-11128 which specifies whether the shared event will request permission from each participant to access their location data, for instance, through a social geolocation service. In many embodiments, the permission sought in relation to a shared event may be within a limited time frame. For example, in one embodiment, user interface 22-11120 may include collection of radio buttons 22-11130 which specify when the location data will be made available. Specifically, these radio buttons specify the amount of time before the event that the location data will first become available. In other embodiments, location permissions associated with a shared event may expire at the scheduled end of the event.

In various embodiments, user interface 22-11120 may include a collection of check boxes 22-11132 which specify who will have access to event participant location data. In one embodiment, the user may choose between giving access to the event creator and giving access to all event participants. In another embodiment, a user may be allowed to select specific participants who will have access to event participant location data.

In some embodiments, the use of shared event participant location data may be left to the discretion of the participants. In other words, if they take no action, the data will go unused. In other embodiments, the user may specify that an event participant location report be broadcast at one or more points in time, summarizing the relative location of one or more event participants. In one embodiment, the user may make such a specification using a collection of settings 22-11134.

In various embodiments, user interface 22-11120 may include a collection of checkboxes 22-11136 to specify when a location report should be broadcast. For example, in one embodiment, a user may specify that a location report should be sent a predefined amount of time before the scheduled start of the event, at the time the event is scheduled to start, and/or after a predefined amount of time has elapsed since the scheduled event start time. In this way, event participants may be kept up to date regarding participants who are still en route, or have been delayed.

In various embodiments, user interface 22-11120 may include a collection of drop down menus 22-11138 which allow the user to specify who should receive the various location reports. For example, in one embodiment, a user may specify that the event planner alone should receive a report 10 minutes before the scheduled start of the event, and that all participants should receive a report 5 minutes after the event has begun.

In various embodiments, user interface 22-11120 may include a collection of drop down menus 22-11140 which allow the user to specify what will be reported in the various location reports. For example, in one embodiment, a user may specify that before the event starts, the report should indicate the location of all participants, while after the event has begun, only the location of participants who have not yet arrived should be reported.

The location of various event participants may be presented in a number of ways. For example, in one embodiment, a location report may state how far away a participant is from the planned event location. In another embodiment, the report may give an estimated time of arrival for one or more participants. As an option, such a report may be based upon current traffic conditions, weather conditions, a predicted route, and/or any other information which may be combined with the location of an event participant to estimate their time of arrival.

In one embodiment, an event participant location report may state how far away a participant is from the planned location of the event. In another embodiment, said report may state how far away a participant is from the bulk of the rest of the participants, if there a predefined fraction of participants are at a single location, which does not necessarily have to be the planned event location (e.g. a last minute change of plans, etc.).

In one embodiment, an event participant location report may provide the same information to all participants. In another embodiment, a different message may be sent to participants who have not yet arrived (e.g. "Hurry up, we're all waiting!", etc.). Furthermore, in one embodiment, an event participant location report may be sent through various protocols, including, but not limited to, SMS and email.

As shown, user interface 22-11120 may include a button 22-11142 for creating the shared event as presently defined, and sending an invitation to all participants listed in text field 22-11124, in accordance with one embodiment. Additionally, in one embodiment, user interface 22-11120 may also include a button 22-11144 which allows the user to return to a previous user interface without creating a shared event.

In various embodiments, user interface 22-11102 may include a button 22-11146 which allows a user to capture the contents of the screen and send said screen capture to one or more communication participants. In one embodiment, the user may be prompted to select a method of sending, and/or prompted regarding who should receive the screen capture. In another embodiment, the user may be able to select a portion of the display for capture, rather than the entire display. This functionality allows a user to quickly share the contents of the screen with other communication participants without worrying about whether or not they are able to receive the specific protocol of the application (e.g. iCalendar, etc.).

Figures 23, 112:
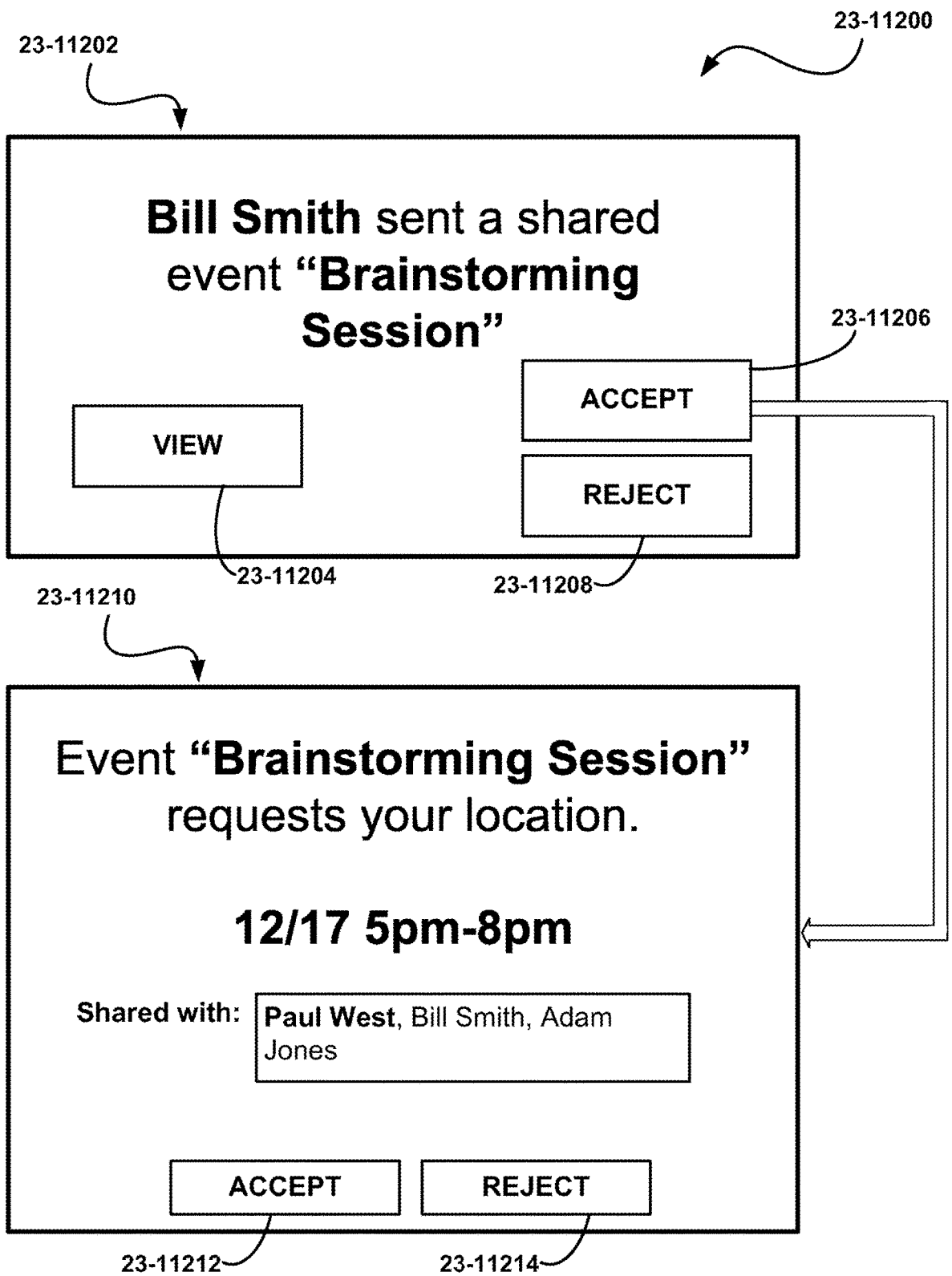
FIG. 23-112 shows a plurality of user interfaces for receiving a shared calendar event, in accordance with one embodiment.

FIG. 23-112 shows a plurality of user interfaces 23-11200 for receiving a shared calendar event, in accordance with one embodiment. As an option, the plurality of user interfaces 23-11200 may be implemented in the context of the architecture and environment of the previous Figures or any subsequent Figure(s). Of course, however, the plurality of user interfaces 23-11200 may be implemented in any desired environment. It should also be noted that the aforementioned definitions may apply during the present description.

In various embodiments, user interfaces 23-11202 and 23-11210 may be used to accept a shared calendar event created and sent by another individual. For example, as shown, user interface 23-11202 informs the user that a person has sent them a shared event, which they can either accept or reject. In some embodiments, user interface 23-11202 may also indicate to the user whether the shared event conflicts with an event already in the user's calendar. As shown, user interface 23-11202 includes a button 23-11204, which allows the user to view the details of the event.

In one embodiment, user interface 23-11202 may include a button 23-11206 for accepting the shared event, and a button 23-11208 for rejecting or declining the event. In some cases, the event will request permission of participants to share their location data on a temporary basis. In such a case, and the user has elected to accept the shared event, they may be presented with user interface 23-11210, in accordance with one embodiment.

As shown, user interface 23-11210 may be used to grant or deny permission for one or more participants of a shared event to view the user's location data on a temporary basis, in accordance with one embodiment. Further, in one embodiment, user interface 23-11210 may include buttons 23-11212 and 23-11214 for accepting or rejecting the request.

In one embodiment, all participants of a shared event which requests participant location information may be presented with said request through user interface 23-11210, or a similar interface. In another embodiment, user interface 23-11210 may only be presented if needed. For example, if a user has already granted permission to all parties who would be accessing the location data, there would be no need to gain further permission. As an option, the user may be informed that the shared event will involve the sharing of location data, but only with people who already have permission. In yet another embodiment, the user may be informed who will be receiving the location data, and among those individuals, who does not already have permission to do so.

Figures 24, 113:
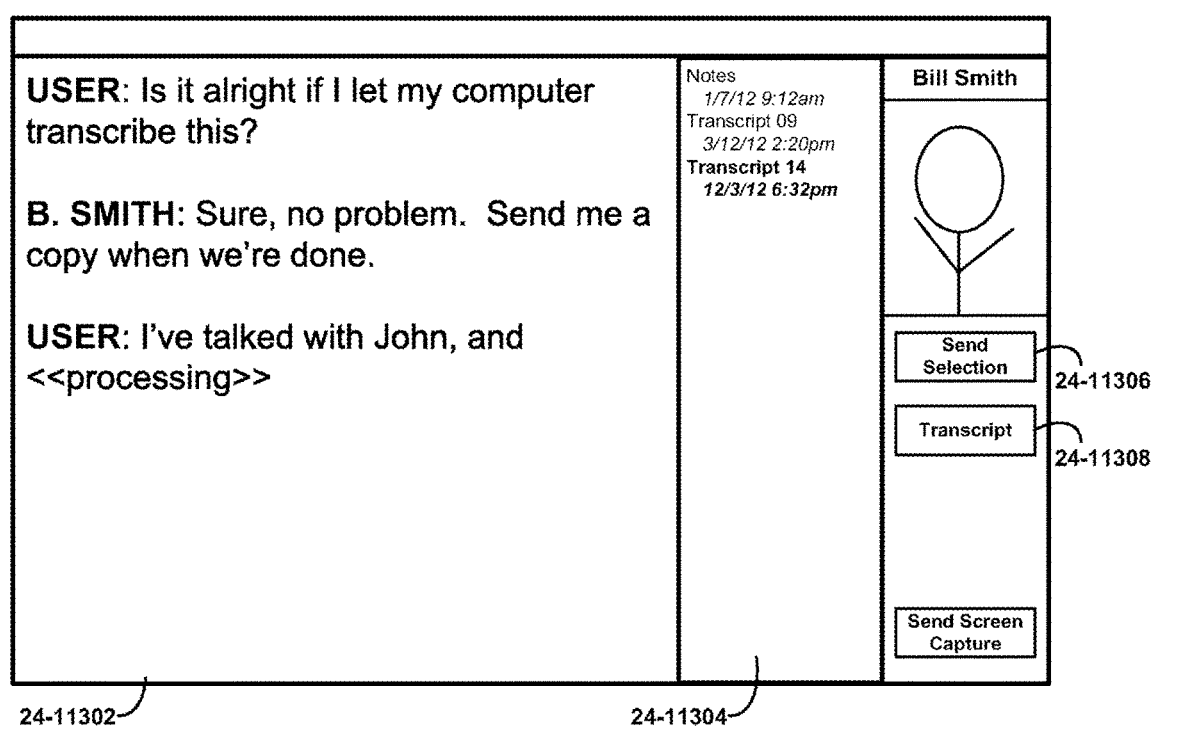
FIG. 24-113 shows a user interface for using a note application, in accordance with one embodiment.

FIG. 24-113 shows a user interface 24-11300 for using a note application, in accordance with one embodiment. As an option, user interface 24-11300 may be implemented in the context of the architecture and environment of the previous Figures or any subsequent Figure(s). Of course, however, user interface 24-11300 may be implemented in any desired environment. It should also be noted that the aforementioned definitions may apply during the present description.

In various embodiments, user interface 24-11300 may be used to operate a note taking application in conjunction with an ongoing or recently terminated communication. Specifically, user interface 24-11300 may be used in conjunction with a voice call or video conference which is in progress, or has recently ended. In some embodiments, user interface 24-11300 may be available for a limited amount of time after a voice call or video conference has ended. In other embodiments, this use interface may be accessible, and utilized with respect to the previous communication, when accessed through an interface directly related to said communication (e.g. phone interface, video conference interface, an integrated phone interface, etc.).

In various embodiments, user interface 24-11300 may include a document 24-11302 which allows the user to enter notes or other information. In some embodiments, document

24-11302 may be purely text based. As an option, the document may support rich text (e.g. stylized, etc.). In other embodiments, document 24-11302 may be a mixture of graphics and text. For example, in one embodiment, a user may enter text via various methods, as well as draw directly on the touchscreen of a tablet, or using some other touch-based input device, or using a cursor-based input device. In another embodiment, the note application may employ handwriting recognition, converting a users handwritten notes into proper text.

In various embodiments, user interface 24-11300 may include a list of documents 24-11304. In some embodiments, this list may be nested, allowing some form of hierarchical organization for the documents described within.

In various embodiments, user interface 24-11300 may include a button 24-11306 which allows a user to send a selected object to one or more communication participants. Objects which may be sent may include, but are not limited to, a portion of text or graphics selected within document 24-11302, and one or more documents selected from within document list 24-11304.

In various embodiments, user interface 24-11300 may include a button 24-11310 which creates a transcript of the ongoing communication using speech recognition technology. In one embodiment, a transcript may be made automatically for every call, but is only recorded after an explicit request from the user. In another embodiment, the transcription process may only begin after the user has made an explicit request. In some embodiments, communication participants may be automatically informed regarding the creation of a recording and/or a transcript of the conversation.

In some embodiments, the created transcript may also incorporate the original audio of the communication. In one embodiment, the audio may be correlated with the individual words of the transcript, such that the user may easily hear the audio associated with a particular part of the transcript through a simple interaction (e.g. tap, click, etc.). Furthermore, in one embodiment, there may exist a mechanism for the user to easily correct transcription errors by interacting with one or more words within document 24-11302. In another embodiment, the degree of confidence in a transcription may be reflected in the style of text within document 24-11302. In other words, a user may have a visual indication whether the transcription system is confident in the present interpretation of a particular word or words. This may assist a user in finding and correcting transcription errors.

Figures 25, 114:
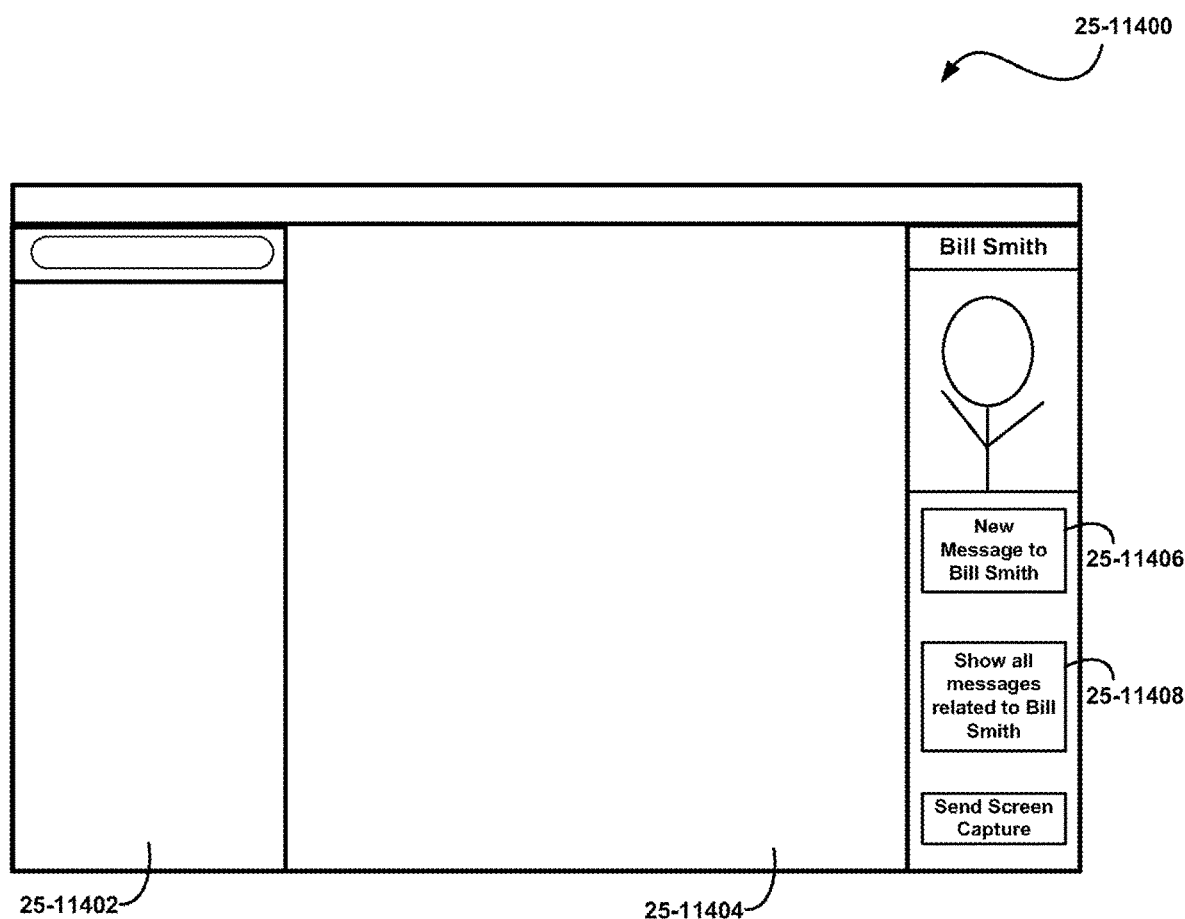
FIG. 25-114 shows a user interface for using an email application, in accordance with one embodiment.

FIG. 25-114 shows a user interface 25-11400 for using an email application, in accordance with one embodiment. As an option, user interface 25-11400 may be implemented in the context of the architecture and environment of the previous Figures or any subsequent Figure(s). Of course, however, user interface 25-11400 may be implemented in any desired environment. It should also be noted that the aforementioned definitions may apply during the present description.

In various embodiments, user interface 25-11400 may be used to operate an email application in conjunction with an ongoing or recently terminated communication. Specifically, user interface 25-11400 may be used in conjunction with a voice call or video conference which is in progress, or has recently ended. In some embodiments, user interface 25-11400 may be available for a limited amount of time after a voice call or video conference has ended. In other embodiments, this user interface may be accessible, and utilized with respect to the previous communication, when accessed through an interface directly related to said communication (e.g. phone interface, video conference interface, an integrated phone interface, etc.).

In one embodiment, user interface 25-11400 may include a list 25-11402 of emails, email accounts, and/or mailboxes. Furthermore, in one embodiment, user interface 25-11400 may include a window 25-11404 for displaying the contents of an email selected from list 25-11402.

In various embodiments, user interface 25-11400 may include a button 25-11406 for creating a new email message addressed to one or more communication participants. In one embodiment, the message may be address to all communication participants, by default. In another embodiment, the user may be prompted to select which participants should receive the message. In yet another embodiment, the user may be notified if there are any communication participants for which an email address is unknown. As an option, the user may have an opportunity to enter an email address for said participants. Upon receipt of said addresses, the user may be prompted whether they wish to create or update an address book record for that particular communication participant.

In various embodiments, user interface 25-11400 may include a button 25-11408 for causing the display of all messages related to one or more communication participants. In some embodiments, the user may be prompted to select one or more communication participants to use as a selection criteria. In other embodiments, all communication participants may be used as a default selection criteria. In one embodiment, user interface 25-11400 may display all messages related to one or more communication participants. In another embodiment, the user interface may only display messages which are related to all communication participants. As an option, the user may further narrow the selection criteria by specifying a date range, a text search, and/or any other search constraint.

Figures 26, 115:
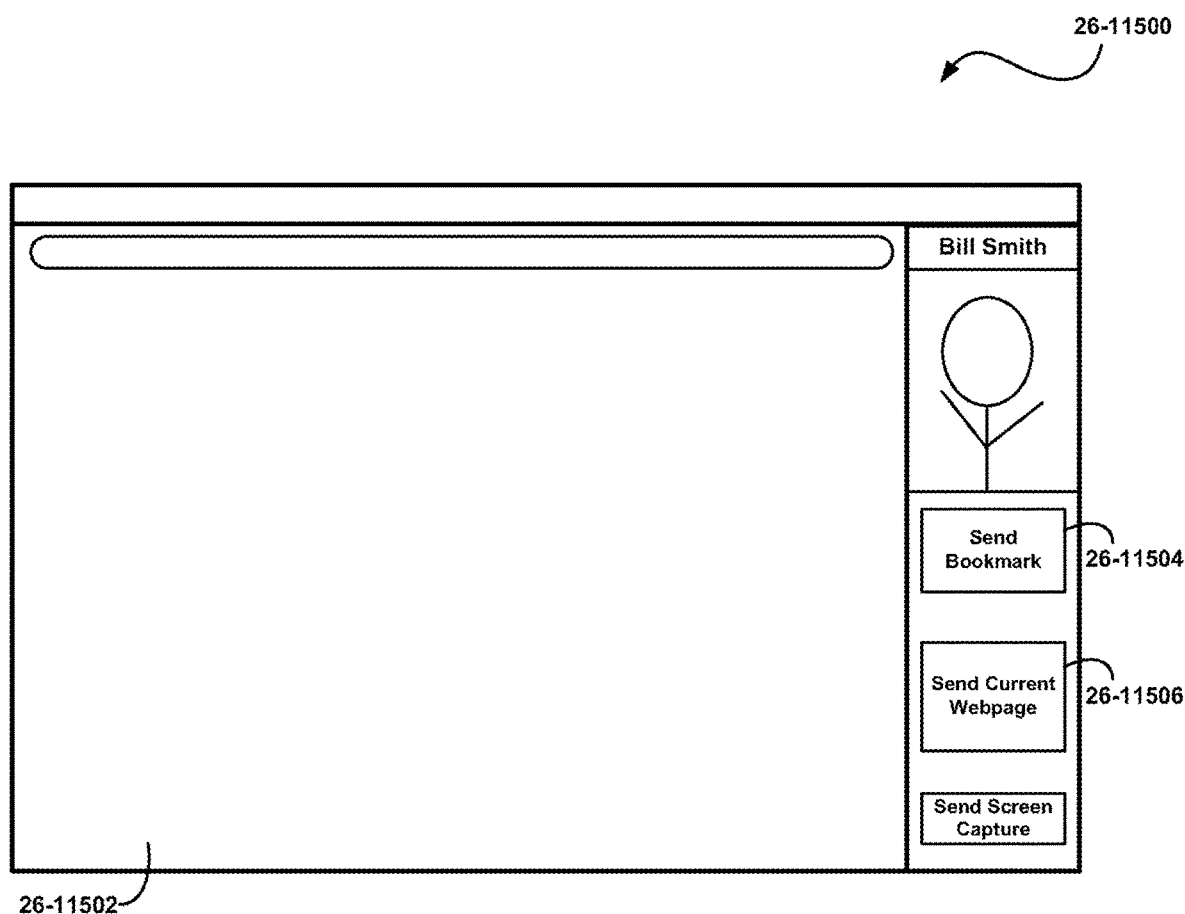
FIG. 26-115 shows a user interface for using a web browser application, in accordance with one embodiment.

FIG. 26-115 shows a user interface 26-11500 for using a web browser application, in accordance with one embodiment. As an option, user interface 26-11500 may be implemented in the context of the architecture and environment of the previous Figures or any subsequent Figure(s). Of course, however, user interface 26-11500 may be implemented in any desired environment. It should also be noted that the aforementioned definitions may apply during the present description.

In various embodiments, user interface 26-11500 may be used to operate a web browser application in conjunction with an ongoing or recently terminated communication. Specifically, user interface 26-11500 may be used in conjunction with a voice call or video conference which is in progress, or has recently ended. In some embodiments, user interface 26-11500 may be available for a limited amount of time after a voice call or video conference has ended. In other embodiments, this user interface may be accessible, and utilized with respect to the previous communication, when accessed through an interface directly related to said communication (e.g. phone interface, video conference interface, an integrated phone interface, etc.).

In various embodiments, user interface 26-11500 may include a browser window 24-11302, which may be used to view webpages. In one embodiment, browser window 24-11302 may operate as a normal web browser, including the use of bookmarks.

In various embodiments, user interface 26-11500 may include a button 26-11504 for sending one or more bookmarks to one or more communication participants. For example, in one embodiment, the user may be prompted to select one or more web bookmarks to send to communication participants. In some embodiments, the user may select which of the communication participants will receive the bookmarks. In other embodiments, the selected bookmarks may be sent to all communication participants. Furthermore, in various embodiments, user interface 26-11500 may include a button 26-11506 for sending the URL of the webpage currently being viewed in browser window 26-11502.

In various embodiments, bookmarks and/or other URLs may be sent to communication participants using various methods. For example, in one embodiment, bookmarks and URLs may be sent to communication participants using a text-based form of message, such as email or SMS. In another embodiment, bookmarks and URLs shared through user interface 26-11500 may be automatically presented to the communication participants in a new browser window.

Figures 27, 116:
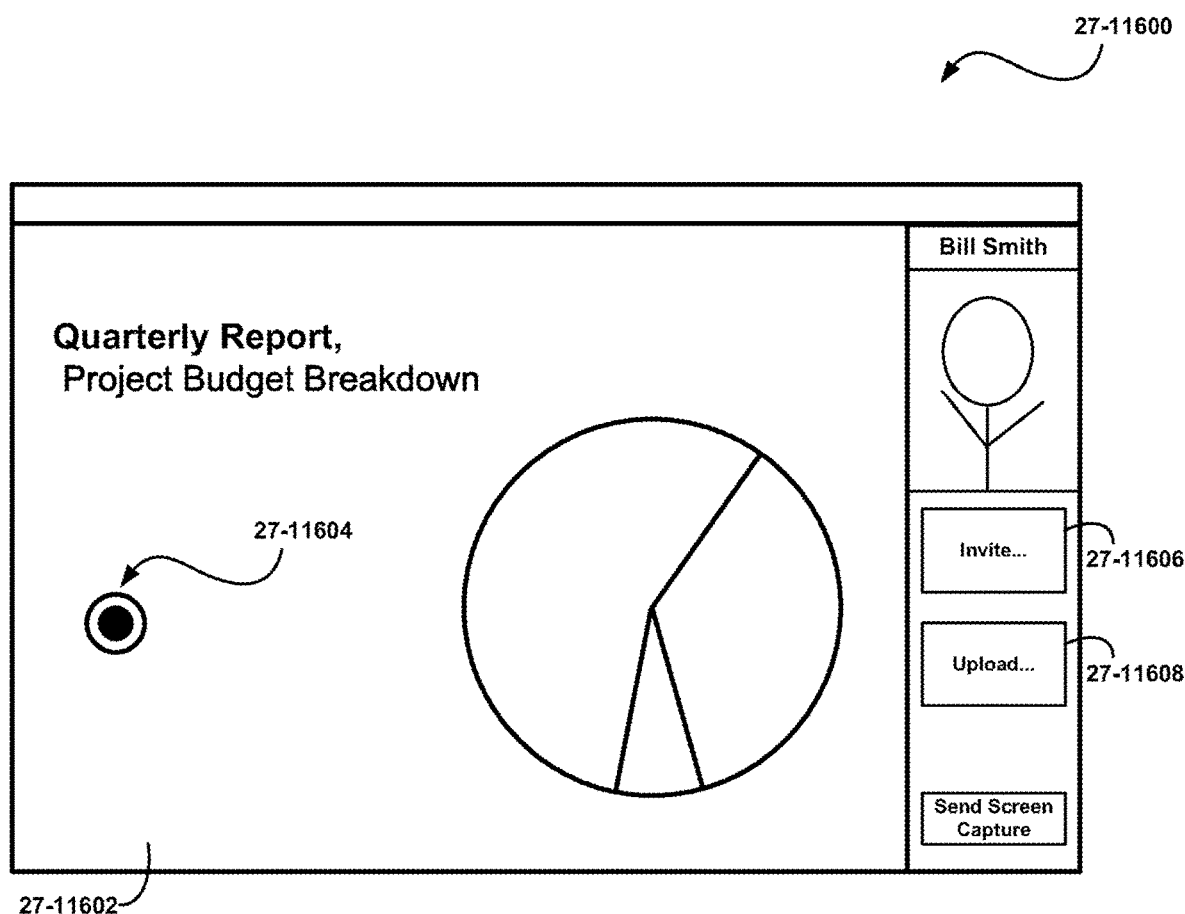
FIG. 27-116 shows a user interface for using a shared workspace, in accordance with one embodiment.

FIG. 27-116 shows a user interface 27-11600 for using a shared workspace, in accordance with one embodiment. As an option, user interface 27-11600 may be implemented in the context of the architecture and environment of the previous Figures or any subsequent Figure(s). Of course, however, user interface 27-11600 may be implemented in any desired environment. It should also be noted that the aforementioned definitions may apply during the present description.

In various embodiments, user interface 27-11600 may be used to operate a shared workspace in conjunction with an ongoing or recently terminated communication. Specifically, user interface 27-11600 may be used in conjunction with a voice call or video conference which is in progress, or has recently ended. In some embodiments, user interface 27-11600 may be available for a limited amount of time after a voice call or video conference has ended. In other embodiments, this user interface may be accessible, and utilized with respect to the previous communication, when accessed through an interface directly related to said communication (e.g. phone interface, video conference interface, an integrated phone interface, etc.).

In various embodiments, user interface 27-11600 may include a shared workspace 27-11602. In one embodiment, shared workspace 27-11602 may allow all communication participants to view and interact with a workspace hosted by an individual. In another embodiment, shared workspace 27-11602 may allow all communication participants to view and interact with a workspace hosted on an external server. In some embodiments, shared workspace 27-11602 may allow all communication participants to view and interact with an application being executed by one participant. In other embodiments, shared workspace 27-11602 may allow all communication participants to execute the same application, allowing them to view and modify the same document simultaneously.

As shown, shared workspace 27-11602 may include a cursor 27-11604, in accordance with one embodiment. In some embodiments, each participant may be associated with a visually distinct cursor. In this way, participants may draw attention to elements displayed within shared workspace 27-11602. Furthermore, this may allow participants to understand who is performing what action on a shared document within shared workspace 27-11602.

In various embodiments, user interface 27-11600 may include a button 27-11606 for inviting one or more communication participants to join a shared workspace. In one embodiment, this button may issue an invitation to all communication participants. In another embodiment, this button may allow the user to select which communication participants should be invited to join the shared workspace.

In various embodiments, user interface 27-11600 may include a button 27-11608 for uploading a document to a shared storage associated with shared workspace 27-11602. In this way, a user may make a document readily available to the other participants, for their review. In some embodiments, any document opened within shared workspace 27-11602 may be automatically uploaded to a shared storage. In one embodiment, the shared storage may be located on a cloud server. In another embodiment, the shared storage may be located on a device associated with one of the communication participants.

Figures 28, 117:
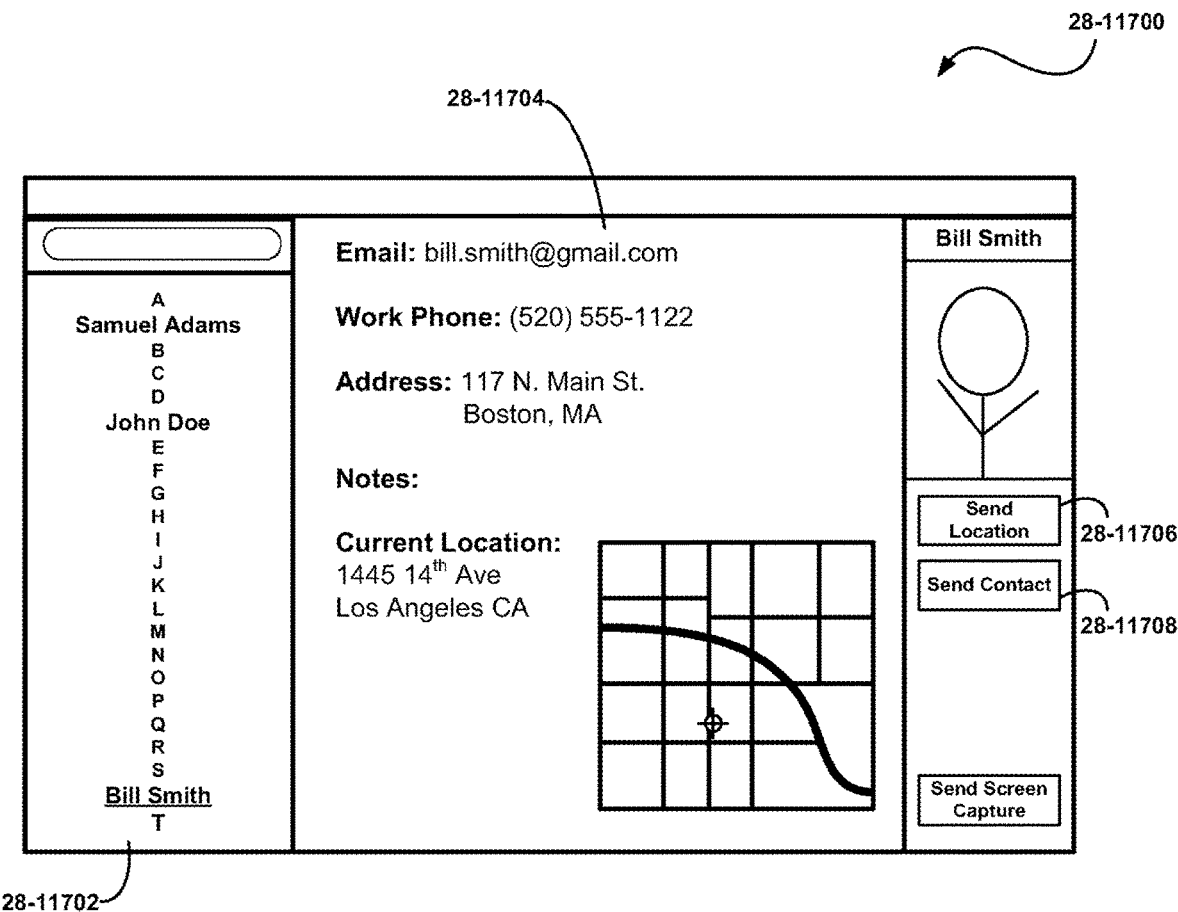
FIG. 28-117 shows a user interface for using an address book application, in accordance with one embodiment.

FIG. 28-117 shows a user interface 28-11700 for using an address book application, in accordance with one embodiment. As an option, user interface 28-11700 may be implemented in the context of the architecture and environment of the previous Figures or any subsequent Figure(s). Of course, however, user interface 28-11700 may be implemented in any desired environment. It should also be noted that the aforementioned definitions may apply during the present description.

In various embodiments, user interface 28-11700 may be used to operate an address book application in conjunction with an ongoing or recently terminated communication. Specifically, user interface 28-11700 may be used in conjunction with a voice call or video conference which is in progress, or has recently ended. In some embodiments, user interface 28-11700 may be available for a limited amount of time after a voice call or video conference has ended. In other embodiments, this user interface may be accessible, and utilized with respect to the previous communication, when accessed through an interface directly related to said communication (e.g. phone interface, video conference interface, an integrated phone interface, etc.).

In various embodiments, user interface 28-11700 may include a window 28-11702 which contains a list of contact records. In one embodiment, the names of contacts who are communication participants may be made visually distinct (e.g. different style, different size, different color, etc.). In another embodiment, a user may have the option of limiting the contact records listed in window 28-11702 to those associated with communication participants.

In various embodiments, user interface 28-11700 may include a window 28-11704 which displays the data associated with a selected contact record. In one embodiment, window 28-11704 may display data stored within a contact record, such as phone numbers, email addresses, street addresses, notes, and/or any other information concerning the contact. Furthermore, in one embodiment, window 28-11704 may also display data obtained from an external source, including, but not limited to, navigation data to a recorded address from the contact record, the current location of the contact obtained from a social geolocation service, the current record for the contact's address and/or present location, and the travel time and/or distance from the user's present location to the contact's present location. In the case that the user does not have permission to receive the contact's current location, window 28-11704 may include a button which allows the user to request permission to access the contact's location data.

In various embodiments, user interface 28-11700 may include a button 28-11706 which may be used to send the user's present location to one or more communication participants. In some embodiments, button 28-11706 may be used to send permission to one or more communication participants to access the user's location through a social geolocation service.

In other embodiments, button 28-11706 may be used to send the user's current location to one or more communication participants in the form of a message (e.g. email, SMS, etc.). For example, in one embodiment, button 28-11706 may send a message containing the user's current street address. As an option, said message may include a link to a mapping service which would provide directions to the user's current location.

In various embodiments, user interface 28-11700 may include a button 28-11706 which may be used to send one or more selected contact records to one or more communication participants. In one embodiment, the contact records may be sent through a message, utilizing a standardized file format, such as vCard.

Figures 29, 118:
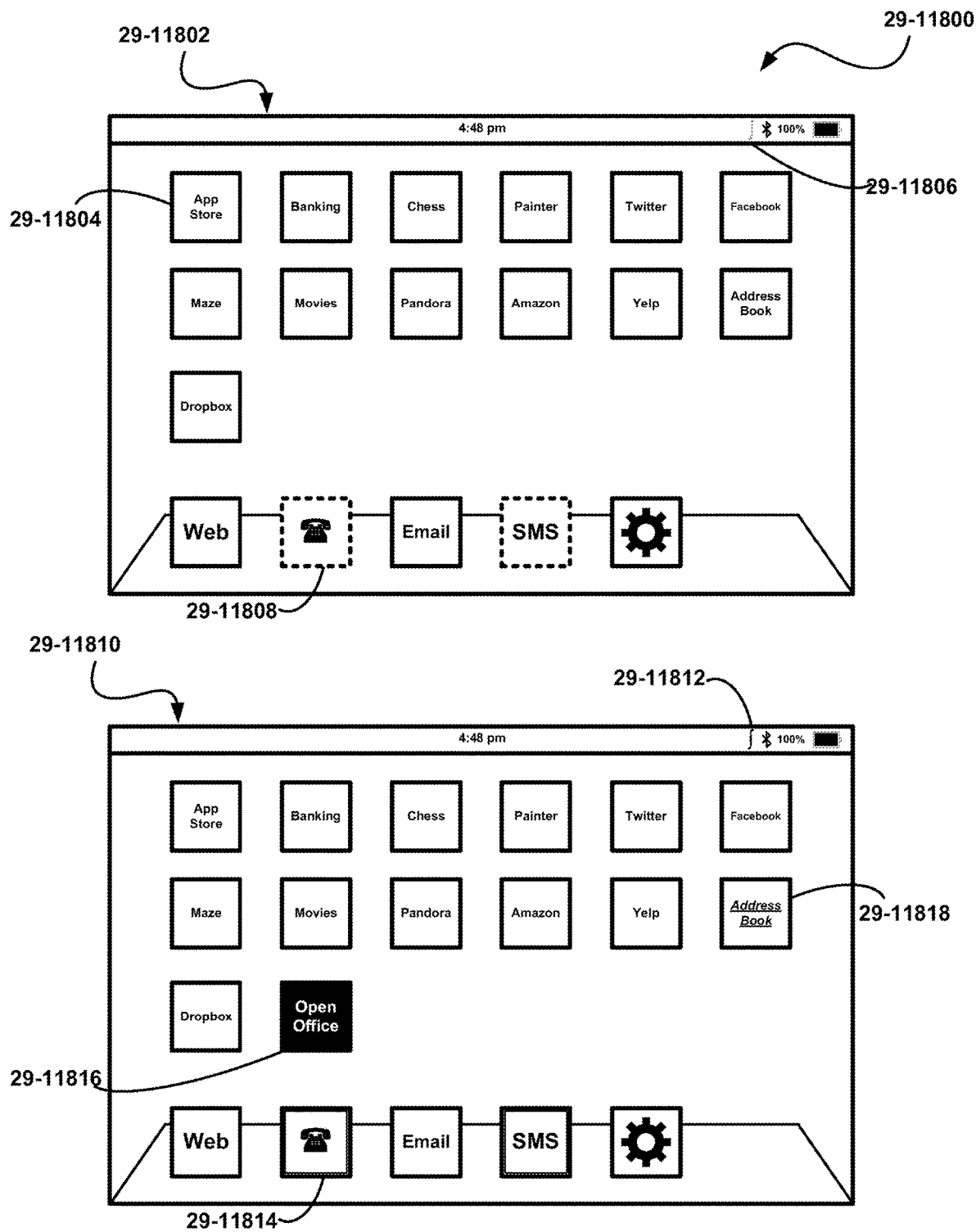
FIG. 29-118 shows a plurality of user interfaces for launching applications, in accordance with one embodiment.

FIG. 29-118 shows a plurality of user interfaces 29-11800 for launching an application, in accordance with one embodiment. As an option, the plurality of user interfaces 29-11800 may be implemented in the context of the architecture and environment of the previous Figures or any subsequent Figure(s). Of course, however, the plurality of user interfaces 29-11800 may be implemented in any desired environment. It should also be noted that the aforementioned definitions may apply during the present description.

Integration allows a user to harness the resources of two devices through a single interface (which may be spread across multiple displays). In some embodiments, the presence or absence of the additional resources provide through integration may be reflected by various aspects of the user interface. For example, in some embodiments, the home screen, or application launcher, may reflect the consequences of integration.

In various embodiments, the plurality of user interfaces 29-11800 illustrate how a home screen may change depending upon whether or not a device is integrated. For example, in one embodiment, user interface 29-11802 may be used to launch applications in the absence of an integration. Furthermore, in one embodiment, the lack of integration may be indicated by the appearance of the integration status icon 29-11806 located in a status bar.

In one embodiment, user interface 29-11802 may contain a plurality of buttons, such as button 29-11804, which may be used to launch applications. As an option, one or more of these application buttons may be located in a dock (e.g. application button 29-11808, etc.), or a designated portion of the user interface which is more accessible to the user than other locations.

In various embodiments, user interface 29-11802 may contain one or more application buttons which are disabled because they are associated with functionality not available in the absence of an integration. For example, in one embodiment, tablet user interface 29-11802 may contain phone button 29-11808, which is disabled due to a lack of a local cellular modem or integration with a phone.

In some embodiments, applications which are not available due to the lack of an integration may still be visible, yet visually distinct from operational applications. In other embodiments, unavailable applications may be hidden from view until they become operational through an integration. As an option, the reappearance of the buttons associated with said applications may cause other buttons to shift in position, restoring the organization that existed during previous integrations.

In still other embodiments, the visibility of unavailable application buttons may depend upon their location. For example, in one embodiment, buttons for unavailable applications located in a dock (such as button 29-11808) may remain visible, while buttons located elsewhere may be hidden. In this way, the user may have a predictable application dock.

Upon integration, the user interface for launching applications may change to reflect the additional resources now available. For example, see user interface 29-11810. In one embodiment, user interface 29-11810 may reflect the existence of an integration in a number of ways, including the appearance of integration status icon 29-11812.

An integration between a tablet and phone may provide functionality not available on the tablet alone. In various embodiments, user interface 29-11810 may include buttons such as button 29-11814, which is for launching a phone application, which makes use of the integrated phone. Another example may be a SMS messaging application. In some embodiments, this button may be visually distinct (e.g. double frame, etc.) from application buttons associated with applications local to the tablet device, indicating that it is making use of integrated hardware. Additionally, a different appearance will remind the user that upon disintegration, this application button may become disabled, or disappear altogether, in accordance with various embodiments.

An integration between a tablet and a phone may result in one or more applications being transferred from the phone to the tablet as part of a live migration. In various embodiments, user interface 29-11810 may include buttons such as button 29-11816 for launching or making active an application which is running on the tablet as part of a virtual machine or virtual application. In some embodiments, each application which was migrated from one device to another as part of an integration may be incorporated into the local application launching interface as visually distinct (e.g. inverted color, etc.) application buttons. In this way, a user may be made aware that this application is not native to the tablet device. In one embodiment, virtual application buttons such as 29-11816 may be placed in a predefined area within an application launching interface. In another embodiment, virtual application buttons may be placed in the next available spot within the organizational scheme of an application launcher.

An integration between a tablet and a phone may result in the aggregation of data stored on both devices. In various embodiments, user interface 29-11810 may include buttons such as button 29-11818, which are visually distinct (e.g. style of application name, etc.) from other application buttons, to indicate that they have access to aggregated data as part of the integration. As a specific example, if it is determined that both the phone and the tablet contain address book data, and the sets are not identical (indicating that an aggregation may represent a superior set of data), the address book application button may have a different appearance than it does when the tablet is used by itself.

In some embodiments, launching an application which has access to new information through the integration may result in the user being able to use the application with the aggregated set of data without altering the data stored on either device. In other embodiments, the user may be notified that there are differences between the two data sets, and may be prompted to choose whether to synchronize the two data sets.

In some embodiments, application buttons, such as button 29-11818, may be visually distinct because they have access to additional information through the integration. In other embodiments, this visual distinction may be given to the buttons of applications which may make use of integrated hardware (e.g. camera, audio equipment, etc.).

A few examples have been given of ways to make buttons associated with applications visually distinct. Other examples may include, but are not limited to, variations in color saturation, some form of animation (e.g. pulsing, etc.), and/or any other method of modifying the appearance of an application button without overly obscuring the identity of the associated application.

Figures 30, 119:
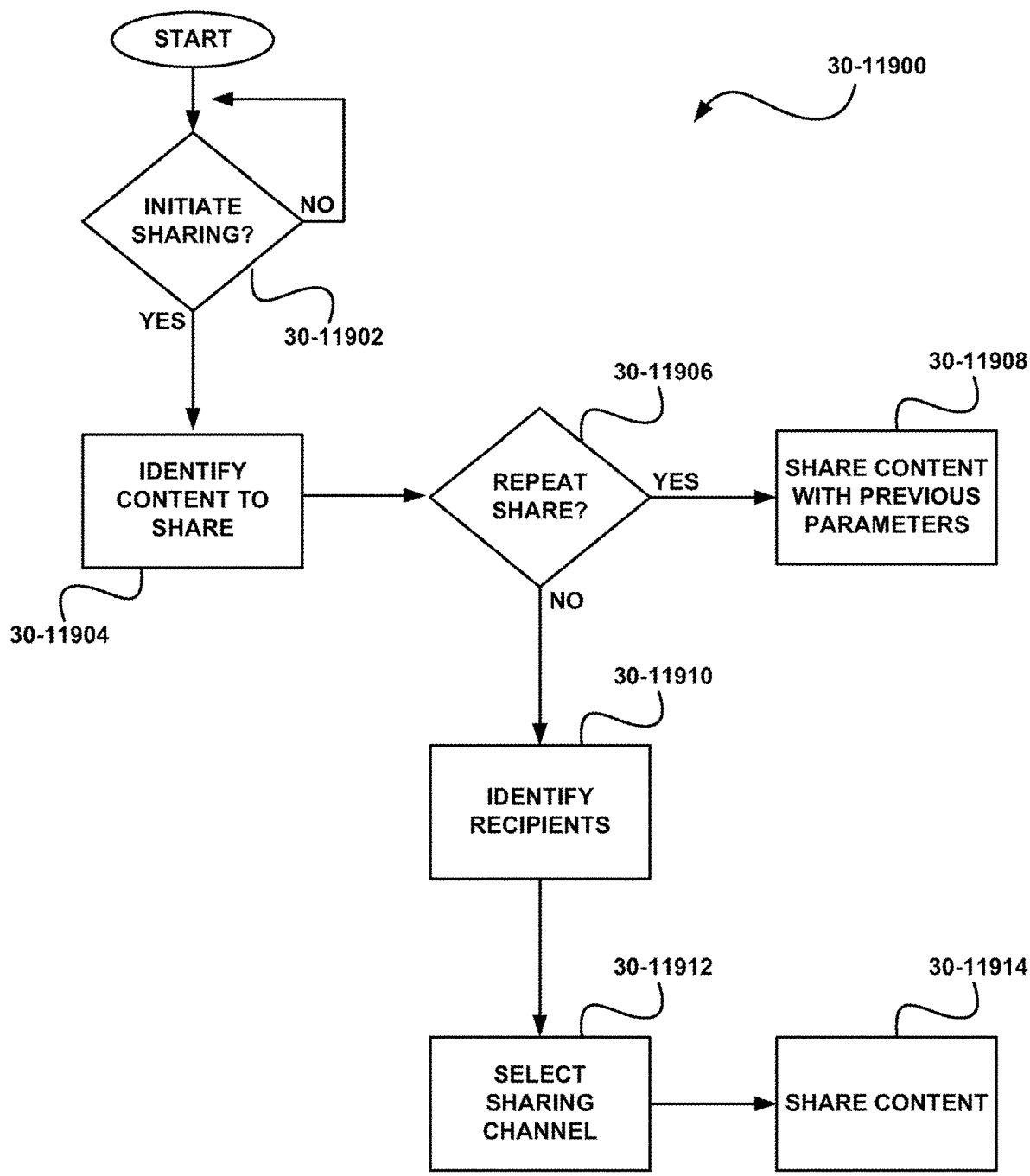
FIG. 30-119 shows a method for sharing content, in accordance with one embodiment.

FIG. 30-119 shows a method 30-11900 for sharing content, in accordance with one embodiment. As an option, the method 30-11900 may be implemented in the context of the architecture and environment of the previous Figures or any subsequent Figure(s). Of course, however, the method 30-11900 may be implemented in any desired environment. It should also be noted that the aforementioned definitions may apply during the present description.

The integration of a tablet device and a phone device may combine a phone's ability to communicate with a tablet's ability to display more content. In many cases, a user may wish to share content from one of the devices with one or more individuals while (or after) communicating with them. In various embodiments, method 30-11900 may be utilized to share content with individuals with whom a user is currently, or was previously, communicating, hereinafter referred to as communication participants.

As shown, it is determined whether to initiate the sharing of content. See determination 30-11902. In various embodiments, sharing may be initiated by the user. For example, in one embodiment, the sharing of content may be initiated in response to a user interaction with a sharing widget, button, or some other kind of user interface element. As an option, said widget or button may be located in a status bar, typically located unobtrusively alone one edge of a device display. In another embodiment, the sharing of content may be initiated in response to some form of user input, including, but not limited to, a multitouch gesture, a key combination, a voice command, accelerometer input, and/or any other form of user input.

In one embodiment, sharing may be initiated through a content-handling system which may be part of the device operating system. In the context of the present description, content handling system refers to a method and user interface which may be provided by an operating system or application for manipulating, viewing, and/or transmitting content. An example of a content-handling system may be an interface which pops up, prompting the user to select an application to use to open selected content (e.g. "open with . . . ", etc.). Another example is a system which allows a user to send content directly to a communication application or service, to be attached to a communication (e.g. an interface which gives options such as "Email to . . . ", "Post to Facebook", "Post to Twitter", etc.).

In one embodiment, sharing may be initiated automatically. For example, in one embodiment, a device, or a pair of integrated devices, may monitor an ongoing communications (e.g. voice call, video conference, etc.) for contextual clues that the sharing of content may be desired. As a specific example, in one embodiment, the sharing of content may be initiated automatically when one of the communication participants is heard to say "can you send . . . ", or "can you email me/us . . . ", immediately followed by a response from the user.

In one embodiment, sharing may be initiated automatically, based upon previously observed user behavior. For example, in one embodiment, if a user has previously shared content in relation to a communication, they may be prompted with the option to do so in identical, or similar, future scenarios. In another embodiment, sharing may be initiated based upon previous behavior without prompting the user for confirmation before content is selected.

If it is determined that sharing should be initiated, the content to be shared is then identified. See operation 30-11904. In some embodiments, the user may designate the content to be shared in one or more ways. For example, in one embodiment, the user may drag a piece of content, or an iconic representation of content, over to a user interface element operable to receive such objects. Examples of such user interface elements may include, but are not limited to, a sharing widget (e.g. status bar icon, etc.), a button, a predefined portion of the display, an iconic representation of one or more communication participants (e.g. contact photos, etc.).

In one embodiment, the user may designate the content to be shared by making an active selection through a user interface. In the context of the present description, an active selection refers to a portion of content which has been designated by the user as a target for a subsequent operation (e.g. cut, copy, clear, style change, etc.). In some embodiments, an active selection may be visually distinct from other content being displayed (e.g. framed within a border, shaded, animated, etc.).

In various embodiments, a user may make an active selection for the purpose of sharing content in a variety of ways. For example, in one embodiment, a user may select content to share by surrounding it with a bounding box created with a dragging user interaction (e.g. click and drag, touch and drag, etc.). In another embodiment, a user may select content to share by drawing a boundary around the desired content, either with a touch-based interaction or a cursor-based interaction. In some embodiments, a user may select content to share using the same selection method (and corresponding user interface elements and conventions) used to cut or copy content.

In various embodiments, default content may be shared if no other content has been selected by the user. In some embodiments, the user may select what content should be shared in the absence of further user selection. For example, the user may select a particular document, the current version of which will be shared in the absence of another content selection. In other embodiments, the user may not be able to change what content is shared by default, in the absence of a user selection. Other examples of potential default content to be shared may include, but are not limited to, a capture of one or more displays, an image captured from a camera associated with a device or integration, the user's contact info (e.g. vCard, etc.), and/or any other content.

In various embodiments, the content to be shared may be selected automatically. For example, in one embodiment, a device, or a pair of integrated devices, may monitor an ongoing communications (e.g. voice call, video conference, etc.) for contextual clues regarding what content would be the most appropriate to share. As a specific example, in one embodiment, content pertinent to an ongoing communication may be identified by searching for correlations between words, phrases, and numbers used in the communication and the content the user is able to share. In another embodiment, the search for a correlation may be limited to metadata associated with content (e.g. filename, modification date, etc.).

In one embodiment, content may be selected for sharing automatically, based upon previously observed behavior. For example, in one embodiment, if it has been observed that a particular piece of content, or a type of content, has been shared during communications with a certain set of participants, that content, or type of content, may be automatically selected for sharing during, or after, communications with the same set of participants. In another embodiment, the user may be presented with one or more pieces of content which may be potentially pertinent to an ongoing or previous communication, based upon one or more criteria. Possible criteria for identifying potentially pertinent content includes, but is not limited to, documents or other content that the user has recently accessed or modified (e.g. the closer in time to the communication, the more potential for pertinence, etc.), sources of documents or other content (e.g. was it previously received from one of the communication participants, etc.), the identity of the creator of a document or other content (e.g. did one of the communication participants create the content, etc.), the combination of any of these criteria, and/or any other criteria which may indicate the potential relevance of a piece of content.

In some embodiments, content may be automatically selected, or the user may be presented with a selection of content automatically identified, every time sharing is initiated. In other embodiments, the automatic selection of content may be performed only in the absence of an explicit user selection of content (e.g. automatic selection may be the default, etc.).

In some embodiments, the user may be informed of what content has been automatically selected for sharing. In other embodiments, the user may be required to confirm the results of the automatic selection before the content is shared.

After the content to share has been identified, it is then determined whether to perform the sharing using parameters previously used to share content. See determination 30-11906. In the case where a user wishes to share content in conjunction with a communication more than once, it may be beneficial to be able to quickly perform a sharing without having to redefine the sharing parameters. Sharing parameters may include, but are not limited to, the identity of recipients, the method of transmission, and/or any other parameter associated with the sharing of content.

In various embodiments, previously utilized sharing parameters may be used again in response to a user interaction. Examples of possible triggering user interactions include, but are not limited to, extended interactions (e.g. touch and hold, click and hold, etc.), alternative interactions (e.g. right click, etc.), multitouch gestures, key combinations, voice commands, and/or any other form of user interaction or input.

In various embodiments, previously utilized sharing parameters may be used again based upon the context of sharing. For example, in one embodiment, if a user has already shared content during an ongoing communication, subsequent sharing initiated during that communication may automatically utilize the same sharing parameters. Furthermore, in various embodiments, previously utilized sharing parameters may be used again automatically, based upon contextual clues obtained from an ongoing communication.

If it is determined that previous sharing parameters should be used, then the identified content is shared utilizing previous sharing parameters. See operation 30-11908. In some embodiments, the sharing parameters of the last sharing may be used. In other embodiments, the sharing parameters from the last time content was shared with the same set of communication participants may be used.

If it is determined that reusing a previous set of sharing parameters would not be appropriate, the user may be prompted to define a new set of sharing parameters. As shown, sharing recipients are identified. See operation 30-11910. In one embodiment, sharing may be automatically directed at all communication participants. In another embodiment, the user may be prompted to choose from participants of ongoing or previous communications.

In various embodiments, sharing recipients may be selected automatically. For example, in one embodiment, a device, or a pair of integrated devices, may monitor an ongoing communications (e.g. voice call, video conference, etc.) for contextual clues that the sharing of content may be desired. As a specific example, in one embodiment, a recipient may be selected automatically when one of the communication participants is heard to say "can you send me . . . ", or "can you send Bill . . . ", followed by an affirmative response from the user.

In various embodiments, sharing recipients may be selected automatically, based upon previously observed user behavior. For example, in one embodiment, if it has been observed that every time content is shared with a particular recipient, it is also shared with another recipient, or some other action is taken (e.g. a copy placed in cloud storage, etc.), similar action may be taken automatically in subsequent instances of sharing. As an option, the user may be notified of such an automatic action, and be given an opportunity to intervene.

As shown, the sharing channel is identified. See operation 30-11912. In the context of the present description, a sharing channel refers to a method of sending content from the user to one or more recipients, or making said content available to one or more recipients. Possible sharing channels may include, but are not limited to, email, SMS, FTP/SFTP, web server (e.g. WebDAV protocol, etc.), cloud storage (e.g. Dropbox, SugarSync, Amazon S3, etc.), social network, collaboration or project management service (e.g. Basecamp, etc.), BitTorrent or other peer-to-peer file sharing, LAN/intranet file sharing (e.g. AFP-based, SMB-based, etc.), and/or any other method, protocol, server, or service which may be used to share content from one party to one or more other parties.

In some embodiments, the content shared with multiple recipients may be sent to all recipients through the same sharing channel. As an option, the user may be prompted to select the sharing channel when sharing is initiated. In other embodiments, different sharing channels may be used for different recipients. For example, in one embodiment, there may be defined a preferred sharing channel for each communication participants.

In some embodiments, a preferred sharing channel may be defined for a communication participant within a contact data record (e.g. it may be viewed and/or modified using an address book application, etc.). In other embodiments, a preferred sharing channel may be determined for each communication participant upon initiation of a communication. For example, in one embodiment, a user's system may automatically send a sharing channel request message to all communication participants; communication participants who are using a compatible communication system may send a response automatically, without requiring input from the communication participant, indicating a preferred sharing channel. In some embodiments, said determination may be performed at the start of every new communication. In other embodiments, said determination may be performed only in if the user's contact record for a communication participant does not contain a preferred sharing channel.

In various embodiments, a sharing channel request message may be sent and replied to using a variety of methods.

For example, in one embodiment, the message and response may be transmitted through an external server, such as a cloud server. In another embodiment, the message and response may be sent through other messaging channels, such as SMS. In yet another embodiment, the message and response may be sent through the audio channel of an ongoing communication (e.g. using tones outside the range of human hearing, frequency modulation, etc.). In some embodiments, if a preferred sharing channel is not known for a communication participant, or cannot be determined, a default sharing channel may be used.

In some embodiments, a sharing channel may be used to send content directly to a recipient. As a specific example, a file may be placed in the cloud storage of a recipient. In other embodiments, a sharing channel may be used to make content available to a recipient. As an option, the recipient may be sent a message directing them to the now-available content. As a specific example, a file may be placed in the cloud storage of the user, and a message may be sent to a recipient containing a URL which allows the recipient to download the file through a web browser. In some embodiments, a user may be able to define a message which is sent to recipients when such a sharing channel is used.

In some embodiments, a sharing channel may be selected automatically. For example, in one embodiment, a device, or a pair of integrated devices, may monitor an ongoing communications (e.g. voice call, video conference, etc.) for contextual clues indicating a desired sharing channel. As a specific example, in one embodiment, an email sharing channel may be selected automatically when one of the communication participants is heard to say "can you email that to me . . . ", or "email us . . . ", followed by an affirmative response from the user.

In various embodiments, a sharing channel may be selected automatically, based upon previously observed user behavior. For example, in one embodiment, if it has been observed that every time content is shared with a particular recipient, it is shared using a particular sharing channel, similar action may be taken automatically in subsequent instances of sharing. As an option, the user may be notified of such an automatic action, and be given an opportunity to intervene.

After one or more recipients have been identified, and one or more sharing channels have been selected, the content is shared. See operation 30-11914. In some embodiments, the content may be sent directly to a recipient. In other embodiments, the content may be made available, and a message is sent to a recipient instructing them how to obtain the content (e.g. a URL pointing to content stored in cloud storage, an IP address to an FTP server, etc.).

Method 30-11900 for sharing content may be adapted for sharing content in other contexts, in accordance with one embodiment. For example, it may be utilized in a integrated system, or using a single device. Furthermore, this method may be used in conjunction with communication between individuals in the same physical vicinity (e.g. a meeting, a party, a classroom, etc.), in accordance with one embodiment.

Figures 31, 120:
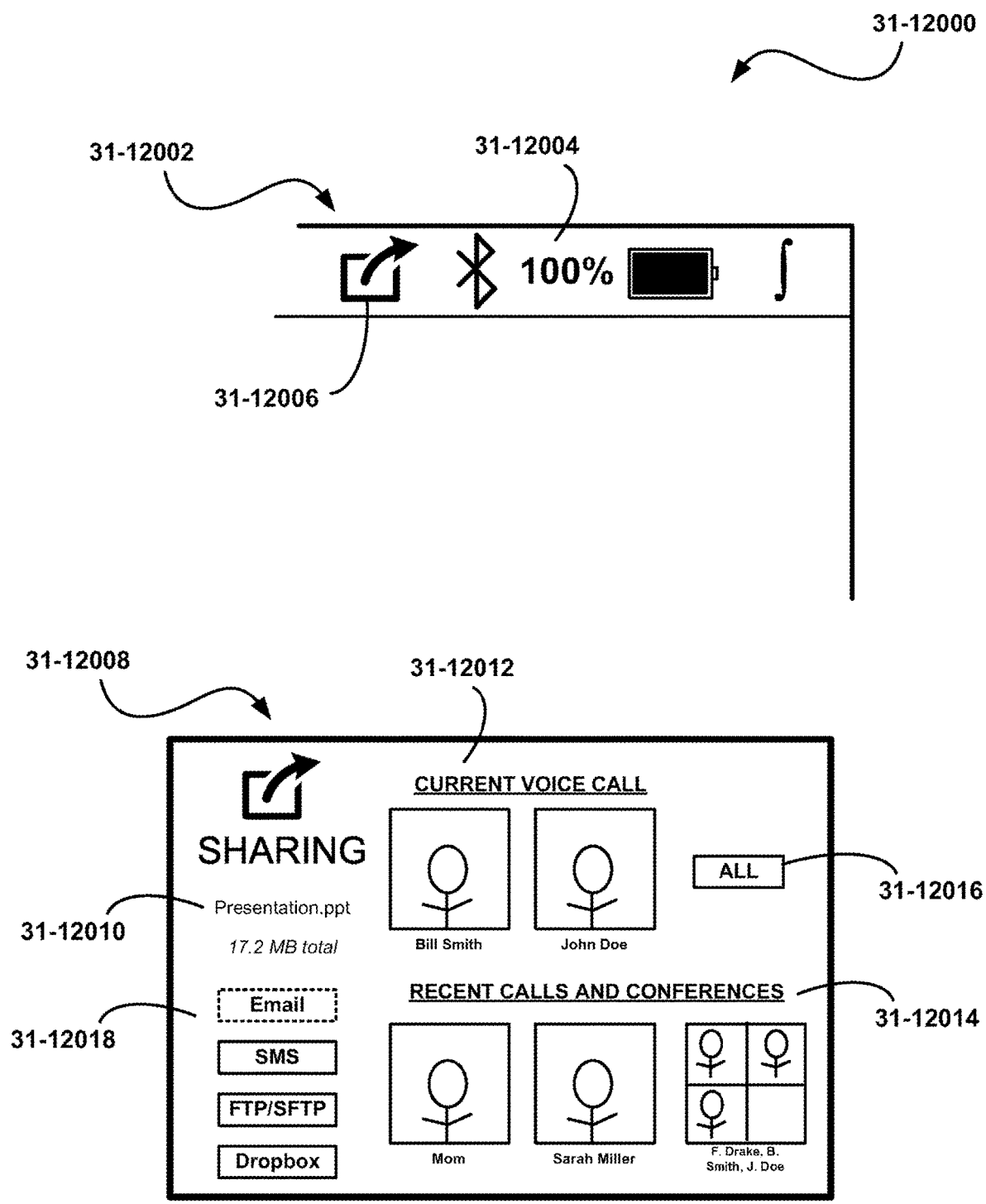
FIG. 31-120 shows a plurality of user interfaces for sharing content, in accordance with one embodiment.

FIG. 31-120 shows a plurality of user interfaces 31-12000 for sharing content, in accordance with one embodiment. As an option, the plurality of user interfaces 31-12000 may be implemented in the context of the architecture and environment of the previous Figures or any subsequent Figure(s). Of course, however, the plurality of user interfaces 31-12000 may be implemented in any desired environment. It should also be noted that the aforementioned definitions may apply during the present description.

The integration of a tablet device and a phone device may combine a phone's ability to communicate with a tablet's ability to display more content. In many cases, a user may wish to share content from one of the devices with one or more individuals while (or after) communicating with them. In various embodiments, the plurality of user interfaces 31-12000 may be used to share content with individuals with whom a user is currently, or was previously, communicating.

In various embodiments, user interface 31-12002 may be used to facilitate the sharing of content through interaction with a status bar 31-12004. For example, in one embodiment, status bar 31-12004 may include a sharing widget 31-12006, which provides easily accessed sharing functionality without overly disrupting the use of an application.

In various embodiments, a user may interact with sharing widget 31-12006 to share content. For example, in one embodiment, a user may drag an object (e.g. text selection, image, document in iconic form, etc.) to the widget to initiate a sharing procedure. As an option, there may exist an API which would allow developers to include this drag-and-drop sharing functionality within an application.

In another embodiment, a user may select an object using a standard selection interaction, and then interact with (e.g. tap, click, etc.) sharing widget 31-12006 to initiate a sharing procedure. In this way, all applications which support basic cut/copy/paste functionality (i.e. content can be selected before performing an operation) may be compatible with this method of sharing content, without any additional coding. As an option, interacting with the sharing widget when nothing is selected may trigger a screen capture, the resulting image becoming the content to be shared.

In some embodiments, a user may initiate the same or similar sharing process through a pre-existing sharing functionality. For example, in one embodiment, applications which make use of an operating system-based sharing mechanism (e.g. "email to . . . ", "Post to Facebook", "Post to Twitter", etc.) may provide additional options when used in the context of an ongoing or recently terminated communication. As an option, the user may utilize said sharing mechanism to access a user interface which provides additional options, such as user interface 31-12008.

In various embodiments, interacting with a sharing widget, or selecting an appropriate option within a system-wide sharing mechanism, may result in the display of user interface 31-12008. As shown, user interface 31-12008 may include a text field 31-12010 which describes the content being shared, in accordance with one embodiment. The content description may include, but is not limited to, a file name, a file size, a file type and/or name of associated application, a creation date, a modification date, dimensions of an image, metadata (e.g. notes, EXIF data, etc.), and/or any other descriptive information. In some embodiments, text field 31-12010 may be accompanied by one or more images, which may include, but are not limited to, a file icon, a creating application icon, a thumbnail preview of the content, and/or any other graphical representation of the content or descriptive data. In some embodiments, multiple pieces of content may be listed, and shared.

In various embodiments, user interface 31-12008 may provide the user with one or more choices of destinations for the selected content. For example, in one embodiment, user interface 31-12008 may include one or more buttons 31-12012 which represent the participants of an ongoing communication (e.g. voice call, video conference, etc.). These buttons may be grouped under a label indicating the nature of the ongoing activity (e.g. "Current Voice Call", etc.), a label which may change depending on the nature of the communication. In one embodiment, the buttons may bear the image of the communication participant they represent, or an icon if no image is available. Furthermore, in one embodiment, the buttons may be labeled with the communication participants name, or some other identifier (e.g. phone number, IP address, communication origination city, etc.) if a name is not known.

In one embodiment, a user may select only one button representing a communication participant. In another embodiment, a user may select multiple buttons. For example, one interaction (e.g. tap, click, etc.) may select the button, and a second interaction may deselect the button.

In various embodiments, user interface 31-12008 may include one or more buttons 31-12014 which represent the participants of previous communications. For example, in one embodiment, these buttons may represent all communications made within a certain time period (e.g. the last 3 hours, etc.). In another embodiment, buttons 31-12014 may represent the most recent communications, independent of how long ago they took place.

In various embodiments, buttons 31-12014 may bear the image of all participants (other than the user) of a particular previous communication. In the case of a communication involving more than one other participant, the button may be segmented to contain images or iconic representations of all other participants, in accordance with one embodiment. As an option, said images may spread out and expand in size in response to a user interacting with the button; the user may subsequently select the desired recipients of the content with further interactions, or may dismiss the expanded set of images with an interaction outside the boundary of the collection of representative images.

In various embodiments, buttons 31-12014 may be labeled with descriptive information. The descriptive labels of buttons 31-12014 may include, but are not limited to, the type of communication (e.g. voice call, video conference, etc.), the time and date that the communication took place, the duration of the communication, the names of the participants (e.g. full names, initials, abbreviated names, etc.), and/or any other descriptive information.

In one embodiment, user interface 31-12008 may include a button 31-12016 which allows the user to select all participants of the current communication with a single interaction. Furthermore, in one embodiment, all participants of the current communication may be selected by default. In another embodiment, the previously selected recipients may remain selected upon subsequent uses of user interface 31-12008, if the associated communication is still relevant (e.g. current, or recent enough to merit being listed, etc.).

In various embodiments, user interface 31-12008 may include a plurality of buttons 31-12018 which represent various sharing channels through which content may be shared. In some embodiments, the user may specify which sharing channels are represented by buttons 31-12018.

In one embodiment, one or more of the buttons 31-12018 may be disabled, if the associated sharing channel is not compatible with the content being shared. For example, the size of the content may exceed a limit imposed on a particular channel. Furthermore, in one embodiment, one or more of the buttons 31-12018 may be disabled if all of the selected recipients are unable to receive content through the associated channel(s). For example, the user may not have an email address for the selected participant(s). If the user has selected multiple recipients, and some, but not all, are not able to receive content through a particular sharing channel, the associated sharing channel button may be given a distinct appearance, or the user may be notified. The user may proceed with sharing the content through that channel, but will do so having been notified that one or more of the designated recipients will not receive it. As an option, the recipients who will not be able to receive the content may be indicated to the user, along with a prompt to verify the content should be shared through that channel.

Some sharing channels may require a method of addressing a recipient (e.g. email address, phone number for SMS, etc.). Other sharing channels may provide more flexibility. For example, in one embodiment, if a user elects to share selected content through a cloud storage service, said content may be sent directly to a shared directory associated with a recipient, said directory being noted in a contact record. If the user's records do not indicate a shared directory within cloud storage for a designated recipient, the content may be placed in the user's own cloud storage, and a link to the content may be sent through a channel which is available for said recipient (e.g. email, SMS, etc.). In addition to cloud storage, this flexibility may be achieved through other channels, including, but not limited to, FTP/SFTP servers, WebDAV servers, and/or any other sharing channel which may be linked to through a text-based message (e.g. a URL, an IP address, etc.) or an easily transmitted file (e.g. torrent, etc.).

In some embodiments, user interface 31-12008 may be presented to the user in response to every interaction with sharing widget 31-12006. In other embodiments, certain user interactions (e.g. press and hold, click and hold, right click, etc.) with the sharing widget may cause the selected/dragged content to be shared with the same recipients and through the same channel as was the last content which was shared. In this way, after the first instance of content sharing during an ongoing communication, subsequent content sharing with those individuals will require less effort. In some embodiments, if there is insufficient information to share content with any of the ongoing or previous communication participants through any sharing channel, sharing widget 31-12006 may be disabled.

As discussed previously, these methods and interfaces for sharing content may be adapted for sharing content in other contexts, in accordance with one embodiment. For example, they may be used in conjunction with communication between individuals in the same physical vicinity (e.g. a meeting, a party, a classroom, etc.). Said sharing may be accomplished using peer-to-peer wireless networking, such as Wi-Fi direct. In such a case, buttons 31-12012 of user interface 31-12008 may display nearby individuals/devices which are receptive to such a form of sharing. Furthermore, in one embodiment, these methods and user interfaces for sharing content may be utilized in an integrated system of a tablet and a phone, as well as on a non-integrated tablet or phone.

Figures 32, 121:
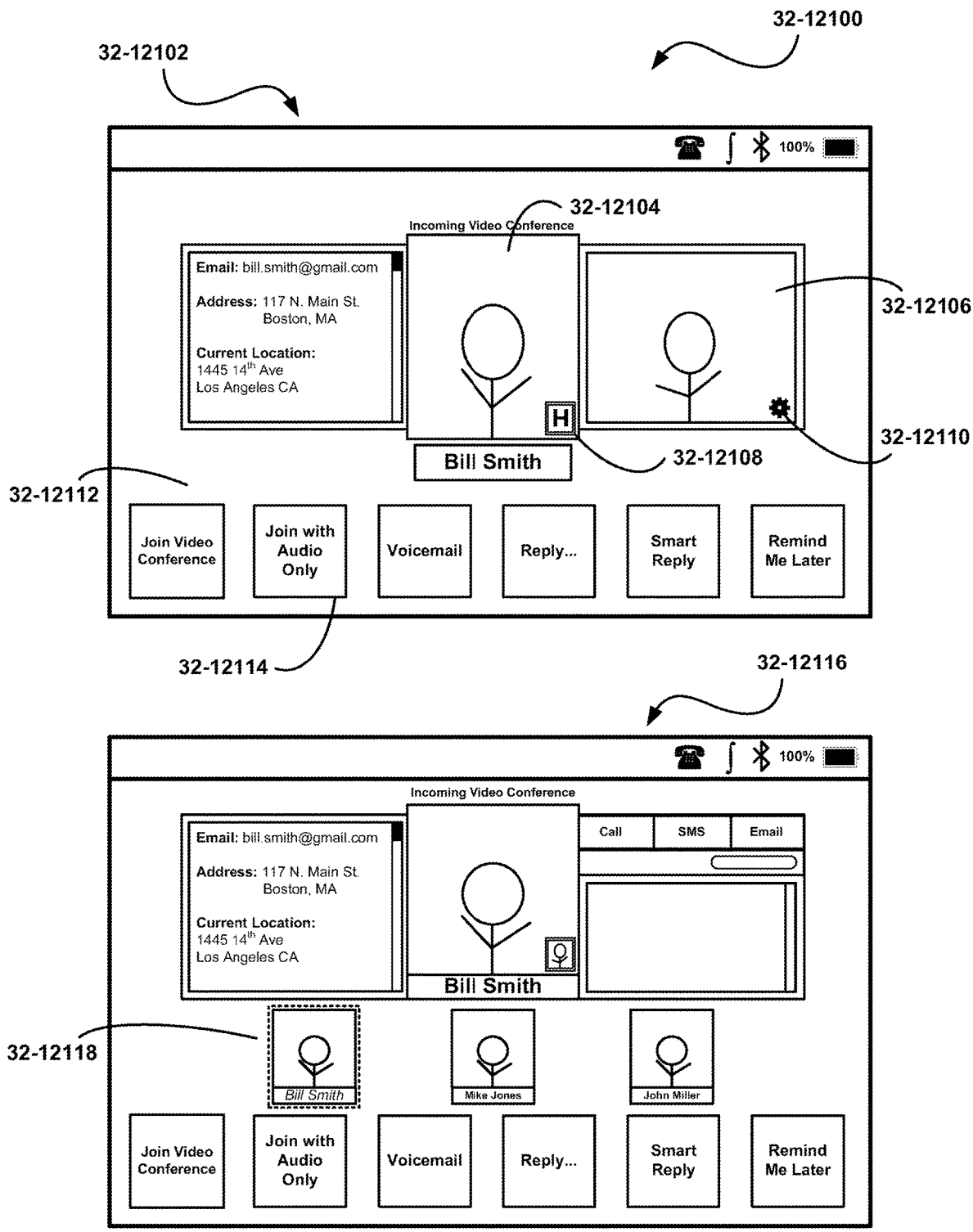
FIG. 32-121 shows a plurality of user interfaces for receiving and responding to an invitation to a video conference, in accordance with one embodiment.

FIG. 32-121 shows a plurality of user interfaces 32-12100 for receiving and responding to a voice call, in accordance with one embodiment. As an option, the plurality of user interfaces 32-12100 may be implemented in the context of the architecture and environment of the previous Figures or any subsequent Figure(s). Of course, however, the plurality of user interfaces 32-12100 may be implemented in any desired environment. It should also be noted that the aforementioned definitions may apply during the present description.

In various embodiments, integration functionality may be utilized, and phone events may be handled, using a native tablet interface, such as those depicted within the plurality of user interfaces 32-12100. In various embodiments, these user interface may be utilized to receive and respond to an invitation to join a video conference with one or more participants. For example, in one embodiment, user interface 32-12102 may be used to receive and respond to an invitation to join a video conference with one other participant.

As shown, user interface 32-12102 is similar in appearance and functionality to user interface 19-10802 of FIG. 19-108, in accordance with one embodiment. However, there are some differences due to involvement of video. For example, in one embodiment, descriptive graphic element 32-12104 may display an incoming video stream of the individual inviting the user to join a video conference. In another embodiment, though, descriptive graphic element 32-12104 may be a still image (e.g. contact photo, a frame taken from participant's video feed, etc.) or an iconic representation of the participant, similar to what is done for voice calls.

In various embodiments, the user may be given an opportunity to preview their own video stream before responding to an invitation to join a video conference. For example, in one embodiment, user interface 32-12102 may include user video panel 32-12106, which displays the user's own video stream. Furthermore, in one embodiment, user interface 32-12102 may include button 32-12108, which may be used to switch between displaying user video panel 32-12106 and a communication history panel, which may be similar to panel 19-10818 of FIG. 19-108. In some embodiments, user interface 32-12102 may display user video panel 32-12106 by default. In other embodiments, user interface 32-12102 may display whatever panel was visible the last time the user interface was active. Furthermore, in one embodiment, if the communication history panel is being displayed, button 32-12108 may display the user's video stream at a reduced size.

In some embodiments, user interface 32-12102 may include button 32-12110, which may be used to define one or more parameters associated with the user's video stream. As an option, these parameters may be defined through a user interface. Possible video stream parameters may include, but are not limited to, an automatic or manual white balance, a digital zoom, a brightness, one or more video effects (e.g. color manipulation, distortion, mapping to a different color space, etc.), and/or any other parameter which may be associated with a video stream.

In various embodiments, user interface 32-12102 may include a collection of buttons 32-12112 which provide a plurality of response options to the user. In some embodiments, these response options may be similar to those provided by user interface 19-10802 of FIG. 19-108. For example, a user may have the option to accept the invitation to join the video conference, transfer the individual making the invitation to a voicemail system, send a reply or smart reply, or set a reminder to contact the participant at a later time. Furthermore, in one embodiment, collection 32-12112 may include a button 32-12114 which allows the user to join the video conference without sending a video stream (e.g. sending an audio stream only, etc.).

In the case where the user is being invited to an ongoing video conference made up of more than one participant, the user may be presented with user interface 32-12116, in accordance with one embodiment. As shown, in one embodiment, the pre-conference user interface may include a collection of graphical representations of the video conference participants, such as collection of buttons 32-12118. As an option, the representation associated with the individual who issued the invitation to the user may be visually distinct from the other representation.

Figures 33, 122:
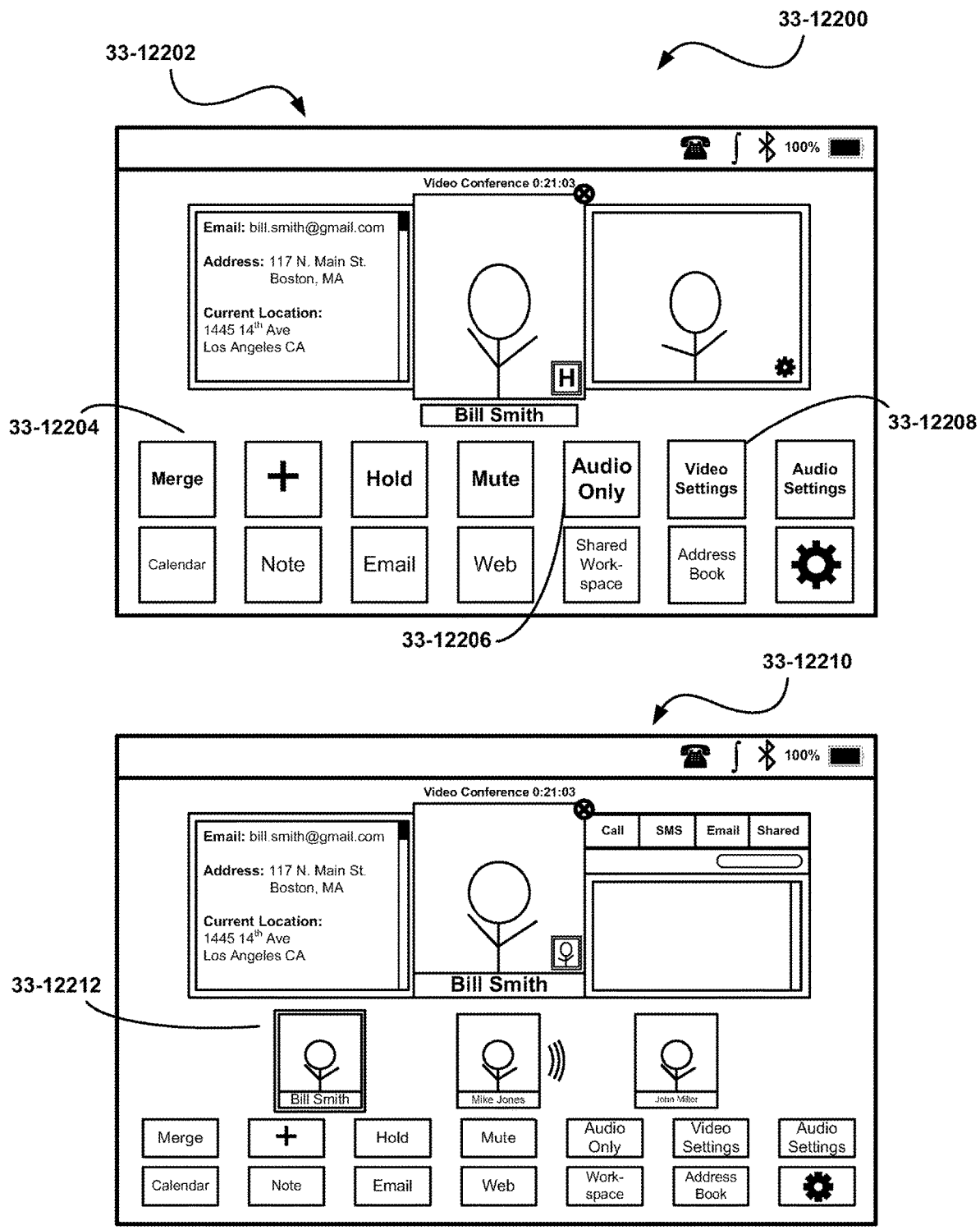
FIG. 33-122 shows a plurality of user interfaces for modifying an ongoing video conference, in accordance with one embodiment.

FIG. 33-122 shows a plurality of user interfaces 33-12200 for modifying an ongoing video conference, in accordance with one embodiment. As an option, the plurality of user interfaces 33-12200 may be implemented in the context of the architecture and environment of the previous Figures or any subsequent Figure(s). Of course, however, the plurality of user interfaces 33-12200 may be implemented in any desired environment. It should also be noted that the aforementioned definitions may apply during the present description.

In various embodiments, the user interfaces used to respond to, modify, and enhance a video conference may be similar in appearance and functionality as the user interfaces utilized in conjunction with voice calls. For example, plurality of user interfaces 33-12200 may be utilized to modify or enhance an ongoing video conference involving one or more participants.

In one embodiment, user interface 33-12202 may be utilized to modify or enhance a ongoing video conference involving one other participant. In various embodiments, user interface 33-12202 may provide functionality similar to that provided by user interface 20-10900 of FIG. 20-109. For example, in one embodiment, user interface 33-12202 may include collections of buttons 33-12204 which allow the user to perform various in-conference operations, as well as interact with various applications, similar to buttons shown in FIG. 20-109. However, in some embodiments, additional functionality may be needed due to the inclusion of a video stream.

In various embodiments, user interface 33-12202 may include a button 33-12206 which allows the user to turn off their camera, sending only an audio stream to the other conference participant. In one embodiment, this button may cause the camera video stream to be replaced with a video or image. Possible replacements for the camera video stream include, but are not limited to, a solid color (e.g. black, etc.), an iconic representation of a user, a looping video, a message indicating that the user has disabled the camera video stream, an image, and/or any other video stream. In some embodiments, the user may be able to define what is sent in the place of a video stream from a camera.

In various embodiments, user interface 33-12202 may include a button 33-12208 which allows the user to modify various settings related to the video conference. For example, in one embodiment, this button may allow a user to define what happens to the user's video stream when the user is no longer in view of the camera.

In some embodiments, the user's presence within the outgoing video stream may be determined using various methods, including, but not limited to, face detection, motion detection, and/or any other method of analyzing the content of a video stream. When the user is no longer in view of the camera, the outgoing video stream may be replaced with different content, in accordance with one embodiment. For example, in one embodiment, the video stream may be replaced with content associated with the user, including, but not limited to, a weather report for the user's current location, a slideshow of photos, a predefined message from the user (e.g. "I'll be right back", etc.), and/or any other content.

In various embodiments, the outgoing video steam may be replaced with a loop of video containing the user. In some embodiments, the replacement video loop may be created automatically. For example, in one embodiment, the outgoing video stream may be captured and analyzed until a portion that is longer than a predefined length is able to be looped, as determined by comparing the difference between the first frame and the last frame. Of course, in other embodiments, other methods may be employed to create the video loop.

In some embodiments, the same type of content may be displayed when the user leaves the camera frame during a video conference, independent of who the other conference participants are. In other embodiments, the content displayed may depend upon who is participating in the video conference. As an option, a user may be able to define these settings using button 33-12208.

In the case where the user is participating in an ongoing video conference made up of more than one participant, the user may be presented with user interface 33-12210, in accordance with one embodiment. As shown, in one embodiment, the in-conference user interface may include a collection of graphical representations of the video conference participants, such as collection of buttons 33-12212. As an option, these buttons may display the video streams associated the said participants. Furthermore, in one embodiment, the buttons associated with participants who are currently speaking and/or displayed in the in-conference descriptive elements may be visually distinct, similar to the user interface shown in FIG. 21-110.

Figures 34, 123:
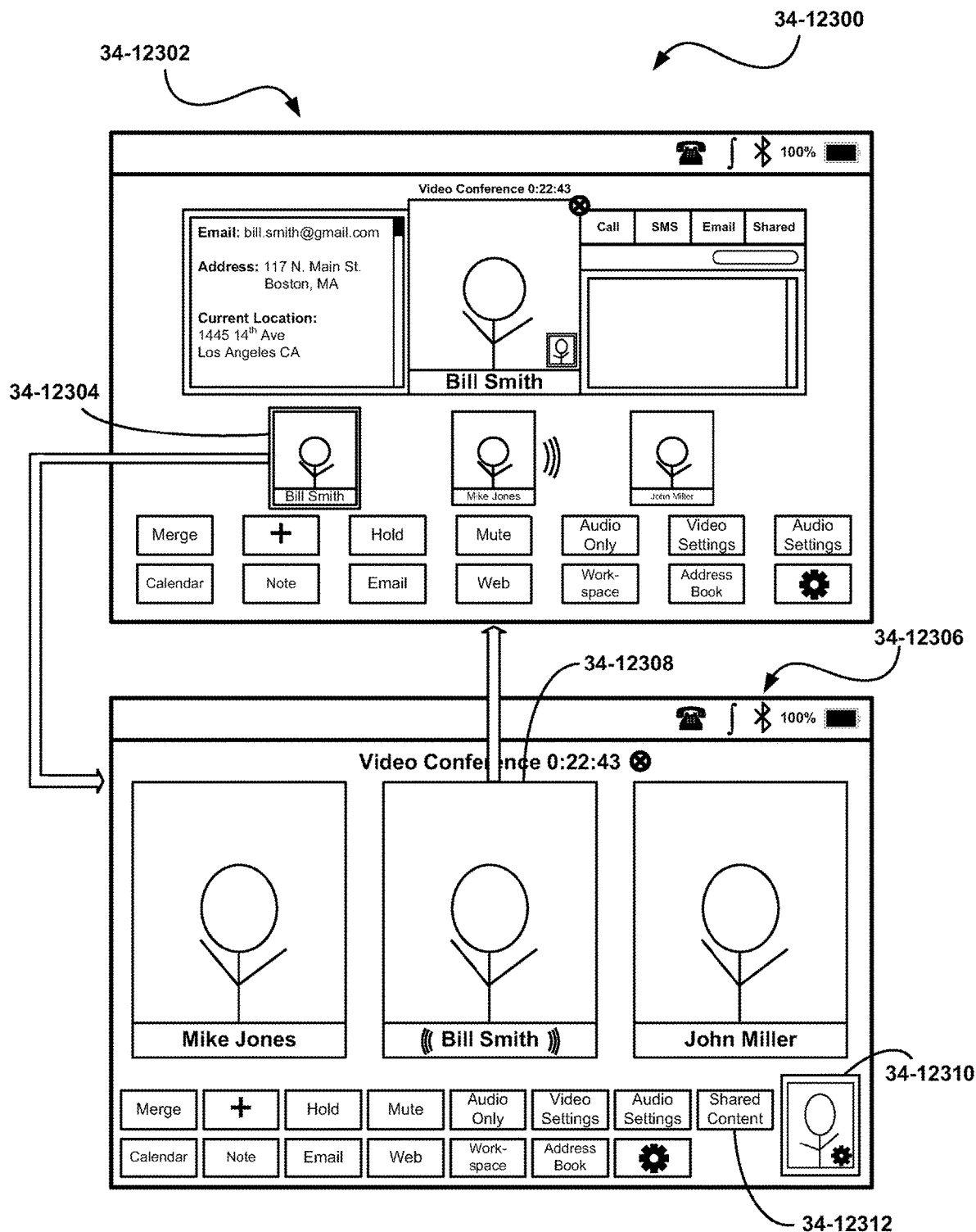
FIG. 34-123 shows a plurality of user interfaces for modifying an ongoing video conference, in accordance with another embodiment.

FIG. 34-123 shows a plurality of user interfaces 34-12300 for modifying an ongoing video conference, in accordance with another embodiment. As an option, the plurality of user interfaces 34-12300 may be implemented in the context of the architecture and environment of the previous Figures or any subsequent Figure(s). Of course, however, the plurality of user interfaces 34-12300 may be implemented in any desired environment. It should also be noted that the aforementioned definitions may apply during the present description.

In various embodiments, the user interfaces used to modify and enhance a video conference may be dynamic, allowing a user to expand, minimize, or even hide various user interface elements. For example, in one embodiment, user interface 34-12302 may include a plurality of buttons, such as button 34-12304, which represent the participants of the video conference. In some embodiments, these representations may display the video streams associated with the participants. A user may interact with (e.g. touch, click, etc.) these representations to specify which participant is the target of descriptive elements of user interface 34-12302.

In some embodiments, a the participant representations of user interface 34-12302, such as button 34-12304, may be used to change how the video streams are displayed. For example, in one embodiment, if a user interacts with a selected representation for a second time, user interface 34-12306 may be displayed, hiding the caller information panel and the communication history panel, and enlarging the participant video streams 34-12308. Furthermore, in one embodiment, user interface 34-12306 may include an element displaying the user's video stream.

In some embodiments, interacting with one of the participant video streams in user interface 34-12306 may present the user with user interface 34-12302, where said participant is the focus of the descriptive elements.

As shown, user interface 34-12306 may include a button 34-12312 which may be used to display a list of content which has been shared in conjunction with the ongoing communication, in accordance with various embodiments. In one embodiment, said list may be presented in a similar manner as the participant video streams, reducing the size of the stream elements to provide room for the list. In other embodiments, a user may further expand the participant stream elements, hiding the buttons associated with operations and applications.

Figures 35, 124:
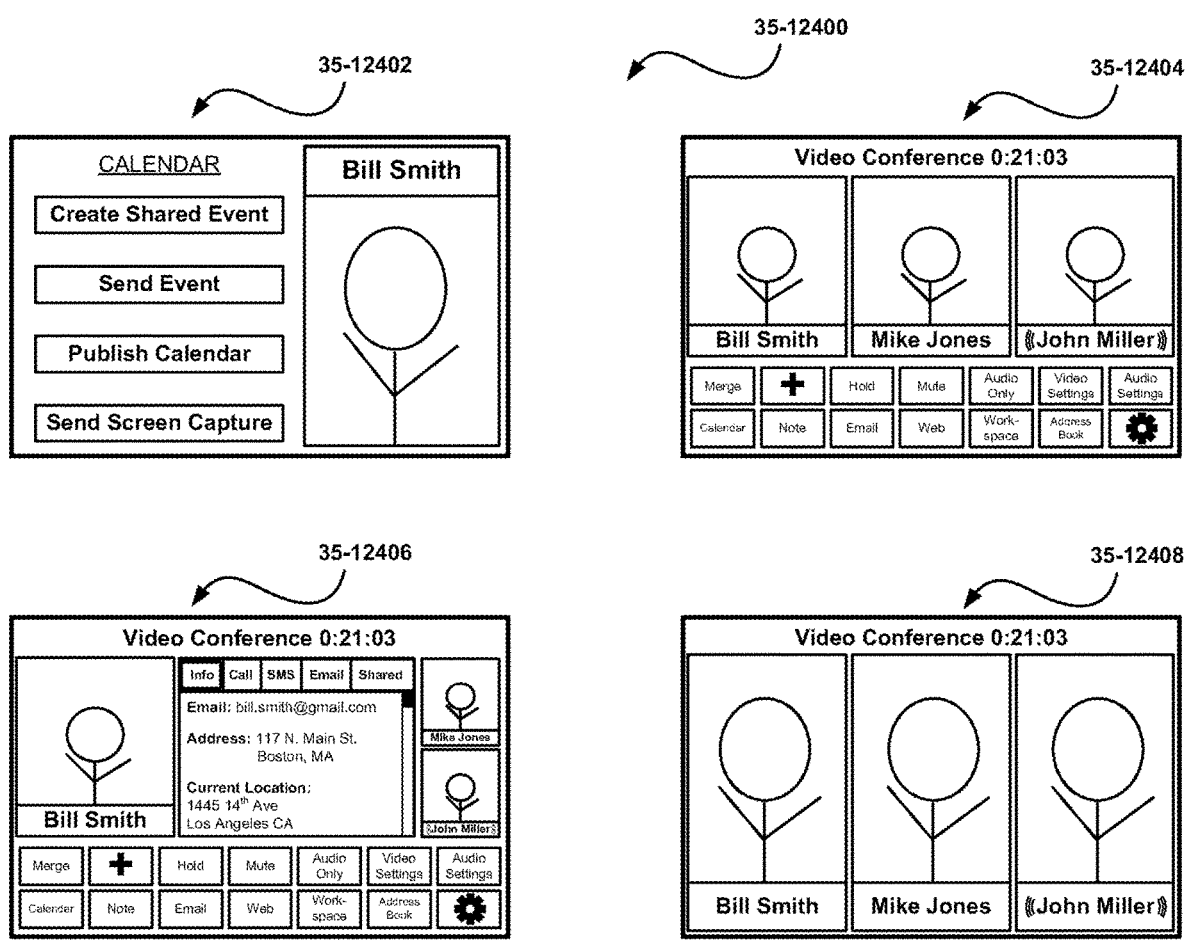
FIG. 35-124 shows a plurality of user interfaces for utilizing a secondary display, in accordance with one embodiment.

FIG. 35-124 shows a plurality of user interfaces 35-12400 for utilizing a secondary display, in accordance with one embodiment. As an option, the plurality of user interfaces 35-12400 may be implemented in the context of the architecture and environment of the previous Figures or any subsequent Figure(s). Of course, however, the plurality of user interfaces 35-12400 may be implemented in any desired environment. It should also be noted that the aforementioned definitions may apply during the present description.

In some cases, an integration comprised of a phone and a tablet may utilize the displays of both devices. In various embodiments, the larger display of an integrated tablet may be used as a prime display, and the smaller display of a phone may be used as a secondary display. In some embodiments, the user interfaces shown previously may be adapted for use on a secondary display. For example, see the plurality of user interfaces 35-12400.

As shown, in one embodiment, user interface 35-12402 may be provided on a secondary display, and used to operate an application (e.g. calendar application, etc.) in conjunction with an ongoing or recently terminated communication (e.g. voice call, video conference, etc.). In this way, the application may be presented to the user on the prime display without any change in appearance to allow for the additional user interface elements needed to combine the application functionality with the communication.

As shown, in one embodiment, user interfaces 35-12404 and 35-12406 may be provided on a secondary display, and used to modify and/or enhance an ongoing communication. In another embodiment, a user may switch between these two user interfaces by interacting with the visual representation of a participant, as previously described with respect to FIG. 34-123.

As shown, in one embodiment, user interface 33-12208 may be provided on a secondary display, and used to present video steams of the communication participants without taking up any of the display real estate on the prime display. This user interface may be used in conjunction with a shared workspace, in accordance with one embodiment.

In some embodiments, a user may be able to specify one or more user interface elements to be displayed on a secondary display. For example, in one embodiment, a user may specify that the caller information panel or the communication history panel be displayed on a secondary display while the prime display is devoted to video streams or an application. In some embodiments, the user may interact with a secondary display in a different manner than they interact with the prime display. For example, in one embodiment, a user may interact with a secondary display using a touchscreen, while the prime display may be controlled using a mouse.

Figures 36, 125:
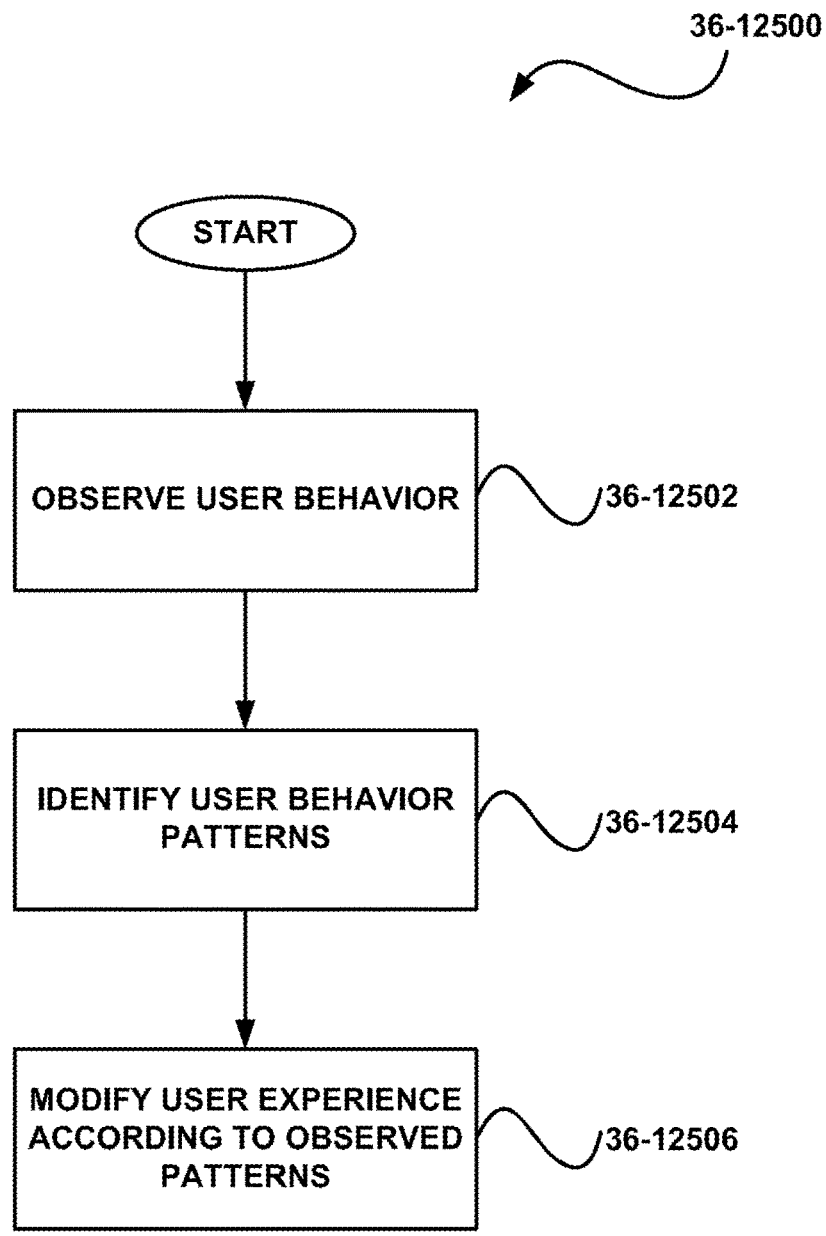
FIG. 36-125 shows a method for modifying the user experience, in accordance with one embodiment.

FIG. 36-125 shows a method 36-12500 for modifying the user experience, in accordance with one embodiment. As an option, the method 36-12500 may be implemented in the context of the architecture and environment of the previous Figures or any subsequent Figure(s). Of course, however, the method 36-12500 may be implemented in any desired environment. It should also be noted that the aforementioned definitions may apply during the present description.

In many cases, a user may perform an action, or a series of actions, in a predictable manner. Identifying said patterns may allow a device or plurality of devices to anticipate a user's intentions and assist them. The integration of a phone and a tablet, and the consolidation of their user observations, may facilitate the identification of behavior patterns. In various embodiments, method 36-12500 may be utilized to modify the user experience according to observed user behavior.

As shown, user behavior is observed. See operation 36-12502. In various embodiments, a variety of user behavior may be observed. Possible examples of observable behavior may include, but is not limited to, execution and/or termination of applications, modification of system settings (e.g. display brightness, volume, wireless interfaces, etc.), sending a message (e.g. email, SMS, social network, etc.), reading a message, deleting a message, opening a web site, capturing a photo and/or video, changing device orientation, operating a device hardware interface (e.g. silent switch, volume buttons, home button, sleep button, etc.), activation and/or deactivation of passcode-based device lock, joining a wireless network, changing a power source, and/or any other user behavior.

In some embodiments, observable user behavior may also include user actions taken within an application. For example, application-based user behavior which may be observed may include, but is not limited to, finance-related behavior (e.g. paying a bill, checking a bank balance, transferring money between accounts, making a purchase, etc.), entertainment-related behavior (e.g. purchasing tickets, making reservations, reading reviews, watching movie trailers, etc.), communication-related behavior (e.g. making a call, checking voicemail, creating and/or modifying a contact record, etc.), document-related behavior (e.g. opening a document, modifying a document, archiving or compressing a document, backing up a document, copying a document, creating a new document, deleting a document, etc.), schedule-related behavior (e.g. making a new calendar event, modifying a new calendar event, accepting and/or declining an invitation to an event, etc.), health-related behavior (e.g. recording a meal, recording a weight, recording a health-related reading, etc.), profession-related behavior (e.g. recording time spent on project, giving a presentation, etc.), any/or any other application-based user behavior.

In various embodiments, observations of user behavior may be stored in one or more log files. In some embodiments, user behavior logs may be stored on an external server, such as a cloud server. In other embodiments, user behavior logs may be stored on the device where the behavior was observed. In one such embodiment, user behavior logs of two devices may be combined upon integration. Furthermore, in one embodiment, observed user behavior may be recorded in a database.

In various embodiments, additional information may be recorded in association with observed user behavior. For example, in some embodiments, a user behavior log may describe a plurality of observed user behaviors, as well as data giving said behavior context. Examples of such contextual data may include, but are not limited to, behavior time and date, device identity, device location, active and/or observable wireless network, data related to a document associated with a user behavior (e.g. filename, metadata, etc.), the content of an associated document (e.g. identity of people in a picture, words in a text document, etc.), type of power supply (e.g. external, battery, etc.), local weather, and/or any other data which may provide context for an observed user behavior.

In some embodiments, all user behavior may be observed. In other embodiments, a user may be required to give permission before any observed user behavior is recorded or transmitted. In still other embodiments, a user may grant permission for specific types of user behavior to be recorded.

As shown, user behavior patterns are identified. See operation 36-12504. In various embodiments, patterns within the observed user behavior may be identified automatically. The methods which may be employed to identify user behavior patterns may include, but are not limited to, machine learning, decision tree learning, cluster analysis, an artificial neural network, data mining, sequence mining, a Bayesian network, and/or any other method of identifying a pattern.

In some embodiments, user behavior patterns may be identified by considering all contextual data at the same time (e.g. a form of clustering analysis, etc.). In other embodiments, user behavior patterns may be identified sequentially. For example, in one embodiment, user behavior data may be searched for a pattern while organized with respect to time, or some other contextual dimension (e.g. location, device identity, etc.). Discovered patterns may then be further refined until a threshold confidence has been met. In the context of the present description, a confidence refers to a numerical value which may be assigned to a prediction, which is associated, at least in part, with the probability that the prediction is correct. Furthermore, a threshold confidence refers to a confidence value beyond which a prediction may be used to modify the user experience.

In some embodiments, a user may specify the threshold confidence level. For example, in one embodiment, a user may indicate a threshold confidence level explicitly, though a user interface. In another embodiment, a user may specify a threshold confidence level indirectly, by accepting or rejecting the proposed automation of various behaviors. Over time, the system may determine what threshold confidence would best fit the manner in which the user operates their devices.

In some embodiments, the analysis of recorded user behavior in search of patterns may be performed at regular intervals. In other embodiments, said analysis may be performed in response to an event, such as the observation of a new type of behavior. In still other embodiments, the analysis of recorded user behavior may be performed at times when the user is not utilizing all of a device or integrations processing power. By delaying the analysis until a time when the processor is idle, the user experience will not be detrimentally changed under the processing load.

As shown, the user experience is modified according to observed patterns. See operation 36-12506. In various embodiments, the user experience may be modified according to observed patterns of user behavior in a variety of ways. For example, in one embodiment, upon identification of a user behavior pattern which has been previously observed, where said identification may be made with a sufficient degree of confidence before the entire behavior pattern has occurred, the user may be prompted with the option to have the rest of the behavior performed automatically. In another embodiment, said performance of the rest of the behavior may be performed automatically, without prompting the user for permission.

In various embodiments, the user experience may be modified by altering a user interface based upon observed user behavior patterns. For example, in one embodiment, if an observed behavior pattern indicates that a user selects a certain button within a user interface, given a particular set of circumstances, said button may be modified (e.g. made larger, moved to a more accessible location, made visually distinct, etc.) to facilitate its use when that set of circumstances arises. In another embodiment, certain user interface elements may be relocated to a secondary display, based upon the amount they are used. In some embodiments, the degree that a user interface element is modified may depend upon the confidence value for the behavior pattern.

In various embodiments, the user experience may be modified by launching applications based upon observed user behavior patterns. For example, in one embodiment, based upon previously observed user behavior, a particular application (e.g. a time tracker, a note application, etc.) may be automatically launched after the user completes a particular activity (e.g. speaks to a client on the phone, etc.).

In various embodiments, the user experience may be modified by altering system or application settings based upon observed user behavior patterns. For example, in one embodiment, a device or integration may develop a default volume level, based upon location, by observing when and where the user manually changes the volume. In some embodiments, one or more aspects, including system or application settings, defined within an integration profile may be modified based upon observed user behavior patterns.

In various embodiments, the user experience may be modified by defining auto responses and/or smart replies based upon observed user behavior patterns. For example, in one embodiment, a user may be prompted with a list of most likely responses they may send in reply to an incoming call. As an option, these predicted responses may be contextually dynamic, changing depending upon the current circumstances, as previously discussed.

Figures 37, 126:
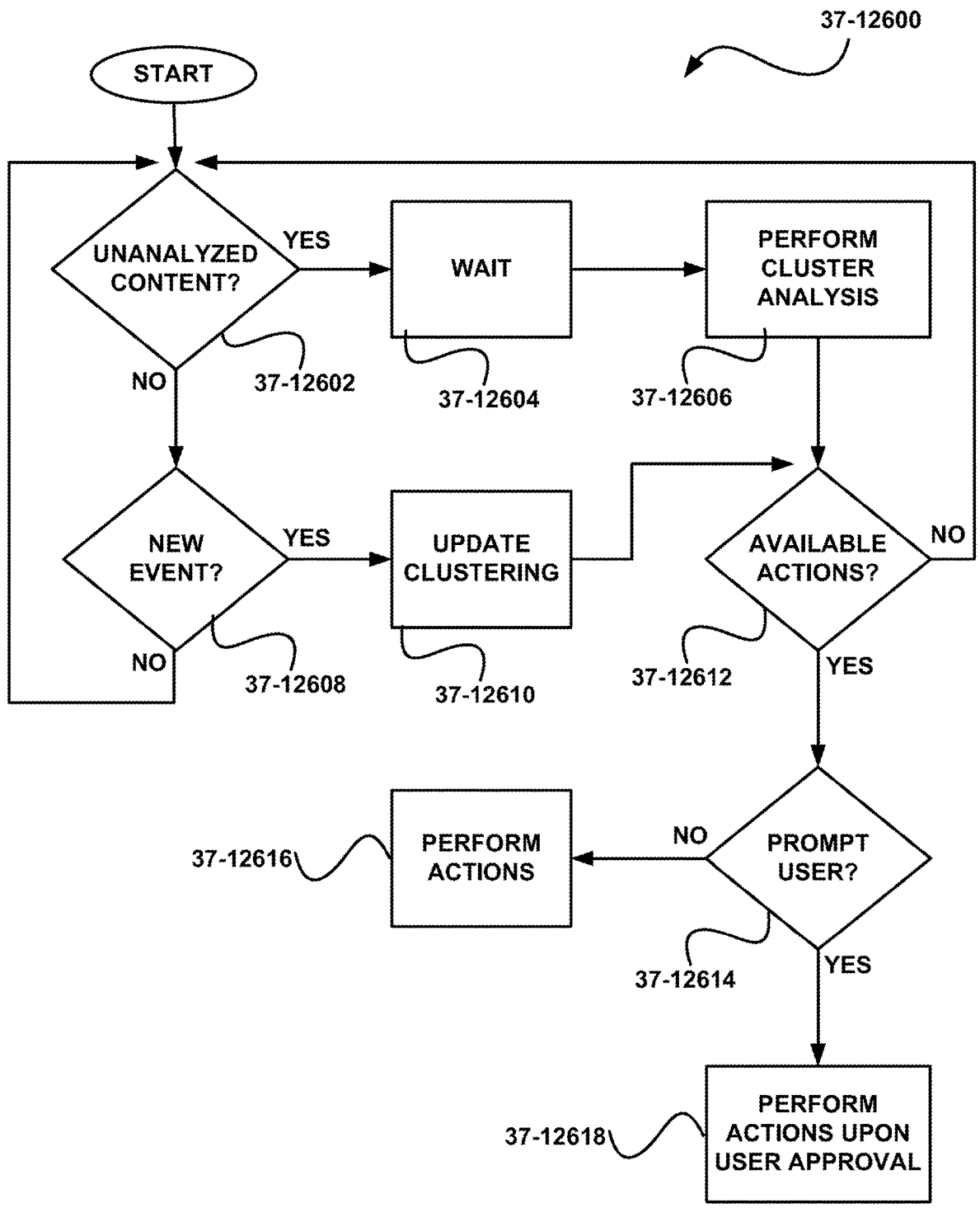
FIG. 37-126 shows a method for facilitating the use of content, in accordance with one embodiment.

FIG. 37-126 shows a method 37-12600 for facilitating the use of content, in accordance with one embodiment. As an option, the method 37-12600 may be implemented in the context of the architecture and environment of the previous Figures or any subsequent Figure(s). Of course, however, the method 37-12600 may be implemented in any desired environment. It should also be noted that the aforementioned definitions may apply during the present description.

In various embodiments, method 37-12600 may be utilized to automate various aspects of the user experience, facilitating the use of content in various contexts. This method is based upon observations made throughout the lifespan of a piece of content, as opposed to method 36-12500 of FIG. 36-125, which is based upon user behavior. Like method 36-12500, this method may be implemented within an integration, as well as on a single device, in accordance with one embodiment.

As shown, it is determined whether there is any unanalyzed content available. See determination 37-12602. Examples of content may include, but are not limited to, photos, video, text, documents, applications, scripts, and/or any other discrete piece of content. In some embodiments, this method may be applied to content which is stored on a device or a pair of integrated devices. In other embodiments, this method may be applied to content stored on an external server, such as a cloud server. Examples of unanalyzed content may include, but are not limited to, content that the user recently created, content created by someone else which has been shared with the user, and/or any other content which has not been analyzed.

In some embodiments, whether or not a piece of content has been analyzed may be determined using data attached to the content, such as metadata. In one embodiment, a flag may be placed in the metadata of a piece of content indicating that it has been analyzed for a particular user on a particular device. In another embodiment, all of the data associated with the analysis may be embedded within the content as metadata. In other embodiments, all data associated with the analysis may be stored apart from the content. In such embodiments, whether or not a piece of content has been analyzed may be determined by comparing the identity of the content with the analysis data which has been stored.

If it is determined that one or more pieces of unanalyzed content are available, the system waits to proceed with further analysis. See operation 37-12604. In some cases, the unanalyzed content may be introduced to a device or integration in bursts (e.g. taking photos at an event, receiving multiple documents in an email message, etc.). In such a case, it may be advantageous to suspend analysis until all related content has been obtained. In various embodiments, the analysis of the content may be delayed. In one embodiment, the length of the delay may be fixed, and applied to all unanalyzed content. In another embodiment, the length of the delay may depend upon the context in which the unanalyzed content first appeared on the device or integration. Possible contextual details which may be used to determine the length of the delay may include, but not limited to, calendar data (e.g. further analysis may be delayed until the scheduled end of an event where pictures are being taken, etc.), time of day (e.g. if a user typically receives a lot of email attachments during a particular window of time, etc.), and/or any other context. In yet another embodiment, the length of the delay may depend on the type of content (e.g. picture, video, document, etc.). In still another embodiment, the length of the delay may depend upon the source of the content (e.g. received from another individual, created by the user, etc.). Of course, in one embodiment, there is no delay, and the analysis of said content may begin as soon as possible.

As shown, a cluster analysis is performed on the unanalyzed content. See operation 37-12606. In the context of the present description, cluster analysis refers to a method, formula, algorithm, or procedure for grouping a set of objects in such a way that similar objects are closer in state space than dissimilar objects. In this way, patterns may be recognized, and later exploited. In other words, cluster analysis may be considered a form of automatic classification.

In various embodiments, the results of such an analysis may be stored. In one embodiment, the results may be stored as a database. In some embodiments, the results may be stored on a device, or on one or both integrated devices. In other embodiments, the results may be stored on an external server, such as a cloud server. In one embodiment, analysis results may be stored for content which has since been deleted. As an option, analysis results for deleted content may be given less weight, thus allowing content-use patterns to evolve over time.

In some embodiments, the analysis performed on the unanalyzed content may be done using cluster analysis methods. In other embodiments, the automatic grouping and/or classification of content may be done using other methods. These methods may include, but are not limited to, pattern recognition, data mining, sequence mining, artificial intelligence, machine learning, evolutionary algorithms, and/or any other method, procedure, or technique which may be used to group similar objects.

In various embodiments, the cluster analysis performed on the unanalyzed content may be done on the basis of information associated with the content. For example, in one embodiment, the cluster analysis may be based, at least in part, upon the event history of a piece of content. In the context of the present description, a content event history refers to a chronological record of all operations performed on a piece of content, beginning with the creation of the content, and ending with the deletion of the content. Examples may include the resizing of a picture, or the transmission of a document in an email message. In this embodiment, content may be clustered according to what events are found in the history of each particular piece of content.

In various embodiments, the cluster analysis may be based on the substance of the content. For example, in one embodiment, the analysis may take into account the identity of people and places depicted in a photo or movie (e.g. facial recognition, voice recognition, landmark recognition, the parsing of text, etc.). Furthermore, in various embodiments, the cluster analysis may be based upon other gathered data, including, but not limited to, metadata (e.g. content creator, EXIF information, etc.), identity of the creation device, date and time of creation, size (e.g. file size, image resolution, etc.), any/or any other data which may be gathered and used to gather or classify the content. In some embodiments, this gathered data is then attached to the piece of content, facilitating the transfer of the content and associated data during an integration, or between two devices associated with a single user.

In some embodiments, the cluster analysis may be performed using device-specific data (i.e. content history from other devices is ignored). In other embodiments, all data associated with a single user may be considered during content analysis. For example, in one embodiment, as part of integration, if a piece of content exists on both devices, the content event history and associated data for said content may be merged for analysis. In some embodiments, the analysis is device-agnostic. In other embodiments, the analysis may take into account on which device a content event occurred.

If it is determined that there is not any unanalyzed content available, it is determined if any new content events have occurred. See determination 37-12608. Examples of content events include, but are not limited to, the sharing of content (e.g. transmission through email, uploading to a server, etc.), duplication, deletion, modification (e.g. resizing an image, re-encoding a video, find and replace within a text document, etc.), compression or other form of archiving, and/or any other operation which may be performed on content.

In some embodiments, a content event which involves sharing content with another individual may automatically trigger the removal of all metadata associated with the cluster analysis from the copy being transmitted. This may be done to protect the privacy of a user.

If it is determined that one or more new content events have occurred, the clustering is updated. See operation 37-12610. In various embodiments, the methods employed in operation 37-12606 may also be employed here, to determine if a new cluster has formed, if previous clusters are now better defined, or if the recorded analysis needs to be updated in any way.

As shown, it is determined whether there are new cluster-based content actions available. See determination 37-12612. In the context of the present description, a cluster-based content action refers to an action which may be taken on, or with, a piece of content, said action being recommended by the fact that some or all other members of an associated cluster have said action in their content event history. As a specific example, if there was a cluster of photos, all of which contain the recognized faces of the user's children, and all of which were subsequently resized and sent to relatives in an email message, the detection of a resize operation of a new photo featuring a user's child may have an available cluster-based content action, specifically, sending the photo to relatives via email.

In some embodiments, the determination of whether there are new cluster-based content actions available may depend upon a confidence value for the clustering results. For example, returning to the previous example, if there were photos of the user's children which had not been resized, they may not be able to be placed in that cluster with sufficient confidence to create a resize and email cluster-based content actions. In some embodiments, the user may explicitly set the threshold confidence level. In other embodiments, the threshold confidence level may be pre-defined, and static. In still other embodiments, the threshold confidence level may be defined by the user indirectly, by accepting or rejecting the proposed performance of cluster-based content actions which are near the presently defined threshold confidence value.

If it is determined that there are new cluster-based content actions available, it is then determined whether the user should be prompted. See determination 37-12614. In various embodiments, whether or not a user is prompted regarding the availability of cluster-based content actions may depend on one or more factors. For example, in one embodiment, a user may be prompted regarding the performance of the content action only if the confidence value for the associated clustering is greater than the threshold, but not high enough to warrant automatic performance.

In another embodiment, the user may be always prompted for certain types of content actions. The types of content actions which may always require a user confirmation, independent of the associated confidence value, may include, but are not limited to, communication actions (e.g. sending an email, sending an SMS message, posting on a social network, etc.), irreversible actions (e.g. performing an irreversible modification on the only copy of a file, etc.), and/or any other type of action which would be overly detrimental should it malfunction. However, in one embodiment, the user may specify exceptions to this blanket requirement for user confirmation.

If it is determined that the user need not be prompted, the cluster-based content actions are performed. See operation 37-12616. In various embodiments, the performance of said action or actions may result in the related content fitting in better with other content within a cluster. In some embodiments, the performance of a cluster-based content action may result in a subsequent determination that a new event has occurred (e.g. see determination 37-12608).

In some embodiments, the performance of a cluster-based content action without prompting the user may be carried out without any indication that the action is being performed. In other embodiments, the user may still be notified of the performance of said action, though in an unobtrusive manner. As an option, the user may given a brief window of time in which they may intervene.

In various embodiments, one possible cluster-based content action may be to place the related content on one or more contextual content lists. In the context of the present description, a contextual content list refers to a list of content which is presented to the user in a particular context. Examples of contexts with which these lists may be associated include, but are not limited to, location-based (e.g. at the office, at home, at the store, etc.), action-based (e.g. participating in a video conference with a particular group of people, etc.), schedule-based (e.g. at the end of a scheduled meeting, etc.), and/or any other context.

The purpose of the contextual content lists is to make appropriate content readily available to the user in their current context. For example, in one embodiment, a location-based list associated with a user's office may be populated with documents recently opened while in the office. In another example, an action-based list associated with a video conference may be populated with content which is associated with (e.g. received from, created by, sent to, etc.) one or more participants.

In some embodiments, a contextual content list may be available to a user through a status bar icon, or some other user interface element which is always, or almost always, accessible to the user. In another embodiment, the contextual content list may be displayed to the user inside a file dialog box, or other prompt where a user must select one or more pieces of content. In still another embodiment, the contextual content list may be accessed through performing a multitouch gesture, or a key combination.

Other examples of cluster-based content actions which may be performed include, but are not limited to, sharing content, archiving content, backing up content to an external server, duplicating content, renaming content, modifying content (e.g. resizing an image, adding a signature, etc.).

If it is determined that the user should be prompted, the cluster-based content actions are performed upon user approval. See operation 37-12618. In some embodiments, the performance of a cluster-based content action may result in a subsequent determination that a new event has occurred (e.g. see determination 37-12608).

In some embodiments, the user may be prompted regarding the performance of a cluster-based content action as soon as it is identified as being available. In other embodiments, the user may be prompted in a context which matches the context where said action was performed on other members of the associated cluster. Returning to the previous example involving photos of the user's children, if previous photos were not resized and emailed to relatives until the user was at home (e.g. had returned from whatever event the children were involved in, etc.), the user may not be prompted regarding the performance of those content actions until they are at home.

In some embodiments, the prompt displayed to the user may give them the option to perform similar actions in the future without asking for confirmation. As an option, the user may manage such exceptions through a user interface, in accordance with one embodiment.

As an option, the aforementioned mobile device may be capable of operating in a location-specific mode, in the context of any of the embodiments disclosed hereinabove. Specifically, in one embodiment, a location associated with the mobile device may be determined. Further determined may be a presence of at least one other person at the location. Still yet, a graphical user interface may be automatically displayed. Such graphical user interface may be specifically associated with the determined location and the determined presence of the at least one other person. In another embodiment, the system, method, or computer program product may be capable of determining a location associated with the mobile device and automatically determining that the location is proximate to a previously identified item of interest. To this end, a graphical user interface associated with the determined location and the previously identified item of interest may be displayed. More information regarding such location-specific features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

In one embodiment, each method described above and combinations thereof may be embodied in computer executable code that, when executing on one or more computing devices, performs the acts and/or provides the capabilities thereof. In another embodiment, the methods may be embodied in systems that perform the acts and/or provides the capabilities thereof, and may be distributed across devices in a number of ways, or all of the functionality may be integrated into a dedicated, standalone device or other hardware. In another embodiment, means for performing the steps associated with the processes described above may include any of the hardware and/or software described above. All such permutations and combinations are intended to fall within the scope of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable storage medium storing one or more programs, the one or more programs comprising instructions which, when executed by an electronic device with a display, cause the electronic device to:
while displaying a first user interface of a first application on the display, detect a first input that corresponds to a request to share first content from the first application;
in response to detecting the first input, while continuing to display at least a portion of the first user interface of the first application, display a sharing interface that includes a plurality of concurrently displayed, user-selectable options for sharing the first content, wherein the sharing interface includes common portions that are capable of being accessed in a plurality of different applications in response to a request from a user to share respective content from a respective application in the plurality of different applications, and the sharing interface provides access to:
a first region for displaying one or more sharing options for sharing the first content directly with other users, wherein the first region includes a first row of icons that represent the other users with whom the first content is capable of being shared directly,
a second region separate from the first region, the second region for displaying one or more other sharing options each for sharing the first content using a protocol of a plurality of protocols, wherein the second region includes a second row of icons that represent the plurality of protocols capable of being used to share the first content, wherein:
a first subset of icons in the second row of icons each include a picture of a user that corresponds to a respective icon in the first subset of icons, and
a second subset of icons in the second row of icons each include one or more initials of a name of a user that corresponds to a respective icon in the second subset of icons, and
a third region, separate from and concurrently displayed with the second region, the third region for displaying one or more application-related options each for performing an application-related operation of a plurality of application-related operations;
while displaying the sharing interface, detect user selection of an affordance accessible via the sharing interface;
in response to detecting user selection of the affordance accessible via the sharing interface:
in accordance with a determination that detecting user selection of the affordance accessible via the sharing interface includes detecting selection of a respective one of the one or more sharing options for a respective other user, initiate a process for sharing the first content with the respective other user,
in accordance with a determination that detecting user selection of the affordance accessible via the sharing interface includes detecting selection of a respective one of the one or more other sharing options for a respective protocol, initiate a process for sharing the first content using the respective protocol, and
in accordance with a determination that detecting user selection of the affordance accessible via the sharing interface includes detecting selection of a respective one of the one or more application-related options for a respective application-related operation, initiate a process for sharing the first content using the respective application-related operation;
share the first content from the first application in accordance with the affordance selected;
open a second application that is different from the first application;
while displaying a user interface of the second application on the display, detect a second input that corresponds to a request to share second content from the second application; and
in response to detecting the second input, display the common portions for sharing the second content.

2. The non-transitory computer readable storage medium of claim 1, including instructions which, when executed by the electronic device with the display, cause the electronic device to: display, in the second region at an edge of the second region, a portion of a particular icon that represents a corresponding user without displaying an entirety of the particular icon.

3. The non-transitory computer readable storage medium of claim 1, wherein the first row of icons has an appearance that is different from the second row of icons.

4. The non-transitory computer readable storage medium of claim 1, wherein the one or more sharing options or the one or more other sharing options are ordered based on user sharing preferences.

5. The non-transitory computer readable storage medium of claim 1, wherein:
a first communication mode is used to identify users with whom the first content is capable of being shared directly; and
a second communication mode, distinct from the first communication mode, is used to share the first content to a selected recipient indirectly via at least one network component.

6. The non-transitory computer readable storage medium of claim 1, wherein, when the selected affordance is the respective application-related option, the process for sharing the first content using the respective application-related operation includes:
after the respective application-related option has been selected, providing options for selecting a set of one or more users to share the first content using the respective application-related operation, and
after receiving a selection of the set of one or more users to share the first content, sharing the first content with the set of users using the respective application-related operation.

7. The non-transitory computer readable storage medium of claim 1, wherein the second region is further for displaying an additional sharing option that is displayed with a representation of a first other user including a picture of the first other user, and a representation of a second other user including one or more initials of the second other user without a picture of the second other user, for, based on a selection thereof, creating a single communication involving each of the first other user and the second other user.

8. The non-transitory computer readable storage medium of claim 1, wherein the respective sharing option utilizes a Wi-Fi device-to-device network protocol.

9. The non-transitory computer readable storage medium of claim 1, wherein the process for sharing the first content with the respective other user is capable of causing a completion of the sharing of the first content without requiring detection of any additional user input at the electronic device after detecting the user selection of the affordance accessible via the sharing interface.

10. The non-transitory computer readable storage medium of claim 1, wherein:
the second row of icons each include at least one protocol identifier of at least one sharing protocol including at least one of an email protocol or an instant messaging protocol, and with at least one user identifier; and
the one or more application-related options are each displayed with one of multiple identifiers associated with multiple sharing protocols including at least the email protocol and the instant messaging protocol, and without an identifier of any user.

11. The non-transitory computer readable storage medium of claim 1, wherein at least a portion of the second row of icons is conditionally displayed based on an existence of at least one communication with at least one person associated therewith.

12. The non-transitory computer readable storage medium of claim 1, wherein at least a portion of the second row of icons is ordered based on times of different communications with different users.

13. The non-transitory computer readable storage medium of claim 1, including instructions which, when executed by the electronic device with the display, cause the electronic device to operate such that:
the first row of icons has an appearance that is different from the second row of icons;
when the selected affordance is the respective application-related option, the process for sharing the first content using the respective application-related operation includes:
after the respective application-related option has been selected, providing options for selecting a set of one or more users to share the first content using the respective application-related operation, and
after receiving a selection of the set of one or more users to share the first content, sharing the first content with the set of users using the respective application-related operation;
the one or more sharing options each utilizes a Wi-Fi device-to-device network protocol;
the process for sharing the first content with the respective other user is capable of causing a completion of the sharing of the first content without requiring detection of any additional user input at the electronic device after detecting the user selection of the affordance accessible via the sharing interface;
the second row of icons each include at least one protocol identifier of at least one sharing protocol including at least one of an email protocol or an instant messaging protocol, and with at least one user identifier;
the one or more application-related options are each displayed with one of multiple identifiers associated with multiple sharing protocols including at least the email protocol and the instant messaging protocol, and without an identifier of any user; and
at least a portion of the second row of icons is conditionally displayed based on an existence of at least one communication with at least one person associated therewith.

14. The non-transitory computer readable storage medium of claim 13, wherein, prior to detecting the first input that corresponds to the request to share the first content, the electronic device is not enabled to share the first content directly with the other users, and the computer readable storage medium further includes instructions which, when executed by the electronic device with the display, cause the electronic device to:
prior to detecting selection of the affordance accessible via the sharing interface, display a sharing-enable affordance for enabling the electronic device to share the first content directly with the other users;
detect selection of the sharing-enable affordance;
in response to detecting selection of the sharing-enable affordance, enable the electronic device to share the first content directly with the other users and display at least the respective sharing option for the respective other user; and
when the respective sharing option for the respective other user is selected, start to transfer the first content directly to the respective other user over a device-to-device WiFi network.

15. The non-transitory computer readable storage medium of claim 1, wherein, prior to detecting the first input that corresponds to the request to share the first content, the electronic device is not enabled to share the first content directly with the other users, and the computer readable storage medium further includes instructions which, when executed by the electronic device with the display, cause the electronic device to:
prior to detecting selection of the affordance accessible via the sharing interface, display a sharing-enable affordance for enabling the electronic device to share the first content directly with the other users;
detect selection of the sharing-enable affordance; and
in response to detecting selection of the sharing-enable affordance, enable the electronic device to share the first content directly with the other users and display at least the respective sharing option for the respective other user.

16. The non-transitory computer readable storage medium of claim 1, wherein, prior to detecting the first input that corresponds to the request to share the first content, the electronic device is not enabled to share the first content directly with the other users, and the computer readable storage medium further includes instructions which, when executed by the electronic device with the display, cause the electronic device to:
prior to detecting selection of the affordance accessible via the sharing interface, display a sharing-enable affordance for enabling the electronic device to share the first content directly with the other users;
detect selection of the sharing-enable affordance;
in response to detecting selection of the sharing-enable affordance, enable the electronic device to share the first content directly with the other users and display at least the respective sharing option for the respective other user; and
when the respective sharing option for the respective other user is selected, start to transfer the first content directly to the respective other user over a device-to-device WiFi network.

17. The non-transitory computer readable storage medium of claim 1, wherein the one or more sharing options include an option for sharing the first content directly with the other users using a predefined protocol, and the computer readable storage medium further includes instructions which, when executed by the electronic device with the display, cause the electronic device to:
in response to detecting user selection of the affordance:
in accordance with a determination that detecting user selection of the affordance accessible via the sharing interface includes detecting selection of the respective sharing option for the respective other user without detecting selection of any of the one or more other sharing options in addition to selection of the respective sharing option for the respective other user, initiate a process for sharing the first content with the respective other user using the predefined protocol; and in accordance with a determination that detecting user selection of the affordance accessible via the sharing interface includes detecting selection of the respective other sharing option for the respective protocol distinct from the predefined protocol without detecting selection of any of the one or more sharing options in addition to selection of the respective other sharing option for the respective protocol, initiate a process for sharing the first content using the respective protocol.

18. The non-transitory computer readable storage medium of claim 14, wherein at least one of:
the one or more programs include a single program;
the one or more programs include a plurality of programs;
the one or more programs include an application;
the one or more programs include an operating system;
the one or more programs include an operating system and an application;
the one or more programs include at least a portion of an operating system and at least a portion of an application;
the display includes a touchscreen;
the other users include the respective other user;
the one or more sharing options identify the other users;
the one or more sharing options identify the respective other user;
the one or more sharing options visually display the other users;
the one or more sharing options visually display the respective other user;
the one or more sharing options do not require manual identification of the respective other user;
the one or more sharing options do not require manual identification of the other users;
the one or more sharing options do not require separate identification of the respective other user;
the one or more sharing options do not require separate identification of the other users;
the one or more sharing options do not require identification of the respective other user in addition to requiring identification of an associated sharing protocol;
the one or more sharing options do not require identification of the other users in addition to requiring identification of an associated sharing protocol;
the one or more sharing options require identification of the other users in addition to requiring identification of an associated sharing protocol;
the one or more sharing options require identification of the respective other user before requiring identification of an associated sharing protocol;
the one or more sharing options require identification of the other users before requiring identification of an associated sharing protocol;
the one or more sharing options require identification of the respective other user without requiring identification of an associated sharing protocol;
the one or more sharing options require identification of the respective other user wherein an associated sharing protocol is predetermined;
the one or more sharing options require identification of the respective other user wherein an associated sharing protocol is already associated therewith;
the one or more sharing options require selection of the respective sharing option for the respective other user without requiring the selection of any of the one or more other sharing options in addition to the selection of the respective sharing option for the respective other user;
the one or more sharing options require identification of the other users before requiring identification of an associated sharing protocol;
the multiple identifiers are associated with the multiple sharing protocols, by identifying the same;
the multiple identifiers are associated with the multiple sharing protocols, by each identifying a name that reflects a particular application that uses one of the multiple sharing protocols;
the affordance is directly accessible via the sharing interface;
the affordance is not directly accessible via the sharing interface;
the plurality of concurrently displayed, user-selectable options for sharing the first content, includes all of: the one or more sharing options for sharing the first content directly with the other users, the one or more other sharing options each for sharing the first content using a protocol of a plurality of protocols, and the one or more application-related options each for performing an application-related operation of a plurality of application-related operations;
the plurality of concurrently displayed, user-selectable options for sharing the first content, includes only a subset of: the one or more sharing options each for sharing the first content directly with the other users, the one or more other sharing options each for sharing the first content using a protocol of a plurality of protocols, and the one or more application-related options each for performing an application-related operation of a plurality of application-related operations;
the plurality of concurrently displayed, user-selectable options for sharing the first content, includes two of: the one or more sharing options for sharing the first content directly with the other users, the one or more other sharing options each for sharing the first content using a protocol of a plurality of protocols, and the one or more application-related options each for performing an application-related operation of a plurality of application-related operations;
the plurality of concurrently displayed, user-selectable options for sharing the first content, includes only two of: the one or more sharing options for sharing the first content directly with the other users, the one or more other sharing options each for sharing the first content using a protocol of a plurality of protocols, and the one or more application-related options each for performing an application-related operation of a plurality of application-related operations;
the protocol of the plurality of protocols is user-selected
the common portions are accessed, by being displayed;
the common portions are accessed, by being displayed in the application;
the common portions are accessed, by being displayed while a user has access in the application;
the common portions are accessed, by being displayed from in the application;
the sharing interface provides access, by directly displaying;

the sharing interface provides access, by displaying at least one additional interface or interface element for displaying;
the sharing interface provides access, by displaying at least one additional interface or interface element for displaying, in response to additional user input;
the first region, the second region, the third region, are predefined;
the first region, the second region, the third region, are predefined, by at least a portion thereof being predefined;
the second region is concurrently displayed with the first region;
the second region is not concurrently displayed with the first region;
the sharing is capable of being over a device-to-device WiFi network;
the sharing is capable of being over a device-to-device WiFi network, including a WiFi Direct network;
the picture includes a generic picture;
the picture includes an image taken by a camera;
the picture includes an iconic representation;
the picture includes an iconic representation including a generic picture;
the sharing is capable of being over a device-to-device WiFi network, including a WiFi Direct network that uses a Bluetooth channel;
the respective other user includes a single user;
the respective other user includes a plurality of users;
the one or more other sharing options identify the plurality of protocols;
the one or more other sharing options identify the respective protocol;
the one or more other sharing options visually display the plurality of protocols;
the one or more other sharing options visually display the respective protocol;
the one or more other sharing options do not require manual identification of the respective protocol;
the one or more other sharing options do not require manual identification of the plurality of protocols;
the one or more other sharing options do not require separate identification of the respective protocol;
the one or more other sharing options do not require separate identification of the plurality of protocols;
the one or more other sharing options do not require identification of the respective protocol in addition to requiring identification of the respective other user;
the one or more other sharing options do not require identification of the plurality of protocols in addition to requiring identification of the other users;
the one or more other sharing options require identification of the respective protocol without requiring identification of the other users;
the one or more other sharing options require selection of the respective sharing option for the respective protocol without requiring selection of any of the sharing options in addition to the selection of the respective other sharing option for the respective protocol;
the one or more other sharing options require identification of the respective protocol before requiring identification of the respective other user;
the one or more other sharing options require identification of the plurality of protocols before requiring identification of the other users;
the application-related operations are sharing operations;
the application-related operations are non-sharing operations;
the sharing interface includes a single interface;
the sharing interface includes a plurality of interface portions;
the sharing interface includes a plurality of interface;
the first input corresponds to the request to share first content from the first application, by causing the request to share first content from the first application;
the first input corresponds to the request to share first content from the first application, by including the request to share first content from the first application;
the first input corresponds to the request to share first content from the first application, by representing the request to share first content from the first application;
the first input corresponds to the request to share first content from the first application, by corresponding to an icon associated with the request to share first content from the first application;
the first input corresponds to the request to share first content from the first application, by corresponding to an icon for the request to share first content from the first application;
the first input corresponds to the request to share first content from the first application, by corresponding to an icon representing the request to share first content from the first application;
the first input is detected while the first content is displayed by the first application;
the first input is not detected while the first content is displayed by the first application;
the first input is at a location that corresponds with the first content;
the first input is at a location that does not correspond with the first content;
the first input is on the first content;
the first input is not on the first content;
the first input is on the first user interface of the first application;
the first input is not on the first user interface of the first application;
the first input is on a graphical user interface element that is displayed while the first user interface of the first application is displayed;
the first input is on a graphical user interface element that is displayed while the first user interface of the first application is displayed, where the graphical user interface element is separate from the first user interface of the first application;
the first input is on a graphical user interface element that is displayed while the first user interface of the first application is displayed, where the graphical user interface element is adjacent to the first user interface of the first application;
the first input is on a graphical user interface element associated with an operating system;
the first input includes a touch input;
the at least portion of the first user interface of the first application includes only a subset of the first user interface of the first application;
the first content is shared using the protocol of the plurality of protocols, being shared via at least one of a short-message-service (SMS), an electronic mail message, or via an on-line sharing service;
the first content is shared using the protocol of the plurality of protocols, including at least one of a short-message-service (SMS) protocol, an electronic mail message protocol, or via an on-line sharing service protocol;

the first content is shared directly with the other users by not being shared with the other users via at least one other user;

the first content is shared directly with the other users by not being shared with the other users via an intermediate device;

the first content is shared directly with the other users by not being shared with the other users via an intermediate device that is not of the others nor a user of the electronic device;

the first content is shared directly with the other users by not being shared with the other users via a server;

the first content is shared directly with the other users by not being shared via an indirect communication that involves being shared via at least one intermediate server;

the first content is from the first application, by being accessible from the first application;

the first content is from the first application, by being shared from the first application;

the protocol is selected via at least one of the one or more other sharing options;

the protocol is selected by selecting at least one of the one or more other sharing options;

the affordance includes a status bar component;

the affordance is located on a status bar;

the affordance includes a widget;

the affordance includes a graphical user interface element;

the affordance includes at least one of an icon or an object;

the affordance includes at least one of: the respective sharing option or the respective other sharing option;

the affordance includes a quality or property that indicates that it is capable of being used to share content;

the affordance includes a quality or property that indicates that it is capable of being used to share the first content;

the sharing interface includes an interface that is capable of being used to share content;

the sharing interface includes an interface that is capable of being used to share the first content;

the first region is separate from the second region by being displayed adjacent thereto;

the first region is separate from the second region by being displayed in different areas of the sharing interface;

the first region is separate from the second region by being simultaneously displayed in different areas of the sharing interface;

the first region is separate from the second region by being separated by whitespace;

the first region is separate from the second region by being separated by whitespace that is greater than other whitespace between icons in at least one of the first region or the second region;

the first region is separate from the second region by being separated by whitespace that is greater than other whitespace between icons in the first region;

the first region is separate from the second region by being separated by whitespace that is greater than other whitespace between icons in the second region;

the first region is separate from the second region by being separated by whitespace that is larger than other whitespace that separates the one or more sharing options or the one or more other sharing options;

the first region is separate from the second region by being separated by whitespace that is larger than other whitespace that separates the one or more sharing options;

the first region is separate from the second region by being separated by whitespace that is larger than other whitespace that separates the one or more other sharing options;

the first region is separate from the second region by being separated by whitespace that is larger than other whitespace that separates the one or more sharing options and the one or more other sharing options;

the first region is separate from the second region by being separated by at least one indicia;

all of the one or more sharing options are displayed via the first region;

all of the one or more sharing options are not displayed via the first region;

all of the one or more other sharing options are displayed via the first region;

all of the one or more other sharing options are not displayed via the first region;

all of the one or more sharing options are simultaneously displayed via the first region;

all of the one or more sharing options are not simultaneously displayed via the first region;

all of the one or more other sharing options are simultaneously displayed via the first region;

all of the one or more other sharing options are not simultaneously displayed via the first region;

an entirety of the first region is displayed;

an entirety of the first region is not displayed;

an entirety of the first region is simultaneously displayed;

an entirety of the first region is not simultaneously displayed;

an entirety of the second region is displayed;

an entirety of the second region is not displayed;

an entirety of the second region is simultaneously displayed;

an entirety of the second region is not simultaneously displayed;

entireties of the first region and the second region are w displayed;

entireties of the first region and the second region are not concurrently displayed;

the process for sharing the first content with the respective other user includes displaying an expanded set of images;

the process for sharing the first content with the respective other user includes displaying a different set of images included in a button of the at least portion of the sharing interface;

the process for sharing the first content with the respective other user includes displaying a plurality of selectable images that replaces the at least portion of the sharing interface, where the at least portion of the sharing interface includes a single button;

the process for sharing the first content with the respective other user includes displaying a plurality of buttons that replace the at least portion of the sharing interface, where the at least portion of the sharing interface includes a single button;

the process for sharing the first content with the respective other user includes displaying a plurality of buttons that replace the at least portion of the sharing interface including a single button;

the process for sharing the first content with the respective other user includes displaying a differently formatted version of images included in a button of the at least portion of the sharing interface;

the process for sharing the first content with the respective other user includes displaying a differently sized version of images included in a button of the at least portion of the sharing interface;

the process for sharing the first content with the respective other user includes displaying whitespace between images included in a button of the at least portion of the sharing interface;

the process for sharing the first content with the respective other user includes displaying a plurality of selectable user interface elements;

the process for sharing the first content with the respective other user includes displaying a plurality of selectable recipients;

the process for sharing the first content with the respective other user includes displaying a plurality of selectable recipient representations;

the process for sharing the first content with the respective other user includes displaying an integration-related interface element;

the process for sharing the first content with the respective other user includes displaying a portion of an integration-related interface;

the process for sharing the first content with the respective protocol includes displaying a shared directory;

the process for sharing the first content with the respective protocol includes displaying a contact record;

the process for sharing the first content with the respective protocol includes displaying at least one other user-related interface element;

the process for sharing the first content with the respective protocol includes displaying a portion of an integration-related interface;

the process for sharing the first content with the respective other user, and the process for sharing the first content using the respective protocol, execute different code for sharing the first content;

the process for sharing the first content with the respective other user, and the process for sharing the first content using the respective protocol, are different;

the process for sharing the first content with the respective other user is initiated and completed, in accordance with the determination that the affordance is the respective sharing option for the respective other user;

the process for sharing the first content using the respective protocol is initiated and completed, in accordance with the determination that the affordance is the respective other sharing option for the respective protocol;

the process for sharing the first content with the respective other user is initiated and completed, in response to the determination that the affordance is the respective sharing option for the respective other user;

the process for sharing the first content using the respective protocol is initiated and completed, in response to the determination that the affordance is the respective other sharing options for the respective protocol;

the process for sharing the first content with the respective other user is initiated but not completed, in accordance with the determination that the affordance is the respective sharing option for the respective other user;

the process for sharing the first content using the respective protocol is initiated but not completed, in accordance with the determination that the affordance is the respective other sharing option for the respective protocol;

the process for sharing the first content with the respective other user is initiated but not completed, in response to the determination that the affordance is the respective sharing option for the respective other user;

the process for sharing the first content using the respective protocol is initiated but not completed, in response to the determination that the affordance is the respective other sharing option for the respective protocol;

the process for sharing the first content with the respective other user is only initiated, in accordance with the determination that the affordance is the respective sharing option for the respective other user, and completed in response to a detection of at least one additional user action;

the process for sharing the first content using the respective protocol is only initiated, in accordance with the determination that the affordance is the respective other sharing option for the respective protocol, and completed in response to a detection of at least one additional user action, and completed in response to a detection of at least one additional user action;

the process for sharing the first content with the respective other user is only initiated, in response to the determination that the affordance is the respective sharing option for the respective other user, and completed in response to a detection of at least one additional user action;

the process for sharing the first content using the respective protocol is only initiated, in response to the determination that the affordance is the respective other sharing option for the respective protocol, and completed in response to a detection of at least one additional user action;

the sharing-enable affordance includes a prompt;

the sharing-enable affordance includes an integration-related graphical user interface element;

the sharing-enable affordance includes a portion of an integration-related interface;

the activation of the sharing-enable affordance includes a selection of the sharing-enable affordance;

the first region is also for displaying one or more additional sharing options for sharing the first content indirectly with the other users;

the first region is also for displaying one or more additional sharing options for sharing the first content indirectly with the other users via at least one intermediate node;

the plurality of sharing options are each associated with different other users;

the plurality of sharing options are each associated with different devices of different other users;

further provided are application-related operations that include opening content;

further provided are application-related operations that include viewing content;

further provided are application-related operations that include manipulating content;

further provided are application-related operations that include selecting content;

further provided are application-related operations that include creating an application and accessing a file;

further provided are application-related operations that include creating an application;

further provided are application-related operations that include accessing a file;

at least one of the first row of icons or the second row of icons are at least one of vertically-oriented or horizontally-oriented;

the first row of icons are horizontally-oriented;

the first row of icons and the second row of icons are arranged along different directions;

the first row of icons and the second row of icons are arranged along different lines that are in different directions;

the first row of icons and the second row of icons are not arranged in the same direction;

the first row of icons and the second row of icons are not parallel;

the first, second, and third row of icons are ordered;

the first, second, and third row of icons are not ordered;

the second row of icons are horizontally-oriented;

the second row of icons are not vertically-oriented;

the protocol identifier is alphanumeric;

the protocol identifier is not alphanumeric;

the common portions include at least one of: the first region, the second region, the third region, one or more of the first row of icons, one of more of the second row of icons, or one or more of the application-related options;

the common portions include at least two of: the first region, the second region, the third region, one or more of the first row of icons, one of more of the second row of icons, or one or more of the application-related options;

the common portions that are displayed in the plurality of different applications include indicia;

the common portions that are displayed in the plurality of different applications include labels;

the common portions that are capable of being accessed in the plurality of different applications include one or more of the application-related operations;

the common portions that are capable of being accessed in the plurality of different applications, by being displayed over the plurality of different applications;

the common portions that are capable of being accessed in the plurality of different applications, by being displayed over at least a portion of at least one user interface of the plurality of different applications;

the first subset of icons and the second subset of icons are both present in a first use case scenario, and only one of the first subset of icons or the second subset of icons is present in a second use case scenario;

the first subset of icons includes a single icon;

the first subset of icons includes multiple icons;

the second subset of icons includes a single icon;

the second subset of icons includes multiple icons;

the first subset of icons in the first row of icons also includes the one or more initials of the name;

the first subset of icons in the first row of icons does not include the one or more initials of the name;

the second subset of icons in the first row of icons also includes the picture of the user;

the second subset of icons in the first row of icons does not include the picture of the user;

the other users with whom the first content is capable of being shared directly, include users of other devices;

the other users with whom the first content is capable of being shared directly, include users of a sharing service that is implemented via the electronic device and other devices;

the other users with whom the first content is capable of being shared directly, include users of a sharing service that is implemented at least in part via the electronic device;

the one or more application-related options are application-related by being related to one or more files accessible via an application;

the one or more application-related options are application-related by being related to creating an application;

the one or more application-related options are application-related by changing based on an application;

the one or more application-related options do not include system-related options;

the one or more application-related options do not include system-related options that remain the same regardless as to particular application use;

the one or more application-related options do not include system-related options that remain the same regardless as to the application that is currently being used;

the one or more application-related options include one or more application-related options that are common among the different applications;

the application-related operation includes an operation on the file that is performed in response to detection of a selection of a file icon;

the application-related operation includes a creating operation that is performed in response to detection of a selection of a creating application icon;

the common portions that are capable of being accessed in the plurality of different applications, by being displayed in connection with the plurality of different applications;

the common portions that are capable of being accessed in the plurality of different applications, by being displayed in an execution environment of the plurality of different applications;

the common portions that are capable of being accessed in the plurality of different applications, by being displayed in a process of the plurality of different applications;

the common portions that are capable of being accessed in the plurality of different applications, by being displayed in an operation of the plurality of different applications;

the common portions that are capable of being accessed in the plurality of different applications, by being displayed in an execution environment of the plurality of different applications;

the common portions that are capable of being accessed in the plurality of different applications, by being displayed in an operating system of the plurality of different applications;

the common portions that are capable of being accessed in the plurality of different applications, by being displayed in an operating system interface of an operating system of the plurality of different applications;

the common portions that are capable of being accessed in the plurality of different applications, by being displayed while continuing to display at least a portion of user interfaces of the different applications;

the common portions that are capable of being accessed in the plurality of different applications, by being displayed while continuing to display at least a portion of at least one user interface of at least one of the different applications;

the user interface for the second application is of the second application;

the user interface for the second application includes a second user interface;

the sharing options for sharing the second content include the one or more sharing options;

the sharing options for sharing the second content include another instance of the one or more sharing options;

the sharing interface that provides access to the plurality of sharing options for sharing the second content, includes the common portions;

the sharing interface that provides access to the plurality of sharing options for sharing the second content, includes the common portions in addition to different portions;

the sharing interface that provides access to the plurality of sharing options for sharing the second content, includes another instance of the sharing interface for sharing the first content;

the respective content is shared from the respective application in the plurality of different applications, by the respective content being accessible via the respective application for sharing;

the plurality of protocols include different types of communication;

the plurality of protocols include different types of communication including a voice call and a video conference;

the plurality of protocols correspond with different types of communication;

the plurality of protocols correspond with different types of communication including a voice call and a video conference;

the one or more sharing options include the first row of icons;

the one or more sharing options are represented by the first row of icons;

the first row of icons correspond to the one or more sharing options;

the first row of icons include the one or more sharing options;

the first subset of icons in the first row of icons includes a single icon;

the one or more other sharing options include the second row of icons;

the one or more other sharing options are represented by the second row of icons;

the second subset of icons in the first row of icons includes a single icon;

the affordance includes one of the icons;

the affordance includes a button that includes therein one of the icons;

the affordance includes a user-selectable user interface element that displays therein one of the icons;

the affordance includes at least one of an icon, a button, or indicia; or the response includes one of the one or more other sharing options; and the electronic device is configured for determining a location associated with the electronic device; determining a presence of at least one other person at the location; and automatically displaying a graphical user interface associated with the determined location and the determined presence of the at least one other person, wherein the electronic device is further configured for determining that the location is proximate to an item of interest; and displaying another graphical user interface associated with the determined location and the item of interest.

19. A non-transitory computer readable storage medium storing one or more programs, the one or more programs comprising instructions means, which when executed by an electronic device means with a display, cause the electronic device means to:

while displaying a first user interface of a first application on the display, detect a first input that corresponds to a request to share first content from the first application;

in response to detecting the first input, while continuing to display at least a portion of the first user interface of the first application, display a sharing interface that provides access to a plurality of concurrently displayed, user-selectable options for sharing the first content, wherein the sharing interface includes common portions that are capable of being accessed in a plurality of different applications in response to a request from a user to share respective content from a respective application in the plurality of different applications, and the sharing interface provides access to:

a first region for displaying one or more sharing options for sharing the first content directly with other users, wherein the first region includes a first row of icons that represent the other users with whom the first content is capable of being shared directly, a second region separate from the first region, the second region for displaying one or more other sharing options each for sharing the first content using a protocol of a plurality of protocols, wherein the second region includes a second row of icons that represent the plurality of protocols capable of being used to share the first content, wherein:

a first subset of icons in the second row of icons each include a picture of a user that corresponds to a respective icon in the first subset of icons, and a second subset of icons in the second row of icons each include one or more initials of a name of a user that corresponds to a respective icon in the second subset of icons, and a third region, separate from and concurrently displayed with the second region, the third region for displaying one or more application-related options each for performing an application-related operation of a plurality of application-related operations;

while displaying the sharing interface, detect user selection of an affordance accessible via the sharing interface;

in response to detecting user selection of the affordance accessible via the sharing interface:

in accordance with a determination that detecting user selection of the affordance accessible via the sharing interface includes detecting selection of a respective one of the one or more sharing options for a respective other user, initiate a process for sharing the first content with the respective other user, in accordance with a determination that detecting user selection of the affordance accessible via the sharing interface includes detecting selection of a respective one of the one or more other sharing options for a respective protocol, initiate a process for sharing the first content using the respective protocol, and in accordance with a determination that detecting user selection of the affordance accessible via the sharing interface includes detecting selection of a respective one of the one or more application-related options for a respective application-related operation, initiate a process for sharing the first content using the respective application-related operation;

share the first content from the first application in accordance with the affordance selected;
open a second application that is different from the first application;
while displaying a user interface of the second application on the display, detect a second input that corresponds to a request to share second content from the second application; and
in response to detecting the second input, display the common portions for sharing the second content.

20. A method, comprising:

at an electronic device with a display:
  while displaying a first user interface of a first application on the display, detecting a first input that corresponds to a request to share first content from the first application;
  in response to detecting the first input, while continuing to display at least a portion of the first user interface of the first application, displaying a sharing interface that provides access to a plurality of concurrently displayed, user-selectable options for sharing the first content, wherein the sharing interface includes common portions that are displayed for a plurality of different applications in response to a request from a user to share respective content from a respective application in the plurality of different applications, and the sharing interface provides access to:
    a first region for displaying one or more sharing options for sharing the first content directly with other users, wherein the first region includes a first row of icons that represent the other users,
    a second region separate from the first region, the second region for displaying one or more other sharing options each for sharing the first content using a protocol of a plurality of protocols, wherein the second region includes a second row of icons that represent the plurality of protocols capable of being used to share the first content, wherein:
      a first subset of icons in the second row of icons each include a picture of a user that corresponds to a respective icon in the first subset of icons, and
      a second subset of icons in the second row of icons each include one or more initials of a name of a user that corresponds to a respective icon in the second subset of icons, and
    a third region, separate from and concurrently displayed with the second region, the third region for displaying one or more application-related options each for performing an application-related operation of a plurality of application-related operations;
  while displaying the sharing interface, detecting user selection of an affordance accessible via the sharing interface;
  in response to detecting user selection of the affordance accessible via the sharing interface:
    in accordance with a determination that detecting user selection of the affordance accessible via the sharing interface includes detecting selection of a respective one of the one or more sharing options for a respective other user, initiating a process for sharing the first content with the respective other user,
    in accordance with a determination that detecting user selection of the affordance accessible via the sharing interface includes detecting selection of a respective one of the one or more other sharing options for a respective protocol, initiating a process for sharing the first content using the respective protocol, and
    in accordance with a determination that detecting user selection of the affordance accessible via the sharing interface includes detecting selection of a respective one of the one or more application-related options for a respective application-related operation, initiating a process for sharing the first content using the respective application-related operation;
  sharing the first content from the first application in accordance with the affordance selected;
  opening a second application that is different from the first application;
  while displaying a user interface of the second application on the display, detecting a second input that corresponds to a request to share second content from the second application; and
  in response to detecting the second input, displaying the common portions for sharing the second content.

* * * * *